United States Patent
Vulcano et al.

(10) Patent No.: US 9,146,125 B2
(45) Date of Patent: Sep. 29, 2015

(54) NAVIGATION APPLICATION WITH ADAPTIVE DISPLAY OF GRAPHICAL DIRECTIONAL INDICATORS

(71) Applicant: Apple Inc., Cupertino, CA (US)

(72) Inventors: Emanuele Vulcano, San Francisco, CA (US); Marcel van Os, San Francisco, CA (US); Bradford A. Moore, San Francisco, CA (US); Seejo K. Pylappan, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 13/632,117

(22) Filed: Sep. 30, 2012

(65) Prior Publication Data

US 2013/0345975 A1    Dec. 26, 2013

Related U.S. Application Data

(60) Provisional application No. 61/655,995, filed on Jun. 5, 2012, provisional application No. 61/655,997, filed on Jun. 5, 2012, provisional application No. 61/656,015, filed on Jun. 6, 2012, provisional (Continued)

(51) Int. Cl.
| | |
|---|---|
| *G01C 21/34* | (2006.01) |
| *G08G 1/0968* | (2006.01) |
| *G08G 1/0969* | (2006.01) |
| *G01C 21/36* | (2006.01) |
| *G09B 29/00* | (2006.01) |
| *G09B 29/10* | (2006.01) |
| *G06T 17/05* | (2011.01) |
| *G06F 1/32* | (2006.01) |

(52) U.S. Cl.
CPC ........ *G01C 21/3635* (2013.01); *G01C 21/3415* (2013.01); *G01C 21/3626* (2013.01);
(Continued)

(58) Field of Classification Search
CPC .. G01C 21/00; G01C 21/367; G01C 21/3667; G01C 21/3632; G01C 21/365; G09B 29/10; G01W 1/04
See application file for complete search history.

(56) References Cited

U.S. PATENT DOCUMENTS 5,629,854 A    5/1997    Schulte
5,654,892 A *  8/1997    Fujii et al. .................... 701/437
(Continued)

FOREIGN PATENT DOCUMENTS

EP    1626250    2/2006
EP    2080985    7/2009
(Continued)

OTHER PUBLICATIONS

International Search Report and Written Opinion for PCT/US2013/042029, Jan. 16, 2014 (mailing date), Apple Inc.
(Continued)

*Primary Examiner* — James Trammell
*Assistant Examiner* — Demetra Smith-Stewart
(74) *Attorney, Agent, or Firm* — Adeli LLP

(57) ABSTRACT

Some embodiments provide a navigation application. The navigation application includes an interface for receiving data describing junctures along a route from a first location to a second location. The data for each juncture comprises a set of angles at which roads leave the juncture. The navigation application includes a juncture simplifier for simplifying the angles for the received junctures. The navigation application includes an arrow generator for generating at least two different representations of the simplified juncture. The representations are for use in displaying navigation information describing a maneuver to perform at the juncture during the route. The navigation application includes an arrow selector for selecting one of the different representations of the simplified juncture for display according to a context in which the representation will be displayed.

25 Claims, 54 Drawing Sheets

Related U.S. Application Data application No. 61/656,032, filed on Jun. 6, 2012, provisional application No. 61/656,043, filed on Jun. 6, 2012, provisional application No. 61/656,080, filed on Jun. 6, 2012, provisional application No. 61/657,864, filed on Jun. 10, 2012, provisional application No. 61/657,880, filed on Jun. 10, 2012, provisional application No. 61/699,842, filed on Sep. 11, 2012, provisional application No. 61/699,855, filed on Sep. 11, 2012, provisional application No. 61/699,851, filed on Sep. 11, 2012, provisional application No. 61/699,853, filed on Sep. 11, 2012.

(52) U.S. Cl.
CPC ........ *G01C21/3632* (2013.01); *G01C 21/3638* (2013.01); *G01C 21/3664* (2013.01); *G01C 21/3667* (2013.01); *G06F 1/3215* (2013.01); *G06T 17/05* (2013.01); *G08G 1/0969* (2013.01); *G08G 1/096861* (2013.01); *G08G 1/096866* (2013.01); *G09B 29/007* (2013.01); *G09B 29/10* (2013.01); *G06F 1/3265* (2013.01); *Y02B 60/1242* (2013.01)

(56) References Cited

U.S. PATENT DOCUMENTS

| | | | |
|---|---|---|---|
| 5,862,511 A | 1/1999 | Croyle et al. | |
| 5,878,368 A | 3/1999 | DeGraaf | |
| 6,029,111 A | 2/2000 | Croyle | |
| 6,163,269 A | 12/2000 | Millington et al. | |
| 6,178,380 B1 | 1/2001 | Millington | |
| 6,295,503 B1 | 9/2001 | Inoue et al. | |
| 6,360,167 B1 | 3/2002 | Millington et al. | |
| 6,374,180 B1 | 4/2002 | Slominski et al. | |
| 6,381,534 B2 | 4/2002 | Takayama et al. | |
| 6,480,783 B1 | 11/2002 | Myr | |
| 6,539,300 B2 | 3/2003 | Myr | |
| 6,577,946 B2 | 6/2003 | Myr | |
| 6,615,130 B2 | 9/2003 | Myr | |
| 6,654,024 B1 | 11/2003 | Völkel | |
| 6,693,564 B2 | 2/2004 | Niitsuma | |
| 7,054,742 B2 | 5/2006 | Khavakh et al. | |
| 7,194,356 B2 | 3/2007 | Sano | |
| 7,433,780 B2 | 10/2008 | Machino | |
| 7,440,875 B2 | 10/2008 | Cuthbert et al. | |
| 7,460,953 B2 | 12/2008 | Herbst et al. | |
| 7,480,565 B2 | 1/2009 | Ikeuchi et al. | |
| 7,729,854 B2 | 6/2010 | Muramatsu | |
| 7,761,227 B2 | 7/2010 | Kropp | |
| 8,301,378 B2 | 10/2012 | Nishibashi et al. | |
| 8,306,730 B2 | 11/2012 | Nishibashi et al. | |
| 8,428,871 B1 | 4/2013 | Matthews et al. | |
| 8,438,481 B2 | 5/2013 | Lau et al. | |
| 8,612,151 B2 | 12/2013 | Winkler et al. | |
| 2004/0024524 A1 | 2/2004 | Miyazawa | |
| 2004/0048620 A1 | 3/2004 | Nakahara et al. | |
| 2005/0049786 A1 | 3/2005 | Odachi et al. | |
| 2005/0107993 A1 | 5/2005 | Cuthbert et al. | |
| 2005/0273251 A1 | 12/2005 | Nix et al. | |
| 2005/0273252 A1 | 12/2005 | Nix et al. | |
| 2006/0041372 A1 | 2/2006 | Kubota et al. | |
| 2006/0195259 A1 | 8/2006 | Pinkus et al. | |
| 2007/0150179 A1 | 6/2007 | Pinkus et al. | |
| 2007/0192020 A1 | 8/2007 | Brulle-Drews et al. | |
| 2007/0213092 A1 | 9/2007 | Geelen | |
| 2007/0276596 A1* | 11/2007 | Solomon et al. | 701/211 |
| 2008/0133124 A1 | 6/2008 | Sarkeshik | |
| 2008/0167798 A1 | 7/2008 | Tertoolen | |
| 2008/0167801 A1 | 7/2008 | Geelen et al. | |
| 2008/0320419 A1 | 12/2008 | Matas et al. | |
| 2009/0037094 A1* | 2/2009 | Schmidt | 701/201 |
| 2009/0063041 A1 | 3/2009 | Hirose et al. | |
| 2009/0105944 A1* | 4/2009 | Urano et al. | 701/202 |
| 2009/0164115 A1 | 6/2009 | Kosakowski et al. | |
| 2009/0171561 A1 | 7/2009 | Geelen | |
| 2009/0171578 A1 | 7/2009 | Kim et al. | |
| 2009/0171580 A1 | 7/2009 | Nezu | |
| 2009/0187335 A1 | 7/2009 | Muhlfelder et al. | |
| 2009/0326803 A1 | 12/2009 | Neef et al. | |
| 2010/0045704 A1 | 2/2010 | Kim | |
| 2010/0057358 A1 | 3/2010 | Winer et al. | |
| 2010/0153010 A1 | 6/2010 | Huang | |
| 2010/0312466 A1 | 12/2010 | Katzer et al. | |
| 2010/0324816 A1 | 12/2010 | Highstrom et al. | |
| 2011/0106595 A1 | 5/2011 | Vande Velde | |
| 2011/0285717 A1 | 11/2011 | Schmidt et al. | |
| 2012/0041674 A1 | 2/2012 | Katzer | |
| 2012/0197839 A1 | 8/2012 | Vervaet et al. | |
| 2012/0259539 A1 | 10/2012 | Sumizawa | |
| 2012/0265433 A1 | 10/2012 | Viola et al. | |
| 2012/0303263 A1 | 11/2012 | Alam et al. | |
| 2013/0035853 A1 | 2/2013 | Stout et al. | |
| 2013/0191020 A1 | 7/2013 | Emani et al. | |
| 2014/0025298 A1* | 1/2014 | Spindler et al. | 701/533 |

FOREIGN PATENT DOCUMENTS

| | | |
|---|---|---|
| EP | 102008036748 | 10/2009 |
| EP | 13169145 | 5/2013 |
| EP | 13169912 | 5/2013 |
| EP | 2672223 | 12/2013 |
| EP | 2672225 | 12/2013 |
| WO | WO 2007/101711 | 9/2007 |
| WO | WO 2011/025555 | 3/2011 |
| WO | WO 2011/076989 | 6/2011 |
| WO | WO 2011/146141 | 11/2011 |
| WO | WO 2012/034581 | 3/2012 |
| WO | WO 2013/184348 | 12/2013 |

OTHER PUBLICATIONS

Updated portions of prosecution history of EP13169145.3, Jan. 28, 2014 (mailing date), Apple Inc.
Portions of prosecution history of EP13169145, Sep. 2, 2013 (mailing date), Apple Inc.
Portions of prosecution history EP13169912, Aug. 30, 2013, Apple Inc.
Author Unknown, "'Touch & Go' Owner's Manual," Jul. 2011, 218 pages, Toyota, United Kingdom.
Updated portions of prosecution histroy of EP13169145.3, Aug. 19, 2014 (mailing date), Apple Inc.
Updated portions of prosecution history of EP13169912.6, Jun. 10, 2014 (mailing date), Apple Inc.
Qureshi, Khurram, "Garmin Nuvi 885T Voice Recognition & Command Demonstration," Feb. 3, 2010, 1 page, available at http://www.youtube.com/watch?v=OOJKhTN6iMg.
Author Unknown, "Garmin. nüvi 1100/1200/1300/1400 series owner's manual," Jan. 2011, 72 pages, Garmin Corporation, No. 68, Jangshu 2nd Road, Sijhih, Taipei County, Taiwan.
Ruhs, Chris, "My Favorite Android Apps: Maps," Jun. 24, 2011, 1 page, available at http://www.youtube.com/watch?v=v2aRkLkLT3s.
Author Unknown, "Google Maps Voice Navigation in Singapore," software2tech, Jul. 20, 2011, 1 page, available at http://www.youtube.com/watch?v=7B9JN7BkvME.
Author Unknown, "TomTom GO Live 1005 on the road Re-routing," PocketGPS, Mar. 8, 2012, 1 page, available at http://www.youtube.com/watch?v=sJf_NOcqoNA.
Updated portions of prosecution history of EP13169912.6, Oct. 17, 2014 (mailing date), Apple Inc.
Author Unknown, "MAZDA: Navigation System—Owner's Manual", available at http://download.tomtom.com/open/manuals/mazda/nva-sd8110/Full Manual EN.pdf, Jan. 1, 2009, 159 pages.
Dube, Ryan, "Use Google Maps Navigation for Turn-By-Turn GPS [Android]", available at http://www.makeuseof.com/tag/google-maps-navigation-turnbyturn-gps-android/, Jun. 24, 2010, 7 pages.

\* cited by examiner

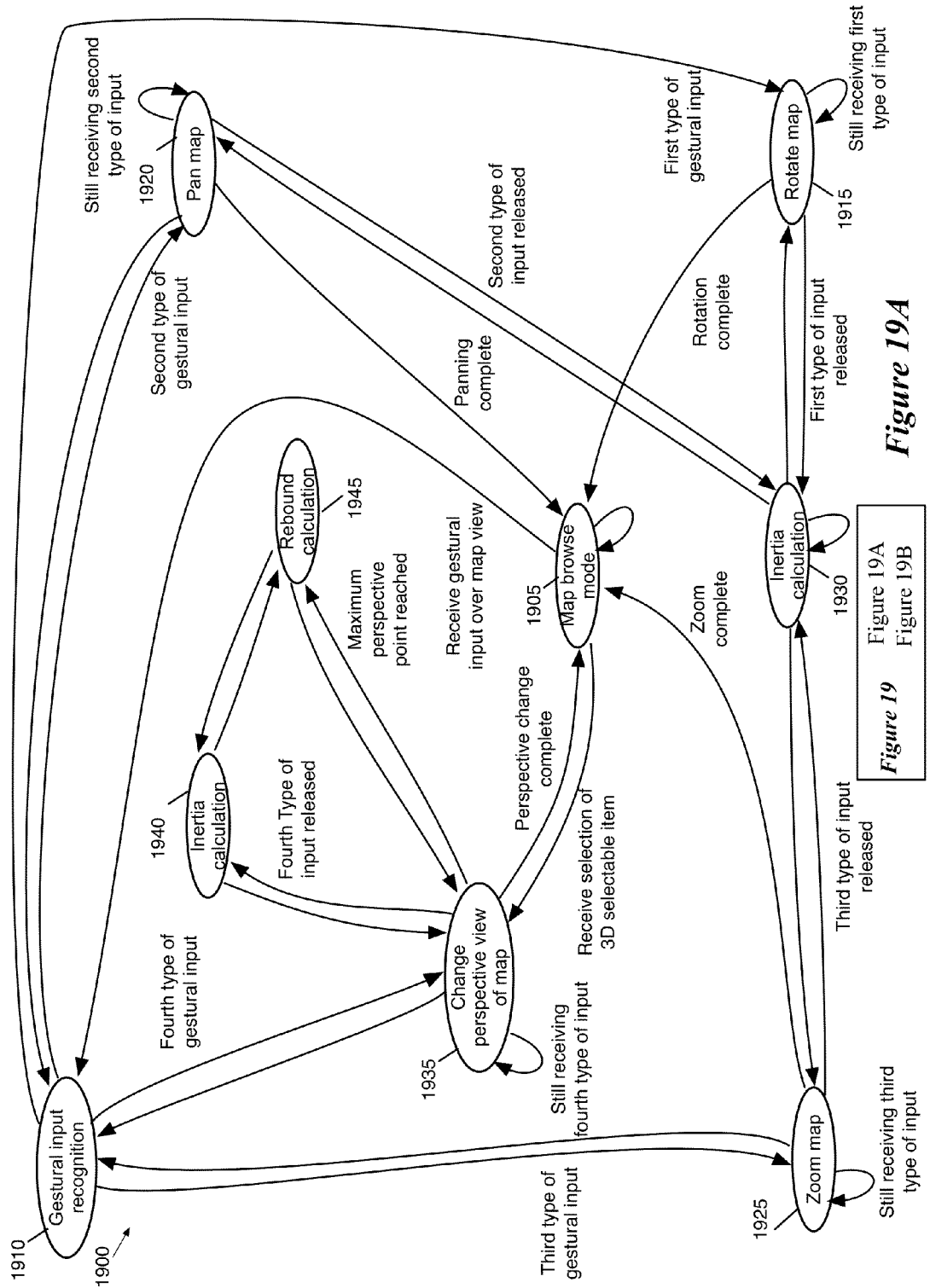

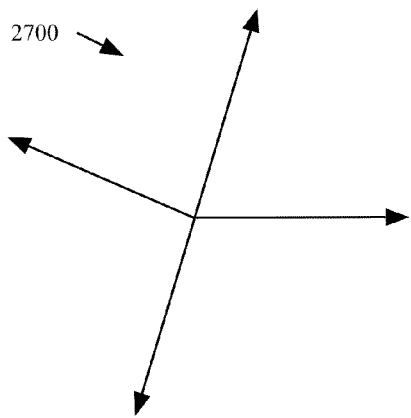
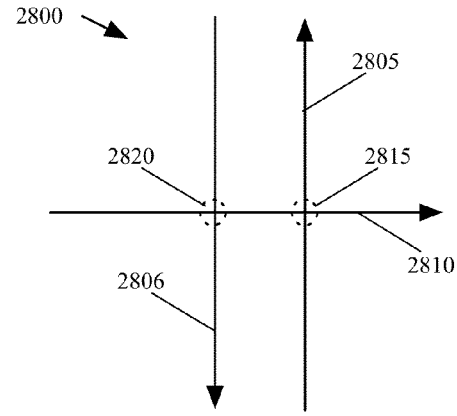
Figure 27
Figure 28
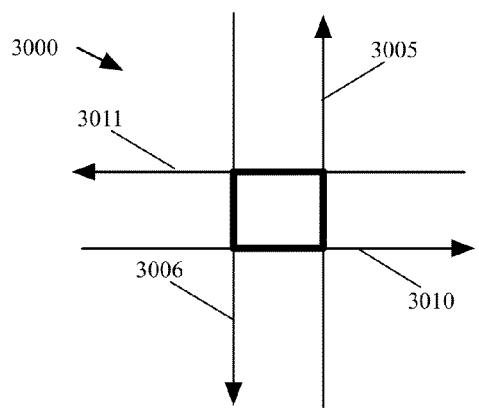
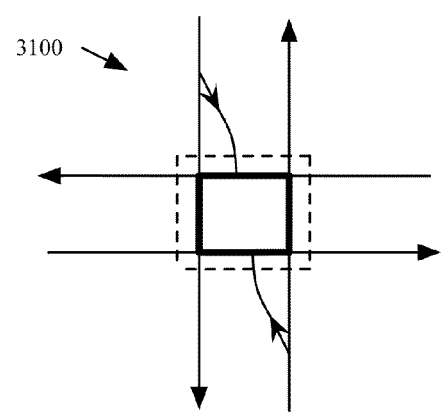
Figure 30
Figure 31
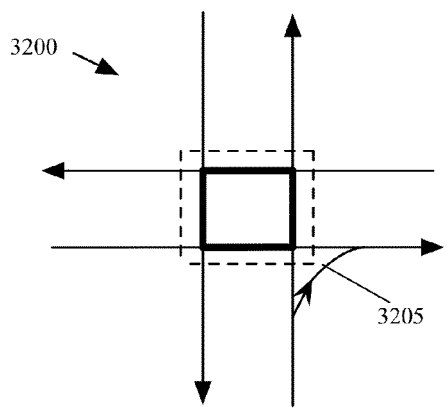
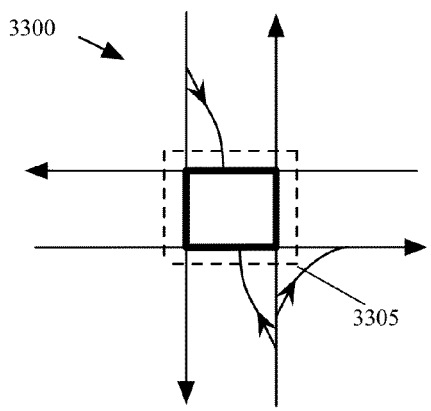
Figure 32
Figure 33

NAVIGATION APPLICATION WITH ADAPTIVE DISPLAY OF GRAPHICAL DIRECTIONAL INDICATORS

CLAIM OF BENEFIT TO PRIOR APPLICATIONS

This application claims the benefit of U.S. Provisional Patent Application 61/655,995, filed Jun. 5, 2012; U.S. Provisional Application 61/655,997, filed Jun. 5, 2012; U.S. Provisional Patent Application 61/656,015, filed Jun. 6, 2012; U.S. Provisional Application 61/656,032, filed Jun. 6, 2012; U.S. Provisional Application 61/656,043, filed Jun. 6, 2012; U.S. Provisional Patent Application 61/656,080, filed Jun. 6, 2012; U.S. Provisional Application 61/657,864, filed Jun. 10, 2012; U.S. Provisional Application 61/657,880, filed Jun. 10, 2012; U.S. Provisional Patent Application 61/699,842, filed Sep. 11, 2012; U.S. Provisional Application 61/699,855, filed Sep. 11, 2012; U.S. Provisional Patent Application 61/699,851, filed Sep. 11, 2012; and U.S. Provisional Patent Application 61/699,853, filed Sep. 11, 2012. U.S. Applications 61/655,995, 61/655,997, 61/656,015, 61/656,032, 61/656,043, 61/656,080, 61/657,864, 61/657,880, 61/699,842, 61/699,855, and 61/699,851 are incorporated herein by reference.

BACKGROUND

Many map-based applications available today are designed for a variety of different devices (e.g., desktops, laptops, tablet devices, smartphones, handheld global positioning system (GPS) receivers, etc.) and for various different purposes (e.g., navigation, browsing, sports, etc.). Most of these applications generate displays of a map based on map data that describes relative locations of streets, highways, points of interest, etc., in the map.

The maps used in such applications are usually two-dimensional (2D) maps or three-dimensional (3D) maps. However, a large number of the applications use 2D maps due in part to the processing-intensive demands of viewing 3D maps. For the same reason, the applications that use 3D maps are often slow, inefficient, plain, and/or simple, to the point that renders the application useless.

BRIEF SUMMARY

Some embodiments of the invention provide a device that includes a navigation application with several novel features. In some embodiments, the device has a touch-sensitive screen that displays the output of the application, and a multi-touch interface that allows a user to provide touch and gestural inputs through the screen to interact with the application.

In some embodiments, the novel features of the navigation application include (1) multiple different views (e.g., a two-dimensional turn-by-turn view, a three-dimensional turn-by-turn view, an overall route view, etc.) and smooth transitions between these views during the navigation, (2) novel user interface (UI) controls for navigation, (3) realistic looking road signs for identifying maneuvers along a navigated route, (4) dynamic generation of instructions and directional indicators for road signs and other presentations of the identified maneuvers, (5) informative navigation displays when the navigation application is operating in the background on the device, (6) novel voice recognition navigation guidance, and (7) integration with other routing applications available on or for the device.

While all these features are part of the navigation application in some embodiments, other embodiments do not employ all of these features in the navigation application. Also, in some embodiments, the navigation application is part of an integrated mapping application that provides several other useful operations, including location browsing, map searching, and route identifying operations. However, one of ordinary skill will realize that in other embodiments, the navigation application is a stand-alone application that does not include some or all of these other operations.

Each of the above-described features are described here. As mentioned above, the navigation application of some embodiments provides multiple different views during navigation and smooth transitions between these views. In some embodiments, examples of such views include a two-dimensional (2D) turn-by-turn view, a three-dimensional (3D) turn-by-turn view, and an overall route view. The application in some embodiments generates the turn-by-turn views from a perspective rendering position within a 3D navigation scene that the device renders. This perspective rendering position in some embodiments is adjustable and can be viewed as a virtual camera that can capture the 3D navigation scene from a variety of different perspectives (e.g., from a variety of different positions and orientations). Accordingly, in some embodiments, the turn-by-turn navigation is an animated rendering of navigated route that is rendered from the vantage point of a virtual camera that traverses along the direction of the route based on the traversal direction and speed of the user carrying the device, which in some embodiments is captured by directional data (e.g., GPS data, triangulated cell-tower data, etc.) associated with the device.

During navigation, the navigation application of some embodiments allows a user to change the position of the virtual camera (i.e., the position from which the navigated route is rendered) through gestural input on the device's screen. Movement of the virtual camera (i.e., movement of the position from which the route is rendered) allows the navigation application to present alternative 3D view. Some embodiments even use the virtual camera to render a top-down 2D view for the turn-by-turn navigation, while other embodiments render the top-down 2D view by zooming in and out of a 2D map.

In some embodiments, the navigation application presents a 3D control (e.g., button) that serves both as a 3D indicator and a 3D initiator/toggle. The 3D control is implemented in some embodiments as a floating control that can "float" above the 2D or 3D navigation presentation when it is needed and "float" out of the presentation when it is not needed. This control also serves as an indicator that the current view is a 3D view. The 3D control may have different appearances (e.g., colored as grey, black, blue, etc.) to provide different indications. In some embodiments, the 3D control is grey when 3D data is not available for the user's current location, black when the 3D data is available but the user is currently viewing the map in 2D, and purple when the user is viewing the map in 3D mode. In some embodiments, the 3D control displays an image of a building when the user is at a certain zoom level and provides a "flyover" of the buildings in the area when selected by the user. It also provides a quick mechanism of getting into and out of 3D navigation. As further described below, the navigation application allows transitions between the 2D and 3D navigation views through other gestural inputs of the multi-touch interface of the device.

The navigation application in some embodiments uses floating controls in order to keep the on-screen controls to a minimum and thereby display as much of the interactive navigation as possible. In some embodiments, the floating controls are part of a cluster of controls that adapt to the task at hand by adjusting its contents in an animated fashion when a user moves between different navigation views, or between different application modalities for embodiments in which the navigation is just one of several modalities of another application. This adaptive nature allows the navigation application to optimize for different tasks while maintaining a consistent look and interaction model while moving between those tasks.

When the navigation application starts a navigation presentation, the application in some embodiments (1) automatically hides the floating controls and a bar (containing other UI controls) on the top of a map along which the navigation is displayed, and (2) starts a full-screen turn-by-turn navigation presentation. In this mode, the application restricts touch interaction with the map. In some embodiments, a tap is required to access the controls that were automatically hidden. In some embodiments, these controls are adapted towards a full-screen navigation look, including a prominent display of the estimated time of arrival (ETA) in the bar along the top.

In some embodiments, one of the controls in the top bar is an overview button. By selecting this button at any time during the navigation, a user can seamlessly switch between the full-screen; turn-by-turn presentation that displays a view optimized for turn-by-turn directions; and an overview presentation that displays a view of the remaining route that better accommodate browsing.

In some embodiments, the constant set of controls and the in-place transition in the map provide continuity between the overview mode and the full-screen mode. These controls also include a control that allows the user to end the navigation in either the overview mode or full-screen model. Some embodiments also allow for a search to be performed while navigating. For instance, some embodiments provide a pull down handle that allows the search field to be pulled into the overview display while navigating in the overview mode. Alternatively, or conjunctively, some embodiments allow for searches to be performed during navigation through a voice-recognition input of the device of some embodiments. Also, in some embodiments, the application allows a user to perform searches (e.g., voice-initiated and/or text-based searches) during turn-by-turn navigation. The navigation application of some embodiments also allows navigation to be initiated through voice-recognition input of the device.

During navigation, the navigation application of some embodiments also allows a user to provide some gestural input without reference to the floating controls or the top-bar controls. For instance, different embodiments provide different gestural inputs to adjust the 2D/3D view during turn-by-turn navigation. In some embodiments, the gestural input is a two-finger pinching/spreading operation to adjust the zoom level. This adjustment of the zoom level inherently adjusts the position and rotation of the camera with respect to the route direction, and thereby changes the 2D/3D perspective view of the route direction. Alternatively, other embodiments provide other gestural inputs (e.g., a finger drag operation) that change the position of the camera instead of or in addition to the zoom operation. In yet other embodiments, a gestural input (e.g., a finger drag operation) momentarily changes the viewing direction of the camera to allow a user to momentarily glance to a side of the navigated route. In these embodiments, the application returns the camera to its previous view along the route after a short time period.

Another novel feature of the navigation application are the realistic-looking road signs that are used during navigation. In some embodiments, the signs are textured images that bear a strong resemblance to actual highway signs. These signs in some embodiments include instructional arrows, text, shields, and distance. The navigation application of some embodiments presents a wide number of sign variants in a large number of different contexts. Also, in some embodiments, the application presents signs in different colors according to the regional norms.

For maneuvers that are close together, the application in some embodiments presents a secondary sign beneath the primary sign. Also, as one maneuver is passed, the navigation application animates the sign passing away with a motion that mimics a sign passing overhead on the highway. When an upcoming maneuver is approaching, the navigation application draws attention to the sign with a subtle animation (e.g., a shimmer across the entire sign).

In some embodiments, the navigation application dynamically generates instructions for a road sign and other presentation (e.g., a list view) associated with a navigation maneuver based on the context under which the application is displaying the sign or presentation. For a given context, the instruction text is chosen by considering factors such as the available space, the availability of information conveyed by means other than text (e.g., the availability of voice guidance), the localized length of each of the instruction variants, the size of the display screen of the device, etc. By locally synthesizing and evaluating several alternatives, the application can pick an optimal instruction string in every scenario.

Similarly, the navigation application of some embodiments adaptively generates directional graphical indicators for a road sign and other presentation (e.g., a list view) associated with a navigation maneuver based on the context under which the application is displaying the sign or presentation. For instance, when there is sufficient space on a sign or presentation for the use of a bigger sign, the navigation application of some embodiments identifies a maneuver to perform at a juncture along a route by using a larger graphical directional indicator that includes (1) a prominent stylized arrow roughly representing the path of the vehicle, and (2) a de-emphasized set of lines and curves corresponding to other elements of the junction. In some embodiments that use this approach, a right turn at a T-junction is represented by a large arrow with a right-angle joined with a smaller, dimmer segment that runs parallel to one of the large arrow's segments. The smaller segment in some embodiments is also pushed off to the side so that the path taken by the vehicle dominates.

Such a representation of a maneuver (that includes a prominent stylized arrow and a de-emphasized set of lines) provides fairly complete information about the maneuver while remaining abstract and easily understandable. However, there may not be sufficient space on the sign or other presentation for such a representation in other contexts. Accordingly, for such cases, the navigation application of some embodiments uses an alternate representation of the maneuver that omits displaying the junction and instead only displays an arrow in the direction of movement.

To generate either the prominent stylized arrow or the simplified arrow for a juncture maneuver along a route, the navigation application in some embodiments receives from a server a description of the juncture and maneuver. In some embodiments, the server performs an automated process to generate this description based on map data, and provides this information in terms of compressed, geometric point data. Also, at the beginning of a route navigation, the server in some embodiments supplies to the navigation application the description of all junctures and maneuvers along the route, and occasionally updates this description when the user strays from the route and the server computes a new route.

When the navigation application receives the juncture and maneuver description, the application of some embodiments initially performs a process to simplify the characterization of the juncture and the maneuver, and then uses this simplified characterization to generate the prominent stylized graphical directional indicator for the juncture. To display a maneuver at a juncture, some navigation applications often provide a plain arrow that is not expressed in terms of the juncture and does not convey much information, while other navigation applications provide a very detailed representation of the juncture and a complex directional representation through this detailed representation. Thus, one existing approach provides very little information, while another approach provides so much information that the information is rendered practically useless. By generating the prominent stylized directional indicator based on the simplified description of the juncture, the navigation application of some embodiments displays a detailed representation of the maneuver at the juncture while eliminating some of the unnecessary complexities of the juncture.

In some embodiments, the navigation application provides navigation instructions while the application is operating in the background and even while the device is locked. In some embodiments, the device is locked when only a reduced set of controls can be used to provide input into the device. For instance, in some embodiments, the locking of the device greatly limits the number of inputs that a user can provide through the touch-sensitive screen of the device.

In some embodiments, voice guidance instructions are one example of instructions that can be provided while the navigation application is operating in the background or while the device is locked. Alternatively to, or conjunctively with, the voice guidance, the navigation application can provide text and/or graphical instructions in at least two modes while operating in the background.

First, the application of some embodiments incorporates in the lock screen background, a live navigation view (e.g., a turn-by-turn view) that includes text and graphical navigation description in the lock-screen display. With this presentation, the user can see the navigation instructions while the application is running in the background without unlocking the device. In some embodiments, the application further refines the lock screen experience by sending notifications that would normally occupy the space being taken by the navigation display to a drawer in the lock-screen display, which in some embodiments is done immediately while in other embodiments is done after a short time period in which the notification is shown on the lock screen view. Also, whenever a user unlocks the device, some embodiments return without animation to the navigation display in order to make the experience seamless.

In some embodiments, the application turns off the lock screen navigation display after a time period if no maneuvers are impending. However, the application in some of these embodiments lights up the screen when approaching an imminent maneuver and/or new navigation instructions need to be provided. This is a small amount of time relative to the duration of each step, so the display of the navigation instructions does not come at the expense of noticeably degraded battery life. To enhance the experience, the navigation application in some embodiments activates an ambient light sensor well before the navigation prompt so that the ambient light settings can be used to light the screen to the correct brightness when it comes time to show the navigation map.

Second, in some embodiments, the navigation application operates in the background even when the device is unlocked. This is the case when the navigation application operates on a device (e.g., a smartphone) that executes several other applications. In such a device, the navigation application would operate in the background when the device is presenting a view (e.g., a page) that is provided by the operating system of the device or a view that is provided by another application on the device.

When the navigation application operates in the background on an unlocked device, the device in some embodiments (1) uses a double-height status bar to indicate the background operation of the navigation application when far from an upcoming maneuver, and (2) uses a sign-like navigation banner that includes dynamically updated distance to a maneuver when approaching a maneuver or when guidance instructions are audible. Further, the application maintains the sign-like banner until the maneuver is complete and suppresses other notifications in that space. Selection of either the double-height status bar or the navigation banner in some embodiments directs the device to switch to a navigation view generated by the navigation application.

The above-described features as well as some other features of the navigation application of some embodiments are further described below. In the description above and below, many of the features are described as part of an integrated mapping application that provides novel location browsing, location searching, route identifying and route navigating operations. However, one of ordinary skill will realize that these novel operations are performed in other embodiments by applications that do not perform all of these operations, or perform other operations in addition to these operations.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

FIGS. 19A and 19B conceptually illustrate a state diagram that describes different states and transitions between these states of the integrated mapping, search, and navigation application of some embodiments (e.g., the application described in the above sections).

FIG. 27 illustrates an example of a junction and shows that there is no requirement that the path segments meet at right angles or that the paths continue in a straight line through the junction in some embodiments.

FIG. 28 illustrates an intersection that includes two dual carriageway paths and a one-way road in some embodiments.

FIG. 30 illustrates a commonly existing intersection, between a dual carriageway with two paths and a dual carriageway with two paths in some embodiments.

FIG. 31 illustrates an intersection in which left-turn channels are defined as separate path segments in some embodiments.

FIG. 32 illustrates a slip road in an intersection in some embodiments.

FIG. 33 illustrates a slip road in an intersection in some embodiments.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

I. Navigation User Interface

A. Start

The navigation application of some embodiments is part of an integrated mapping application that includes several useful modalities, including location browsing, map searching, route identifying and route navigating operations. This integrated application (referred to below as the mapping application, the navigation application, or the integrated application) in some embodiments is defined to be executed by a device that has a touch-sensitive screen that displays the output of the application. In some embodiments, this device has a multi-touch interface for allowing a user to provide touch and gestural inputs through the screen to interact with the application. Examples of such devices are smartphones (e.g., iPhone® sold by Apple Inc., phones operating the Android® operating system, phones operating the Windows 8® operating system, etc.).

Figure 1:
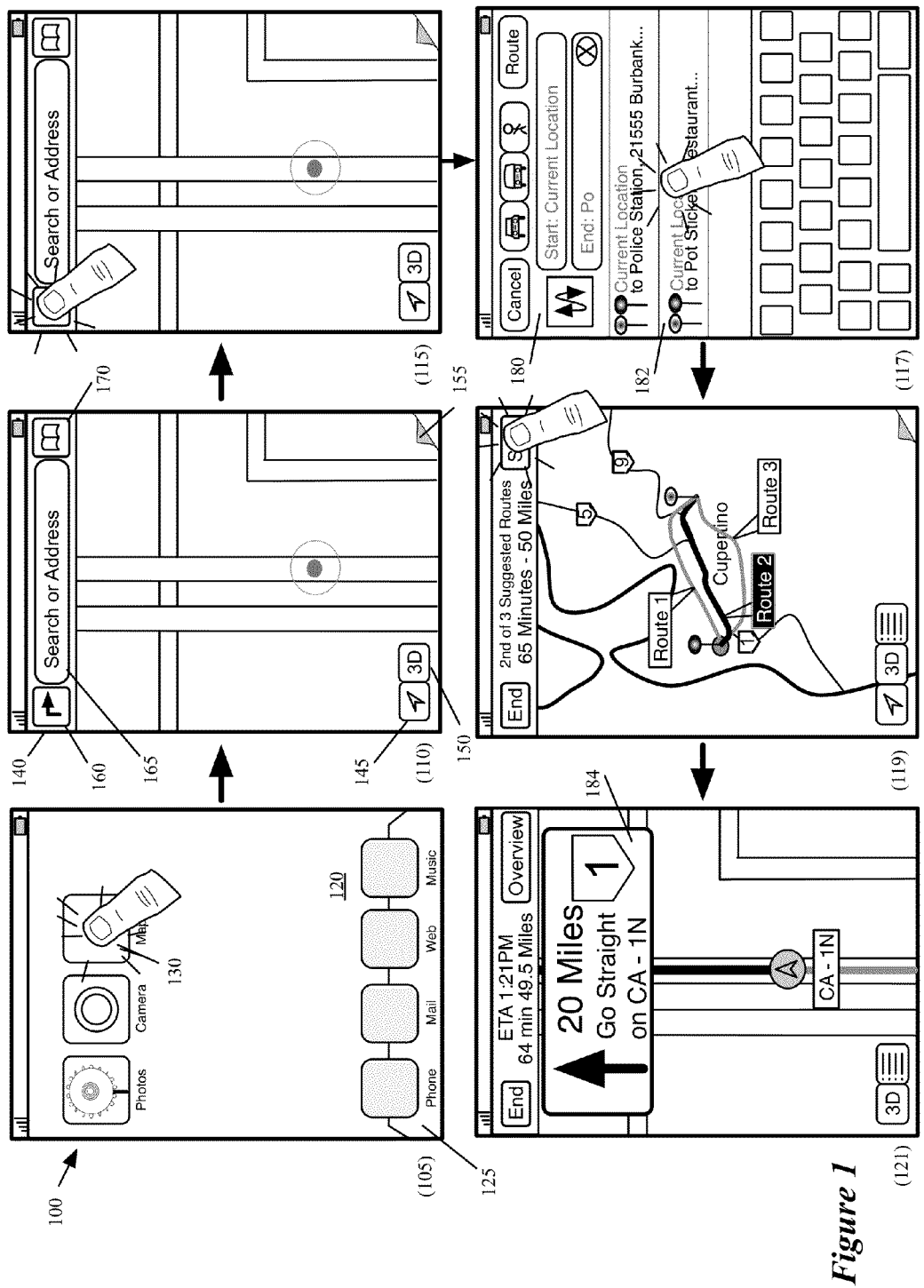
FIG. 1 illustrates an example of a device that executes an integrated mapping application of some embodiments of the invention.

FIG. 1 illustrates an example of a device 100 that executes an integrated mapping application of some embodiments of the invention. This figure also illustrates an example of launching a route navigation in this application. This application has a novel user interface (UI) design that seamlessly and cohesively integrates the controls for each of its different modalities by using a minimum set of on-screen controls that float on top of the content in order to display as much of the content as possible. Additionally, this cluster adapts to the task at hand, adjusting its contents in an animated fashion when a user moves between the different modalities (e.g., between browsing, searching, routing and navigating). This common element with an adaptive nature enables the mapping application to optimize for different tasks while maintaining a consistent look and interaction model while moving between those tasks.

FIG. 1 shows six stages 105, 110, 115, 117, 119, 121 of interaction with the mapping application. The first stage 105 shows the device's UI 120, which includes several icons of several applications in a dock area 125 and on a page of the UI. One of the icons on this page is the icon for the mapping application 130. The first stage shows a user's selection of the mapping application through touch contact with the device's screen at the location of this application on the screen.

The second stage 110 shows the device after the mapping application has opened. As shown in this stage, the mapping application's UI has a starting page that in some embodiments displays (1) a map of the current location of the device and (2) several UI controls arranged in a top bar 140, and as floating controls. As shown in FIG. 1, the floating controls include an indicator 145, a 3D control 150, and a page curl control 155, while the top bar 140 includes a direction control 160, a search field 165, and a bookmark control 170.

In some embodiments, a user can initiate a search by tapping in the search field 165. This directs the application to present an animation that (1) presents an on-screen keyboard and (2) opens a search table full of invaluable completions. This table has some important subtleties. When the search field is tapped and before the terms are edited, or when the search field is empty, the table contains a list of "recents," which in some embodiments are recent searches and route directions that the user has requested. This makes it very easy to quickly bring up recently accessed results.

After any input on the search field, the table is filled with search completions both from local sources (e.g., bookmarks, contacts, recent searches, recent route directions, etc.) and remote servers. The incorporation of the user's contact card into the search interface adds additional flexibility to the design. When showing recents, a route from the current location to the user's home is always offered in some embodiments, while it is offered in the contexts that are deemed to be "appropriate" in other embodiments. Also, when the search term matches at least part of an address label (e.g., 'ork' for 'Work'), the application presents the user's labeled address as a completion in the search table in some embodiments. Together these behaviors make the search UI a very powerful way to get results onto a map from a variety of sources. In addition to allowing a user to initiate a search, the presence of the text field in the primary map view in some embodiments also allows users to see the query corresponding to search results on the map and to remove those search results by clearing the query.

The bookmark control 170 (e.g., button) allows location and routes to be bookmarked by the application. The position indicator 145 allows the current position of the device to be specifically noted on the map. Once this indicator is selected, the application maintains the current position of the device in the center of the map. In some embodiments, it can also identify the direction to which the device currently points.

The 3D control 150 is a control for viewing a map or inspecting a route in three dimensions (3D). The mapping application provides the 3D control as a quick mechanism of getting into and out of 3D. This control also serves as (1) an indicator that the current view is a 3D view, (2) an indicator that a 3D perspective is available for a given map view (e.g., a map view that is zoomed out might not have a 3D view available), (3) an indicator that a 3D perspective is not available (e.g., the 3D data is not available for the map region), and (4) an indicator that a flyover animation is available at the given zoom level. The 3D control may provide a different appearance corresponding to each indication. For instance, the 3D control may be colored grey when the 3D view is unavailable, black when the 3D view is available but the map is in the 2D view, and blue when the map is in the 3D view. In some embodiments, the 3D control changes to an image of a building when the flyover animation is available for the user's given zoom level and location on the map.

The page curl control 155 is a control that allows the application to minimize the number of on-screen controls, by placing certain less frequently used actions in a secondary UI screen that is accessible through the page curl control that is displayed on the map. In some embodiments, the page curl is permanently displayed on at least some of the map views that the application provides. For instance, in some embodiments, the application displays the page curl permanently on the starting page (illustrated in the second stage 110) that it provides for allowing a user to browse or search for a location or to identify a route.

The direction control 160 opens a direction entry page 180 through which a user can request a route to be identified between a starting location and an ending location. The third stage 115 of FIG. 1 illustrates that the selection of the direction control 160 opens the direction entry page 180, which is shown in the fourth stage 117. The direction control is one of three mechanisms through which the mapping application can be directed to identify and display a route between two locations; the two other mechanisms are (1) a control in an information banner that is displayed for a selected item in the map, and (2) recent routes identified by the device that are displayed in the search field 165. Accordingly, the information banner control and the search field 165 are two UI tools that the application employs to make the transition between the different modalities seamless.

The fourth stage 117 shows that the direction entry page 180 includes starting and ending fields for providing starting and ending locations for a route, and a table that lists recent routes that the application has provided to the user. Other controls on this page are controls for starting a route, for reversing the order of the start and end locations, for canceling the direction request, for picking walking, auto, or public transit routes. These controls and other aspects of the mapping application are described in U.S. patent application Ser. No. 13/632,102, entitled "Problem Reporting in Maps," filed on Sep. 30, 2012, now published as U.S. Patent Publication No. 2013/0326407. U.S. patent application Ser. No. 13/632,102, now published as U.S. Patent Publication 2013/0326407 is incorporated herein by reference.

The fourth stage illustrates the user selecting one of the recent directions that was auto-populated in the table 182. The fifth stage 119 then shows three routes on a 2D map view between the specified start and end locations specified through the page 180. It also shows the selection of the second route and some information about this route in a bar at the top of the layout. This bar is shown to include start and end buttons. The start button is shown to be selected in the fifth stage.

As shown in the sixth stage, the selection of the start button directs the application to enter a turn-by-turn navigation mode. In this example, the application has entered a 2D turn-by-turn navigation mode. In other embodiments, the application will enter by default into a 3D turn-by-turn navigation mode. In this mode, the application displays a realistic sign 184 that identifies the distance from the current location of the device to the next juncture maneuver in the navigated route and some other pertinent information. The application also displays a top bar that includes some information about the navigation as well as End and Overview buttons, for respectively ending the navigation and obtaining an overview of the remaining portion of the navigated route or the entire portion of the navigated route in other embodiments.

The mapping application of some embodiments identifies the location of the device using the coordinates (e.g., longitudinal, altitudinal, and latitudinal coordinates) in the GPS signal that the device receives at the location of the device. Alternatively or conjunctively, the mapping application uses other methods (e.g., cell tower triangulation) to compute the current location. When the user carrying the device deviates from the route, the mapping application of some embodiments tracks the location of the device and re-calculates a new route from the deviated location in order to re-direct the user to the destination location from the deviated location. In other words, the mapping application of some embodiments operating in the navigation mode requires the device to be on a route at all times.

The application further displays the floating 3D control and the floating list control, which were described above. It should be noted that the list control was adaptively added to the floating control cluster upon entering the route inspection and route navigation modalities, while the position indicator was removed from the floating control upon entering the route navigation modality. Also, upon transition from the route inspection mode to the route navigation mode, the application performs an animation in some embodiments that involves the page curl uncurling completely before the application transitions into the navigation presentation.

In some embodiments, the animation transition includes removing the top bar, its associated controls and the floating controls from the navigation presentation, and moving the sign 184 to the top edge of the presentation a short time period after starting the navigation presentation. As further described below, the application requires the user tap on the navigated map to bring back the top bar, its controls and the floating controls, and requires another tap to remove these controls again from the map, in some embodiments. Other embodiments provide other mechanisms for viewing and removing these controls.

Figure 2:
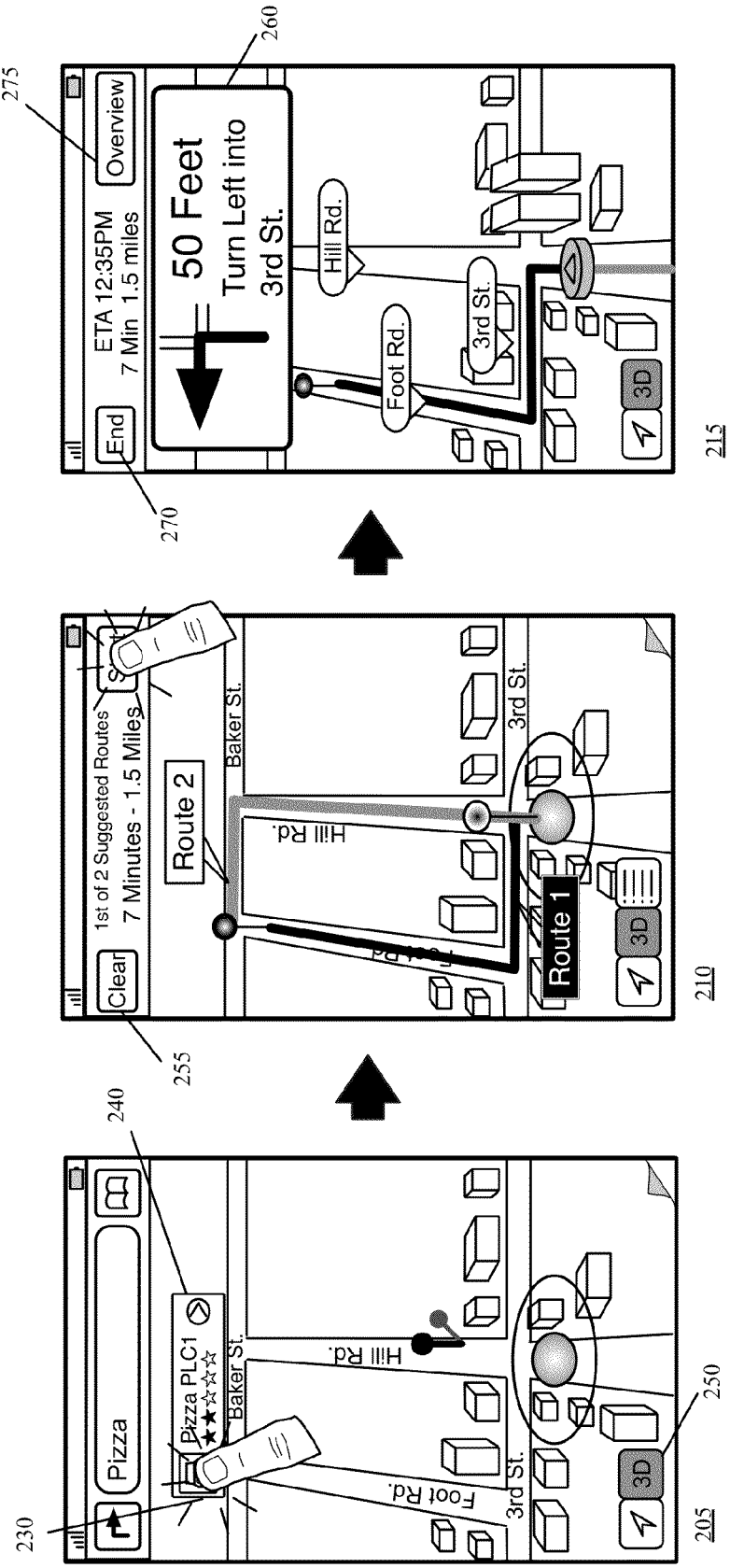
FIG. 2 illustrates an example in terms of three stages of a user's interaction with the mapping application to obtain routing directions.

As another way of allowing the user to get navigation experience, the mapping application of some embodiments provides a UI item in an informational banner that appears by a pin that represents a point of interest (POI). FIG. 2 illustrates an example in terms of three stages 205-215 of a user's interaction with the mapping application to obtain routing directions. This example is provided in the context of using a car icon 230.

The first stage 205 illustrates a map in a 3D map view. As shown, a 3D control 250 appears highlighted to indicate that the map is in a 3D map view. The first stage 205 also illustrates two informational banners for the two pins for the search resulting from running a search with a search query "Pizza" as shown. The user selects the car icon 230. As mentioned above, the car icon 230 is for showing one or more routes to the location that is represented by a pin with which the banner that includes the car icon 230 is associated. The banner 240 which includes the car icon 230 also shows a brief description of the place, a star rating, and an arrow for launching a "stage" for the POI.

The second stage 210 illustrates the two routes, route 1 and route 2, that the mapping application of some embodiments shows in response to the selection of the car icon 230 in the previous stage 205. The user has selected route 1 as indicated by the highlight on the route 1. The user also selects the start button. As mentioned above, the start button in some embodiments is for starting the navigation according to the selected route.

The third stage 215 illustrates that the mapping application displays an instruction sign 260, which is the sign for the first instruction. The mapping application has replaced the clear control 255 and the start button with an end button 270 and an overview control 275 in the top bar 140. The end button is for ending the navigation of the route and the overview control 275 is for showing the entire route in the map view by adjusting the zoom level of the displayed map if adjusting the zoom level is necessary to show the entire route. In some embodiments, the mapping application displays in the top bar 140 the ETA, the amount of time to get to the destination, and the remaining distance to the destination as shown.

When the mapping application receives a selection of the end button while the mapping application is operating in the route inspection mode, the mapping application of some embodiments stops inspection of the selected route by going back to map browsing mode. The mapping application of some embodiments goes back to the map browsing mode by removing the selected route from the map, putting back the page curl, and replacing the information and controls in the top bar with a set of other controls including a direction control, a search field, and a bookmark control. That is, the mapping application takes the appearance of the UI page back to a UI page similar to the UI page shown in the first stage 205. The mapping application of some embodiments does not shift the map to another region when switching to the map browsing mode from the inspection mode.

B. 2D and 3D Navigation

Figure 3:
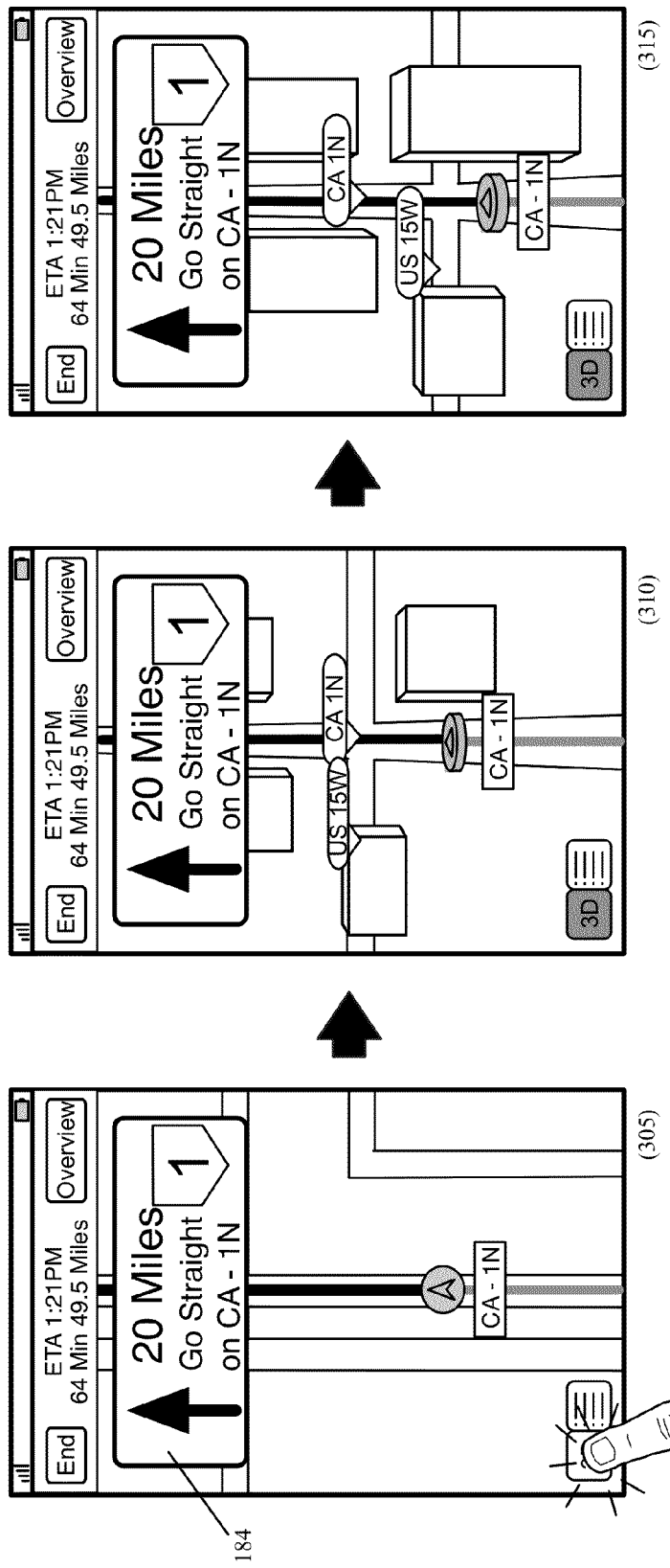
FIG. 3 illustrates how the navigation application of some embodiments provides the 3D control as a quick mechanism for entering a 3D navigating mode.

The navigation application of some embodiments can display navigation in either a 2D mode or a 3D mode. As mentioned above, one of the floating controls is the 3D control 250 that allows a user to view a navigation presentation in three dimensions (3D). FIG. 3 illustrates how the navigation application of some embodiments provides the 3D control 250 as a quick mechanism for entering a 3D navigating mode. This figure illustrates this operation in three stages 305-315. The first stage 305 illustrates the user selecting the 3D control 150 while viewing a two-dimensional navigation presentation.

The second stage 310 illustrates the navigation presentation in the midst of its transition into a 3D presentation. As shown in this figure, the 3D control appears highlighted at this stage to indicate that the navigation presentation has entered a 3D mode. As mentioned above, the navigation application generates the 3D view of the navigated map in some embodiments by rendering the map view from a particular position in the three dimensional scene that can be conceptually thought of as the position of a virtual camera that is capturing the map view. This rendering is further described below by reference to FIG. 5.

The third stage 315 then illustrates the navigation presentation at the end of its transition into its 3D appearance. As shown by the difference between the heights of the buildings in the second and third stages, the transition from 2D to 3D navigation in some embodiments includes an animation that shows three-dimensional objects in the navigated map becoming larger. Generating such animation that shows objects rising/falling and becoming larger/smaller is further described in the U.S. patent application Ser. No. 13/632,027, entitled "Displaying 3D Objects in a 3D Map Presentation," filed on Sep. 30, 2012, now published as U.S. Patent Publication 2014/007119. U.S. patent application Ser. No. 13/632,027, now published as U.S. Patent Publication 2014/0071119 is incorporated herein by reference.

Some embodiments use a cinematic transition from the 2D map view to the 3D map view or vice versa. For instance, when the mapping application receives a selection of the 3D control 250 while showing a starting location of a route, the mapping application begins from the 2D map view and transitions smoothly from a first virtual camera view for the 2D to a new virtual camera 3D view that is more zoomed in and pointing in the direction of the start of the route. In doing so, the virtual camera performs a combination of translation, zoom, and rotation operations in order to reach the start of the route for navigation. That is, the virtual camera moves in an arc and rotates upward as the camera moves downward along the arc. Also, the mapping application may rotate the arc itself to align the virtual camera viewpoint to the initial road segment of the route. In other words, the mapping application rotates the map during the cinematic transition.

Figure 4:
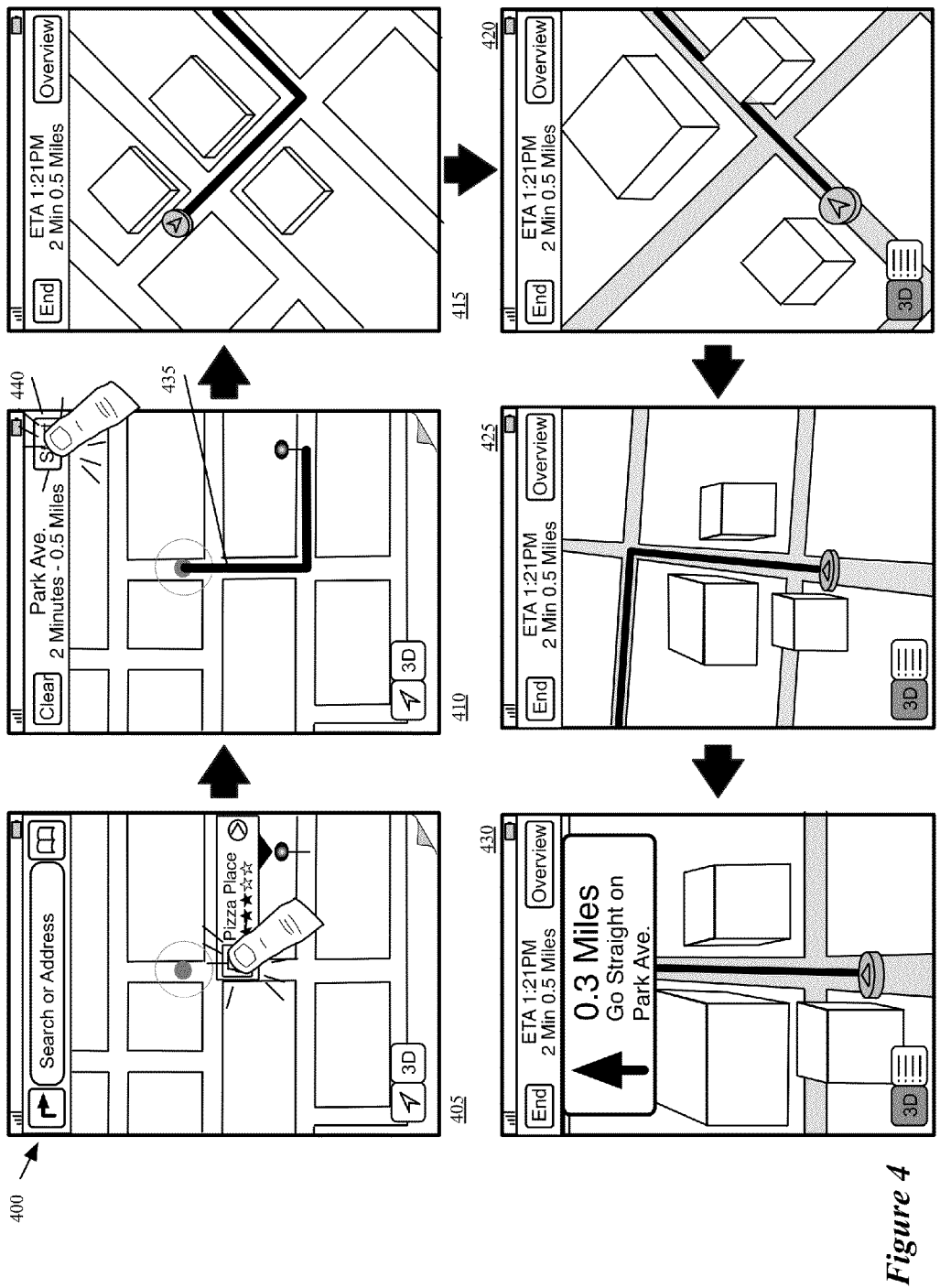
FIG. 4 illustrates a device that displays a mapping application as the application transitions from a non-immersive map view for map browsing into an immersive map view for navigation.

FIG. 4 illustrates a device 400 that displays a mapping application as the application transitions from a non-immersive map view for map browsing into an immersive map view for navigation, over six stages 405-430.

The first stage 405 illustrates a user selecting a quick-route button for a location "Pizza Place" in order to generate a route from the user's current location (near the center of the screen of device 400) to the selected location. The second stage 410 illustrates the mapping application displaying a route 435 to reach the location "Pizza Place." At the second stage 410, the user selects the "Start" UI control 440. Accordingly, the application begins entering navigation.

As shown at the third through sixth stages 415-430, some embodiments use a cinematic transition from the 2D (or 3D) non-immersive map view into the 3D immersive map view. The application display begins from its current state (that shown at 410) and transitions smoothly from the first virtual camera view to the new virtual camera view that is more zoomed in and pointing in the direction of the start of the route. In doing so, the virtual camera may perform a combination of translation, zoom, and rotation operations in order to reach the start of the route for navigation. As shown in these stages, the virtual camera moves and rotates into its eventual location behind the navigation location indicator (i.e., the puck) shown in the sixth stage 430.

Also, in some embodiments, the mapping application provides two different types of 3D presentations—an immersive 3D presentation and a non-immersive 3D presentation. The immersive presentation in some embodiments not only displays more geometries but also displays more details for the geometries that are displayed in the non-immersive presentation. The mapping application also provides smooth transitions between the non-immersive and immersive presentations.

To achieve such smooth transitions and generate other novel effects, the mapping application of some embodiments uses a novel image processing pipeline. This pipeline performs a variety of pre-load operations to download, retrieve and/or decompress map tiles that may be needed for a navigation presentation, to prepare its rendering pipeline for its rendering operations, and to prepare a duplicate pipeline to smoothly transition between the immersive and non-immersive 3D presentations. In order to display immersive and non-immersive 3D map presentations, some embodiments have to generate a variety of tiles for client devices to render in order to generate roads, building, and surrounding scenery. In some embodiments, examples of such tiles include road and building tiles used for non-immersive 3D presentations, and navigation and building tiles used for immersive 3D presentations. This pipeline is described in above-incorporated U.S. patent application Ser. No. 13/632,102, entitled "Problem Reporting in Maps," filed on Sep. 30, 2012, now published as U.S. Patent Publication 2013/0326407. This pipeline is also described in detail in the U.S. patent application Ser. No. 13/632,040, entitled "Virtual Camera for 3D Maps," filed on Sep. 30, 2012, now published as U.S. Patent Publication 2013/0321401. U.S. patent application Ser. No. 13/632,040, now published as U.S. Patent Publication 2013/0321401 is incorporated herein by reference.

In some embodiments, the non-immersive and immersive viewing modes are viewing modes for viewing different 3D maps that have different constructs and/or geometries. For instance, the non-immersive viewing mode of some embodiments is for viewing a 3D map that includes roads, buildings, land cover, etc. The immersive viewing mode is for viewing a more detailed 3D map that includes the same or similar elements (e.g., roads, buildings, land cover, etc.) as the 3D map for the non-immersive viewing mode. However, this more detailed 3D map also includes higher detail constructs (e.g., trees, foliage, sidewalks, medians, lanes of roads, road asphalt, medians, cross walks, etc.) that provide a more realistic and rich 3D map.

In addition, the non-immersive and immersive viewing modes may be defined for viewing 3D maps at different ranges of zoom levels. For example, the non-immersive viewing mode of some embodiments is defined for viewing a 3D map at low zoom levels (e.g., zoom levels 0-14) while the immersive viewing mode of some embodiments is defined for viewing the 3D map at high zoom levels (e.g., zoom levels 16-21). The viewing modes may be defined to view any number of different zoom levels in different embodiments. In some instances, the range of zoom levels of the immersive viewing mode are defined as higher zoom levels than, lower zoom levels than, the same zoom levels as, or zoom levels that overlap with the zoom levels defined for the non-immersive viewing mode. These viewing modes and other aspects of the mapping application are described in the U.S. patent application Ser. No. 13/632,040, entitled "Virtual Camera for 3D Maps," filed on Sep. 30, 2012, now published as U.S. Patent Publication 2013/0321401. U.S. patent application Ser. No. 13/632,040, now published as U.S. Patent Publication 2013/0321401 is incorporated herein by reference.

1. Virtual Camera

Figure 5:
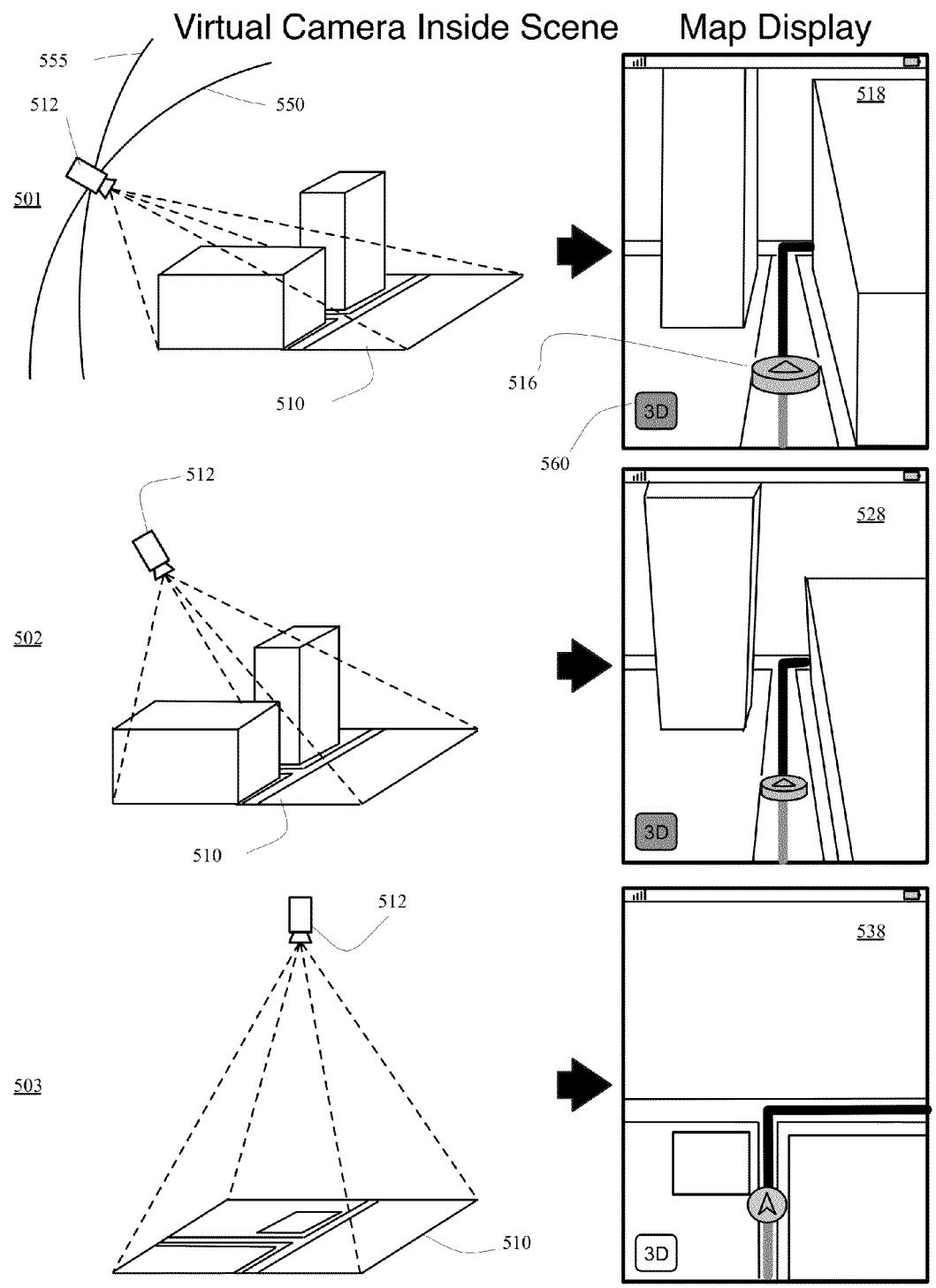
FIG. 5 presents a simplified example to illustrate the concept of a virtual camera.

The navigation application of some embodiments is capable of displaying navigation maps from multiple perspectives. The application can show maps in three dimensions (3D) or in two dimensions (2D). The 3D maps are generated simulations of a virtual scene as seen by a virtual camera. FIG. 5 presents a simplified example to illustrate the concept of a virtual camera 512. When rendering a 3D navigation map, a virtual camera is a conceptualization of the position in the 3D map scene from which the device renders a 3D view of the scene. FIG. 5 illustrates a location in a 3D navigation map scene 510 that includes four objects, which are two buildings and two intersecting roads. To illustrate the virtual camera concept, this figure illustrates three scenarios, each of which corresponds to a different virtual camera location (i.e., a different rendering position) and a different resulting view that is displayed on the device.

The first stage 501 shows the virtual camera 512 at a first position pointing downwards at an angle (e.g., a 30 degree angle) towards the 3D scene 510. By rendering the 3D scene from the position and angle shown in stage 501 the application generates the 3D map view 518. From this position, the camera is pointing at a location that is a moving position in front of the device. The virtual camera 512 is kept behind the current location of the device. "Behind the current location" in this case means backward along the navigation application's defined path in the opposite direction from the current direction that the device is moving in.

The navigation map view 518 looks as though it was shot by a camera from above and behind the device's location indicator 516. The location and angle of the virtual camera places the location indicator 516 near the bottom of the navigation map view 518. This also results in the majority of the screen being filled with the streets and buildings ahead of the present location of the device. In contrast, in some embodiments, the location indicator 516 is in the center of the screen, with half of the screen representing things ahead of the device and the other half representing things behind the device. To simplify the figure, no road signs are depicted for the views 518, 528, and 538.

The second stage 502 shows the virtual camera 512 at a different position, pointing downwards towards the scene 510 at a larger second angle (e.g., −45°). The application renders the scene 510 from this angle, resulting in the 3D navigation map view 528. The buildings and the roads are smaller than their illustration in the first navigation map view 518. Once again the virtual camera 512 is above and behind the location indicator 516 in the scene 510. This again results in the location indicator appearing in the lower part of the 3D map view 528. The location and orientation of the camera also results again in the majority of the screen displaying things ahead of the location indicator 516 (i.e., the location of the car carrying the device), which is what someone navigating needs to know.

The third stage 503 shows the virtual camera 512 at a top-down view that looks downwards on a location in the 3D map scene 510 that was used to render the 3D views 518 and 528. The scene that is rendered from this perspective is the 2D map view 538. Unlike the 3D rendering operations of the first and second stages that in some embodiments are perspective 3D rendering operations, the rendering operation in the third stage is relatively simple as it only needs to crop a portion of the 2D map that is identified by a zoom level specified by the application or the user. Accordingly, the virtual camera characterization in this situation somewhat unnecessarily complicates the description of the operation of the application as cropping a portion of a 2D map is not a perspective rendering operation.

At the third stage 503, the mapping application in some embodiments switches from rendering a 3D scene from a particular perspective direction to cropping a 2D scene when the camera switches from the 3D perspective view to a 2D top-down view. This is because in these embodiments, the application is designed to use a simplified rendering operation that is easier and that does not generate unnecessary perspective artifacts. In other embodiments, however, the mapping application uses a perspective rendering operation to render a 3D scene from a top-down virtual camera position. In these embodiments, the 2D map view that is generated is somewhat different than the map view 538 illustrated in the third stage 503, because any object that is away from the center of the view is distorted, with the distortions being greater the further the object's distance from the center of the view.

The virtual camera 512 moves along different trajectories in different embodiments. Two such trajectories 550 and 555 are illustrated in FIG. 5. In both these trajectories, the camera moves in an arc and rotates downward as the camera moves upward along the arc. The trajectory 555 differs from the trajectory 550 in that in the trajectory 555 the camera moves backward from the current location as it moves up the arc.

While moving along one of the arcs, the camera rotates to maintain a point ahead of the location indicator at the focal point of the camera. In some embodiments, the user can turn off the three dimensional view and go with a purely two dimensional view. For example, the application of some embodiments allows a three dimensional mode to be turned on and off by use of a 3D button 560. The 3D button 560 is essential to the turn-by-turn navigation feature, where it has a role as an indicator and a toggle. When 3D is turned off, the camera will maintain a 2D navigation experience, but when 3D is turned on, there may still be some top-down perspectives when 3D viewing angles are not appropriate (e.g., when going around a corner that would be obstructed in 3D mode).

2. 3D Control

Figure 6:
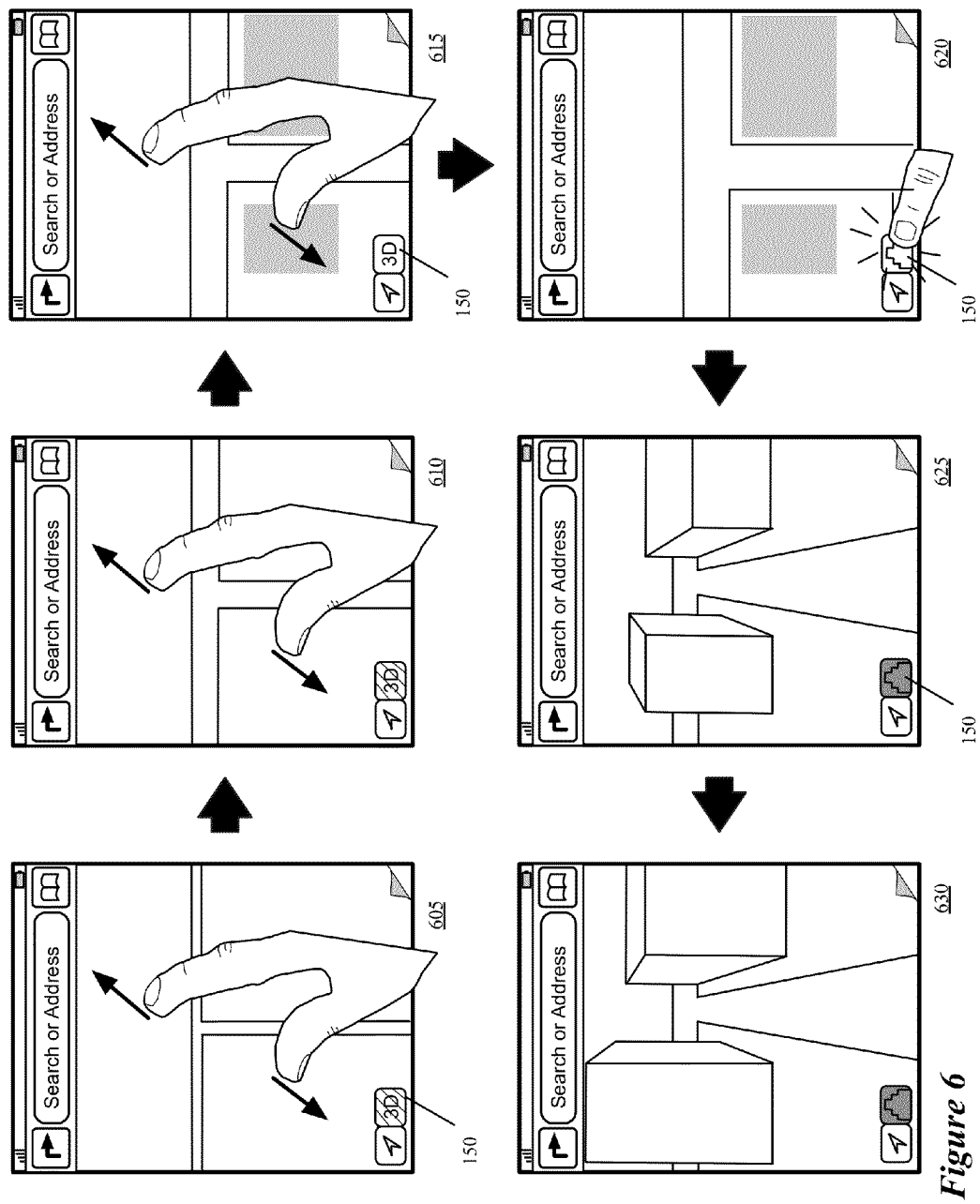
FIG. 6 illustrates that the mapping application of some embodiments changes the appearance of the 3D control to indicate different 2D and 3D states of the map view.

FIG. 6 illustrates in six different stages 605-630 that the mapping application of some embodiments changes the appearance of the 3D control to indicate different 2D and 3D states of the map view. The first stage 605 illustrates that the mapping application is displaying a map and the floating controls including the 3D control 150. The mapping application is displaying the map in 2D at a certain low zoom level (map has not been zoomed in much) as shown. The 3D control 150 is displayed using a first appearance (e.g., grey letters "3D") to indicate the 3D map data is not available at this particular zoom level. The first stage 605 also shows that the mapping application is receiving the user's gestural input to zoom in on the map (i.e., to increase the zoom level).

The second stage 610 shows that the mapping application is displaying the map at a higher zoom level than it did at the previous stage 605. However, the 3D control 150 is maintaining the first appearance because the 3D map data is still not available even at this particular higher zoom level. The second stage 610 also shows that the mapping application is receiving another gestural input to zoom in on the map further.

The third stage 615 shows that the mapping application is displaying the map at a higher zoom level than it did at the previous stage 610. The mapping application has changed the appearance of the 3D control 150 into a second appearance (e.g., "3D" in black letters) to indicate that the 3D map data is available at this zoom level. When the mapping application receives a selection of the 3D control 150, the mapping application of some embodiments would change the appearance of the 3D control 150 to a third appearance (e.g., "3D" in blue letters) and display the map in 3D (e.g., by changing into a perspective view from a straight-down view for 2D). The third appearance therefore would indicate that the map is displayed in 3D. The third stage 615 shows that the mapping application is receiving yet another gestural input to zoom in the map even further to a higher zoom level. The third stage 615 shows that the mapping application is displaying buildings in the map as grey boxes at this zoom level.

The fourth stage 620 shows that the mapping application is displaying the map at a higher zoom level than it did at the previous stage 615. The mapping application has changed the appearance of the 3D control 150 into a fourth appearance (e.g., a building icon in a first color as shown) in order to indicate that 3D immersive map data for rendering an immersive 3D map view is available at this zoom level. The fourth stage 620 also shows that the mapping application of some embodiments is receiving a selection of the 3D control 150.

The fifth and sixth stages 625 and 630 show subsequent views (though not necessarily successive views) that the mapping application provides after it starts to provide a 3D immersive map view. The zoom level does not change between the fifth and sixth stages in some embodiments but the height of the buildings in the map views increases to provide an animation that conveys that the view is moving into the 3D immersive map view from the 2D view. Also, from the fourth stage 620 to the fifth stage 625, the mapping application has changed the appearance of the 3D control into the fifth appearance (e.g., a building icon in a second color as shown) in order to indicate that the map is displayed in the 3D immersive view.

3. Automatic Changing of Views

The application of some embodiments allows any particular virtual camera angle to be used, not just the 30 degree and 60 degree angles specified here. The application of some embodiments allows the user to set the downward angle for the camera. The application of some embodiments automatically adjusts the angle of the camera for various reasons, (e.g., to keep a particular point of focus near the top of the screen). In still other embodiments, the navigation application automatically sets the angle of the camera, but allows the user to override the automatically set angle.

Figure 7:
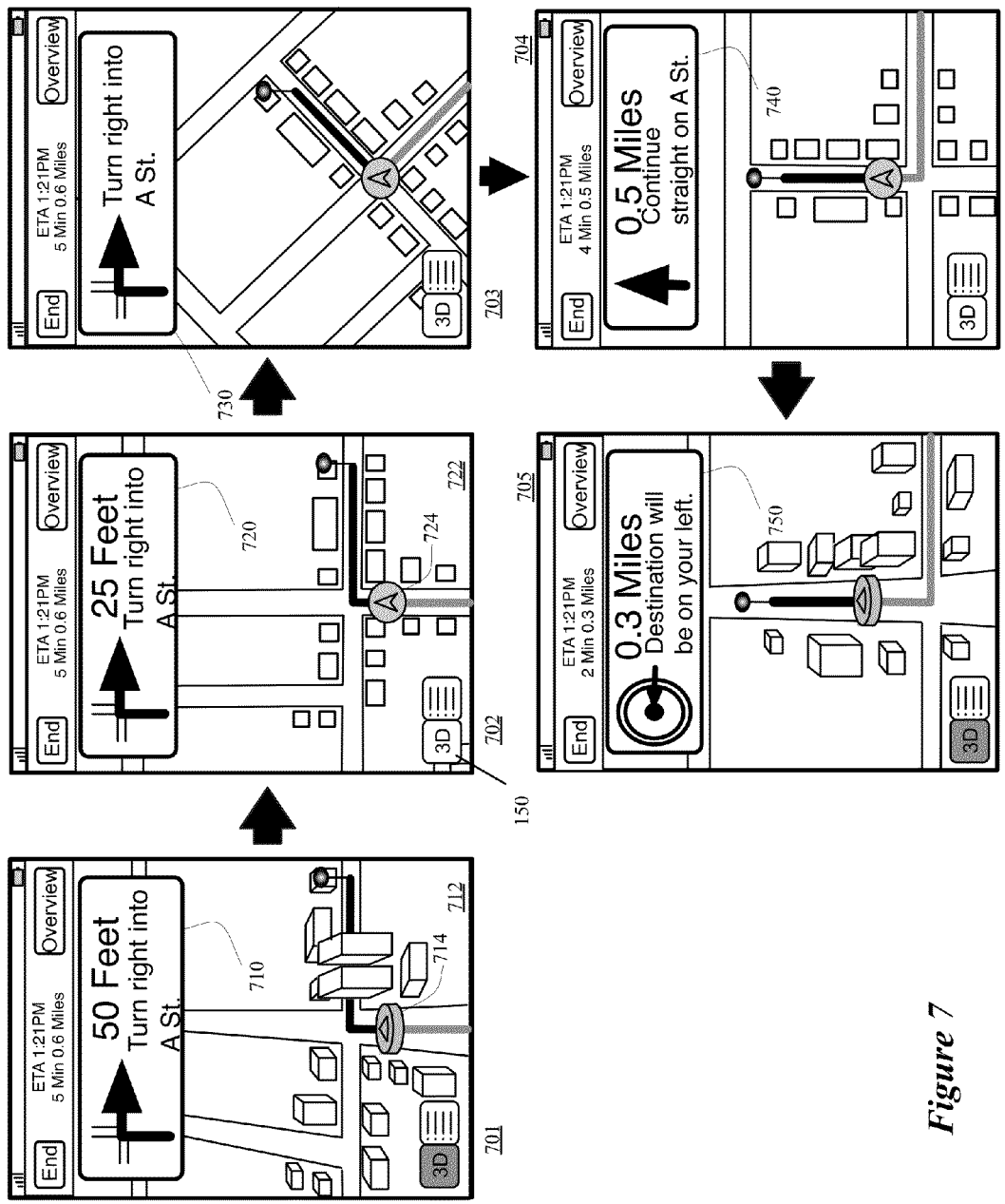
FIG. 7 illustrates switching from 3D mode to 2D mode in some embodiments.

In some embodiments, when a device running the navigation application in a 3D mode is about to reach a junction with a turn, the navigation application switches to a 2D mode in order to enable the user to more clearly identify the turn. FIG. 7 illustrates the switching from 3D mode to 2D mode of some embodiments. The figure is shown in five stages 701-705. In stage 701, the application shows a navigation map in a 3D view. The navigation box 710 shows a right turn in 50 feet. The map 712 is in 3D as is the location identifier 714.

As the device approaches the junction in stage 702 (as indicated by navigation box 720) the 3D map 712 switches to a 2D map 722 with the location indicator 724 in 2D as well. The mapping application also changes the appearance of the 3D control 150 to indicate that the map is now in 2D. The map 722 remains in 2D as the device rounds the corner in stage 703. As the device rounds the corner, the navigation box 730 with the instructions "turn right into A St." in stage 703 is replaced by the navigation box 740 with the instructions "0.5 miles continue straight on A St." in stage 704. The map remains in 2D in stage 704 until the corner has been fully navigated at which point, in stage 705, the map returns to a 3D view with new instructions "0.3 miles Destination will be on your left" in navigation box 750. The mapping application also has changed the appearance of the 3D control 150 to indicate the map is now back in 3D.

In some embodiments, the navigation application determines some or all of the following five pieces of information for every location update (e.g., 1 time per second). First, the navigation application determines the location of the point of reference (i.e. the user's location).

Second, the navigation application determines the location of the point of focus of the virtual camera, which is used to determine which direction the virtual camera should face. If the user is off-route, the point of focus will be a fixed distance ahead of the user along the user's direction of travel (if that can be determined) or a fixed distance north of the user (if the user's direction of travel cannot be determined). If the user is on-route, the point of focus will be a fixed distance ahead of the user along the route, with the angle between the vector from the user and this point of focus and the user's travel direction capped at a maximum value. This allows the virtual camera to subtly peek around turns before the user actually turns. For example, if the route turns a corner shortly ahead, the point of focus will be a point around the corner from the current location of the device. As turning the virtual camera to face that actual point could cause the virtual camera to directly face a building, the virtual camera is capped as to how far off the present direction it can look. Third, the navigation application determines the location of the point of interest (e.g., the location of an upcoming intersection).

Fourth, the navigation application determines the virtual camera view style (top-down centered, top-down forward, or rooftop). "Top-down centered" means that the virtual camera should look straight down on the user's location such that the user's location is in the center of the screen. "Top-down forward" means the virtual camera should look straight down on the user's location such that the user's location is toward the bottom of the screen. "Rooftop" means the virtual camera should be behind the user's location and pitched so that it is looking forward along the vector from the user's location to the point of focus. If the user is off-route or the user's direction of travel cannot be determined (e.g., when the user is parked), the virtual camera will be in top-down centered view style. Otherwise, the view style will be determined by whether the user has requested "2D" navigation or not. If the user has requested 2D navigation, the view style will be top-down forward. Otherwise, the view style will be rooftop.

Fifth, the navigation application determines the virtual camera focus style (e.g., cruise or hard focus). "Cruise focus style" means the virtual camera should adopt a preset height and pitch angle based on the view style. "Hard focus" means that the virtual camera should adjust its height (in the case of top-down centered or top-down forward view styles) or pitch (in the case of rooftop view style) so that the given point-of-interest is just on screen (i.e. the virtual camera should focus in on the point-of-interest as the user approaches it). When far from an intersection, the navigation application puts the virtual camera in cruise focus mode. When approaching an 'interesting' intersection, the navigation application puts the virtual camera in hard focus mode as described above and the location of the intersection (point of interest) will be passed to the virtual camera. When in hard focus mode, the application adjusts the virtual camera's height (in the case of top-down centered or top-down forward view styles) or pitch (in the case of rooftop view style) so that the intersection is at a reasonable position on screen. A given intersection is determined to be 'interesting' enough to focus on using the angle at which the user will leave the intersection. If the angle is large enough (e.g., a 90 degree right turn), the intersection is considered to be 'interesting' and the virtual camera will focus on it. If the angle is too small (e.g., merging onto a freeway), the virtual camera will stay in cruise focus style From these five pieces of information, the navigation application computes the virtual camera's desired position and orientation. From the desired position and orientation, the positions of the following three key points can be extracted: (1) the virtual camera's position, (2) the intersection between the virtual camera's forward vector and the ground, and (3) a point along the virtual camera's right vector. The three points are animated independently from each other as follows: (1) when a new point is available, the application fits a cubic polynomial between the last evaluated position/tangent for that point and the new point and (2) every step of the animation, the navigation application evaluates the cubic polynomials for each curve and extracts the virtual camera position and orientation from them.

4. User Adjustment of Camera Height

Figure 8:
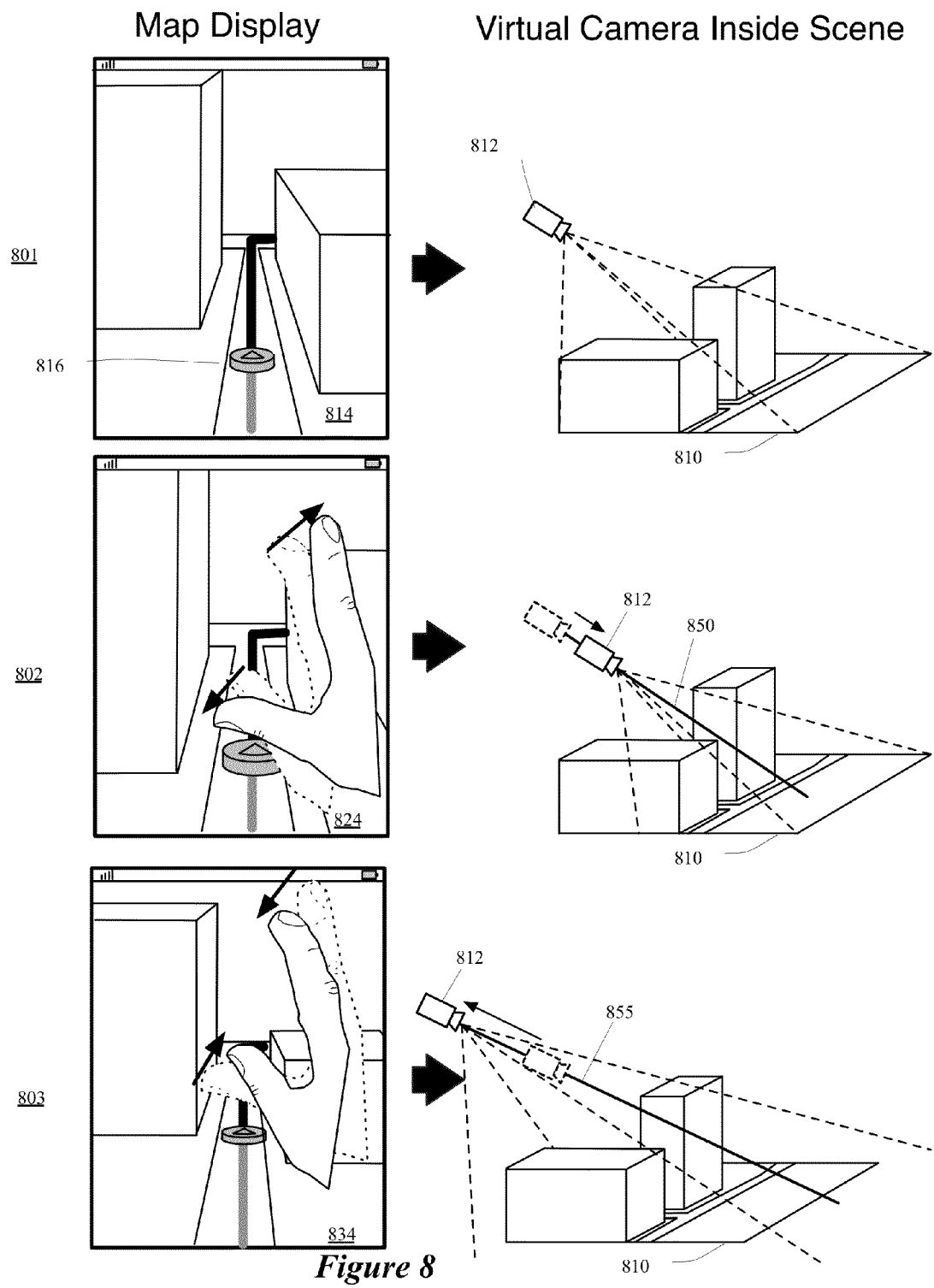
FIG. 8 illustrates the adjustment of the distance of a virtual camera by contracting and expanding gestures.

Besides (or instead of) having the navigation application control the camera (e.g., turning from 3D to 2D when going around corners) some embodiments also allow the user to adjust the level of the camera. Some embodiments allow the user to make a command gesture with two fingers to adjust the distance (height) and angle of the camera. Some embodiments even allow multiple types of gestures to control the camera. FIG. 8 illustrates the adjustment of the distance of a virtual camera by contracting and expanding gestures. The figure is shown in three stages 801-803. In stage 801, the application shows a basic scene 810 with a virtual camera 812 at the default level for 3D viewing and the screen view 814 rendered from the scene 810. The basic scene contains two buildings and a T-junction. In stage 801, the buildings are viewed from a 45 degree downward angle and a particular height that makes them seem a particular size. The location indicator 816 is also shown at a particular size.

In stage 802, the user makes a gesture by placing two fingertips near each other on the screen of the device, on the screen view 824 and moving the fingertips apart while they are on the screen. Moving the fingertips apart has the effect of making the map (both the part between the fingers and the rest of the map) larger. In order to make the things in the map appear larger, the application causes the virtual camera 812 to zoom in. In some embodiments, the line 850 that the mapping application uses to move the virtual camera 812 along is a line formed by the front of the virtual camera 812 and the virtual camera 812's point of focus. The mapping application of some embodiments moves the virtual camera 812 along a line formed by the front of the virtual camera 812 and a location in the 3D map 810 based on the user's input to zoom into the view of the 3D map 810.

After zooming in for stage 802, the user decides to zoom out for stage 803. In this stage the user has placed two fingers on the screen and brought them closer together. Bringing the fingers closer together has the effect of shrinking the map (both the part between the fingers and the rest of the map). The zoom-out adjustment is accomplished by moving the virtual camera 812 moving farther away from the 3D map 810 along the line 855. In some embodiments, the line 855 that the mapping application uses to move the virtual camera 812 along is a line formed by the front of the virtual camera 812 and the virtual camera 812's point of focus. The mapping application of some embodiments moves the virtual camera 812 along a line formed by the front of the virtual camera 812 and a location in the 3D map 810 based on the user's input to zoom into the view of the 3D map 810.

Rendering a 3D map view using the virtual camera 812 at this position results in a 3D map view 834 in which the buildings and the roads appear farther than the position illustrated in the 3D map view 824. As shown by the dashed-line version of the virtual camera 812, the virtual camera 812 moved farther from the 3D map 810 along the line 855.

Figure 9:
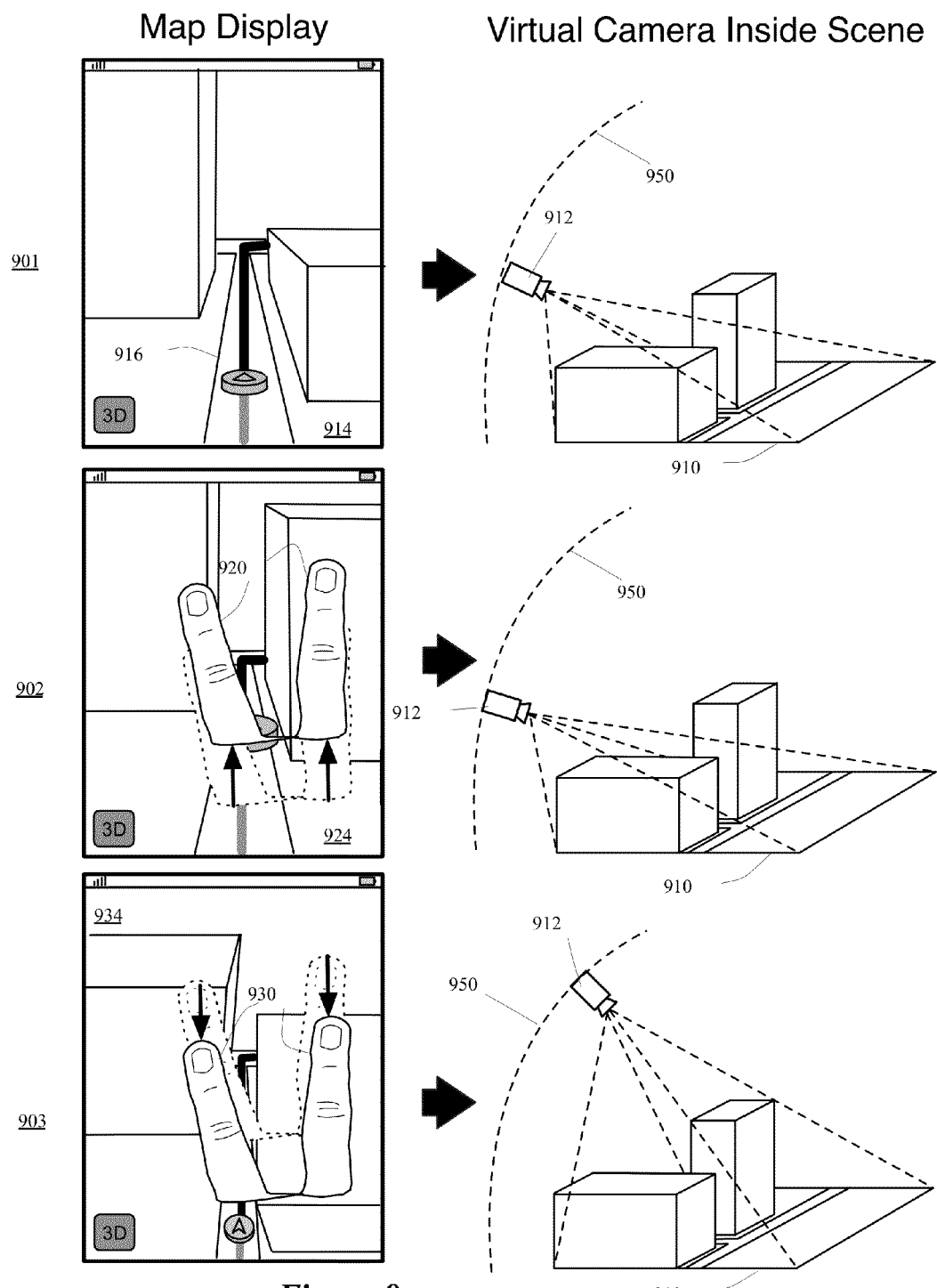
FIG. 9 illustrates an embodiment of a camera whose angle can be adjusted by gestures.

In addition to being controllable by zooming in and out, some applications allow a user to change the angle of the virtual camera. FIG. 9 illustrates an embodiment of a camera whose angle can be adjusted by gestures. The figure is shown in three stages 901-903. In stage 901, the camera is pointing downward at 45 degrees at scene 910. Scene 910 contains two buildings and a T-junction which are shown in screen view 914. The buildings are shown from a particular angle and a particular size. The location indicator 916 is also shown at a particular size.

In stage 902, the user has placed two fingers 920 on the screen approximately horizontal to each other and dragged up. This has the apparent effect of dragging the scene up with the fingers. The scene rising is accomplished by the virtual camera 912 lowering and changing its viewing angle from 45 degrees to 30 degrees. In the screen view 924, the buildings and the location indicator look taller than in stage 901.

After the user drags the scene up in stage 902, the user then drags the scene down in stage 903. To do this, the user again placed two fingers 930 on the screen and drags them down. This drags the scene down along with the fingers 930. The scene dropping is accomplished by the virtual camera 912 rising and changing its angle with the scene 910 to 60 degrees downward. In stage 903, the camera 912 has moved farther up and is angled down more than in stage 901. Accordingly, the buildings and location identifier 916 again look shorter and smaller in stage 903 than in stage 901.

In some embodiments, the mapping application provides an inertia effect for different operations (e.g., panning, rotating, entering from 2D to 3D). When a user provides a particular type of input (e.g., input that terminates at a velocity greater than a threshold velocity) to pan the 3D map, the mapping application generates an inertia effect that causes the 3D map to continue panning and decelerate to a stop. The inertia effect in some embodiments provides the user with a more realistic interaction with the 3D map that mimics behaviors in the real world. Details of inertia effects and implementations of inertia effects are described in U.S. patent application Ser. No. 13/632,040, entitled "Virtual Camera for 3D Maps," filed on Sep. 30, 2012, now published as U.S. Patent Publication 2013/0321401. U.S. patent application Ser. No. 13/632,040, now published as U.S. Patent Publication 2013/0321401 is incorporated herein by reference.

The application of some embodiments allows the distance and angle of the camera to be independently controlled. For example, it allows the distance to be controlled by the contracting and expanding finger gestures and the angle to be controlled by the dragging of horizontally placed fingers. Other embodiments use whichever gesture is being performed to set either a distance or an angle of the camera, with the other variable being set automatically. While FIGS. 8 and 9 show gestures being performed in a certain direction leading to certain results, in some embodiments, one or both of these gestures could be reversed. For example, in some embodiments, dragging horizontally placed fingers down may bring the camera down rather than bringing the scene down. That would have the effect of moving the scene down when the fingers move up and moving the scene up when the fingers move down.

Figure 10:
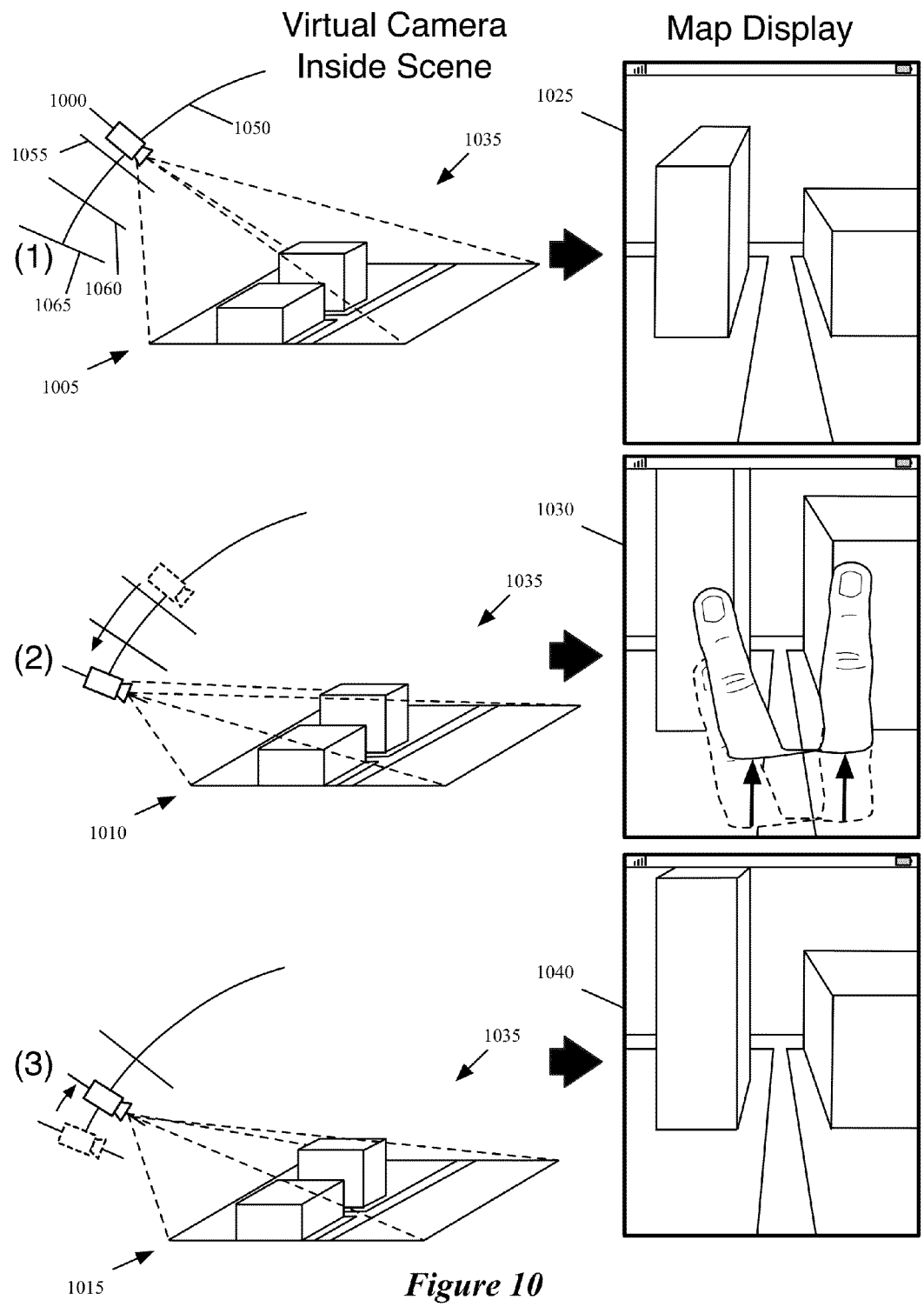
FIG. 10 conceptually illustrates a feature provided by the mapping application of some embodiments for maintaining the position of a virtual camera within a defined range along an arc.

FIG. 10 conceptually illustrates a feature provided by the mapping application of some embodiments for maintaining the position of a virtual camera within a defined range along an arc. In particular, FIG. 10 illustrates the virtual camera 1000 at three different stages 1005-1015 that show the virtual camera 1000's position maintained within a defined range of arc 1050. As shown in FIG. 10, a location in a 3D map 1035 includes two buildings and two roads forming a T-junction.

The first stage 1005 shows the virtual camera 1000 at a particular position along the arc 1050. As shown, the arc 1050 represents a defined range (e.g., angular range) within which the virtual camera 1000 is movable. The first stage 1005 also shows three positions 1055-1065 along the arc 1050 (e.g., perspective view angles). In this example, the mapping application moves the virtual camera 1000 along the arc 1050 between the high perspective end of the arc 1050 (e.g., the position along the arc 1050 when the virtual camera 1000 is most tilted downwards) and the position 1055 in a manner similar to that described above by reference to FIG. 9. Rendering a 3D map view based on the virtual camera 1000's position in the first stage 1005 results in 3D map view 1025.

When the virtual camera 1000 passes the position 1055 while moving towards the low perspective end of the arc 1050, the mapping application reduces the speed (e.g., decelerates) that the virtual camera 1000 moves towards the low perspective end of the arc 1050 regardless of the input provided by a user. In some embodiments, the mapping application reduces the speed of the virtual camera 1000 at a constant rate while, in other embodiments, the mapping application reduces the speed of the virtual camera 1000 at an exponential rate. Additional and/or different methods for decreasing the speed of the virtual camera 1000 are used in some embodiments.

The second stage 1010 shows that the virtual camera 1000 has moved to a position along the arc 1050 at or near the low perspective end of the arc 1050. As shown, a user is providing input to adjust the perspective of the view of the 3D map 1035 by touching two fingers on the screen and dragging the two fingers in an upward direction (e.g., a swipe gesture). In response to the input, the mapping application moved the virtual camera 1000 toward the low perspective end of the arc 1050 while tilting the virtual camera 1050 upwards. When the virtual camera reaches the position 1065 along the arc 1050, the mapping application prevents the virtual camera 1000 from moving lower and beyond the position 1065 even while the user continues to provide input to decrease the perspective of the view of the 3D map 1035 (e.g., the user continues to drag the two fingers upwards on the touchscreen).

In some embodiments, when the user stops providing input to decrease the perspective of the view of the 3D map 1035 (e.g., the user lifts the two fingers off the touchscreen), the mapping application "bounces" or "snaps" the position of the virtual camera 1000 from the position 1065 up to the position 1060 along the arc 1050. As the mapping application is generating or rendering 3D map views of the 3D map 1035 based on the view of the virtual camera 1000 during the bounce or snap motion, the generated 3D map views provide a bounce animation that displays the 3D map view briefly bouncing or snapping down in order to indicate to the user that the perspective of the map view cannot be decreased any farther. Rendering a 3D map view using the virtual camera 1000 positioned at this angle results in a 3D map view 1030 in which the buildings and the roads are taller compared to the map view 1025.

The third stage 1015 shows the virtual camera 1000 after the mapping application has bounced or snapped the position of the virtual camera 1000 to the position 1060 in response to the user ceasing to provide input. Different embodiments use different techniques for implementing the bounce or snap of the virtual camera 1000. For instance, the mapping application of some embodiments starts quickly accelerating the virtual camera 1000 along the arc 1050 for a defined distance or until the virtual camera 1000 reaches a defined speed. Then the mapping application decelerates the virtual camera 1000 for the remaining distance to the position 1060 along the arc 1050. Other ways to implement the bounce or snap effect are used in some embodiments. Rendering a 3D map view using the virtual camera 1000 positioned at the position 1060 along the arc 1050 in the third stage 1015 results in a 3D map view 1040 in which the buildings appear a little smaller and flatter and the roads appear a little smaller compared to the map view 1030.

As described above, FIG. 10 illustrates a technique for preventing a virtual camera from moving beyond the low perspective end of an arc. Alternatively or in conjunction with preventing the virtual camera from moving beyond the low perspective end of the arc, the mapping application of some embodiments utilizes a similar technique for preventing the virtual camera from moving beyond the high perspective end of the arc. In addition, FIG. 10 shows an example of a position along an arc at which to slow down a virtual camera, a position along the arc to prevent the virtual camera from moving past, and a position along the arc to which the virtual camera snaps or bounces back. Different embodiments define the positions any number of different ways. For instance, in some embodiments, the position along the arc at which to slow down the virtual camera is the same or near the position along the arc to which the virtual camera snaps or bounces back.

C. Other User Interactions

1. Appearing and Disappearing Controls

Figure 11:
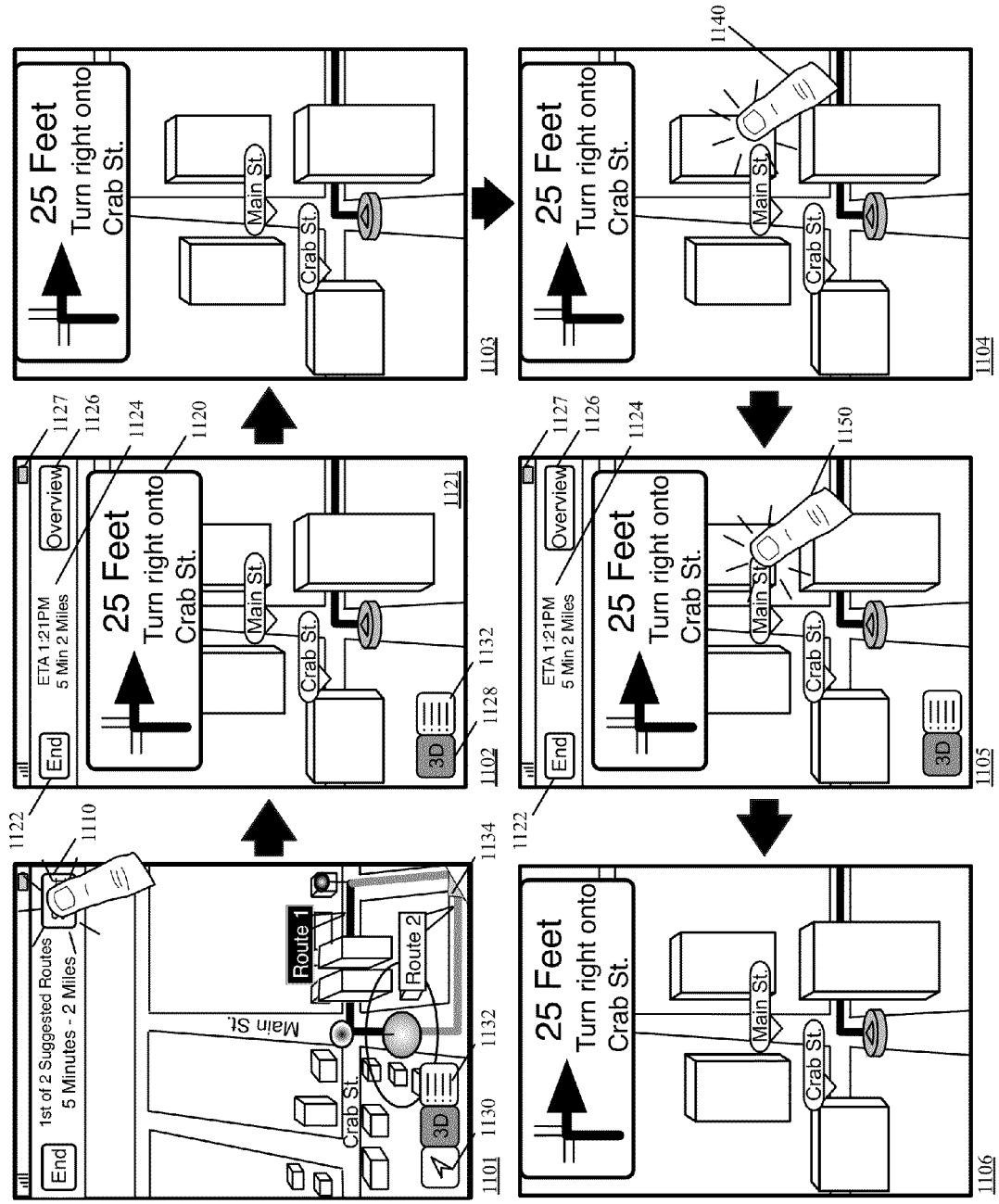
FIG. 11 illustrates a full screen mode of some embodiments.

The applications of some embodiments, while navigating, have a full screen mode. That is, during the actual providing of directions, the controls that ordinarily take up some of the screen surface are hidden. FIG. 11 illustrates a full screen mode of some embodiments. The figure is shown in six stages 1101-1106. In stage 1101*a* set of navigation instructions is activated by the selection of a start button 1110. By selecting the start button, the user selects the highlighted route from two possible routes. The non-highlighted route disappears, and a smaller scale navigation map 1121 appears in stage 1102. The first stage 1101 shows that the road names are on the roads because the mapping application is displaying a map view. The first stage 1101 also shows that the position control 1130 is displayed for the mapping application is displaying a map view. The selection of the list control 1132 will cause the mapping application to display the available routes in a list format.

Also in stage 1102, the first instruction 1120 is shown along with an end control 1122, trip status area 1124 (including an ETA, a trip duration estimate, and a distance of planned route indicator), an overview button 1126, status bar 1127, and a 3D control 1128. The end button 1122 ends the running of the navigation instructions. The status area 1124 displays information about the planned route. The overview button 1126 displays an overview of the route. The 3D control is an indicator of whether the navigation application is showing a scene in 3D or 2D and a toggle for entering and leaving 3D mode. The selection of the list control 1132 at this stage will cause the mapping application to display the set of navigation instructions in a list format. This stage also shows that the road names are displayed in banners rather than on the roads because the mapping application is operating in the navigation mode.

After a brief amount of time, the end control 1122, the list control 1132, status area 1124, overview button 1126, and 3D control 1128 disappear. In some embodiments, the controls disappear abruptly, while in other embodiments the controls fade away. In some embodiments, the status bar 1127 at the top of the screen also vanishes and navigation box 1120 moves to the top of the screen.

The absence of the controls and movement of navigation box 1120 is shown in stage 1103, in which the navigation map 1121 is seen without the controls except for the raised navigation box 1120. The user can restore the hidden controls by tapping the screen in some embodiments. This is demonstrated in stages 1104 and 1105. In stage 1104, the user taps the screen with finger 1140. In stage 1105, as a result of the tap in the previous stage, the controls are back and the navigation box 1120 has dropped back down to its original position. The restored controls include end control 1122, status area 1124, overview button 1126, status bar 1127, and 3D control 1128. Once the controls are back, the user can make the controls vanish again by tapping, as shown in stage 1105 where a user taps the screen with finger 1150 to restore the navigation application to full screen mode in stage 1106. In addition to the hidden controls, in full-screen in some embodiments the touch interaction with the map is greatly restricted. In some embodiments, more controls exist that are shown in some modes, but hidden in full screen mode (e.g., a list control).

Figure 12:
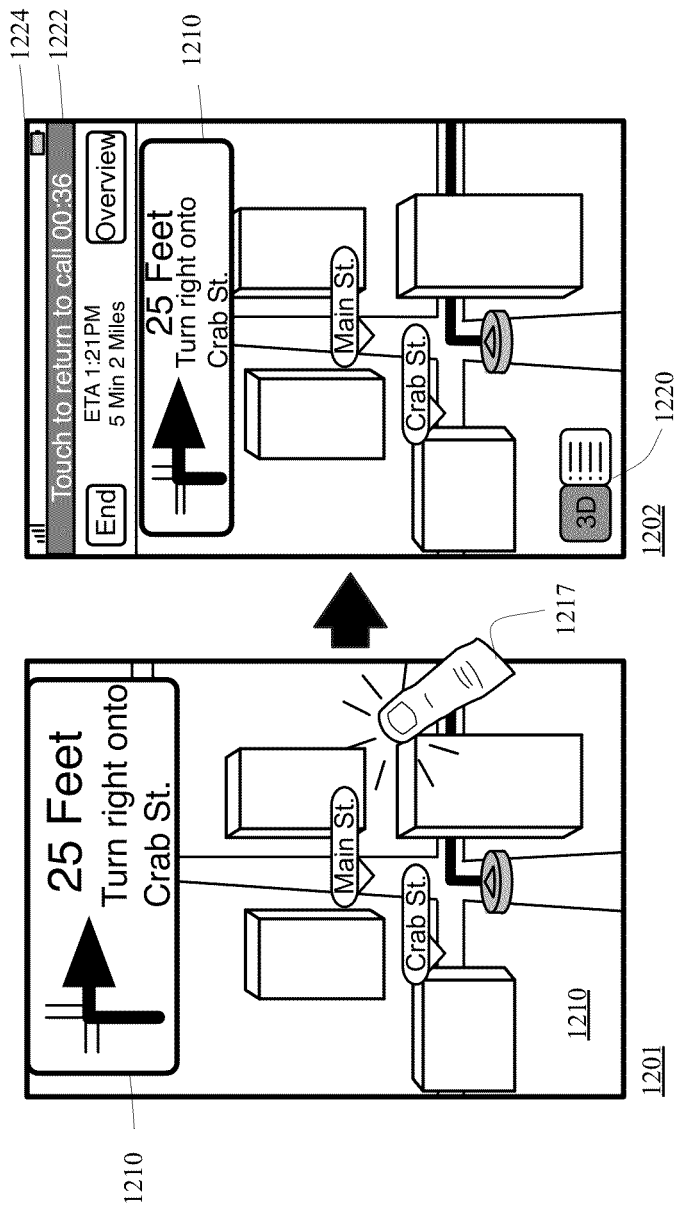
FIG. 12 illustrates the navigation application with the controls hidden and revealed during a phone call on the device in some embodiments.

In some embodiments, when the controls are shown and there is an addition to the status bar (e.g., a phone call status bar showing the length of an ongoing call) the navigation box is shortened in order to make more room for the expanded status bar. This is shown in FIG. 12, which illustrates the navigation application with the controls hidden and revealed during a phone call on the device. FIG. 12 includes stages 1201 and 1202. In stage 1201 the controls of the navigation application are hidden and the navigation box 1210 and map 1215 are visible. The user taps on the touchscreen with finger 1217 to command the navigation application to show its controls. In stage 1202, the navigation application shows its controls 1220 and also shows a phone call status bar 1222 under the status bar 1224. The navigation application has less room due to the phone call status bar 1222. To compensate for the smaller amount of screen area available to the navigation application, the navigation application of some embodiments shrinks the navigation box 1210 when the phone call status bar 1222 is on the screen. In some embodiments, when the navigation box shrinks, the text and/or direction arrow in the box is altered to fit the reduced amount of area available for the text and arrow.

2. Ending Navigation

Figure 13:
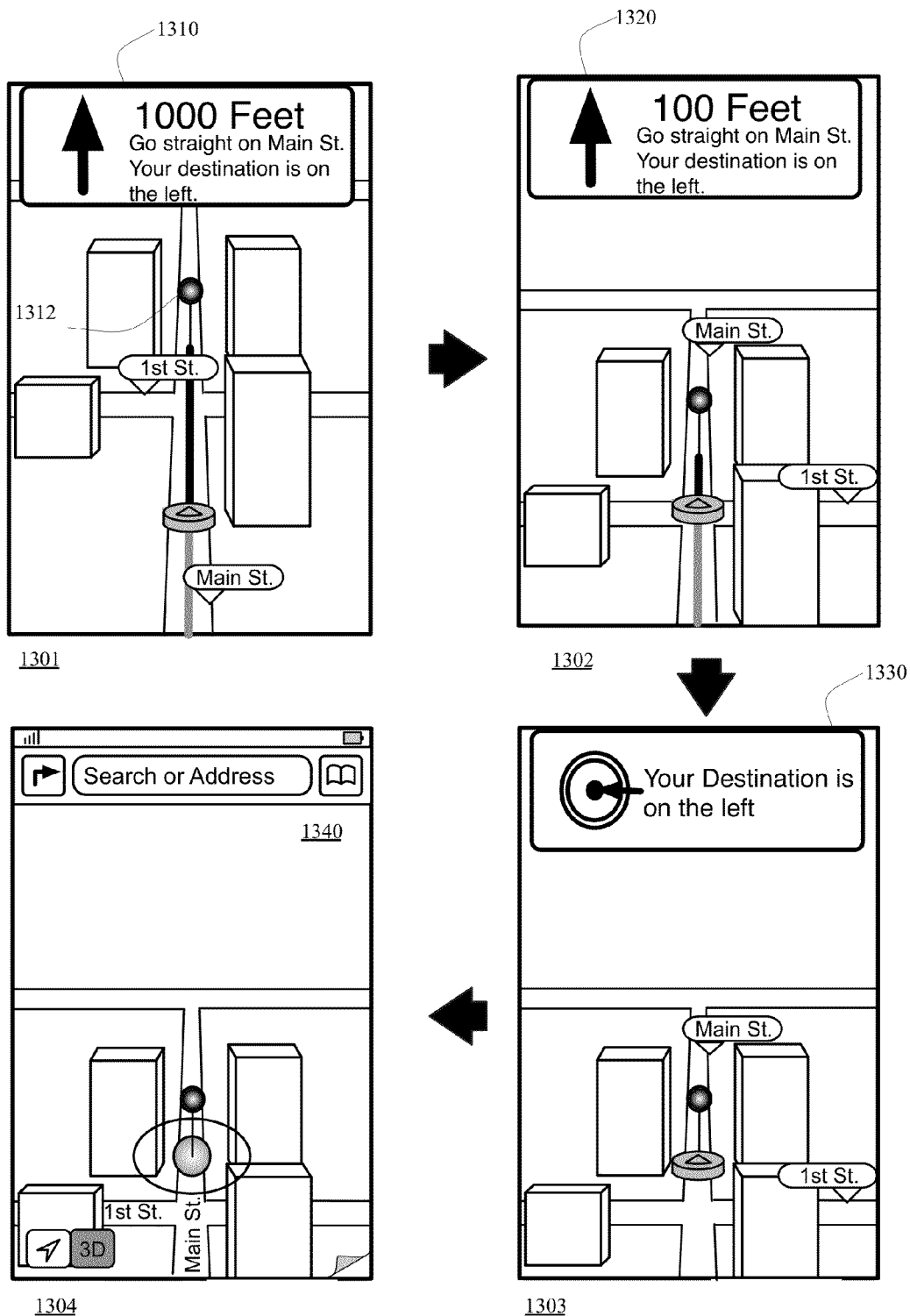
FIG. 13 illustrates the end of a programmed route in some embodiments.

In the ordinary course of the running of a set of navigation instructions by a navigation application, as the device reaches each new junction that needs navigation instructions, the instructions for the next such junction appear. This continues until the device reaches its destination. When the destination is reached, the navigation application stops providing instructions and the running of the programmed route ends. FIG. 13 illustrates in four stages 1301-1304 the end of a programmed route. In stage 1301, the application is running with hidden controls and the navigation box 1310 is showing that the destination is only 1000 feet away. The destination is shown on the map as a pin 1312 with a round head. However, one of ordinary skill in the art will understand that other symbols could be used in applications of other embodiments and that in some embodiments no symbol is used and the line merely ends. As the device moves closer to its destination, the navigation application counts down the distance. In stage 1302, the navigation box 1320 shows that there are only 100 feet to go to the destination. In stage 1303, the device has just reached its destination. Navigation box 1330 indicates that the destination is on the left and includes a symbol of an arrow pointing at the center of a target. Later, in stage 1304, with the device having reached its destination, the navigation application has shut navigation box 1320 down leaving the user with a map 1340, but no further directions.

In some embodiments, destinations can be in places not reachable by car, for example, the end pin could be in the middle of a park. In some such embodiments, the driving directions will end, but there will be continued directions for foot travel. In other such embodiments, the application will not give textual directions for travel on foot, but will still maintain a pin on the location (e.g., the middle of a park) when displaying maps in map mode or in locked mode. In some such embodiments, the last instruction after the automotive portion of the journey ends will be a direction "please reach on foot".

Figure 14:
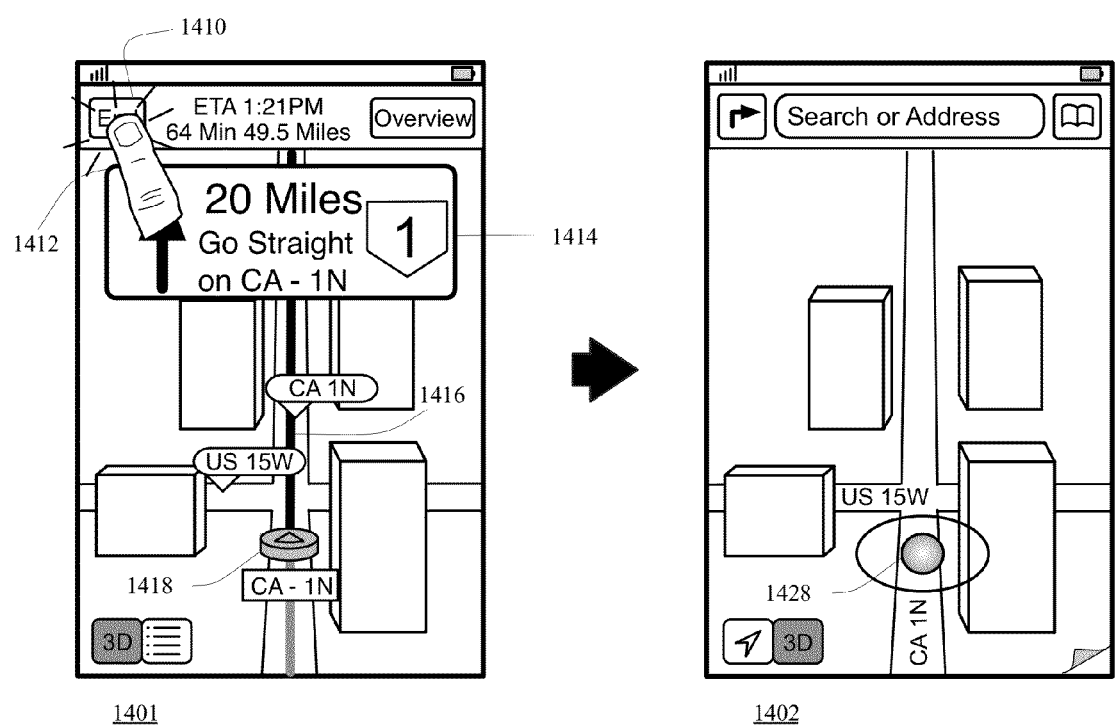
FIG. 14 illustrates a navigation program ending control in some embodiments.

FIG. 13 illustrates what happens when a navigation application guides the user all the way to its final destination. However, in some embodiments, the user may change the user's mind about getting directions. The user may want to stop along the way, change destinations, or for some other reason, may want to end the running of the set of navigation instructions. Accordingly, the application of some embodiments includes an "end" button. The end button stops the running of a set of navigation instructions and in some embodiments leaves the user in the same condition as if they had reached the destination (e.g., no instructions but with a map). FIG. 14 illustrates a navigation program ending control. The figure is shown in two stages 1401 and 1402. Stage 1401 shows a navigation application with its controls visible. The controls include an "end" button 1410. The user is tapping the button with finger 1412. The navigation application is far from its destination, as indicated by navigation box 1414, which states that the next junction is 20 miles away, and by route 1416, which stretches off into the distance ahead of position indicator 1418. In stage 1402, because the user has tapped the end button 1410, the navigation box 1414 disappears as does the route 1416. The position indicator 1418 is also gone in this stage, replaced by a spherical position indicator 1428.

3. Gestures to Look to the Side of the Route During Navigation

As described above, the default behavior for the virtual camera is to follow the location of the device through a virtual world and point down and in the direction the device is moving, or at least to a part of its route a short way ahead of the device's present position. However, it is not always desirable to have the camera pointing straight ahead. Sometimes the user wants the camera to point at an angle instead. Accordingly, the navigation application of some embodiments rotates the virtual camera around when the user drags the map sideways.

Figure 15:
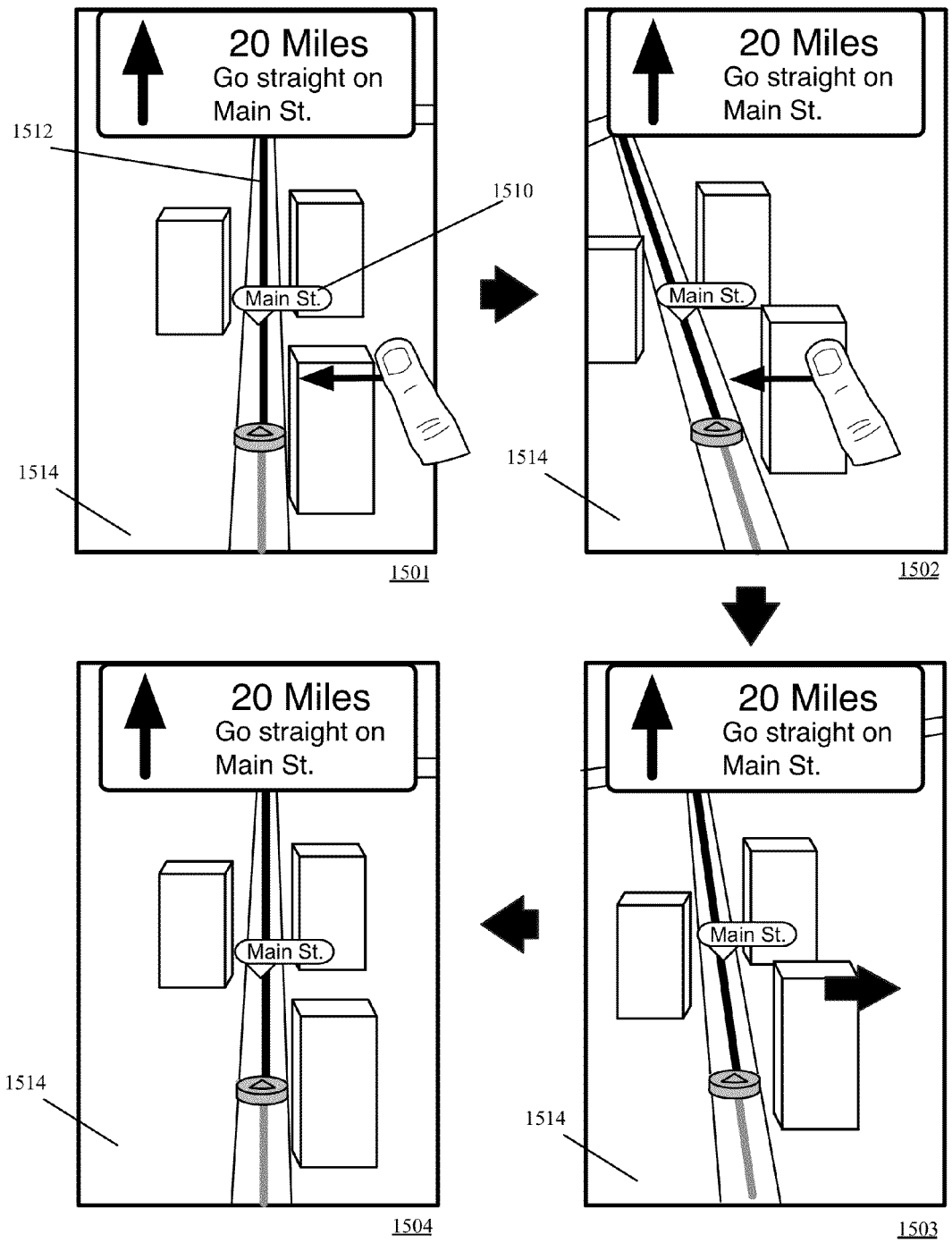
FIG. 15 illustrates the rotation of a map when a user pushes it sideways in some embodiments.

FIG. 15 illustrates the rotation of a map when a user pushes it sideways. The figure includes four stages 1501-1504. In stage 1501, the application is shown in its default mode, with the street 1510 (Main St.) and the current route 1512 running parallel to the sides of the screen on the 3D map 1514. In this stage 1501 the user begins pushing the map to the left. In the next stage 1502, the virtual camera has moved to the left and rotated to the right. That is, the 3D map 1514 has changed as though the virtual camera has moved to the left and rotated to the right. The map 1514, having been rotated, now shows the faces of the buildings on the right side of the street. In some embodiments, there is a maximum threshold to how far the map will rotate. In some embodiments, as well as being able to move the map from side to side, the user can move to a view slightly ahead of or slightly behind the location indicator (e.g., by dragging down or up with one finger). In some such embodiments, the amount that the map can be moved ahead or behind by dragging is also capped.

In the illustrated embodiment, the application only rotates the buildings while the user is dragging the map to the left (or right), or for a short time after (e.g., with simulated inertia). Once the user stops dragging the map 1514 or holding his finger in place to hold the map 1514 in place, the map 1514 reverts to its default view in the direction of the route the camera is taking. This is shown in stage 1503 in which the user has stopped dragging the map 1514 and the virtual camera is rotating and/or moving back to its original position directly behind the device as it moves on its route. By stage 1504, the map 1514 has resumed its previous orientation. In some embodiments, the virtual camera merely rotates when the map is dragged sideways, rather than moving as well as rotating. While in other embodiments, the camera revolves around the location identifier so that the location identifier appears to be a fixed point while the map revolves around it.

4. Route Overview Mode

Figure 16:
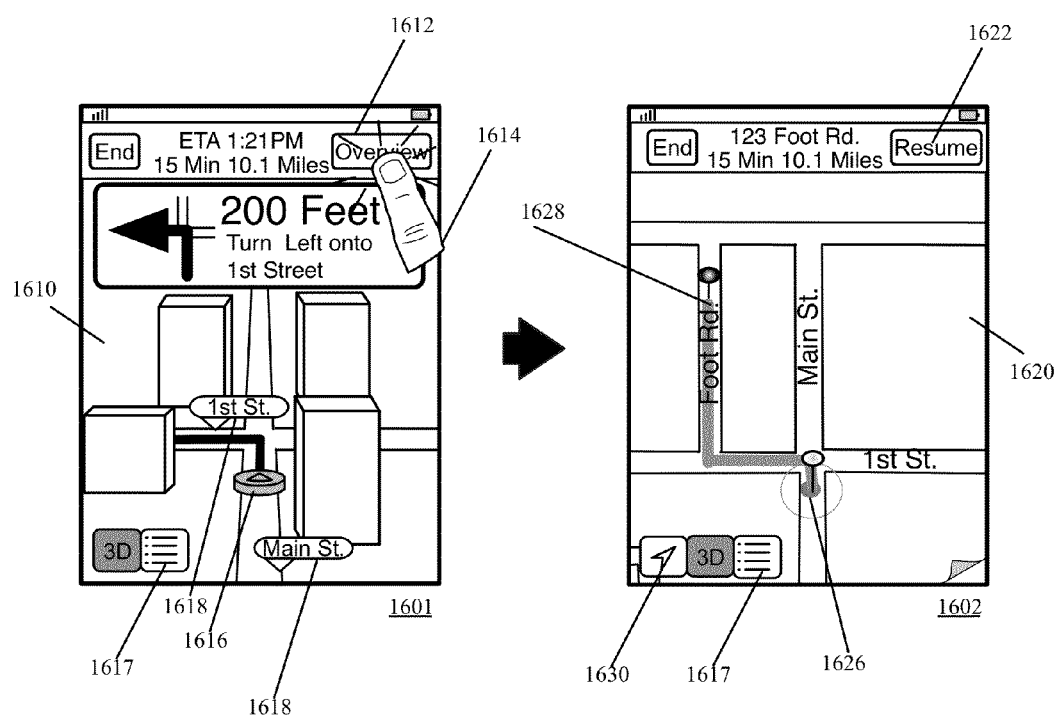
FIGS. 16 and 17 illustrate overview controls in some embodiments.
Figure 17:
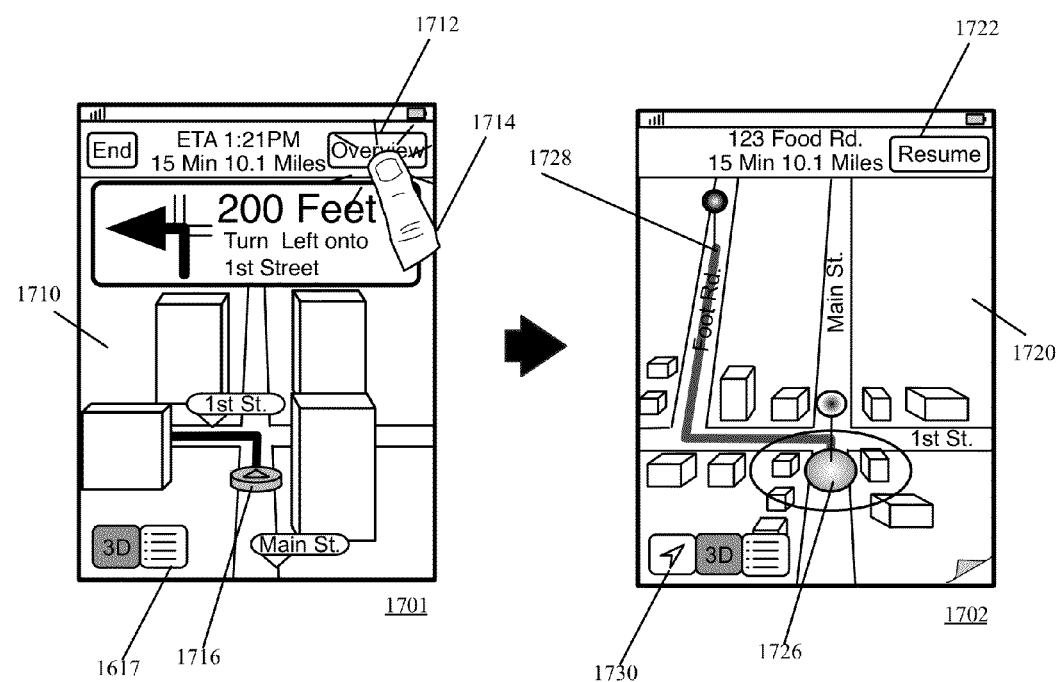

In some cases, rather than looking at only a small scale map that shows the next junction, some users may sometimes want to get a look at the big picture. That is, the users may want to look at the entirety of their navigation application's planned route while the user is traveling over the route. Therefore some embodiments provide an overview option that shows the user the entire route. FIGS. 16 and 17 illustrate overview controls. FIG. 16 includes two stages 1601 and 1602. In stage 1601a navigation map 1610, overview button 1612, finger 1614, and list control 1617 are shown. In navigation map 1610, the location indicator 1616, shows that the device is on Main St. close to 1st St. The stage 1601 also shows that the mapping application is displaying the road names in banners 1618 because the mapping application is operating in the navigation mode. In this stage the finger 1614 hits overview button 1612 causing the overview to be displayed in stage 1602.

In stage 1602, the navigation application has displayed an overview map 1620, resume button 1622, location indicator pin 1626, end pin 1628 and position indicator control 1630. The overview map 1620 shows the user his entire planned route starting from the present position. In the illustrated embodiment, the overview map focuses on the remaining route, not the entire route from the beginning, as it does not show a light colored line indicating the previously traveled route. However, in some embodiments, the overview map shows the entire route rather than just the route from the current location of the device. In some embodiments, list control 1617 is also present in the overview map to allow the user to go directly from the overview map to a list of maneuvers (e.g., upcoming turns). The second stage 1602 also shows that the road names are displayed on the road because the mapping application is displaying the overview map (i.e., not in the navigation mode). It is to be noted that the mapping application of some embodiments alternatively or conjunctively uses banners to display the road names regardless of the mode in which the mapping application is operating.

The resume button 1622 switches the navigation application back to the navigation view of stage 1601. The location indicator pin 1626 and the end pin 1628 show the current location of the device and the final destination of the navigation route, respectively. In some embodiments, the application allows a user to move the map around, zoom in and out, and otherwise focus on different parts of the overview map 1620. The position indicator control 1630 in some embodiments centers the map on the location indicator pin 1626.

In some embodiments, the overview mode has a search box that allows a user to enter search queries for items that may be found in the overview map. For example, the user could search for gas stations on the map so that the user can determine where to refuel his car. Another example would be a search for coffee shops so the user could stop for coffee. Some embodiments allow a user to switch from an original end destination to a destination found in a search before resuming navigation.

In some embodiments all overview maps are 2D. In other embodiments, some or all overview maps are in 3D. For example, some embodiments use 2D overview maps for routes that cover large distances, but use 3D overview maps for navigation routes that cover short distances. FIG. 17 illustrates an embodiment that uses 3D overview maps. FIG. 17 includes two stages 1701 and 1702. In stage 1701a navigation map 1710, overview button 1712, finger 1714, and list button 1617 are shown. In navigation map 1710, the location indicator 1716 shows that the device is on Main St. close to 1st St. In this stage the finger 1714 hits overview button 1712 causing the overview to be displayed in stage 1702.

In stage 1702, the navigation application has displayed an overview map 1720, resume button 1722, location indicator pin 1726, end pin 1728 and position indicator control 1730. The overview map 1720 shows the user their entire planned route. The resume button 1722 switches the navigation application back to the navigation view of stage 1701. The location indicator pin 1726 and end pin 1728 show the current location of the device and the final destination of the navigation route, respectively. The position indicator control 1730 centers the map on the location indicator pin 1726.

In some embodiments, the 3D overview maps include a search function as described with respect to FIG. 16. Also, in some embodiments, the overview mode includes a control to center the map on the end pin. In some embodiments, the position indicator control allows a user to toggle between centering on the present location of the device and the destination of the device. In some embodiments, the overview mode can be activated at any time while navigating.

D. Multi-Mode Application

1. Rendering Module

Figure 18:
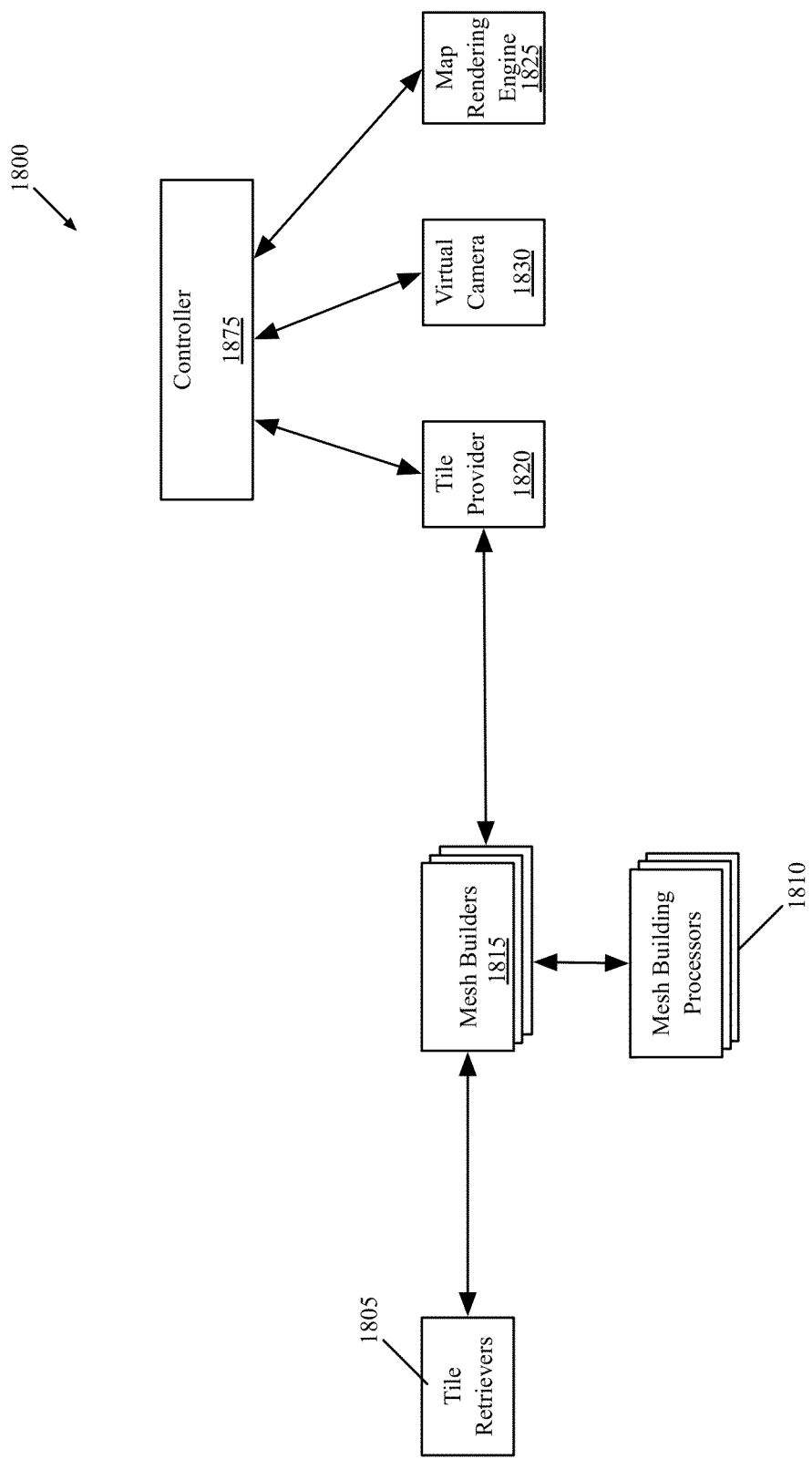
FIG. 18 conceptually illustrates a processing, or map rendering, pipeline performed by the mapping application of some embodiments in order to render a map for display at the client device.

FIG. 18 conceptually illustrates a processing, or map rendering, pipeline 1800 performed by the mapping application of some embodiments in order to render a map for display at the client device (e.g., on the display of the client device). In some embodiments, the map rendering pipeline 1800 may be referred to collectively as a map rendering module. A more detailed version of this processing pipeline is described in U.S. patent application Ser. No. 13/632,040, entitled "Virtual Camera for 3D Maps," filed on Sep. 30, 2012, now published as U.S. Patent Publication 2013/0321401. U.S. patent application Ser. No. 13/362,040, now published as U.S. Patent Publication 2013/0321401 is incorporated herein by reference. As illustrated, the processing pipeline 1800 includes tile retrievers 1805, a set of mesh builders 1815, a set of mesh building processors 1810, a tile provider 1820, a virtual camera 1830, and a map rendering engine 1825.

The tile retrievers 1805 perform various processes to retrieve map tiles in some embodiments, according to requests for the map tiles from the mesh builders 1815. The mesh builders 1815, as will be described below, identify existing map tiles (that are stored on a mapping service server or in a cache on the device performing the processing pipeline 1800) needed to build their respective meshes. The tile retrievers 1805 receive the requests for the map tiles, determine the best location from which to retrieve the map tiles (e.g., from the mapping service, from a cache on the device) and decompress the map tiles if required.

The mesh builders 1815 (also referred to as tile sources) of some embodiments are instantiated by the tile provider 1820 in order to build different layers of view tiles. Depending on the type of map being displayed by the mapping application, the tile provider 1820 may instantiate a different number and different types of mesh builders 1815. For instance, for a flyover (or satellite) view map, the tile provider 1820 might only instantiate one mesh builder 1815, as the flyover map tiles of some embodiments do not contain multiple layers of data. In fact, in some embodiments, the flyover map tiles contain an already-built mesh generated at the mapping service for which the flyover images (taken by a satellite, airplane, helicopter, etc.) are used as textures. However, in some embodiments, additional mesh builders may be instantiated for generating the labels to overlay on the flyover images when the application is in a hybrid mode. For a 2D or 3D rendered vector map (i.e., a non-satellite image map), some embodiments instantiate separate mesh builders 1815 to build meshes for landcover polygon data (e.g., parks, bodies of water, etc.), roads, place of interest markers, point labels (e.g., labels for parks, etc.), road labels, traffic (if displaying traffic), buildings, raster data (for certain objects at certain zoom levels), as well as other layers of data to incorporate into the map.

The mesh builders 1815 of some embodiments, receive "empty" view tiles from the tile provider 1820 and return "built" view tiles to the tile provider 1820. That is, the tile provider 1820 sends to each of the mesh builders 1815 one or more view tiles (not shown). Each of the view tiles indicates an area of the world for which to draw a mesh. Upon receiving such a view tile, a mesh builder 1815 identifies the map tiles needed from the mapping service, and sends its list to the tile retrievers 1805.

Upon receiving the tiles back from the tile retrievers 1805, the mesh builder uses vector data stored in the tiles to build a polygon mesh for the area described by the view tile. In some embodiments, the mesh builder 1815 uses several different mesh building processors 1810 to build the mesh. These functions may include a mesh generator, a triangulator, a shadow generator, and/or a texture decoder. In some embodiments, these functions (and additional mesh building functions) are available to each mesh builder, with different mesh builders 1815 using different functions. After building its mesh, each mesh builder 1815 returns its view tiles to the tile provider 1820 with its layer of the mesh filled in.

The tile provider 1820 receives from the controller 1875 a particular view (i.e., a volume, or viewing frustrum) that represents the map view to be displayed (i.e., the volume visible from the virtual camera 1830). The tile provider performs any culling (e.g., identifying the surface area to be displayed in the view tile), then sends these view tiles to the mesh builders 1815.

The tile provider 1820 then receives the built view tiles from the mesh builders and, in some embodiments, performs culling on the built mesh using the particular view from the virtual camera 1830 (e.g., removing surface area too far away, removing objects that will be entirely behind other objects, etc.). In some embodiments, the tile provider 1820 receives the built view tiles from the different mesh builders at different times (e.g., due to different processing times to complete more and less complicated meshes, different time elapsed before receiving the necessary map tiles from the tile retrievers 1805, etc.). Once all of the layers of view tiles have been returned, the tile provider 1820 of some embodiments puts the layers together and releases the data to the controller 1875 for rendering.

The virtual camera 1830 generates a volume or surface for the pipeline 1800 to render, and sends this information to the controller 1875. Based on a particular location and orientation from which the map will be rendered (i.e., the point in 3D space from which the user "views" the map), the virtual camera identifies a field of view to actually send to the tile provider 1820. In some embodiments, when the mapping application is rendering the 3D perspective view for navigation, the field of view of the virtual camera is determined according to an algorithm that generates a new virtual camera location and orientation at regular intervals based on the movement of the user device.

The controller 1875 is responsible for managing the tile provider 1820, virtual camera 1830, and map rendering engine 1825 in some embodiments. In some embodiments, multiple tile providers may actually be instantiated, and the controller puts together several view tiles (e.g., map tiles and building tiles) to create a scene that is handed off to the map rendering engine 1825.

The map rendering engine 1825 is responsible for generating a drawing to output to a display device based on the mesh tiles (not shown) sent from the virtual camera. The map rendering engine 1825 of some embodiments has several sub-processes. In some embodiments, each different type of map element is rendered by a different sub-process, with the rendering engine 1825 handling the occlusion of different layers of objects (e.g., placing labels above or behind different buildings, generating roads on top of land cover, etc.). Examples of such rendering processes include a road rendering process, a building rendering process, a label rendering process, a vegetation rendering process, a raster traffic rendering process, a raster road rendering process, a satellite rendering process, a polygon rendering process, a background raster rendering process, etc.

The operation of the rendering pipeline 1800 in some embodiments will now be described. Based on user input to view a particular map region at a particular zoom level, the virtual camera 1830 specifies a location and orientation from which to view the map region, and sends this viewing frustrum, or volume, to the controller 1875. The controller 1875 instantiates one or more tile providers. While one tile provider 1820 is shown in this figure, some embodiments allow the instantiation of multiple tile providers at once. For instance, some embodiments instantiate separate tile providers for building tiles and for map tiles.

The tile provider 1820 performs any culling necessary to generate an empty view tile identifying regions of the map for which a mesh needs to be built, and sends the empty view tile to the mesh builders 1815, which are instantiated for the different layers of the drawn map (e.g., roads, land cover, POI labels, etc.). The mesh builders 1815 use a manifest received from the mapping service that identifies the different tiles available on the mapping service server (i.e., as nodes of a quadtree). The mesh builders 1815 request specific map tiles from the tile retrievers 1805, which return the requested map tiles to the mesh builders 1815.

Once a particular mesh builder 1815 has received its map tiles, it begins using the vector data stored in the map tiles to build the mesh for the view tiles sent from the tile provider 1820. After building the mesh for its map layer, the mesh builder 1815 sends the built view tile back to the tile provider 1820. The tile provider 1820 waits until it has received all of the view tiles from the various mesh builders 1815, then layers these together and sends the completed view tile to the controller 1875. The controller stitches together the returned tiles from all of its tile providers (e.g., a map view tile and a building view tile) and sends this scene to the rendering engine 1825. The map rendering engine 1825 uses the information in the map tiles to draw the scene for display.

2. State Diagram for Different Modes

Figure 19B:
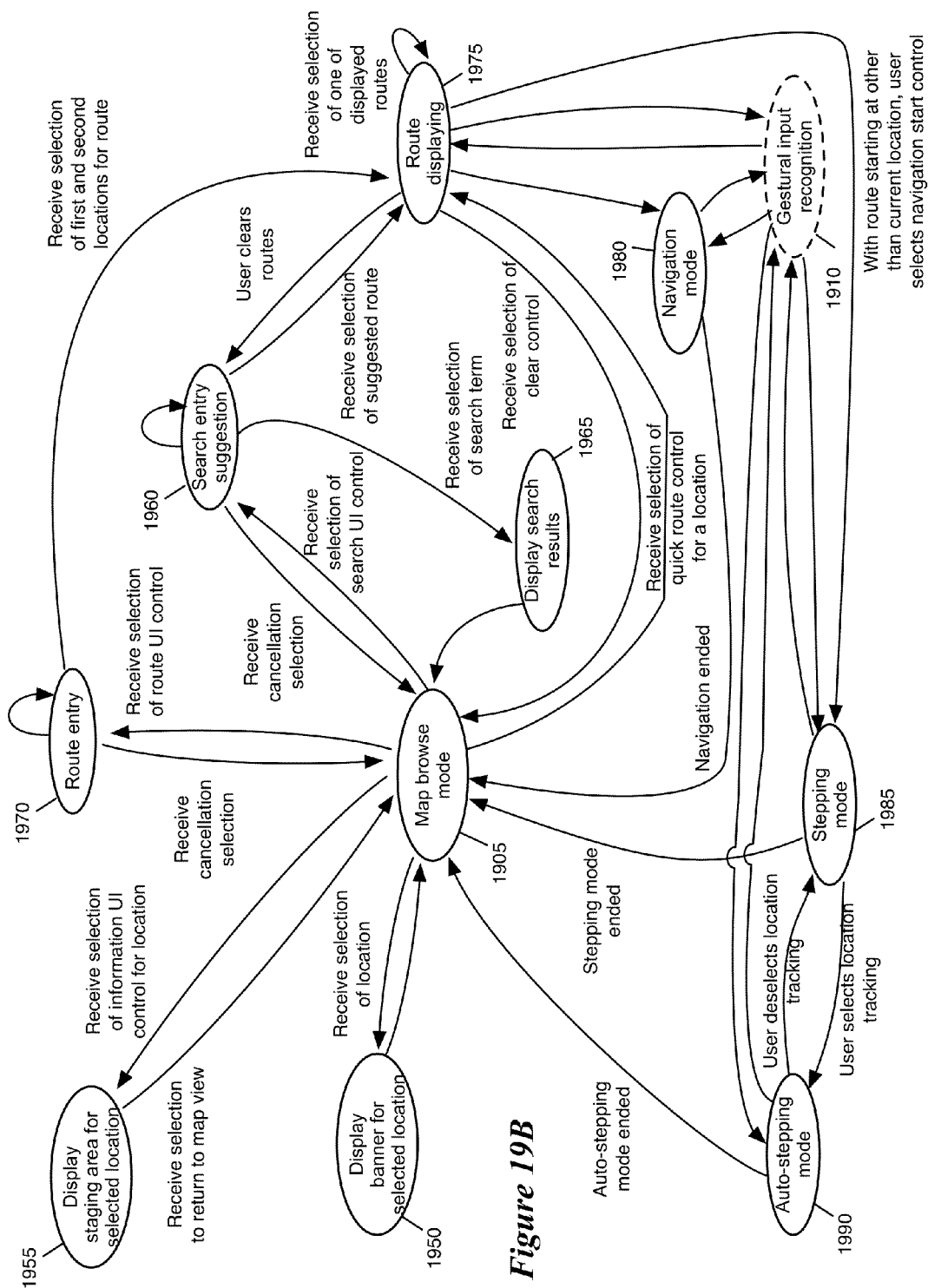

FIG. 19 conceptually illustrates a state diagram 1900 that describes different states and transitions between these states of the integrated mapping, search, and navigation application of some embodiments (e.g., the application described in the above sections). One of ordinary skill in the art will recognize that the application of some embodiments will have many different states relating to all different types of input events, and that the state diagram 1900 is specifically focused on a subset of these events. The state diagram 1900 describes and refers to various gestural interactions (e.g., multi-touch gestures) for changing states of the application. One of ordinary skill in the art will recognize that various other interactions, such as cursor controller gestures and button clicks, keyboard input, touchpad/trackpad input, etc., may also be used for similar selection operations.

When a user initially opens the mapping application, the application is in state 1905, the map browsing state. In this state 1905, the application will have generated and displayed a map view. To generate and display this map view, the application of some embodiments identifies a required set of map tiles for a region, requests the map tiles (e.g., from a mapping service server), generates a view of the map tiles from a particular location, orientation, and perspective of a virtual camera, and renders the map view to a device display. When in state 1905, the map view is static. With the application in state 1905, the user can perform numerous operations to modify the map view, search for entities (e.g., places of interest, addresses, etc.), retrieve a route for navigation, etc.

In some embodiments, the integrated application is displayed on a device with an integrated touch-sensitive display. Various gestural interactions over the map may cause the application to perform different modifications to the map view (e.g., panning, rotating, zooming, modifying the map perspective, etc.). When the integrated application receives gestural interactions over the map display (as opposed to touch inputs over various floating or non-floating controls overlaid on the map display), the application transitions to state 1910 to perform gestural input recognition.

The gestural input recognition state 1910 differentiates between different types of gestural input and translates these types of input into different map view modification operations. In some embodiments, the mapping application receives the gestural input as translated by the operating system of the device with the integrated touch-sensitive display. The operating system translates the touch input into gesture types and locations (e.g., a "tap" at coordinates (x,y), a "pinch" operation with separate touch inputs at two different locations, etc.). At state 1910, the integrated mapping application of some embodiments translates these into the different map view modification operations.

When the application receives a first type of gestural input (e.g., two separate touch inputs moving together in a rotational motion over the map view), the application transitions to state 1915 to rotate the map. To rotate the map view, some embodiments modify the location and/or orientation of the virtual camera that determines which portion of the map is rendered to create the map view. When in 3D mode, for example, the mapping application rotates the virtual camera about a particular position (e.g., the center of the touch inputs, the center of the display, a location indicator identifying the user's location, etc.). As the first type of gestural input continues, the mapping application remains in state 1915 to continue rotating the map.

When the user releases the first type of gestural input, the application of some embodiments transitions to state 1930 to perform an inertia calculation. In some embodiments, after the user releases certain types of touch inputs, the application continues to perform the associated map view modification for a particular amount of time and/or distance. In this case, after the user releases the rotation input, the application transitions to the inertia calculation state 1930 to calculate the additional rotation amount and the time over which this rotation should be performed. In some embodiments, the application slows down the rotation from the (angular) velocity at which the map was being rotated, as if a "frictional" force was applied to the map. As such, the inertia calculation of some embodiments is based on the speed of the first type of gestural input. From state 1930, the application transitions back to the map modification state that the application was previously in. That is, when the application transitions from state 1915 (the rotation state) to the inertia calculation state 1930, it then transitions back to state 1915 after performing the inertia calculation. After the rotation of the map is complete, the application transitions back to state 1905.

When the application receives a second type of gestural input (e.g., a single touch input moving over the map view), the application transitions to state 1920 to pan the map. To pan the map view, some embodiments modify the location of the virtual camera that determines which portion of the map is rendered to create the map view. This causes the map to appear to slide in a direction derived from the direction of the second type of gestural input. In some embodiments, when the map view is in a 3D perspective mode, the panning process involves performing a correlation of the location of the touch input to a location on the flat map, in order to avoid sudden unwanted jumps in the map view. As the second type of gestural input continues, the mapping application remains in state 1920 to continue panning the map.

When the user releases the second type of gestural input, the application of some embodiments transitions to state 1930 to perform an inertia calculation. In some embodiments, after the user releases certain types of touch inputs, the application continues to perform the associated map view modification for a particular amount of time and/or distance. In this case, after the user releases the panning input, the application transitions to the inertia calculation state 1930 to calculate the additional amount to move the map view (i.e., move the virtual camera) and the time over which this movement should be performed. In some embodiments, the application slows down the panning movement from the velocity at which the map was being panned, as if a "frictional" force was applied to the map. As such, the inertia calculation of some embodiments is based on the speed of the second type of gestural input. From state 1930, the application transitions back to the map modification state that the application was previously in. That is, when the application transitions from state 1920 (the panning state) to the inertia calculation state 1930, it then transitions back to state 1920 after performing the inertia calculation. After the panning of the map is complete, the application transitions back to state 1905.

When the application receives a third type of gestural input (e.g., two separate touch inputs moving closer together or farther apart), the application transitions to state 1925 to zoom in on or out of the map. To change the zoom level of the map view, some embodiments modify the location (i.e., height) of the virtual camera that determines which portion of the map is rendered to create the map view. This causes the map view to include more (if zooming out) or less (if zooming in) of the map. In some embodiments, as the user zooms in or out, the application retrieves different map tiles (for different zoom levels) to generate and render the new map view. As the third type of gestural input continues, the mapping application remains in state 1925 to continue zooming in on or out of the map.

When the user releases the second type of gestural input, the application of some embodiments transitions to state 1930 to perform an inertia calculation. In some embodiments, after the user releases certain types of touch inputs, the application continues to perform the associated map view modification for a particular amount of time and/or distance (i.e., moving the virtual camera higher or lower). In this case, after the user releases the zoom input, the application transitions to the inertia calculation state 1930 to calculate the additional amount to zoom the map view (i.e., move the virtual camera) and the time over which this movement should be performed. In some embodiments, the application slows down the zooming movement from the velocity at which the map was being zoomed in on or out of (i.e., the speed at which the virtual camera changes height), as if a "frictional" force was applied to the camera. As such, the inertia calculation of some embodiments is based on the speed of the third type of gestural input. From state 1930, the application transitions back to the map modification state that the application was previously in. That is, when the application transitions from state 1925 (the zooming state) to the inertia calculation state 1930, it then transitions back to state 1925 after performing the inertia calculation. After the zooming of the map is complete, the application transitions back to state 1905.

For simplicity, the state diagram 1900 illustrates the map panning, zooming, and rotation processes using the same inertia calculation process (state 1930). However, in some embodiments, each of these different map modification processes actually uses a different inertia calculation to identify the slow-down and stop for its particular type of movement. In addition, some embodiments calculate and modify the inertia variables as the input is received rather than when the user removes the gestural input.

When the application receives a fourth type of gestural input (e.g., two separate touch inputs moving up or down the touch-sensitive display in unison), the application transitions to state 1935 to modify the perspective view of the map. To change the perspective view of the map, some embodiments move the virtual camera along an arc over the map, modifying both the location and orientation of the virtual camera (as the camera keeps the center of its field of view at a particular location on the map). In some embodiments, different zoom levels use different arcs along which the virtual camera moves. Each of these arcs has a top point at which the virtual camera is pointing straight down, giving a 2D perspective view of the map. In addition, each arc has a bottom point, that is the lowest point on the arc to which the virtual camera can be moved. Thus, the fourth type of gestural input can cause the application to change between a 2D map view and a 3D perspective map view in some embodiments. As the fourth type of gestural input continues, the mapping application remains in state 1935 to continue modifying the perspective view of the map.

When the user releases the fourth type of gestural input, the application of some embodiments transitions to state 1940 to perform an inertia calculation. In some embodiments, after the user releases certain types of touch inputs, the application continues to perform the associated map view modification for a particular amount of time and/or distance (i.e., moving the virtual camera higher or lower). In this case, after the user releases the perspective view change input, the application transitions to the inertia calculation state 1940 to calculate the additional amount to modify the perspective of the map view (i.e., move the virtual camera along its arc) and the time over which this movement should be performed. In some embodiments, the application slows down the movement from the velocity at which the map was changing perspective (i.e., the speed at which the virtual camera moves along its arc), as if a "frictional" force was applied to the camera. As such, the inertia calculation of some embodiments is based on the speed with which the fourth type of gestural input was performed.

In addition, for the perspective change operation, some embodiments transition to a rebound calculation state 1945. As stated, the perspective change operation has a maximum and minimum perspective shift allowed in some embodiments, which may depend on the zoom level of the current map view. Thus, in addition to an inertia calculation, the application performs a rebound calculation at state 1945. The rebound calculation uses the inertia calculation to determine whether the maximum point along the virtual camera arc will be reached and, if so, the velocity of the virtual camera at this point. Some embodiments allow the virtual camera to move slightly past the maximum point to hit a "rebound" point, at which point the application turns the virtual camera around on its arc, moving it back towards the maximum point. Some embodiments include such a bounce-back functionality only on one end of the virtual camera arc (e.g., the bottom of the arc), while other embodiments include the functionality on both ends of the arc. From the rebound calculation state 1945, the application transitions back to the inertia calculation state 1940, then back to the perspective changing state 1935 to display the map view movement. In addition, when the user performs the fourth type of touch input for long enough and the perspective reaches its maximum point, the application transitions directly from the state 1935 to state 1945 to calculate the rebound information and then transitions back to state 1935. After the modification to the perspective view of the map is complete, the application transitions back to state 1905.

The above states relate to the various multi-touch gestures over the map presentation that the integrated mapping, search, and navigation application translates into different modifications to the map presentation. Various other touch inputs can also cause the application to change states and perform various functions. For instance, some embodiments overlay a 3D selectable item on the map view (e.g., as a floating control), and selecting (e.g., with a tap input) the 3D item causes the application to transition to 1935 to modify the perspective of the map view. When the map view starts in a 3D perspective view, the application modifies the perspective into a 2D view; when the map view starts in the 2D view, the application modifies the perspective into a 3D view. After the modification, the application returns to state 1905.

When a user is viewing a map in state 1905, the application presents various labels as part of the map view. Some of these labels indicate places of interest, or other locations. When a user selects certain labels (e.g., for certain businesses, parks, etc.), the application transitions to state 1950 to display a banner for the selected location (e.g., an information display banner), then returns to the map browsing state (with the banner displayed over the map). In some embodiments, this banner includes (1) a quick-route navigation UI control (e.g., a button) that causes the application to retrieve a route (e.g., a driving route) from a current location of the device to the selected location without leaving the map view and (2) an information UI control (e.g., button) that causes the application to provide additional information about the location.

When a user selects the UI control button, the application transitions from state 1905 to state 1955 to display a staging area for the selected location. In some embodiments, this staging area displays a media presentation of the selected location (e.g., a 3D video presentation, a flyover view of the selected location, a series of images captured for the location, etc.), as well as various information for the selected location (contact information, reviews, etc.). The application stays in the state 1955 as the user performs various operations to navigate the staging area and view information within the staging area. When a user selects a UI control to transfer back to the map view, the application transitions to state 1905.

From the map browsing view, the user can also easily access the search function of the application. When a particular UI control (e.g., a search bar) is selected, the application transitions to a search entry suggestion state 1960. At the search entry state, some embodiments display a touchscreen keyboard with which the user can enter a search term. The search term may be a business name, an address, a type of location (e.g., coffee shops), etc. While the user enters characters, the application remains in state 1960 and provides suggestions based on recent searches, the letters already entered, etc. Some embodiments may use prefix-based suggestions (e.g., suggestions starting with the characters already entered) as well as other suggestions (e.g., making spelling corrections to add characters at the beginning of the already-entered string, transpose characters, etc.). In some embodiments, the selections may also include recently entered routes in addition to locations. If the user selects a cancellation UI control at this stage, the application transfers back to state 1905 without performing a search.

When the user selects a search term (either a suggested term or a term entered completely by the user), the application transitions to state 1965 to display the search results over the map view, then transitions to state 1905 with the search results displayed. Some embodiments display the search results as selectable items (e.g., pins) on the map; selection of one of the items causes a transition to state 1950 to display the banner for the selected item. In addition, the application of some embodiments automatically selects one of the search results (e.g., a "best" result) and displays this banner as part of the state 1965.

As the application is a tightly integrated mapping, search, routing, and navigation application, the user can easily access the routing function from the map browsing state. When a particular UI control (e.g., a route entry button) is selected, the application transitions to the route entry state 1970. At the route entry state, some embodiments display a touchscreen keyboard with which the user can enter locations (e.g., addresses, place names, place types, etc.) into both "to" and "from" fields in order to request a route. While the user enters characters, the application remains in state 1970 and provides suggestions based on recent routes, recent searches, an autocomplete similar to that described for the search entry, etc. If the user selects a cancellation UI control at this stage, the application transfers back to state 1905 without retrieving a route.

When the user selects a route (e.g., by entering a "to" location and a "from" location), the application transitions to the route displaying state 1975. At this state, the application displays one or more routes from a first selected location to a second selected location over the map view (e.g., by overlaying route lines on the map view). Some embodiments automatically select a first one of the routes. The user can select any of the other routes (e.g., by tapping over an unselected route), with the application remaining in state 1975 (but modifying the display of the route lines to indicate the selection of the other route). In addition, when in state 1975, the application of some embodiments displays different UI controls related to routing and navigation, including a direction list control, a navigation start control, and others.

Also, various gestural interactions over the map on which the routes are displayed may cause the application to perform different modifications to the map view (e.g., panning, rotating, zooming, modifying the map perspective, etc.). When the integrated application receives gestural interaction over the map display while in the route display state 1975, the application transitions to state 1910 to perform gestural input recognition, with all of the gestural map modification operations (e.g., corollaries to states 1915-1945) available. That is, the application translates the gestural input into panning, rotation, zoom, and/or perspective change operations similar to those described above for states 1915-1945, with similar inertia and rebound features for the virtual camera movement. Whereas the operations 1915-1945 return to the map browsing state 1905, the corollary operations accessed from the route display state 1975 return to the route display state 1975.

In some embodiments, the route display state 1975 is accessible from other states as well. For instance, if a user selects the quick-route UI control on a banner while in state 1905, the application retrieves one or more routes from the current location of the device to the location with which the banner is associated. In addition, some embodiments display previously requested routes among the search suggestions at state 1960. When the user selects one of these suggested routes, the application transitions directly from state 1960 to state 1975 to display one or more routes over the map.

From the route display state 1975, the application can transition into various different modes depending on different controls selected by the user. When the user selects a UI control to clear the routes, the application transitions back to state 1905 to display the map without any routes. In addition, the integrated application may enter one or more navigation modalities from the route displaying state 1975.

When the selected route displayed at state 1975 starts at the current location of the device and the user selects a navigation starting control, the application transitions to the navigation state 1980. In some embodiments, the application displays a cinematic transition from the map view into a more immersive 3D view for navigation. Within the navigation state 1980 of some embodiments, a virtual camera follows the location of the user along the selected route in order to present the upcoming portions of the route. When either the route is completed (the device reaches the destination location) or the user selects a control to end navigation, the application transitions to state 1905 to present the map browsing view 1905.

In some embodiments, various gestural interactions over the map on which the routes are displayed may cause the application to perform different modifications to the map view (e.g., panning, rotating, zooming, modifying the map perspective, etc.) while in the navigation mode 1980. In some embodiments, only some of the described map modification operations are available in the navigation mode. For instance, some embodiments allow the user to zoom in or out, but do not allow any other modifications to the map. Thus, when the user provides gestural input, the gestural input recognition state 1910 filters out types of gestural input not associated with the zoom operation (and subsequently the application returns to state 1980). When the type of gestural input associated with the zoom operation is received, the gestural input recognition state recognizes this input and the application transitions to a state similar to state 1925, for changing the zoom level of the map (with the inertia calculation, in some embodiments).

Other embodiments may enable different map modification operations. For instance, in some embodiments all of the gestural map modification operations (e.g., corollaries to states 1915-1945) are available while in the navigation mode. Some embodiments allow a subset of the gestural map modification operations, such as zooming and a limited panning operation. The panning operation of some embodiments, upon receiving the type of gestural input associated with panning, moves the virtual camera (while in the navigation mode) to the side, then returns the virtual camera back to pointing along the route. Whereas the operations 1915-1945 return to the map browsing state 1905, the corollary operations accessed from the navigation state 1980 return to the navigation state 1980.

When the selected route displayed at state 1975 starts at a location other than the current location of the device (or the route is a walking route) and the user selects a navigation starting control, the application transitions to the stepping mode, or route inspection mode, at state 1985. In some embodiments, the application displays the maneuvers performed along the route one at a time (e.g., as navigation signs). By providing gestural input (e.g., swipe gestures) to the maneuvers, the user can view the different maneuvers while in the route inspection mode. The maneuvers are overlaid on a map and at least a portion of the route is displayed in the map.

As in the route display mode, various gestural interactions over the map may cause the application to perform different modifications to the map view (e.g., panning, rotating, zooming, modifying the map perspective, etc.). When the integrated application receives gestural interaction over the map display while in the stepping mode 1985, the application transitions to state 1910 to perform gestural input recognition, with all of the gestural map modification operations (e.g., corollaries to states 1915-1945) available. That is, the application translates the gestural input into panning, rotation, zoom, and/or perspective change operations similar to those described above for states 1915-1945, with similar inertia and rebound features for the virtual camera movement. Whereas the operations 1915-1945 return to the map browsing state 1905, the corollary operations accessed from the stepping mode 1985 return to the stepping mode 1985.

Furthermore, in some embodiments the gestural input recognition recognizes at least one type of gestural input over the displayed maneuvers in order to switch between the maneuvers. When a particular type of gestural input (e.g., a swipe gesture) is received over the displayed maneuver (as opposed to over the map view), the application transitions to a state (not shown) for changing the displayed maneuver, then returns to state 1985.

When the integrated application receives gestural interaction over the map displayed while in the stepping state 1985, the application transitions to state 1910 to perform gestural input recognition, with all of the gestural map modification operations (e.g., corollaries to states 1915-1945) available. When the modification operations are done, the application returns to state 1985. When the user selects a control to end stepping through the maneuvers, the application transitions to state 1905 to present the map browsing view.

In addition, in some embodiments the application can transition from the stepping mode 1985 to an auto-stepping state 1990. When the user selects a location tracking control while the application is in state 1985, the application transitions to an automatic stepping mode 1990, which is a different navigation modality. When in the automatic stepping mode of some embodiments, the integrated mapping, search, and navigation application displays the maneuver to which the device's location is closest (e.g., as measured by a juncture at which the maneuver is performed). When the device moves (e.g., along the route) to a location closer to a different maneuver, the auto-stepping mode automatically displays the different maneuver. When the user deselects the location tracking control, the application transitions back to the stepping mode 1985. When the user selects a control to end navigation while in the auto-stepping state 1990, the application transitions to state 1905 to present the map browsing view.

As in the stepping mode 1985, various gestural interactions over the map may cause the application to perform different modifications to the map view (e.g., panning, rotating, zooming, modifying the map perspective, etc.). When the integrated application receives gestural interaction over the map display while in the auto-stepping mode 1990, the application transitions to state 1910 to perform gestural input recognition, with all of the gestural map modification operations (e.g., corollaries to states 1915-1945) available. That is, the application translates the gestural input into panning, rotation, zoom, and/or perspective change operations similar to those described above for states 1915-1945, with similar inertia and rebound features for the virtual camera movement. Whereas the operations 1915-1945 return to the map browsing state 1905, the corollary operations accessed from the auto-stepping mode 1990 return to the auto-stepping mode 1990. In addition, some embodiments automatically turn the location tracking control off when the user pans the map a particular distance, in which case the application returns to the stepping mode state 1985 rather than auto-stepping state 1990.

II. Display of Navigation Signs

The above sections introduce the turn-by-turn navigation features of some embodiments. One such feature is the navigation signs provided by the mapping application describing the different maneuvers for the user to perform. These signs may indicate turns, a distance over which to continue traveling straight, when to take a freeway off-ramp, or other maneuvers for the user to perform. Some embodiments provide various animations for the signs, including showing the signs as passing over the user location indicator in 3D mode, modifying the appearance of a sign to indicate an upcoming maneuver, and using secondary signs when two maneuvers will be performed in rapid succession.

A. Realistic Look and Different Formats in Different Contexts

The navigation signs, in some embodiments, may have different appearances in different contexts. Some of these differences are described in greater detail further below. Specifically, graphical indicators of maneuvers to perform (e.g., direction indicators that are described further below) and instruction text describing those maneuvers may be adapted to fit the context of the navigation signs being displayed. For example, different-sized signs may have either simple or complex maneuver descriptions, and instruction text may be adapted to the size of the sign and may be based on other information displayed within the sign.

Some embodiments display the navigation signs in such a way as to give the signs the appearance of a realistic road sign. Some embodiments display the navigation signs as rich, textured images (e.g., using shadows, shading, etc.) as opposed to simply displaying a flat image on the map display. In addition, some embodiments use shading for the navigation sign that matches the color(s) of road signs in the area through which the application is navigating. The application also uses realistic highway shields to mark roads in some embodiments. For instance, for numbered state and federal highways, the application will either use the highway shield associated with the road within the navigation sign (e.g., off to the side of the sign), replace the name of the road in navigation instructions with the highway shield, or otherwise include the highway shield in the graphical display. Generation and use of these road signs are further described in U.S. patent application Ser. No. 13/632,121, entitled "Context-Aware Voice Guidance," filed on Sep. 30, 2012, now published as U.S. Patent Publication 2013/0322634. U.S. patent application Ser. No. 13/632,121, now published as U.S. Patent Publication 2013/0322634 is incorporated herein by reference.

Figure 20:
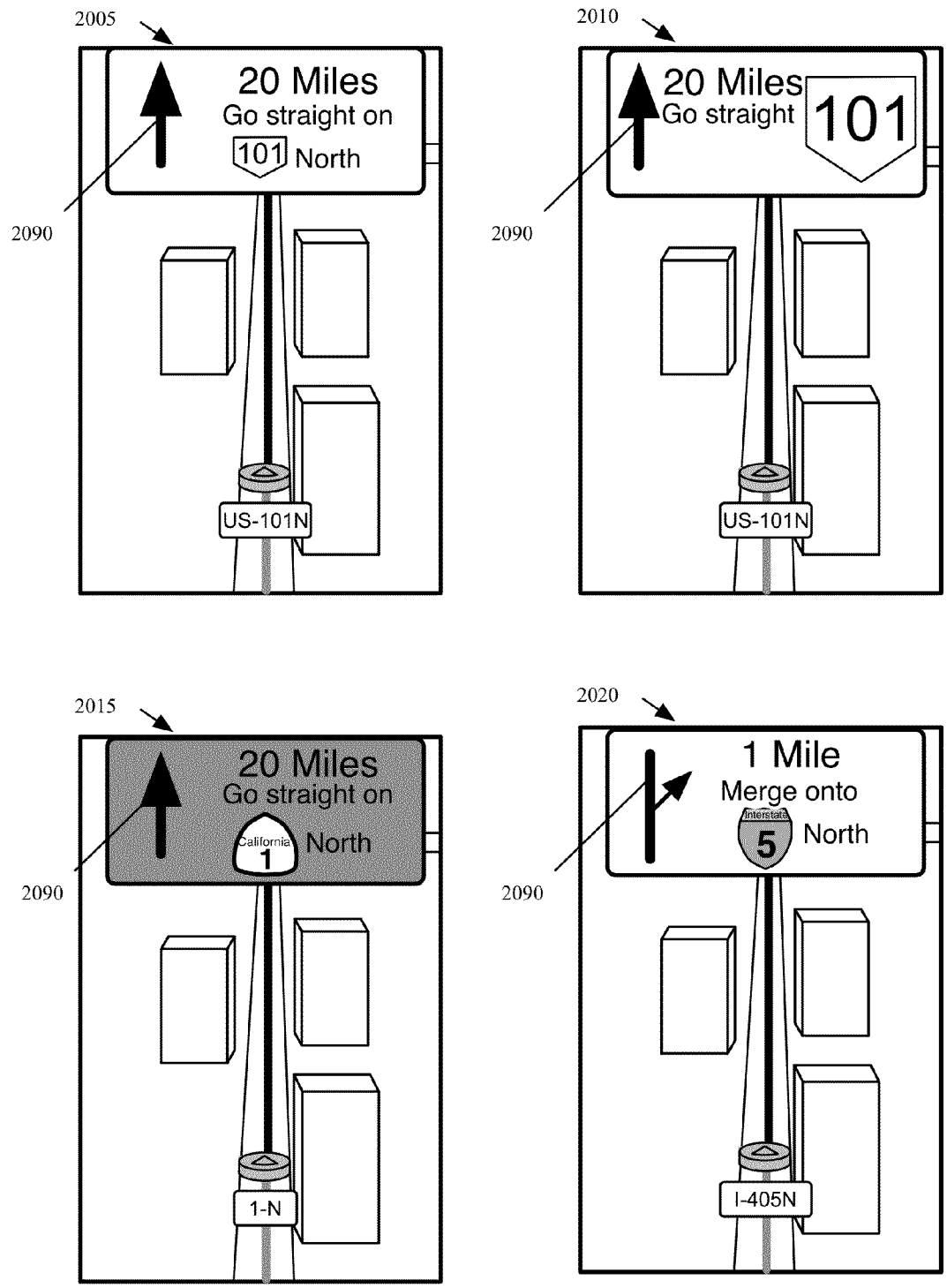
FIG. 20 illustrates several GUI scenarios in which such highway shields are used in some embodiments.

FIG. 20 illustrates several GUI scenarios in which such highway shields are used. The first such scenario 2005 illustrates the mapping application in turn-by-turn navigation mode, showing an instruction to proceed straight on US-101 North for 20 miles. In this example, the road sign for US-101 is displayed inline within the text instruction "Go straight on US-101 North", as a substitute for the actual text "US-101". Some embodiments replace text names of roads with road signs when the road has a sign and that sign is available as an image to the mapping application.

The second example 2010 illustrates the highway shield displayed on the right side of the navigation sign rather than inline in the text instruction. This scenario illustrates an alternative display used by some embodiments for the same instruction as in example 2005. The highway shield in this case is displayed as the same size as the graphical indicator arrow on the left side of the navigation sign. In addition, because the information is presented in the road sign, the application removes the "on 101 North" portion of the text that would otherwise be present.

The third example 2015 illustrates the case in which the navigation sign is shaded to match the type of road shown in the highway shield. In this scenario, the instruction tells the user to go straight on CA-1 North. The "CA-1" is replaced with the highway shield sign for CA-1. While some embodiments shade this sign using green (the color of signs used for California state highways), other embodiments shade the navigation sign using the color of the road shield signs found along the actual highway. Other embodiments use green to match the color of road instruction signs found above freeways in the region in which the device is located (e.g., green for California).

The fourth scenario 2020 illustrates a merge maneuver onto Interstate-5 within the navigation sign. Much like the first example 2005, this illustrates the road shield sign as inline text. Furthermore, shading is used within the road shield in order to match the look of the actual interstate signs, with the top portion shaded red and the bottom portion shaded blue. As mentioned, some embodiments instead shade the entire navigation sign using a combination of these colors.

Although FIG. 20 does not illustrate different appearances of direction indicators 2090, the mapping application of some embodiments uses different appearances in order to adapt the direction indicators to fit the context of the navigation signs being displayed.

B. Dynamic and Animated Presentation of Signs

The above-described situations of FIG. 20 illustrate static display of the navigation signs (i.e., not showing any changes made to the signs). Some embodiments provide animation or other dynamic displays of these navigation signs. These displays include displaying the appearance of the sign passing over the head of the user representation (the navigation puck) in the map display as a user makes a maneuver and the sign is removed. In addition, subtle animation may be applied to a sign as a maneuver approaches in order to bring the upcoming maneuver to the user's attention. Finally, when two maneuvers occur in short succession, the application displays the navigation sign for the second maneuver as queued up behind the first sign.

1. Animated Removal and Presentation of Navigation Sign

Figure 21:
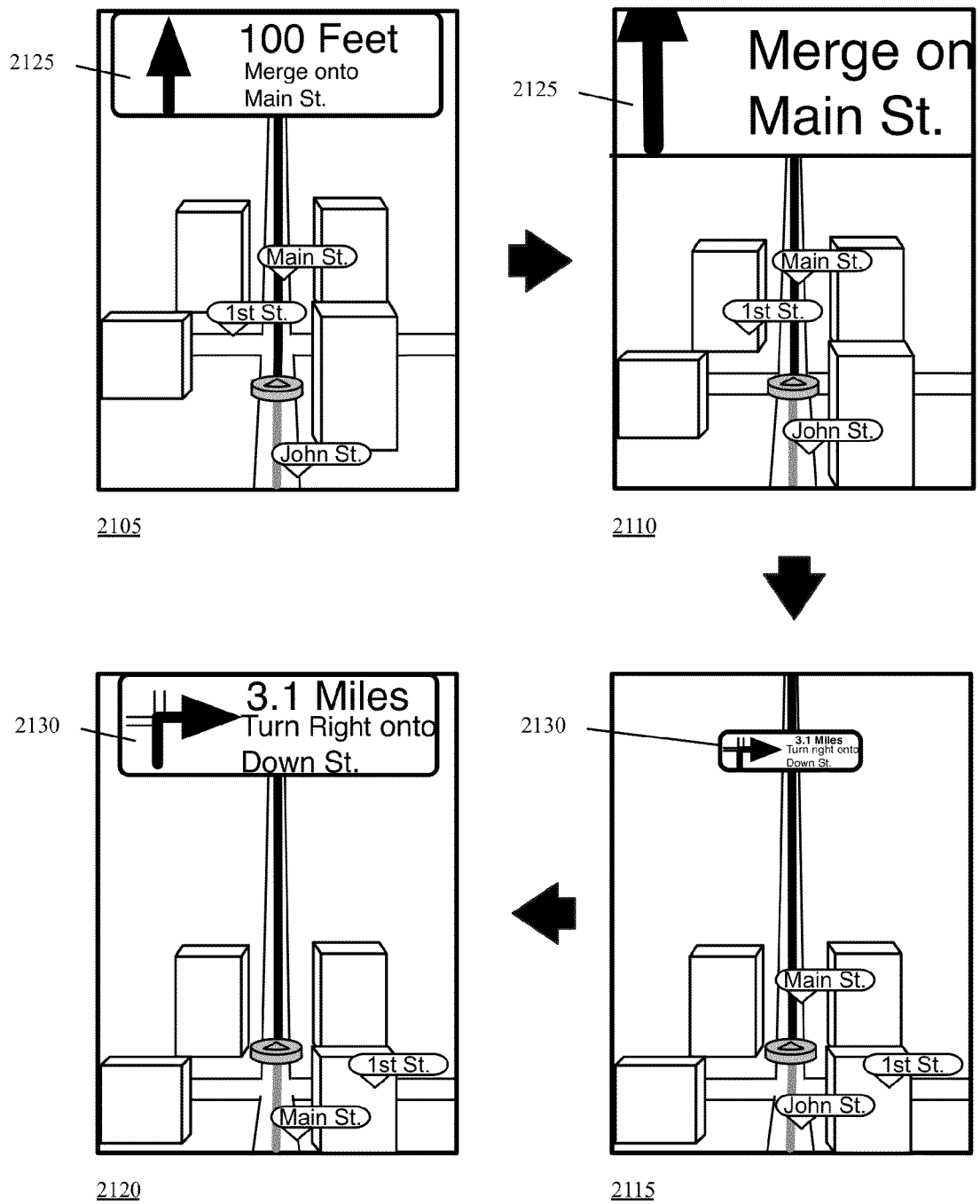
FIG. 21 illustrates, over four stages, the animation of some embodiments for removing a navigation sign and introducing the next sign.

FIG. 21 illustrates, over four stages 2105-2120, the animation of some embodiments for removing a navigation sign and introducing the next sign. In some embodiments, the animation of the removed sign mimics that of a road sign passing overhead on a highway. While this figure illustrates the animation within the context of 3D mode, some embodiments also include the animation in 2D mode. Other embodiments specifically provide the animation for 3D mode.

The first stage 2105 illustrates a navigation sign 2125 indicating a maneuver of merging onto Main St. for the user to perform in 100 ft. The second stage 2110 illustrates the animation to remove the navigation sign 2125 as the user performs the maneuver. As the user physically merges onto Main St., the navigation sign 2125 enlarges and begins disappearing from the field of view, as would a road sign above a freeway. In some embodiments, the mapping application also applies a perspective tilt to the sign, to further mimic the appearance of the sign passing overhead.

At the third stage 2115, the subsequent navigation sign 2130 begins to appear from the horizon, or a closer approximation of the horizon. Some embodiments do not actually render the map all the way out to the horizon in 3D mode, and start animating the upcoming navigation sign from the distance at which the 3D rendering ends. This animation is meant to resemble the approach towards a road sign on the freeway, though often at a faster speed (in order to quickly bring the navigation sign to full size, and avoid the distraction of a lengthy animation). The fourth stage 2120 illustrates the resultant display, with the subsequent navigation sign 2130 displayed at the top of the screen in the normal position.

In addition to the animations shown in FIG. 21, some embodiments also include more complex animations in some cases. As one example, some embodiments rotate a navigation sign as it leaves the display when a user makes a turning maneuver, in order to mimic the appearance of a user turning underneath the sign.

2. Occasional Emphasis

In some cases, the mapping application may display a navigation sign well before the maneuver described by the navigation sign will be performed. For instance, if a user enters a freeway, and the next maneuver involves a freeway exit in 15 miles, the application may display a navigation sign indicating the upcoming freeway exit well before the user needs to begin preparing to actually exit the freeway. When it comes time to alert the user that the juncture at which to perform the maneuver is approaching, different embodiments use different techniques. Some embodiments include audio alerts, with the user device providing voice navigation to indicate that the juncture is approaching.

Some embodiments, either in conjunction with the audio alert or whenever the audio alert is turned off, provide a visual indication that the maneuver is upcoming through the display of the sign. For instance, in some embodiments the application modifies the color of the sign (e.g., from green to white or green to yellow) along with the color of the graphical indicator arrow (e.g., from white to black). Other embodiments display a less obtrusive shimmer over the navigation sign, intended to catch the user's attention without being overly obtrusive.

Figure 22:
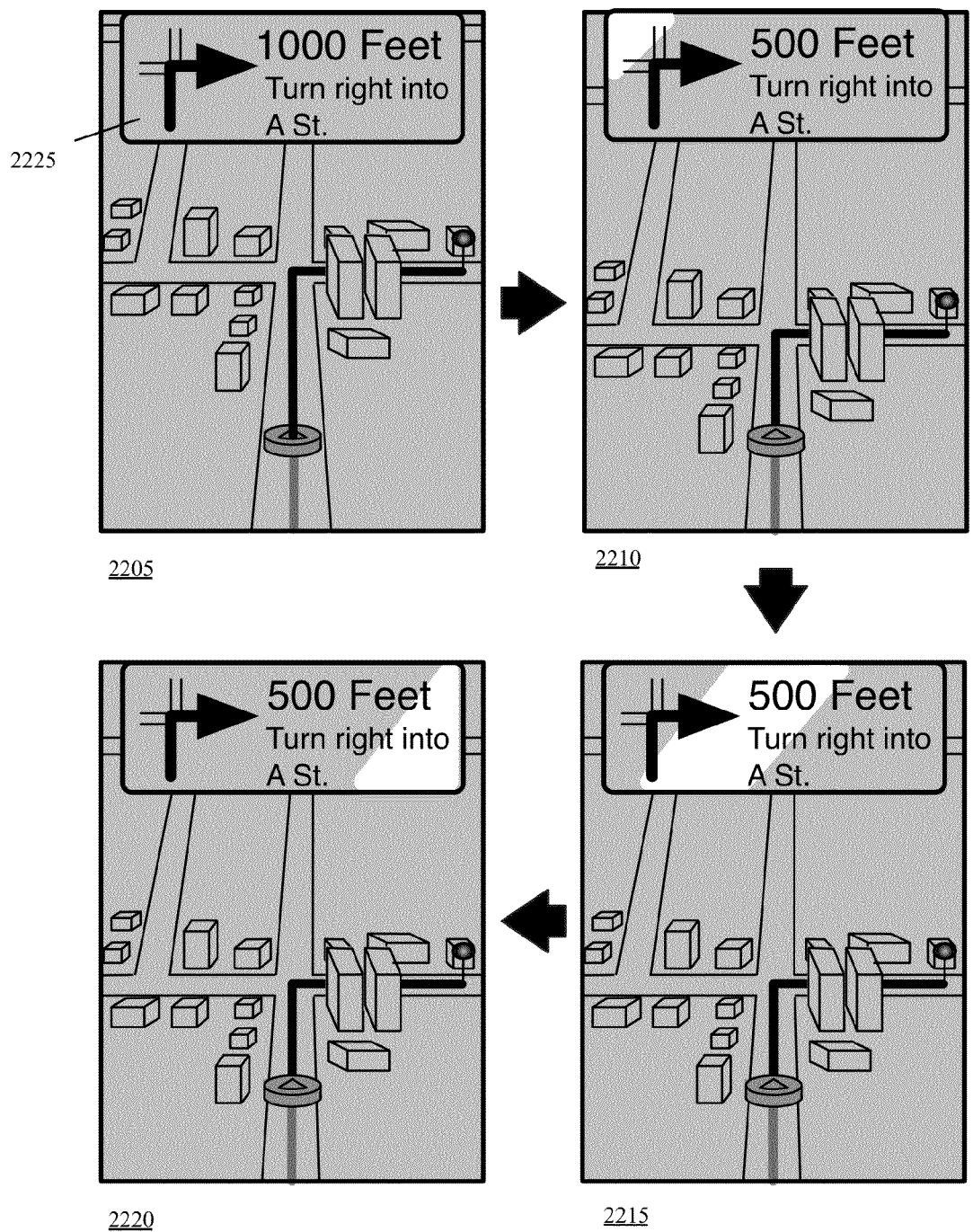
FIG. 22 illustrates such a shimmer animation over four stages that illustrate the background of the display as gray, in order to contrast with the shimmer as it moves across the sign in some embodiments.

FIG. 22 illustrates such a shimmer animation over four stages 2205-2220. These stages illustrate the background of the display as gray, in order to contrast with the shimmer as it moves across the sign (shown in white). The first stage 2205 illustrates a navigation sign 2225, currently indicating a right turn maneuver in 1000 ft.

At the second stage 2210, the right turn is now only 500 ft. away. The application has judged that this is the appropriate distance at which to alert the user to the upcoming maneuver, and therefore has begun displaying a shimmer across the navigation sign 2225. The third and fourth stages 2215 and 2220 illustrate the continuation of this animation. In some embodiments, the animation resembles a light being moved across the sign from left to right. Other embodiments display a similar animation from right to left, or other such animations (e.g., a light radiating out from the center of the sign, etc.).

Some embodiments vary the distance from the maneuver at which the animation begins based on various factors, such as the speed at which the device is moving (based on location tracking information) and the speed limit of the road on which the user is currently traveling. For example, some embodiments have a set time before the intersection that the animation should be displayed, and use this speed information to calculate the appropriate distance. Some embodiments also vary the distance based on the type of maneuver being made (e.g., allowing more time for exiting a freeway than for making a right turn off of a one-lane road).

3. Secondary Signs

When a route requires two distinct maneuvers in rapid succession, some embodiments display the navigation sign for the second maneuver as stacked underneath the navigation sign for the first maneuver. This alerts the user to the impending nature of the second maneuver. When several maneuvers will be performed in succession, some embodiments stack more than two navigation signs on top of each other.

Figure 23:
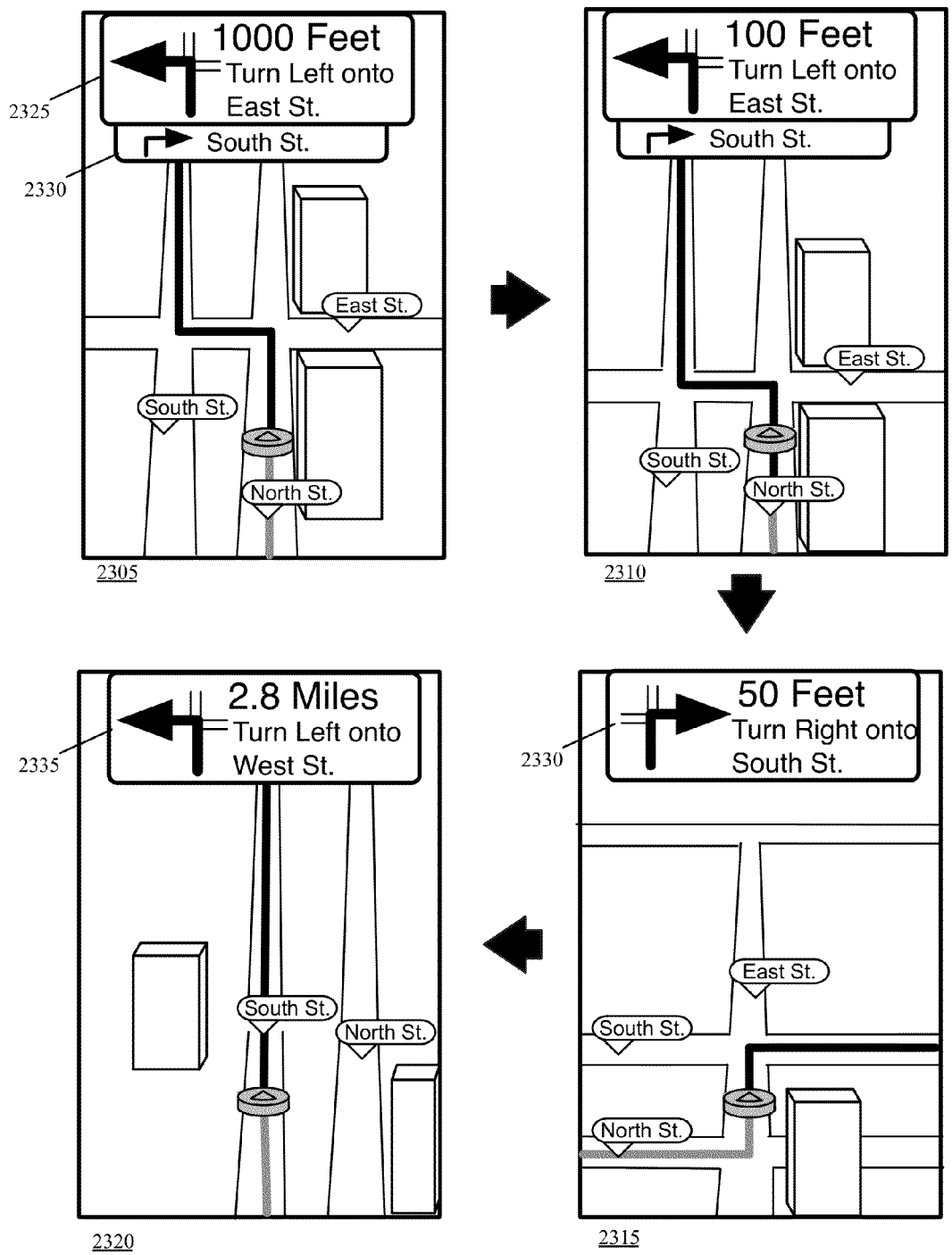
FIG. 23 illustrates the display of two signs for maneuvers in quick succession over four stages in some embodiments.

FIG. 23 illustrates the display of two signs for maneuvers in quick succession over four stages 2305-2320. In the first stage 2305, a first navigation sign 2325 indicates that the upcoming maneuver, at a distance of 1000 ft., is a left turn onto East St. As this is a full size turn-by-turn navigation sign, the application displays a first type of graphical indicator arrow (i.e., a complex arrow) for this maneuver. As can be seen on the map with more careful review than may be available to a driver (who will mostly be looking at the road), a right turn onto South St. will be required shortly after the left turn onto East St. in order to follow the given route. In order to make this more apparent to the user, the application displays a second navigation sign 2330 underneath the first navigation sign 2325. The second sign includes a second type of graphical indicator arrow (i.e., a simpler arrow) as less space is provided. Furthermore, less information is provided to the user in the second sign 2330.

The second stage 2310 illustrates that the user has now traveled 900 feet, so that there are only 100 ft. from the left turn maneuver. Other than the updates to the distance in the navigation sign 2325 (and the movement of the 3D map), the display has not yet changed. The third stage 2315 illustrates the display immediately after the left turn maneuver has been performed onto East St. As shown, the second navigation sign 2330 is now a full-sized navigation sign with a complex graphical indicator arrow and additional textual information (a distance of 50 feet and text instructions to turn right). Some embodiments animate the transition from the smaller sign to the full-size sign, while other embodiments simply replace one with the other.

The fourth stage 2320 illustrates the display after the user has made the second maneuver (the right turn onto South St.). The application now displays a navigation sign 2335 for the next maneuver, a left turn onto West St. Because this maneuver is 2.8 miles away, the application did not stack sign 2335 under sign 2330. Because the navigation is in 3D mode, some embodiments do display the animation described above by reference to FIG. 21.

In the above example, the application stacks signs for maneuvers that occur 50 feet apart, but does not stack signs for maneuvers that occur several maneuvers apart. The threshold distance for when to consider two maneuvers subsequent may depend on a variety of factors. Some embodiments store a set distance that is not variable. Other embodiments look at the type of roads involved in the maneuver (e.g., based on a functional road class variable that describes the road in back-end map data) or the speed limits, assume a likely speed for the user after the maneuver, and set the threshold distance based on this data (i.e., based on a threshold time between maneuvers, such as 30 seconds).

III. Dynamic Generation of Adaptive Directional Indicators

The above section described various features of the navigation signs provided for turn-by-turn navigation. As shown, these navigation signs include directional indicators that graphically describe a maneuver for the user to perform and, in some cases, also show a context for the maneuver by indicating other branches of the intersection at which the maneuver is performed. These directional indicators may appear in various different contexts throughout the mapping and navigation application, both in various aspects of turn-by-turn navigation as well as route inspection.

In order to generate the directional indicators, the mapping application receives data about each of the intersections (also referred to in some places below as junctures) that indicates the different branches of the intersection and notes through which branches the maneuver enters and exits the intersection. In some embodiments, this intersection information is stored by a mapping service that the mapping application accesses in order to retrieve map data as well as route and navigation information. In this Section, subsection A initially describes the generation of this intersection data by the mapping service servers. Subsection B then describes the dynamic generation of the directional indicators by the mapping application operating on the client device.

A. Server Side Generation of Intersection Data

The mapping service of some embodiments receives data specifying each junction of road segments. In some embodiments, the mapping service automatically generates additional data for each of these junctions stored in the map data, and in some embodiments converts the junction data into intersection data. This junction information simplifies each received junction (or a set of related junctions that are viewed in the real world as a single intersection) into a set of branches leaving the junction at different angles. When a user requests a route through a mapping application operating on a device, the device sends the request to the mapping service, which generates a route from a starting location to an ending location. The mapping service also generates turn-by-turn navigation instructions for the route in some embodiments, using the intersection data. The mapping service identifies the intersections at which maneuvers are made, and modifies the intersection data to be specific to the maneuver made during the route. This data is then sent to the user device on which the client mapping application runs. The following subsections first introduce the creation of navigation data for a route, then discuss the precalculation of intersection data by the mapping service (so that the data is available for use in generating navigation data), and then finally describe specific types of modifications made to the intersection data for a requested route.

1. Navigation Data Creation

Figure 24:
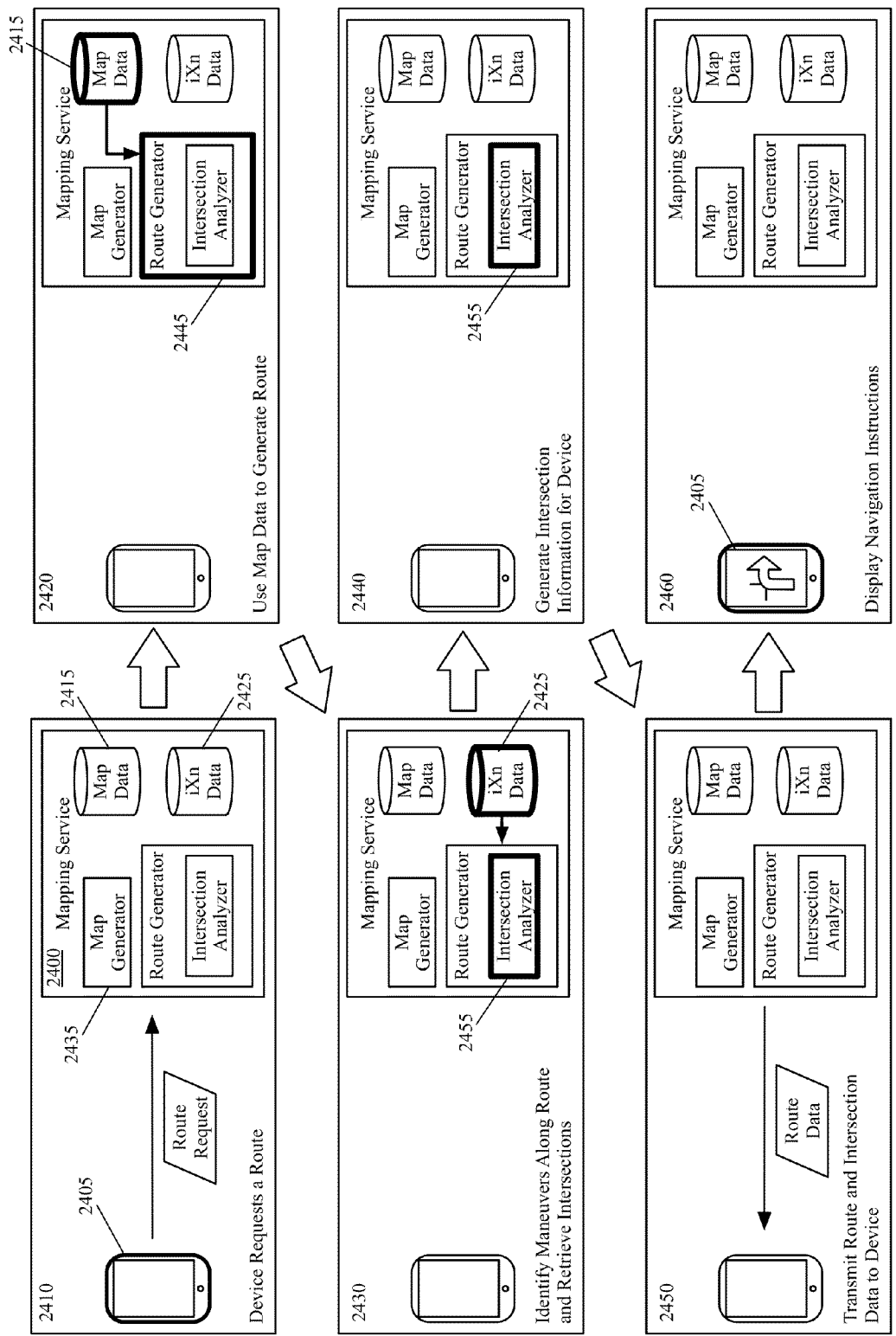
FIG. 24 conceptually illustrates an operation performed by a mapping service of some embodiments to generate a route for a requesting device and provide the route, with navigation instructions, to the requesting device.

FIG. 24 conceptually illustrates an operation performed by a mapping service of some embodiments to generate a route for a requesting device and provide the route, with navigation instructions, to the requesting device. FIG. 24 illustrates this operation over six stages 2410-2460, in which the mapping service receives a request for the route, generates the route, generates intersection data for the route, and provides the route to the device, which uses the information to display navigation instructions.

As shown, each stage of FIG. 24 illustrates a device 2405 and a mapping service 2400. The device 2405 may be a handheld device in some embodiments (e.g., a smart phone, tablet device, etc.), or may be a dedicated navigation device (e.g., a navigation system built into an automobile, a portable navigation device, etc.). In addition, in some embodiments, the device 2405 may be a non-portable device such as a desktop computer or other non-portable computing device.

The mapping service 2400 is a service to which the device 2405 connects (e.g., via a wired connection, wireless connection such as a cell network, Wi-Fi, etc.) in order to request and receive map data, route data, turn-by-turn navigation data, as well as additional information (e.g., information about places located on the map, etc.). As shown, the mapping service 2400 stores map data 2415 and intersection data 2425, and includes a map generator 2435 and route generator 2445, among other modules (not shown).

The map data 2415 provides data from which viewable map regions and routes can be generated. This map data, in some embodiments, includes latitude and longitude data, name data, as well as descriptive data about roads and other pathways (e.g., walkways, ferry routes, bike paths, etc.), natural features (e.g., rivers, lakes, mountain ranges, etc.), places of interest (e.g., buildings, businesses, parks, etc.), and other map items. In some embodiments, for example, a pathway is defined as a series of latitude/longitude vertices, a name, and descriptive data. This descriptive data may include a form of way (i.e., whether the pathway is a single carriageway or a part of a dual carriageway, whether the pathway is a one-way path), the class of road to which the path belongs (e.g., motorway, local road, private road, bicycle path, etc.), as well as other information). In some embodiments, this map data is compiled by an outside source (i.e., a map provider) and provided to the mapping service, while in other embodiments the mapping service provides its own map data. The map data may also be a hybrid of outsider-provided and internally-generated data. In addition, the map data may include geometry data for various map constructs, such as roads, land cover, etc.

The intersection data 2425 provides pretabulated data for the intersections of road paths in the map data. In some embodiments, as described below, the mapping service automatedly calculates intersection data for road pathway intersections using the map data. This intersection data 2425 may be stored by denoting an intersection type (e.g., point, roundabout) and a series of branches coming in and out of the intersection at different angles. While the map data 2415 and the intersection data 2425 are shown as separate storages, these may both be stored on the same physical storage or on separate physical storages, and the intersection data 2425 may in fact be part of the map data 2415. In addition, one or both of the map and intersection data might be distributed across several physical storages (e.g., a series of disks for storing the map data).

The map generator 2435 of some embodiments generates map information (e.g., map tiles) to transmit to the requestor device. The requestor device requests a map for a particular region (e.g., using latitude/longitude information), and the map generator 2435 creates (or uses pre-generated) map tiles for the region, then sends data for these tiles (e.g., as encoded vector and/or image data) to the device.

The route generator 2445 calculates optimal routes between two or more points in response to user requests. In some embodiments, the route generator 2445 calculates the routes based on the map data, using optimization algorithms. The routes may be defined as a series of intersections, a series of road pathways, or in other manners. In addition, when a user requests a route, the route generator 2445 provides intersection data for use by the device in turn-by-turn navigation. In some embodiments, the intersection analyzer 2455 retrieves intersection data 2425, and modifies this data for navigation of the route, as described below.

As shown, at stage 2410, the device 2405 sends a request for a route to the mapping service 2400. In some embodiments, the user enters a starting address (or place) and an ending address (or place), potentially including additional midpoint locations (e.g., starting at A, going to B, then going to C from B). The device then transmits location information to the mapping service. In some embodiments, the device translates the locations into latitude and longitude data, while in other embodiments this conversion is performed by the mapping service.

At stage 2420, the route generator 2445 accesses the map data 2415 in order to generate one or more routes for the series of locations. In some embodiments, the route generator 2445 uses an optimization algorithm to find the best (and second best, third best, etc.) route that connects the series of locations.

At stage 2430, the intersection analyzer 2455 identifies maneuvers along the route for which navigation directions need to be generated and retrieves intersection information for these maneuvers. Some embodiments generate turn-by-turn navigation directions to provide to the device along with the route. To generate these directions, the mapping service 2400 identifies each time the route changes pathways, at which point the user following the directions will have to perform a maneuver (e.g., right turn, slight left turn, U-turn, merge, etc.). In some embodiments, each of these pathway changes corresponds to a pretabulated intersection stored in the intersection data 2425. The intersection analyzer 2455 retrieves this intersection data. In some embodiments, each intersection is stored as a series of branches coming out of the intersection at various angles (e.g., based off of North=0°). In some embodiments, in addition to the intersection data, the route generator creates routing directions, that generally describe the maneuver to be performed. Examples of such descriptions include "turn left", "highway off ramp", "U-turn", etc. In other embodiments, this description is derived by the client mapping application based on the received intersection data.

Next, at stage 2440, the intersection analyzer 2455 generates intersection information designed for the route. In some embodiments, this entails modifying the angles to set the direction of travel into the junction to 0° (i.e., setting the branch on which the route enters the junction to 180°). This effectively rotates the intersection description by the difference between due North and the route's incoming direction of travel. In addition, the intersection analyzer 2455 tags one of the branches as the exit branch. Some embodiments tag an entrance branch as well, while other embodiments rely on the device to identify the 180° branch as the entrance branch.

Stage 2450 illustrates that the mapping service 2400 then transmits (e.g., via the same network that the device used to transmit the route request) the route data (i.e., route data and intersection data for navigation) to the device 2405. As shown at stage 2460, the device 2405 then uses the intersection and route data generated by the mapping service to display navigation instructions for the user of the device. In some embodiments, the navigation instructions include a display of the intersection along with a stylized arrow showing the maneuver (in this case, a right turn) through the intersection.

While the mapping service 2400 is displayed as including a map generator module and a route generator module, one of ordinary skill in the art will recognize that the mapping service may include additional modules, or different breakdowns of modules. The mapping service may consist of a single computing device (e.g., a server) storing all of the functionality and data, or the functionality may be distributed between multiple servers (e.g., one process on a first server and a second process on a second server, numerous servers that perform the same operation in parallel for different users, or other configurations of computing devices that perform the functionality described herein).

Figure 25:
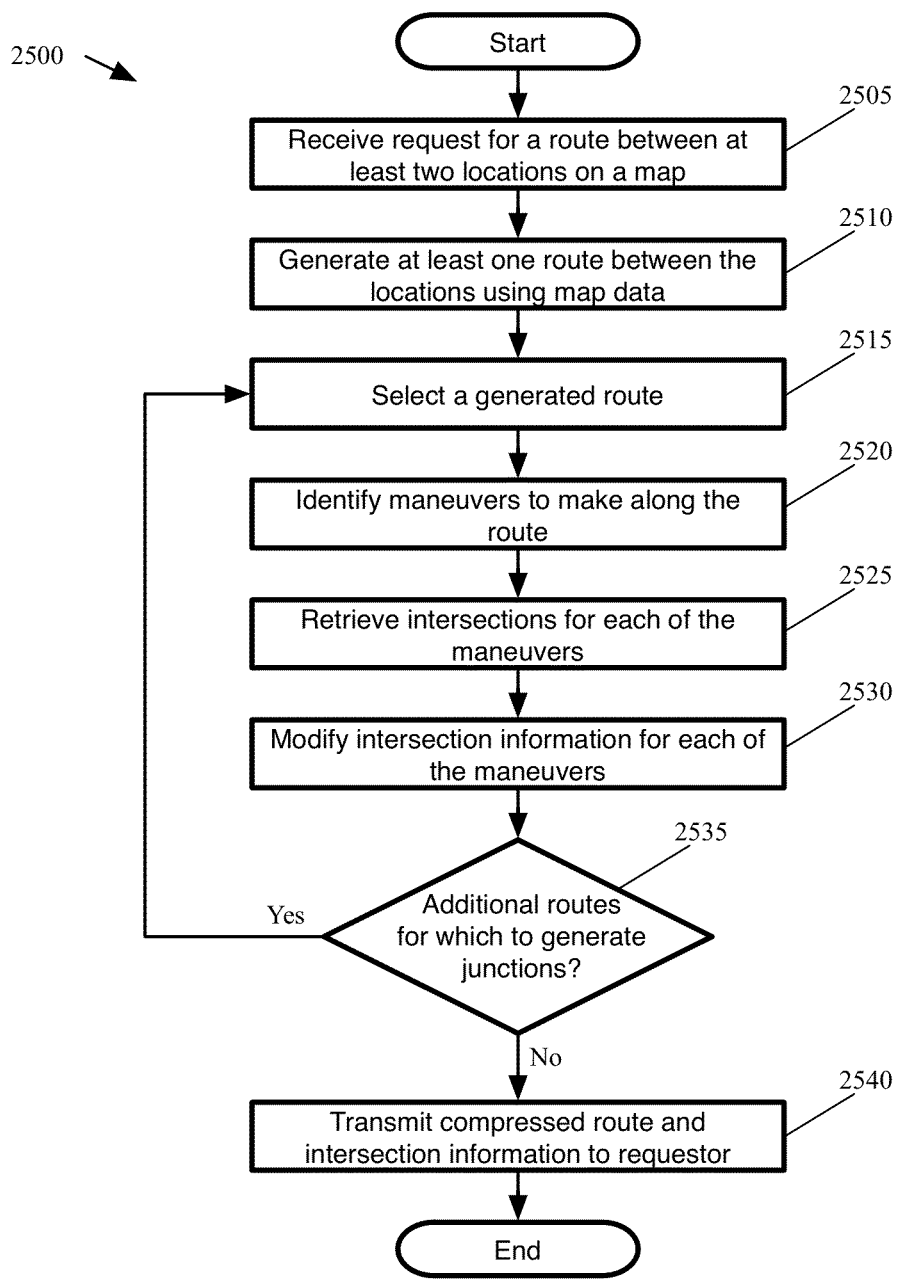
FIG. 25 conceptually illustrates a process performed by the mapping service of some embodiments in order to generate and transmit route and intersection data to a user.

FIG. 25 conceptually illustrates a process 2500 performed by the mapping service of some embodiments in order to generate and transmit route and intersection data to a user. As shown, the process 2500 begins by receiving (at 2505) a request for a route between two locations on a map. In some embodiments, when the user requests a series of more than two locations, each segment is treated as a separate route (i.e., from point A to point B is a first route, then point B to point C is a second route).

The process then generates (at 2510) at least one route between the locations using map data. In some embodiments, the process uses an optimization algorithm to identify the best (or two best, three best, etc.) routes between the two locations. These routes may be described as a series of vertices along pathways, a series of intersections between pathways, or with another description.

With the routes generated for the start and end locations, process 2500 selects (at 2515) one of the generated routes in order to create turn-by-turn instructions for the route. The process then identifies (at 2520) maneuvers to make along the route. In some embodiments, the mapping service identifies each time the route changes pathways, at which point the user following the directions will have to perform a maneuver (e.g., right turn, slight left turn, U-turn, merge, etc.).

Next, the process retrieves (at 2525) intersections for each of the maneuvers. In some embodiments, each of these pathway changes corresponds to a pretabulated intersection stored by the mapping service. The generation of these intersections is described in detail below. In some embodiments, each intersection is stored as a series of branches coming out of the intersection at various angles (e.g., based off of North=0°). In addition, the intersection data stores the type of intersection in some embodiments (e.g., point, roundabout, traffic square, etc.).

The process then modifies (at 2530) the intersection information for each of the maneuvers. In some embodiments, this entails modifying the angles to set the direction of travel into the junction to 0° (i.e., setting the branch on which the route enters the junction to 180°). This effectively rotates the intersection description by the difference between due North and the route's incoming direction of travel. In addition, some embodiments tag one of the branches as the exit branch. Some embodiments tag an entrance branch as well, while other embodiments rely on the device to identify the 180° branch as the entrance branch.

The process 2500 next determines (at 2535) whether additional routes remain for which to generate maneuver/intersection information. When additional routes remain, the process returns to 2515 to select the next route. Different variations of routes from a start location to an end location may overlap in part, in which case some embodiments reuse the already-generated set of intersections for the overlapping portions.

Once intersections are generated for all of the routes, the process transmits (at 2540) the route and intersection information to the requestor (e.g., a requesting device). As mentioned, the requesting device uses this information in some embodiments in order to generate turn-by-turn navigation, including stylized junction/maneuver arrows.

2. Precalculation of Intersection Data

As mentioned above, some embodiments precalculate intersection data from the stored map data (e.g., road segment and junction data). The mapping service then stores this intersection data for use in generating turn-by-turn navigation instructions. The following section describes several processes used to generate this intersection data, in which the mapping service receives vendor-provided junctions, identifies whether any sets of the received junctions should be consolidated into a single intersection, identifies pairs of road segments that should be joined together within an intersection, and generates angles for the intersection. Within this section, the term junction will be generally used to refer to vendor-provided information at which two path segments intersect, while the term intersection will refer to data generated from the junctions that represents where two or more roads meet in the real world. Thus, multiple junctions might be consolidated into one intersection, and junctions between two road segments that are actually just a continuation of a single road might not be considered intersections at all, in some embodiments.

The following represents pseudocode of some embodiments for generating intersection data for point intersections:

Identify all internal segments;
Identify all internal turn channels and mark them as internal segments;

For each internal segment:
  Gather all contiguous internal segments;
  Mark the gathered internal segments as processed;
  Build an intersection from this collection of internal segments;

In addition to other data (e.g., locations of parks, waterways, businesses, etc.), the map data stores information about pathways (i.e., roads, walkways, bike paths, etc.). Each pathway, in some embodiments, is received from a map provider as a series of segments (e.g., road segments). For a given segment, in some embodiments the stored data includes start and end junctions for the segment, geometry data that defines the course taken by the path between the start and end junctions, a path characterization (or "form of way"), a direction of travel (which may, in some embodiments, involve a one-way flag), one or more names for the path (e.g., "I-405 S", "San Diego Freeway", etc.), a class that indicates the level of importance of the path, and a netclass (a connected graph of paths to which the path belongs). In some embodiments, the geometry information comprises a series of latitude/longitude vertices through which the path travels. The form of way attribute, in some embodiments, includes the following characterizations: single carriageway, dual carriageway, motorway, slip road, connector, walkway, stairs. Some embodiments may include additional characterizations.

Figure 26:
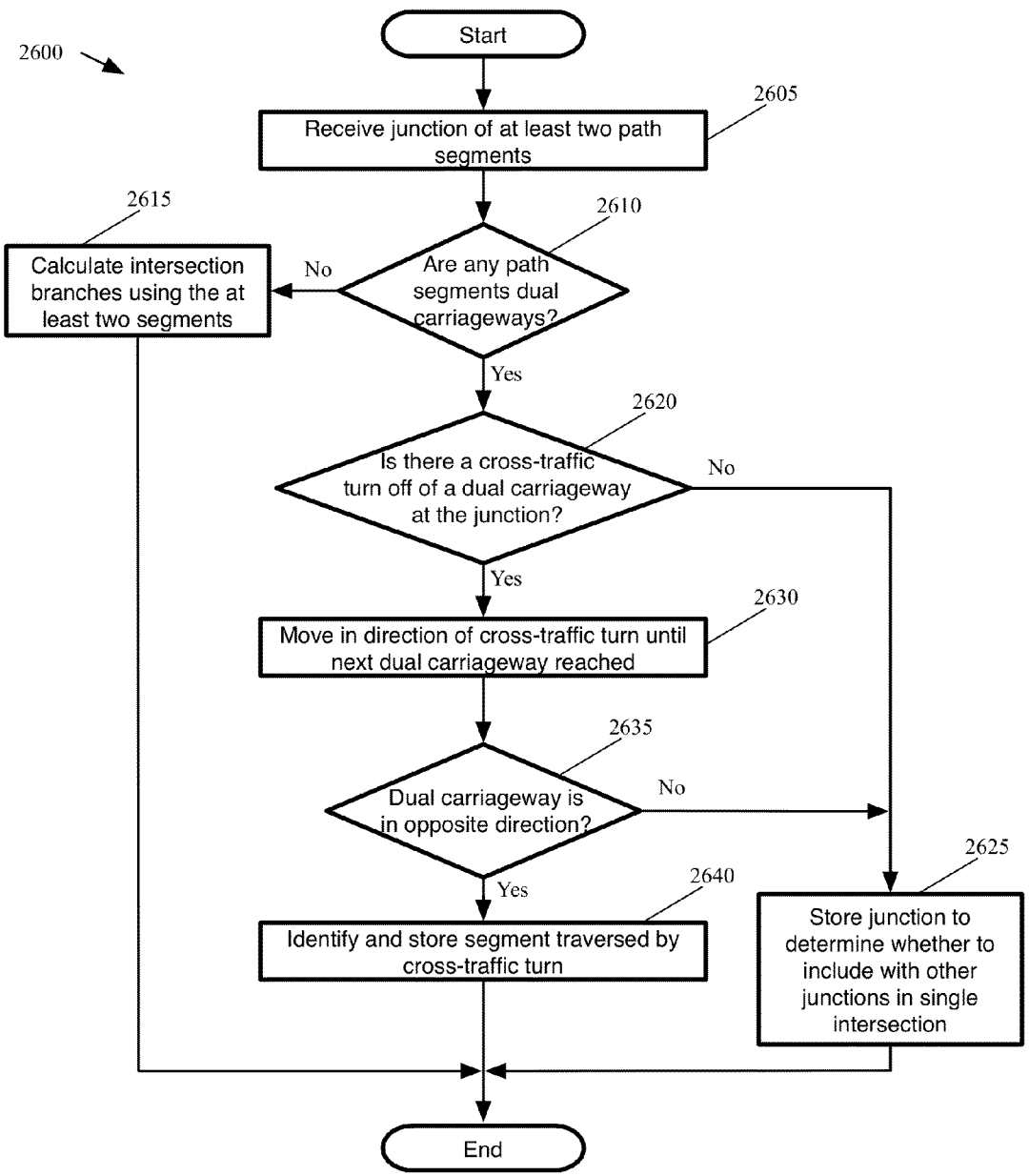
FIG. 26 conceptually illustrates a process of some embodiments for determining path segments between sets of junctions that should be treated together as single intersections.

FIG. 26 conceptually illustrates a process 2600 of some embodiments for determining path segments between sets of junctions that should be treated together as a single intersection. As shown, the process 2600 begins by receiving (at 2605) a junction between at least two path segments (e.g., road segments). In some embodiments, the mapping service receives (e.g., as precalculated data from a map vendor) a set of road segments and a set of junctions. Each road segment follows a path between two such junctions, and each junction references at least two road segments that enter and/or exit the junction. On the other hand, in some embodiments, the junctions are not received from the map data vendors and the mapping service traverses the path data to identify intersections between paths and analyzes these intersections in order to pretabulate the junctions.

The process then determines (at 2610) whether any of the path segments at the received junction are dual carriageways. As mentioned, a dual carriageway is a path characterization used in some forms of map data. Many roads that are divided (e.g., by a median, a double-yellow line, etc.) are received (and drawn) as two separate path segments, one for each direction. Each of the path segments is then marked with a direction of travel and as one-half of a dual carriageway. Because a user will typically think of an intersection of two roads that are both divided by medians as a single intersection (rather than four separate intersections), the junction generation process attempts to unify these four received junctions into a single intersection to present to a user for navigation purposes.

When none of the path segments are marked as dual carriageways, the process calculates (at 2615) the intersection branches using only the path segments specified in the received junction (i.e., the intersection will include only the one received junction). In some embodiments, the calculation of junction branches entails calculating the angle at which each of the segments specified for the junction leaves the junction location. The process then ends. FIG. 27 illustrates an example of such a junction 2700, also illustrating that there is no requirement that the path segments meet at right angles or that the paths continue in a straight line through the junction.

When at least one path segment specified for the received junction is a dual carriageway, the process determines (at 2620) whether there exists a cross-traffic turn off of a dual carriageway at the junction. A cross-traffic turn is a turn off of the dual carriageway in a direction that will cross through the matching half of the dual carriageway (i.e., the other direction of the road), assuming it exists. In the United States, a left turn is a cross-traffic turn. While the examples shown in this document involve right-handed driving (i.e., driving on the right side of the road), one of ordinary skill will recognize that the examples are equally applicable to left-handed driving areas (e.g., England) as well. FIG. 28 illustrates an intersection 2800 that includes two dual carriageway paths 2805 and 2806 and a one-way road 2810. At the junction 2815, there is no cross-traffic turn off of a dual carriageway, because the only options are a right turn off of the dual carriageway path 2805 or a left turn off of the one-way street 2810. When no such turn exists, the process 2600 stores (at 2625) the received junction while recognizing that it may still be part of a larger intersection, in order to determine whether to include the received junction with other received junctions (e.g., the junction 2820 between the one-way road 2810 and the dual carriageway path 2806) in a larger intersection. For instance, in the intersection 2800, the process will want to join the received junction 2820 with the received junction 2815 into a single larger intersection. The process then ends.

When a cross-traffic turn off of a dual carriageway exists at the junction (for instance, at junction 2820), the process moves (at 2630) in the direction of the cross-traffic turn until the next dual carriageway path is reached. In some embodiments, because the path segments start and stop at junctions, the next dual carriageway path will be reached at a different received junction (though not necessarily the next junction, if a road such as a left turn lane is received as a separate path segment). For instance, from intersection 2820, the process would traverse the path 2810 away from the junction 2820 until reaching the next dual carriageway, at junction 2815.

The process 2600 then determines (at 2635) whether the dual carriageway path reached at 2630 has a direction of travel in the opposite direction of the originating dual carriageway path. This, essentially, is a quick determinant of whether the second dual carriageway could be the matching path for the first dual carriageway (i.e., whether they are likely to be two sides of the same road). In most cases, this next dual carriageway will be the matching path, due to the nature of how roads are typically built.

In the case when the second dual carriageway is not in the opposite direction of the originating path, the process proceeds to 2625 to store the newly reached junction for later use in determining whether to include it with any other received junctions. For example, if the left turn off of path 2806 reached another dual carriageway with a downward direction of travel, then path 2806 could be assumed to not have a match in the data (as far as the junctions are concerned, at least), but the newly identified path might itself have a match.

On the other hand, if the two dual carriageways have opposite directions of travel, the process identifies and stores (at 2640) the segment traversed by the cross-traffic turn. In the example of FIG. 28, the segment from junction 2820 to junction 2815 would be stored. This segment will be used as part of additional junction consolidation processes in some embodiments. The process then ends.

Figure 29:
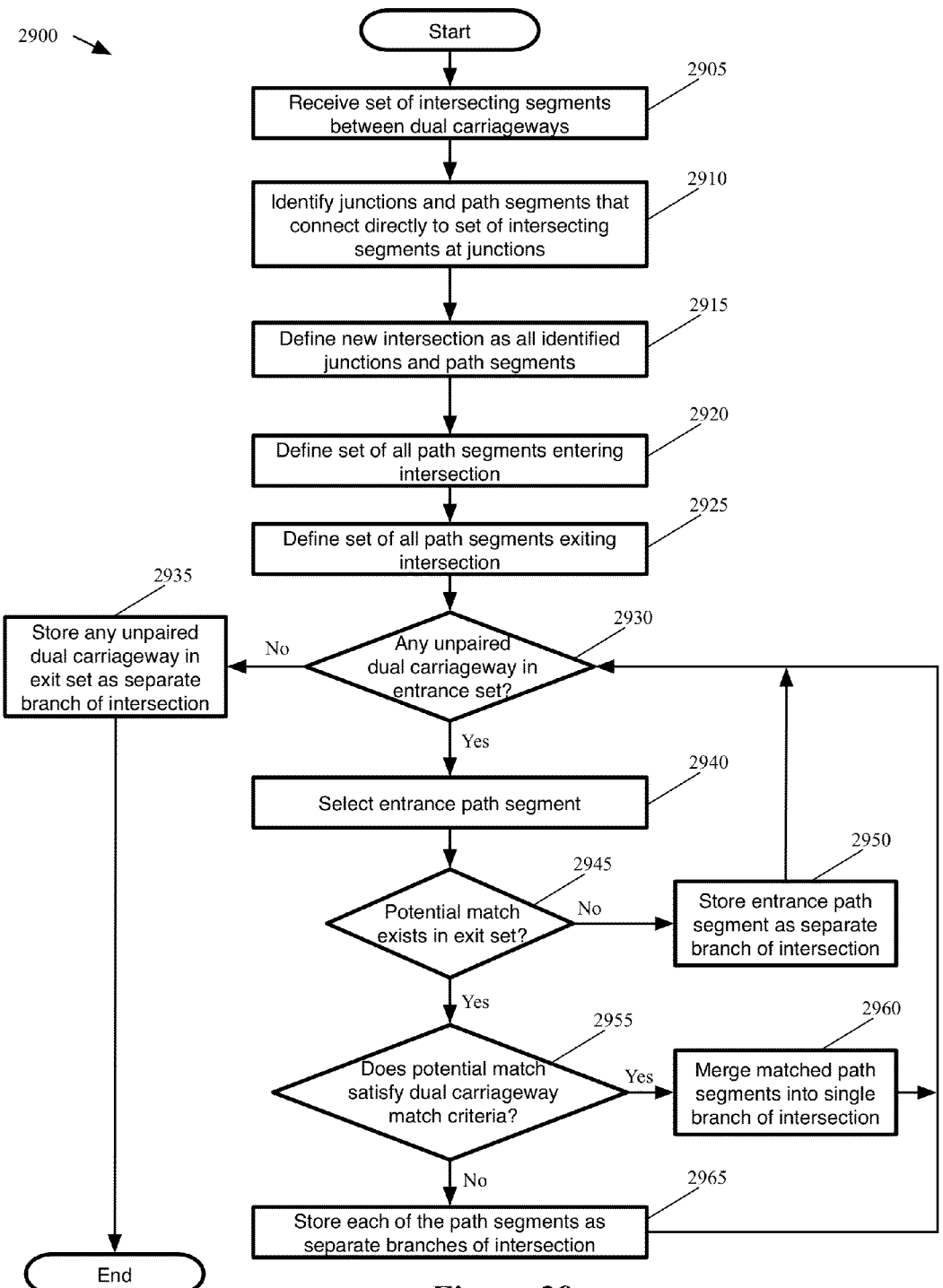
FIG. 29 conceptually illustrates a process for linking together several junctions into a single intersection and identifying the branches of the intersection in some embodiments.

The above process 2600, when applied to all the junctions within a map region, will generate a set of segments between dual carriageways. Some embodiments use these segments to link together received junctions and identify additional received junctions to include in a single intersection definition. The following represents pseudocode of some embodiments for identifying all such "internal" segments for a complex intersection:

For each segment that is a dual carriageway;
        For each connection with cross-traffic turn where a path can be assembled to other side of intersection;
            Mark all segments on the path to other side as internal segments;

This pseudocode includes a determination as to whether a path can be assembled to the other side of an intersection from a segment. The following includes pseudocode of some embodiments for such a determination:

Add first segment to path;
    Get connections from last segment on path;
    Iterate through each connection to either find a connection to other side or find connection that is best continuation;
        If connection is other side, note success and end;
        If no connection is other side and no connection is the best continuation, note failure and end;
        Otherwise:
            Add segment to end of path;
            If path is too far, note failure and end;
            If too many crossings, note failure and end;
            Otherwise return to get connections for added segment and iterate through connections;

FIG. 29 conceptually illustrates a process 2900 for linking together several junctions into a single intersection and identifying the branches of the intersection. The process 2900 begins by receiving (at 2905) a set of intersecting segments between dual carriageways. These segments may be identified using a process such as that shown in FIG. 26, in some embodiments. The mapping service then groups together sets of such segments that intersect each other (i.e., at received junctions). FIG. 30 illustrates a commonly existing intersection 3000, between a dual carriageway with paths 3005 and 3006 and a dual carriageway with paths 3010 and 3011. The set of intersecting segments are shown in this figure as thicker lines.

The process then identifies (at 2910) all junctions and path segments that connect directly to the set of intersecting segments at junctions. That is, the set of intersecting paths intersect at junctions, but these junctions may contain additional path segments. For instance, in the example intersection 3000, the eight dual carriageway path segments that leave the intersection all intersect with the internal (thicker) path segments at the four junctions. Thus, the four junctions and eight external path segments are all included in the intersection.

FIG. 31, on the other hand, illustrates an intersection 3100 in which left-turn channels are defined as separate path segments. In this case, because the left-turn channels intersect the internal segments at junctions received in the initial map data, these channels are identified by the process 2900. The left-turn channels may be characterized in the map data as slip roads or single carriageways, in most cases.

The following represents pseudocode of some embodiments for identifying all turn channels to treat as "internal" to an intersection:

For each segment that is a dual carriageway;
        For each connection with cross-traffic turn where a path can be assembled to internal segments;
            Mark all segments on the path to the internal segments as internal segments themselves;

This pseudocode includes a determination as to whether a path can be assembled to the internal segments from a segment (e.g., a turn channel). The following includes pseudocode of some embodiments for such a determination:

Add first segment to path;
    Get connections from last segment on path (i.e., segments connected to last segment at junction);
    Iterate through each connection to either find either an internal segment or find connection that is best continuation;
        If connection is an internal segment, note success and end;
        If no connection is internal segment and no connection is the best continuation, note failure and end;
        Otherwise:
            Add segment to end of path;
            If path is too far, note failure and end;
            If too many crossings, note failure and end;
            Otherwise return to get connections for added segment and iterate through connections;

Next, the process 2900 defines (at 2915) a new intersection as including all of the identified junctions and path segments, including those that directly intersect the initial set of path segments. In some embodiments, in the case illustrated in FIG. 31, the junctions where the left-turn channels leave their originating dual carriageway segments would be included as well as the left-turn channels that intersect the initial segments. In this situation, some embodiments identify the other junction (i.e., the start junction) for the slip road or single carriageway path segment, which will be where the path segment intersects with one of the dual carriageway path segments before entering the intersection. When the single carriageway path segment stays internal to a (presumed) pair of dual carriageway paths for a threshold distance (e.g., 1 km), some embodiments assume the path segment is a part of the road defined by the dual carriageway paths, and eliminate the junction from consideration.

When processing a slip road or other connector outside of the dual carriageways (e.g., the slip road 3205 shown in the intersection 3200 of FIG. 32), some embodiments do not treat the slip road as a path into the dual carriageway intersection. Instead, some embodiments identify the path characterization as a slip road and attempt to form a closed loop including the start and end junctions of the slip road. When this closed loop shares a common junction with the newly defined intersection (as will typically be the case), the slip road may be associated with the intersection but not treated as an internal path of this intersection. On the other hand, when the newly defined dual carriageway intersection has grown due to the presence of, e.g., left-turn channels, such that the slip road junctions are encompassed by the intersection now including the intersecting single carriageways (as for the slip road 3305 in the intersection 3300 of FIG. 33), some embodiments treat the slip road as internal to the newly defined intersection. In the description of the intersection, these left turn channels, slip roads, etc., will typically be eliminated, as a user generally will not want complex instructions, but will instead want an instruction of "make a right turn onto San Vicente Blvd" or something similar.

With the set of segments and junctions that form the intersection defined, the process needs to merge dual carriageways into single junction branches. The process 2900 next defines (at 2920) the set of all paths entering the intersection, and defines (at 2925) the set of all paths exiting the intersection. For a dual carriageway, which is a one-way path (half of a two-way road), the path will typically have an exit side and an entrance side. For purposes of merging, some embodiments treat each segment (the segment exiting the intersection and the segment entering the intersection) as separate paths. Single carriageways that are not internal to dual carriageways (e.g., the additional two-way path 3405 in the intersection

Figure 34:
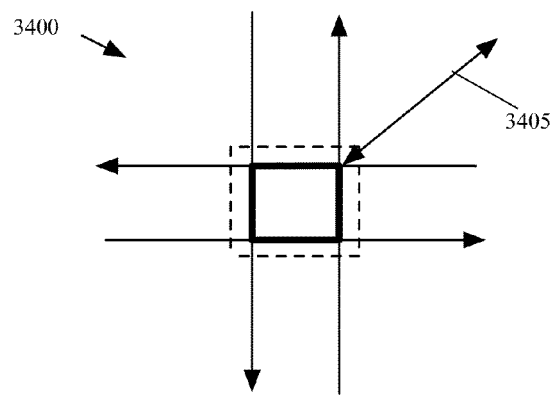
FIG. 34 illustrates additional two-way path in an intersection in some embodiments.

3400 of FIG. 34) will typically be treated as separate branches and are not part of the merging analysis in some embodiments.

Next, the process determines (at 2930) whether the set of entrance paths includes any unpaired dual carriageway paths. When no such paths remain in the set (or none existed in the first place), the process stores (at 2935) any unpaired dual carriageway left in the set of exit paths as separate branches of the junction. In general, this will happen in the case of mislabeled map data (the road is actually a one-way street) or merging criteria that are too strict (leaving a pair of entrance and exit paths unmerged).

When an unpaired entrance path exists, the process selects (at 2940) one of the entrance paths. The process then determines (at 2945) whether a potential match exists in the exit set. A potential match, in some embodiments, is a dual carriageway found by traversing the previously identified segment to the left (to the right, in the case of left-handed driving regions), or traversing the intersection in a clockwise fashion.

When no potential match exists (e.g., the next identified dual carriageway in the traversal is also an entrance path, or the exit set is empty), the process stores (at 2950) the entrance path as a separate branch of the intersection and then returns to 2930 to find the next unpaired entrance path. On the other hand, when a potential match exists, some embodiments determine (at 2955) whether the potential pair satisfies a set of dual carriageway match criteria. These are criteria, in some embodiments, to determine whether a pair of dual carriageways are actually the two sides of the same road. Some embodiments determine whether the two paths (1) are within a threshold distance (e.g., 25 m, 50 m, etc.) where the paths enter/exit the intersection, and (2) whether the angles at which the paths hit their junctions within the intersection is within a threshold range of each other (e.g., 5°, 10°, etc.). To calculate the angle, some embodiments use the vertex closest to the edge of the intersection (or the location of the junction at which the path segment intersects the other segments within the intersection) and a vertex located a particular predefined distance (e.g., 50 m) away. The process then calculates the angle off of North for the line between the two vertices.

In some embodiments, the mapping service additionally looks at the names of the paths to determine whether these match. When the names match, such embodiments may relax the geometry criteria for a matching pair (i.e., allow a greater distance between the paths or a greater difference in angles between the paths). Matching names might be, e.g., "CA-1 South" and "CA-1 North", or if both paths include "Wilshire Blvd." as one of their names. Some embodiments may also look at the road class data for confidence in matching dual carriageways.

Figure 35:
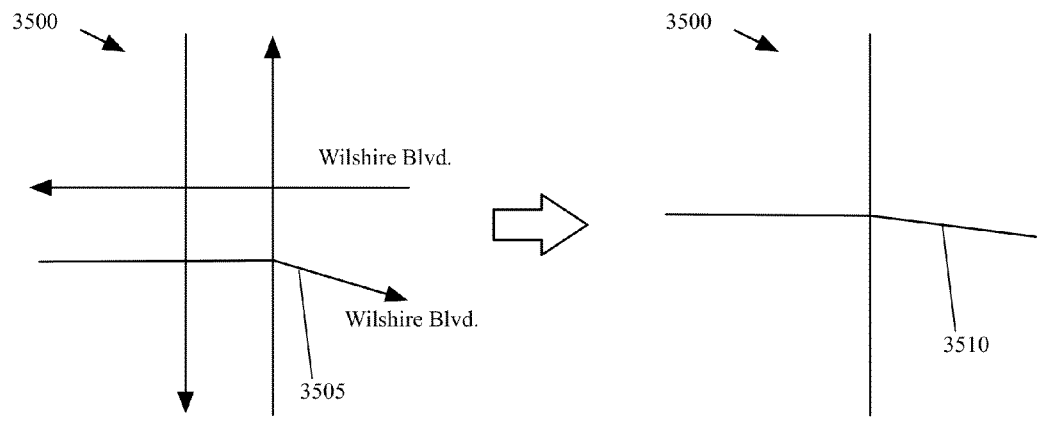
FIG. 35 illustrates the reduction of an eight-path intersection into four branches in some embodiments, in which the angle of the right branch is at half the offset from horizontal as the right exit path, because the right entrance path is on the horizontal.

If the two paths match, the process merges (at 2960) the paths into a single branch of the newly defined intersection. As indicated above, intersections are stored as a set of branches at different angles. For a merged path, some embodiments store the angle as the average of the angles of the two paths that make up the branch. FIG. 35 illustrates the reduction of an eight-path intersection 3500 into four branches, in which the angle of the right branch 3510 is at half the offset from horizontal as the right exit path 3505, because the right entrance path is on the horizontal. As shown conceptually, directions (entrance/exit) are not stored for intersection branches in some embodiments. The mapping service generates the routes using map data, which includes the intersections as well as directions of travel for the roads, so a route will not travel the wrong way on a branch of the intersection.

Figure 36:
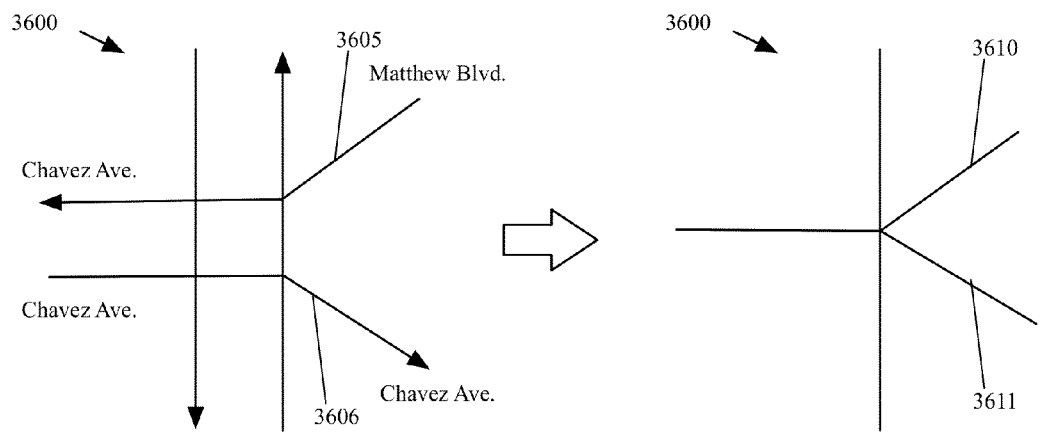
FIG. 36 illustrates the reduction of a different eight-path intersection into five branches in some embodiments.

On the other hand, when the paths do not match, the process stores (at 2965) each of the paths as separate branches of the intersection. FIG. 36 illustrates the reduction of a different eight-path intersection 3600 into five branches. In this case, the dual carriageway paths 3605 and 3606 on the right side do not merge and are therefore treated as separate branches 3610 and 3611 of the reduced intersection. In this example, the angle at which each of these branches leaves the intersection is the angle that is stored for the branch (with no averaging). The process 2900 then returns to 2930 to determine whether any entrance paths remain. As stated, once the entrance path set is empty, the process proceeds to 2935, and subsequently ends.

Figure 37:
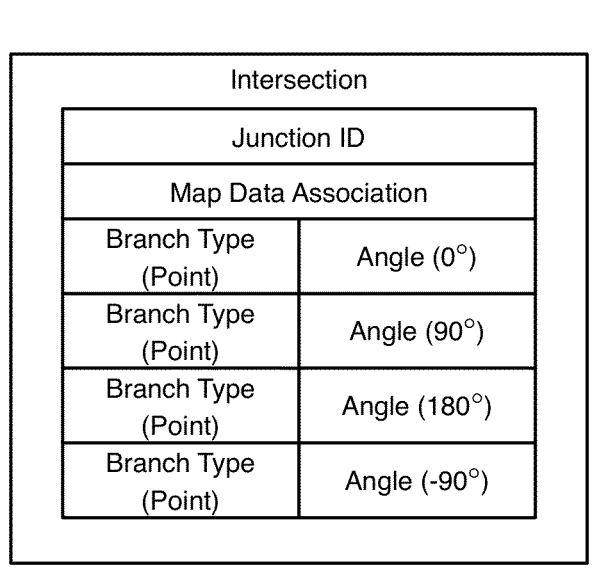
FIG. 37 conceptually illustrates an example of a data structure of some embodiments for a point type intersection.

The following represents pseudocode of some embodiments for generating the data for an intersection once the internal segments have been identified for the intersection (e.g., operations performed by some or all of process 2900):

Gather all external segments that touch internal segments for an intersection;
    Identify external segments that are surrounded by internal segments in the intersection and mark them as internal;
    Group together pairs of incoming and outgoing segments that represent same road;
    Compute an outgoing angle for each pair and for each unpaired road;
    Construct a template Intersection Pattern with one branch for each angle;
    If pattern exists for previously generated intersection, use existing pattern to save space (refer intersection to existing pattern);
    Else if pattern does not exist, create and store new entry for pattern;

As indicated, some embodiments store each intersection as a data structure. This data structure indicates the branches of the intersection and the angles at which the branches enter and/or exit the junction. FIG. 37 conceptually illustrates an example of such a data structure 3700 of some embodiments for a point type intersection. As shown, the intersection includes an intersection ID (which, in some embodiments is a unique identifier), a map data association, and a set of branches with angles and types. The map data association, in some embodiments, associates the intersection data structure with an actual location within the map. In some embodiments, this is simply a latitude/longitude point, but may also consist of other data in other embodiments (e.g., a list of the path segments or aggregate paths that meet at the intersection). Each branch includes a type and an angle. The type, in some embodiments, is an intersection type. Some embodiments define two intersection types: point and roundabout. However, other embodiments may include additional intersection types, such as traffic squares. Some embodiments store the intersection type as a property of the intersection rather than separately for each branch, but other embodiments recognize the possibility of an intersection partially being a roundabout but partially being a point intersection. The data structure 3700 includes four branches, at the cardinal directions of 0° (North), 90° (East), 180° (South), and −90° (West). In some embodiments, the intersection data structure also includes references to any junctions (i.e., data received from the map data provider) and path segments that are contained within the defined intersection. For a typical intersection of two dual carriageways, four junctions are referred to by such a data structure.

Figure 38:
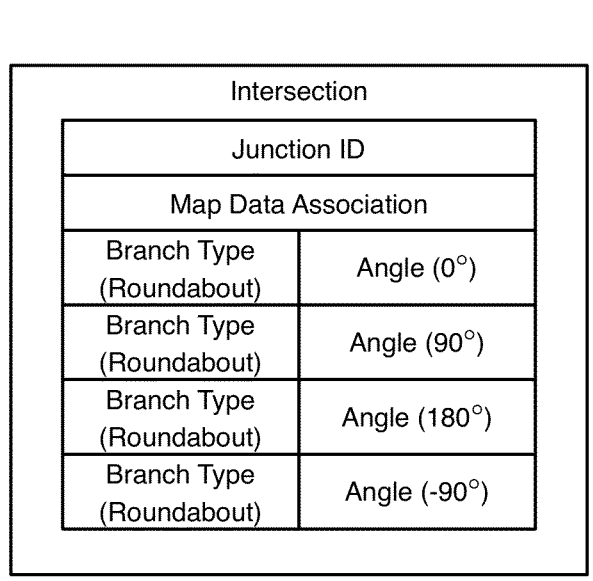
FIG. 38 illustrates a data structure of some embodiments for a roundabout intersection.

FIG. 38 illustrates a data structure 3800 of some embodiments for a roundabout intersection. Some embodiments provide specialized processing for roundabout intersection. The following represents pseudocode of some embodiments for generating intersection data for roundabout intersections:

Identify all roundabout segments;
    For each roundabout segment:
        Gather all contiguous roundabout segments;
        Mark the gathered roundabout segments as processed;
        Build a roundabout intersection from this collection of roundabout segments;

In some cases, the map data identifies a roundabout (e.g., as a form of way or through another indicator). This allows the mapping service intersection calculator to begin its specialized automated roundabout processing. Specifically, when performing roundabout processing, the mapping service attempts to identify pairs of flare connectors (i.e., the portions of a road that flare into and out of a roundabout). In some embodiments, the intersection calculator traverses the roundabout (e.g., in a counterclockwise fashion for right-handed driving) looking for an exit path that is followed, within a particular distance (e.g., angular distance), by an entrance path. The process then determines whether to combine these paths, looking at factors similar to those for merging dual carriageways at point intersections. For instance, the factors used might include whether the names are similar, whether the distance between the exit/entrance paths is small enough, and potentially other factors. As a result of this processing, when a random road intersects the roundabout in between what otherwise appears to be an entrance/exit combination, some embodiments treat this as three separate branches.

Figure 39:
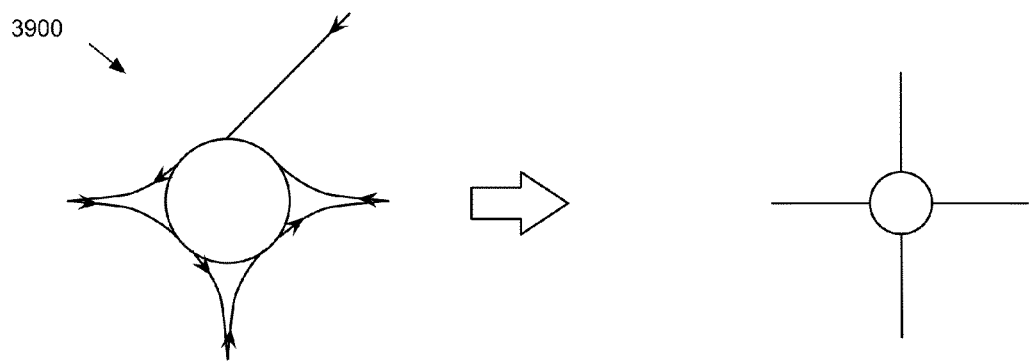
FIG. 39 conceptually illustrates the reduction of a roundabout intersection to intersection data in some embodiments.

In order to calculate the angles of the branches, some embodiments determine where the branch intersects the roundabout, rather than the angle of approach of the road. For entrance/exit combinations, the process takes the average of the two paths. FIG. 39 conceptually illustrates the reduction of a roundabout intersection 3900 to intersection data. The top path, despite approaching at approximately a 30° angle off of North, is designated as a 0° branch—the user is primarily interested in the distance around the traffic circle for the intersections, rather than the angle at which they enter and exit. The other three branches are also designated cardinal directions, because their flares average out to these directions. The data structure 3800 shows the data structure for the roundabout junction 3900. Other embodiments, however, use the angle at which the paths enter or exit the roundabout, rather than the distance around the roundabout at which the paths intersect it.

The following represents pseudocode of some embodiments for generating the data for a roundabout intersection once the roundabout segments have been identified for the intersection:

For set of roundabout segments that form a simple loop:
        Gather all non-roundabout segments that touch the loop, ordered by the direction of travel around the loop;
        Group together pairs of consecutive roundabout exit/entry segments that represent same road;
        Assign an angle to each pair and each unpaired segment;
        Subtract the smallest angle from all angles (so smallest angle=0);
        Construct a template intersection pattern with one branch for each angle;
        If pattern exists for previously generated intersection, use existing pattern to save space (refer intersection to existing pattern);
        Else if pattern does not exist, create and store new entry for pattern;

As indicated in the above examples of pseudocode, some embodiments perform additional compression when storing the intersections. The real world contains millions (or hundreds of millions) of individual intersections, but many of these intersections have the same configuration (especially when very small angular variations are tolerated). Thus, rather than storing separate data for each of the hundreds of millions of intersections, some embodiments utilize compression in storing the intersections. As each intersection is processed, some embodiments store a template pattern for that intersection. When additional intersections with the template pattern are identified, such embodiments store a reference to that pattern (while still creating a separate data structure, as the location information is different for two intersections that follow the same pattern).

3. Modification of Junction Data for Navigation

The above section described the generation of complex intersection data, typically done as an offline process prior to route generation. However, at the time of route generation, some embodiments modify the intersection data for transmission to the user. The mapping service providing the route data modifies the angles to make them relative to the direction of entry and marks one of the branches as an exit branch.

Figure 40:
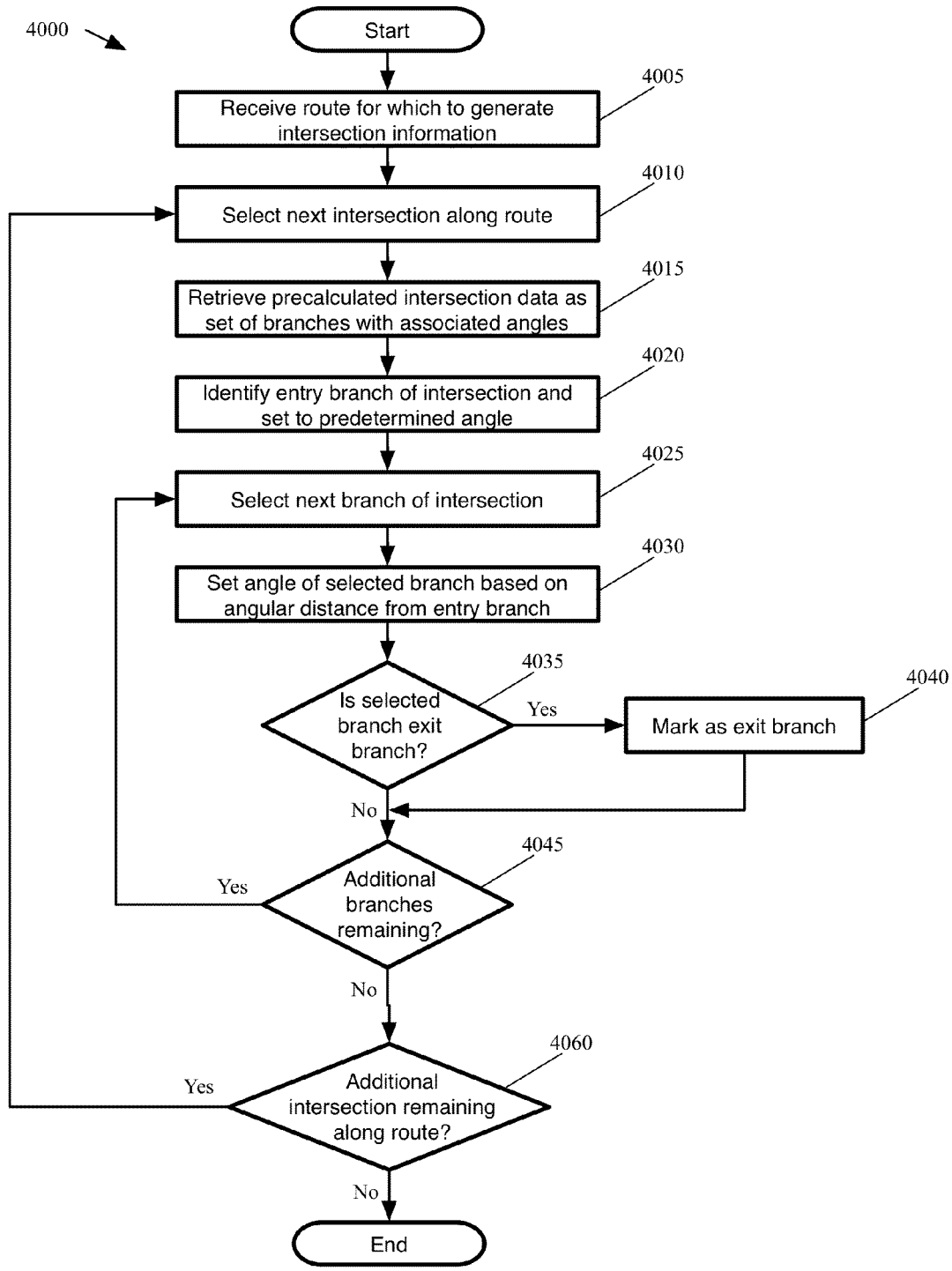
FIG. 40 conceptually illustrates a process of some embodiments for modifying intersection data in order to provide navigation information for a route.

FIG. 40 conceptually illustrates a process 4000 of some embodiments for modifying intersection data in order to provide navigation information for a route. As shown, the process begins by receiving (at 4005) a route for which to generate intersection information. As mentioned above, some embodiments generate one or more routes for each set of starting and ending locations requested by a user device. Each of these routes consists of a series of maneuvers at various path intersections (i.e., at road intersections).

As shown, with the route identified, the process 4000 selects (at 4010) the next intersection along the route. Some embodiments begin with the first intersection (i.e., the first maneuver a user following the route will make), starting from the start point of the route. Many routes involve long stretches along a particular road, going straight through numerous intersections (possibly including junctions of two road segments that are part of the same road and at which no other roads intersect). In some embodiments, the navigation instructions do not include information about the intersections at which no turning maneuver is made. Accordingly, the next intersection is actually the next intersection along the route at which a maneuver will be made.

The process then retrieves (at 4015) precalculated intersection data as a set of branches with associated angles. As described above, some embodiments store a data structure for each intersection, which lists the branches of the intersection along with angles for each branch. FIGS. 37 and 38 illustrate examples of such data structures, for both a point intersection and a roundabout intersection.

After retrieving the data structure for the selected intersection, the mapping service rotates the intersection definition to normalize the definition to the direction at which the route enters the intersection. Accordingly, the process 4000 identifies (at 4020) the entry branch of the intersection and sets the entry branch to a predetermined angle. Some embodiments set the direction of movement into the intersection as 0°, and therefore set the entry branch of the intersection to 180°.

The process then rotates the other branches of the intersection. As shown, the process selects (at 4025) a next branch of the intersection. In some embodiments, the branches and angles are stored in an array, list, or similar data structure, and the process traverses this data structure. The process sets (at 4030) the angle of the selected branch based on an angular distance from the entry branch. For example, if the entry branch was stored as 0° (i.e., pointing North), then a branch stored as 95° will be shifted 180° to −85°. In addition, the process determines (at 4035) whether the selected branch is the exit branch of the junction (i.e., the branch at which the route exits the intersection). In order for the turn-by-turn navigation instructions at the client mapping/navigation application to properly display the maneuvers, the device needs to know along which branch of the intersection the route exits. Thus, when the selected branch is the exit branch, the process 4000 marks (at 4040) the selected branch as such. The process then determines (at 4045) whether any additional branches of the intersection remain to be converted for the route. When additional branches remain, the process returns to 4025 to select the next branch of the junction. When all branches have been processed for the current intersection, the process 4000 determines (at 4060) whether additional intersections remain along the route that need to be modified. When additional intersections remain, the process returns to 4010 to select the next intersection. When the last intersection is modified, the process ends.

Figure 41:
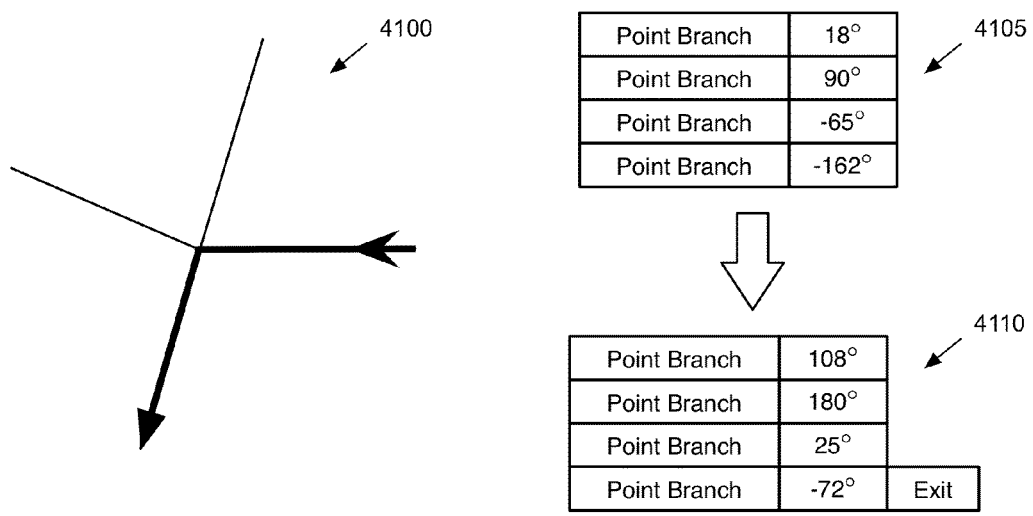
FIG. 41 illustrates a conceptual drawing of a route taken through an intersection a data structure for the intersection, and the modification of the data structure to create a new data structure for turn-by-turn navigation instructions.

FIG. 41 illustrates a conceptual drawing of a route taken through an intersection 4100, a data structure 4105 for the intersection, and the modification of the data structure to create a new data structure 4110 for turn-by-turn navigation instructions. As shown, the route enters from the right side (the 90° branch) and exits the intersection at the bottom (the −162° branch). In the modified data structure, the entry branch has been rotated to 180°, causing a 90° rotation of the other branches. The branch at 18° rotates to 108°, the branch at −65° rotates to 25°, and the branch at −162° rotates to −72°. In addition to the rotation angles, the data structure 4110 has the last branch marked as the exit for the navigation. Some embodiments include a binary exit field, with the exit branch marked with a '1' and all other branches marked with a '0'.

B. Client Side Dynamic Generation of Adaptive Displayed Graphical Indicators

The above section describes the generation of the juncture (i.e., intersection) data for use in turn-by-turn navigation. However, once the user device receives this juncture data, the mapping client application operating on the device must dynamically generate graphical maneuver indicators based on the juncture data in order to provide intuitive turn-by-turn navigation for a route.

1. Example of Different Indicators in Different Contexts

In a navigation system, when presenting a user with graphical representations of upcoming maneuvers, there are two competing goals to satisfy, namely the completeness of the representation and the clarity and legibility of the representation. The mapping application of some embodiments uses a novel adaptive mechanism to balance these goals differently according to context.

For a currently displayed instruction, in the context of full-screen turn-by-turn navigation, the mapping application of some embodiments abstracts a maneuver down to two elements: a prominent stylized arrow roughly representing the path of the vehicle through the juncture, and a de-emphasized set of lines and curves corresponding to other elements of the juncture. For instance, a right turn at a T-junction is represented by a large arrow with a right-angle joined with a smaller, dimmer segment that runs parallel to one of the large arrow's segments. The smaller segment will also be pushed off to the side so that the path taken by the vehicle through the juncture dominates the display. Such a representation of a maneuver which includes an arrow with junction context provides fairly complete information about the maneuver while remaining abstract and easily understandable.

An alternate representation of a maneuver may omit the juncture context entirely and simplify the primary arrow indicating the maneuver. When a user looks at maneuvers beyond the current maneuver (the next maneuver to make), the more detailed graphical representation may provide more information than is required and be harder to read with a quick glance. For example, even if there is space to display the junction context for a secondary instruction that follows the current maneuver, some embodiments display only the simplified arrow for clarity. This adaptive approach also benefits space-constrained UI elements. While multitasking or looking at lists of instructions, for example, the mapping application of some embodiments draws the simpler maneuver abstraction in order to produce something more easily discernible in a smaller area.

Figure 42:
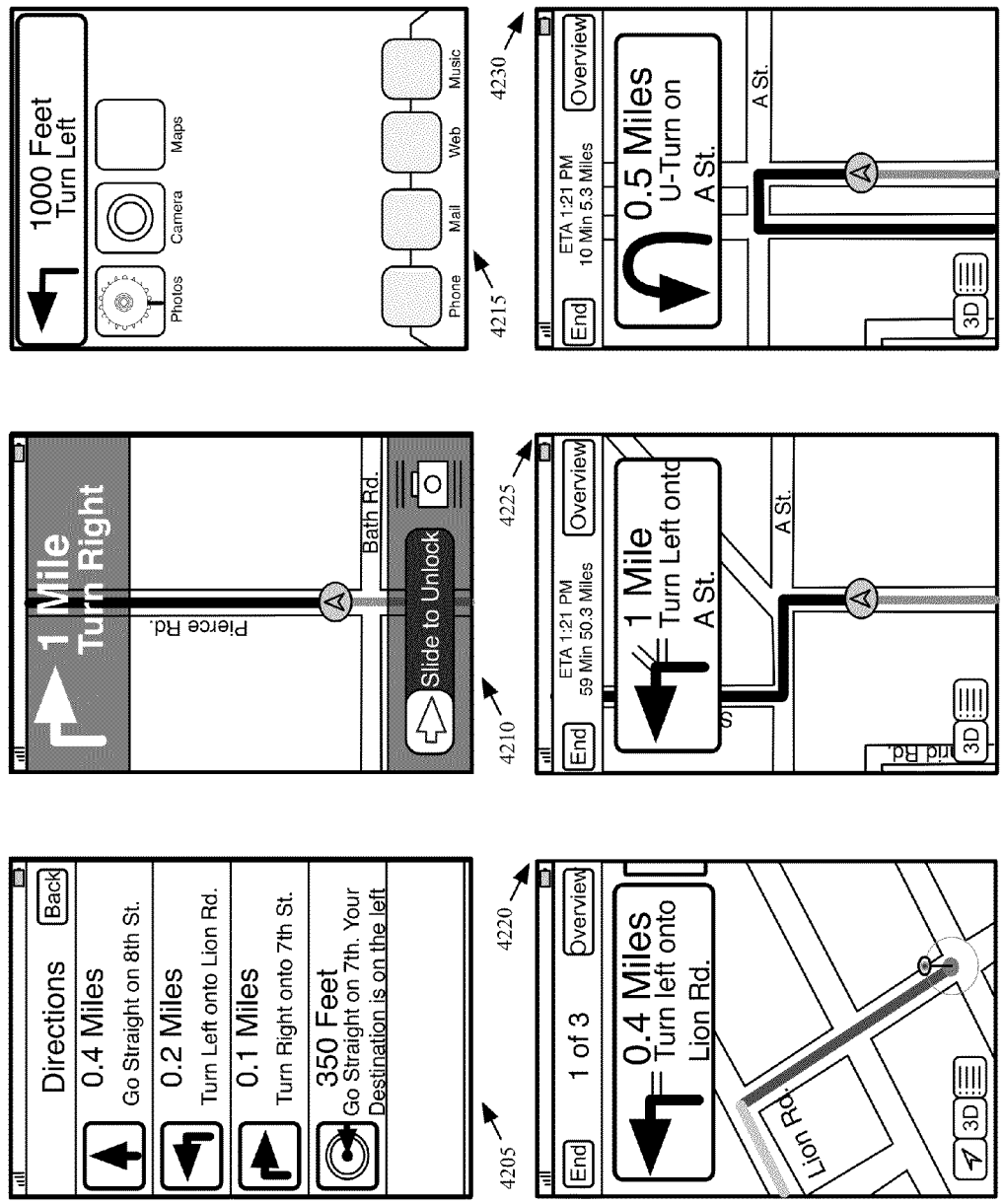
FIG. 42 illustrates several different scenarios in which the mapping application displays different types of graphical indicator arrows to visually represent maneuvers to a user in some embodiments.

FIG. 42 illustrates several different scenarios in which the mapping application displays different types of graphical indicator arrows to visually represent maneuvers to a user. The first scenario 4205 illustrates route directions shown in a list view. The list view displays a series of turn-by-turn instructions to get from a start location to an end location. In some embodiments, the user can view the turn-by-turn instructions without actually entering a navigation mode, or even following the route. In this situation, some embodiments display a simple version of the graphical indicators for each turn. This is done for space-saving reasons, as well as the fact that when the user is not actually approaching a maneuver, the intersection context is not especially helpful.

The second scenario 4210 illustrates turn-by-turn navigation when the user device on which the mapping application operates is locked. As described in detail below, the application is able to display turn-by-turn navigation instructions even when the device is locked, in order to continue providing instructions to the user. In this scenario, as shown, a simplified arrow is also displayed in some embodiments. This provides a simple graphical indication of the turn within the lock screen (in this case, a right turn), without providing the context data that might be difficult for a user to pick out in the lock screen.

The third scenario 4215 also illustrates turn-by-turn navigation when the mapping application is not open (or not presently displayed) on the device on which the application operates. As described in detail above, the application displays turn-by-turn navigation instructions within the notification banner space when the mapping application is not displayed. Much like in the lock-screen mode, the mapping application uses a simple graphical indicator for the indicated maneuver (in this case a left turn). Due to space constraints and the reasons described above for the lock-screen mode, the simple graphical indicator is used.

The previous three scenarios illustrate situations in which the simple graphical indicators are used. One of ordinary skill in the art will recognize that in some embodiments, the more complex stylized juncture plus maneuver graphical indicators might be used in the above situations. The following three scenarios illustrate indications in which these more complex indicators are used.

The fourth scenario 4220 illustrates route overview directions, in which the user can view an entire route from a starting location to ending location. The user can swipe through the different instructions (e.g., using swipe gestures) to view the route segments between maneuvers. Here, the complex juncture indication is used, showing the intersection context (a T intersection) and the maneuver made through the intersection, with the maneuver arrow emphasized over the intersection context.

The fifth scenario 4225 illustrates navigation instructions in the context of the standard turn-by-turn navigation (i.e., not in the lock-screen mode, or with a different application open, etc.). In this case, the more complex arrow graphical indicator is used. In the illustrated example, the road juncture is slightly more complicated than the previous example, with a fourth branch angling up and to the right from the direction of approach. The sixth scenario 4230 also illustrates navigation instructions during turn-by-turn navigation. In this case, the maneuver being performed is a U-turn. Representing a U-turn with the juncture branches as in scenario 4225 would result in the arrow pointing up and down the same branch (the bottom branch). As a result, the application instead displays a stored U-turn indicator arrow.

Figure 43:
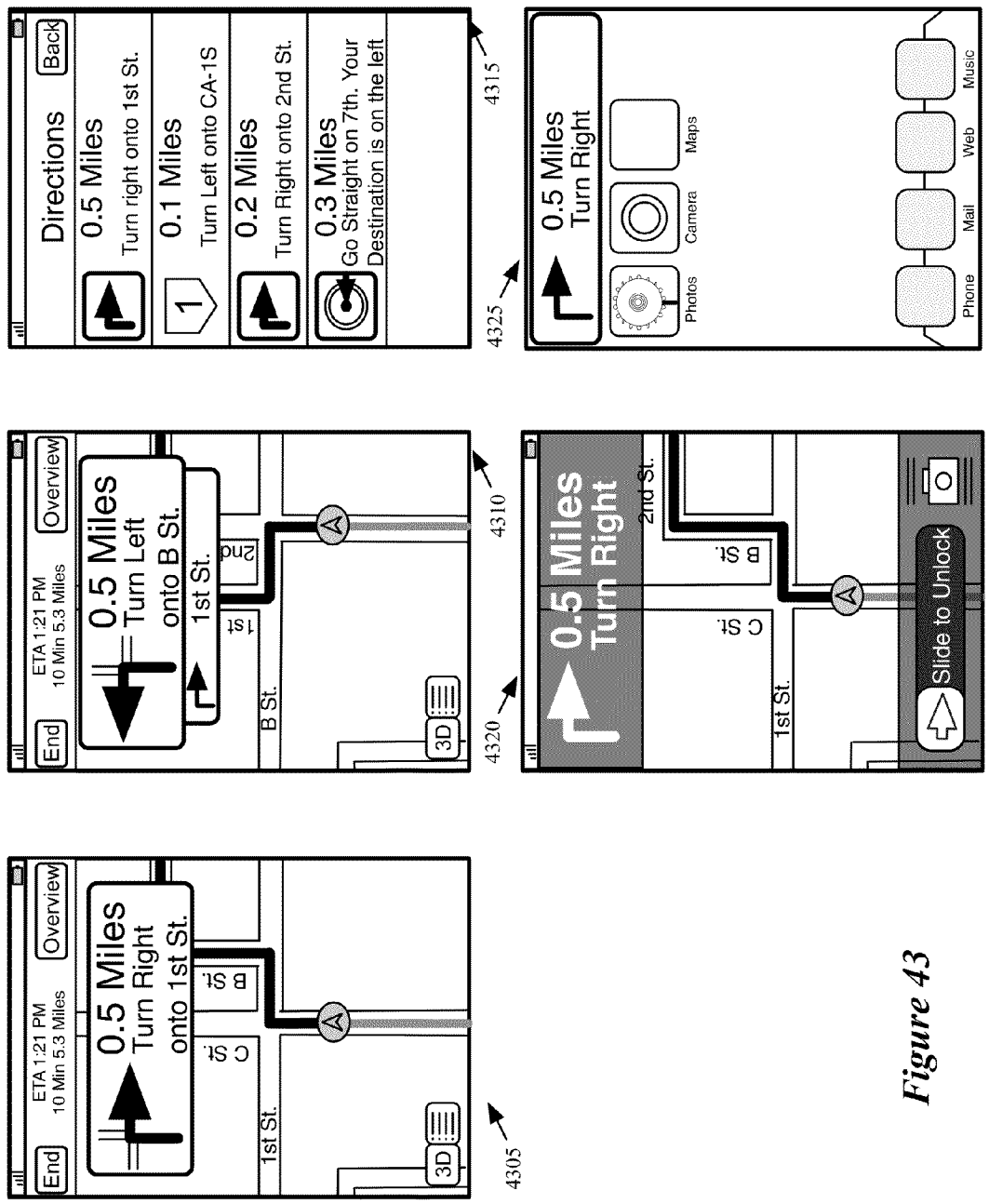
FIG. 43 illustrates several scenarios for the same turn, and how the different arrows might be used for the same turn in some embodiments.

FIG. 43 illustrates several scenarios for the same turn, and how the different arrows might be used for the same turn. The first scenario 4305 shows a right turn onto $1^{st}$ St. in the turn-by-turn navigation instructions. As in FIG. 42, the complex graphical indicator is used. The second scenario 4310 illustrates the situation during turn-by-turn navigation in which the right turn onto $1^{st}$ St. is the second of two maneuvers in quick succession. In this case, the second instruction comes shortly after the first, so the application provides an indication of the upcoming two maneuvers. The second maneuver is allotted less space on the display, and therefore the simplified arrow is used. The third scenario 4315 illustrates the use of the simplified arrow indicator in the route directions list. In addition, as shown for the second maneuver in the route directions list, some embodiments replace the simplified directional indicator with a highway sign (shield) when the maneuver ends on a road for which such a shield/sign is available. The fourth and fifth scenarios 4320 and 4325 illustrate the simplified arrow indicators for the right turn in the lock-screen mode and when the mapping application is not displayed on the device.

2. Download of Juncture Data and Generation of Graphical Indicators

In some embodiments, the mapping application performs navigation based on a route selected by a user of the mapping application. For example, a user might request the mapping application to search for a route from a first location to a second location (e.g., from the user's house to a particular restaurant). In some embodiments, the application sends the request to a centralized mapping service (e.g., a set of servers running back-end map and route generation processes) and receives a set of one or more possible routes from the first location to the second location. The user then selects one of the routes to follow.

Figure 44:
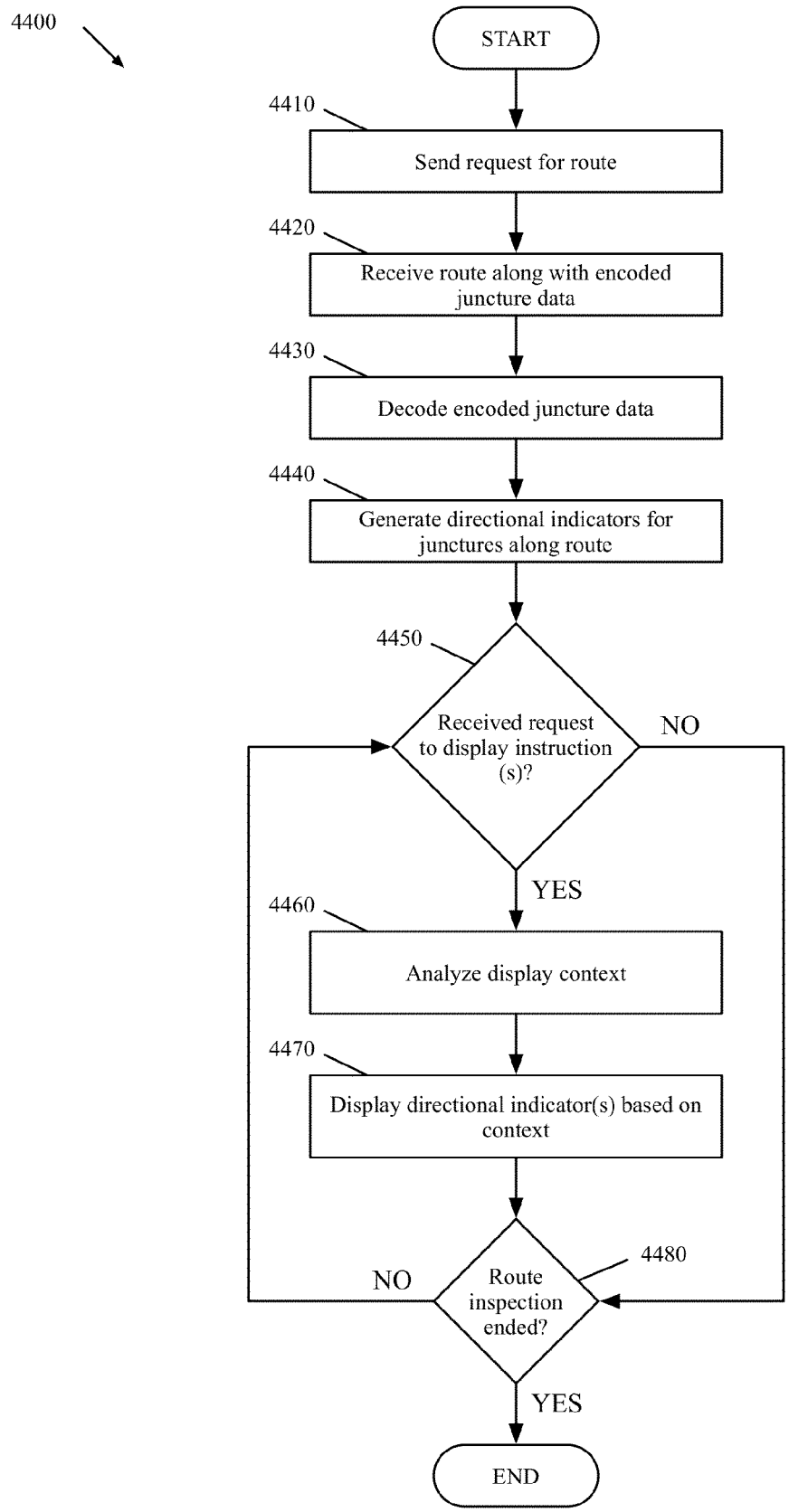
FIG. 44 conceptually illustrates a process of some embodiments for displaying graphical indicators during route inspection.

FIG. 44 conceptually illustrates a process 4400 of some embodiments for displaying graphical indicators during route inspection. In some embodiments, a user can view a list of directions for a route (e.g., by selecting a list view GUI button) or can step through the directions one at a time (e.g., via swipe gestures) while also viewing the route on the map. In some embodiments, the process 4400 is performed by a mapping application that operates on a device (e.g., a mobile device such as a smart phone or touchpad).

As shown, the process 4400 of some embodiments begins by sending (at 4410) a request for a route to a mapping service server. In some embodiments, the request comprises a starting location and an ending location, potentially with one or more intermediate locations. The user enters these locations into the mapping application GUI of some embodiments, and the application transmits a route request through a device interface to the mapping service server. The operations of the server to generate a route and navigation (juncture) instructions are described above in subsection A of this Section.

The process 4400 then receives (at 4420) the route along with encoded juncture data. In some embodiments, the mapping service transmits the juncture data in an encoded format. This encoding may simply involve identifying similar junctures and referencing these rather than repeating the same juncture information twice, or may involve additional encoding. Other embodiments do not provide any encoding. Assuming the data is encoded, the process decodes (at 4430) the encoded juncture data to arrive at juncture information for each maneuver along a route. This juncture data, in some embodiments, consists of geometry information that identifies the branches of the juncture and the angles at which those branches enter/exit the juncture. Some embodiments also include maneuver information along with the juncture information, that describes the maneuver being made (e.g., as a right turn, U-turn, freeway off ramp, etc.).

Next, the process generates (at 4440) directional indicators for all the junctures along the route. Directional indicators are graphical indicators of route maneuvers along the route. For example, a route may include a right turn at a first juncture, no turn at a second juncture, and a slight left at a third juncture. In this example, the set of route indicators may include a first graphical representation for the right turn (e.g., an arrow pointing to the right), a second graphical representation indicating no turn (e.g., a straight arrow), and a third graphical representation for the slight left maneuver (e.g., a diagonal arrow to the left). Some embodiments, however, do not generate graphical representations for junctures at which the route continues through in a straight path. In fact, some embodiments do not transmit juncture data for these junctures from the mapping service server. On the other hand, some embodiments do transmit juncture data for each juncture along the route, and in some such embodiments the mapping application generates graphical indicators for each such juncture. In some embodiments, the directional indicators are generated by the device using a process such as the process 4600 described below by reference to FIG. 46. In some embodiments, the application generates at least two directional indicators for each maneuver: a first, more complex indicator that includes contextual information about the juncture, and a second, simpler indicator that only displays the maneuver to be made.

The process then determines (at 4450) whether a request to display route instruction(s) has been received. As shown in the previous subsection, a user might step through the instructions one at a time, or request to view a list of such route instructions. When no request is received, the process transitions to 4480, to determine whether the route inspection has ended (e.g., because the user has cancelled a route, begun navigation of the route, closed the mapping application, etc.). These two operations effectively function as a 'wait' state, where the process waits until an event causing the display of route instructions is received.

When the application has received such a request, the process 4400 analyzes (at 4460) the context for displaying the one or more directional indicator(s). In some embodiments, the context depends on several factors associated with clearly displaying the route maneuvers required for navigating the route. For example, the context may be based on the amount of space available to display the graphical indicator (e.g., due to the size of the device on which the route directions are displayed), the conditions under which the indicator will be displayed (e.g., whether the maneuver is a current or future route maneuver, in which particular modality of the mapping application the sign will be displayed, etc.).

After identifying the context for the route instructions, the process 4400 displays (at 4470) the directional indicator(s) for the maneuver(s) based on the context. In some embodiments, the context for displaying a particular directional indicator determines how the directional indicator appears when displayed. The directional indicators, in some embodiments, come in different illustrative styles for different contexts. A static (or simple) illustrative style for directional indicators merely describes the maneuver by general appearance (e.g., an arrow turning right to direct the user to turn right, or an arrow turning slightly left to direct the user to turn slightly left, etc.). A dynamic illustrative style, in contrast, adapts and stylizes directional indicators to clearly illustrate important aspects of each maneuver. Such stylized directional indicators can also include additional lines to illustrate other roads at the juncture, and other information associated with the maneuver. Some embodiments, for example, use the more complex directional indicators for displaying the route instructions one maneuver at a time, and use the simpler directional indicators for displaying a list view of all of the instructions at once. The process then determines (at 4480) whether route inspection has ended, as described above. Once route inspection has ended, the process ends.

Figure 45:
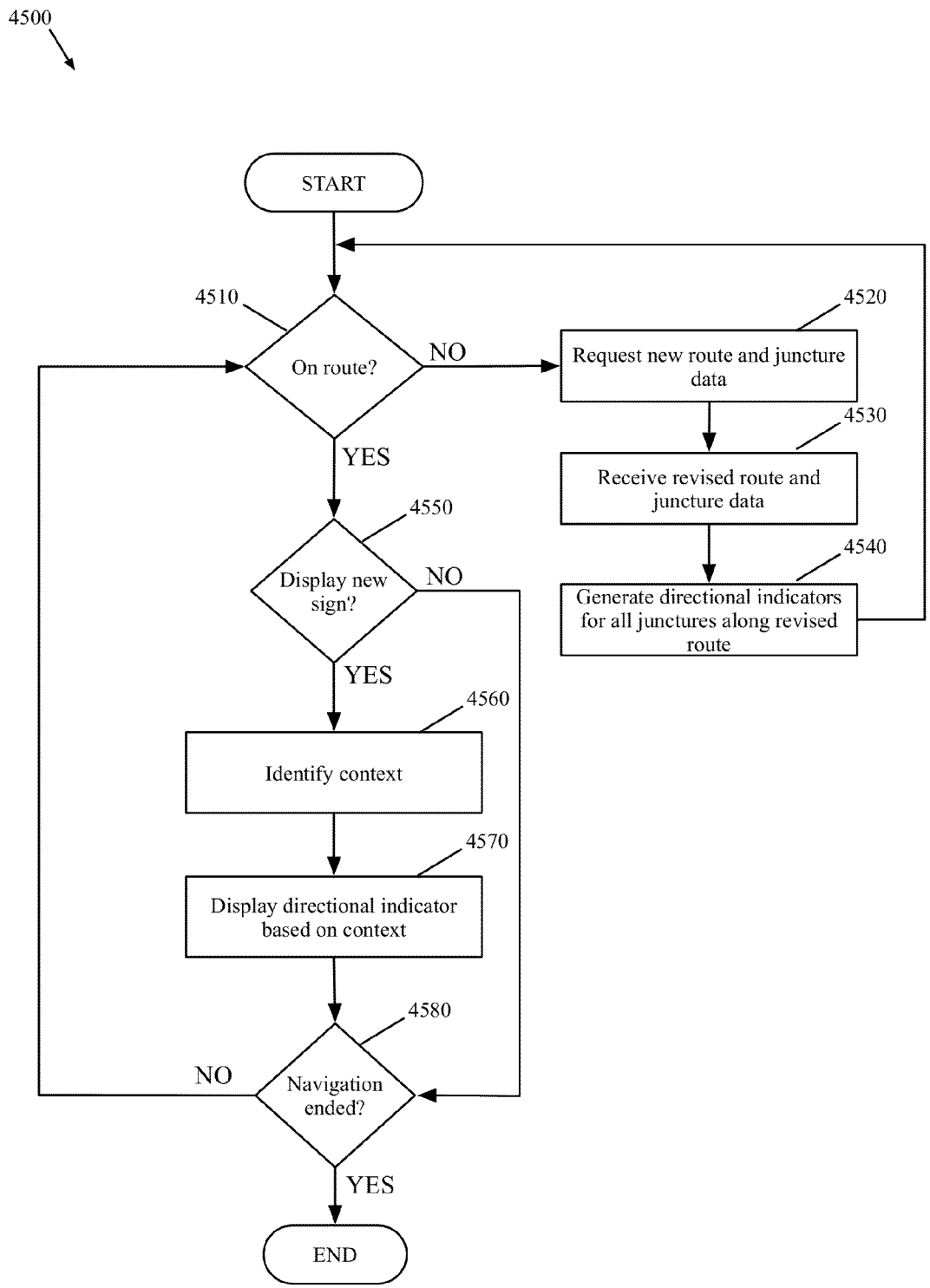
FIG. 45 conceptually illustrates a process of some embodiments that performs navigation over such a route.

In addition to displaying route instructions, the directional indicators are used in various contexts during turn-by-turn navigation. FIG. 45 conceptually illustrates a process 4500 of some embodiments that performs navigation over such a route. In some embodiments, the process 4500 is performed by a mapping application that operates on a device (e.g., a mobile device such as a smart phone or touchpad).

As shown, the process 4500 begins by determining (at 4510) whether the user is navigating the route. That is, the application determines whether the location of the user device (e.g., provided by the device's GPS capability or other location tracking mechanism) is along the path of the route, or has moved off of the route. When the user moves off of the route (e.g., because the user makes a different maneuver than those specified by the route, taking the location of the device off the route), the mapping application requires an update to the route and juncture data. Accordingly, if the device running the mapping application is no longer on route, the process requests (at 4520) new route and junction data from the mapping service server. The process then receives (at 4530) revised route and juncture data for all junctures along the route. In some embodiments, the juncture data is determined by the mapping service server for each juncture along the route. As described above, the juncture data may include the angles of the different branches of the juncture, normalized to the entry direction, along with an indication of the exit branch of the juncture. In some embodiments, the juncture data is retrieved by the server from a storage having a set of known junctures and angles (e.g., all the public roads in the United States). In some cases, the server generates juncture data from other sources (e.g., transportation agencies of states and municipalities, recent satellite photos illustrating new roads not previously stored, etc.). For route updates, some embodiments of the mapping service only generate and transmit new juncture information for the changes to the route, and reference the already-received data for junctures shared by the old and new routes. In some embodiments, as described above by reference to FIG. 45, the juncture data is encoded, in which case the application also decodes this data to arrive at the geometric juncture description.

After receiving the downloaded juncture data, the process 4500 generates (at 4540) directional indicators for all the junctures along the route. Directional indicators are graphical indicators of route maneuvers along the route. For example, a route may include a right turn at a first juncture, no turn at a second juncture, and a slight left at a third juncture. In this example, the set of route indicators may include a first graphical representation for the right turn (e.g., an arrow pointing to the right), a second graphical representation indicating no turn (e.g., a straight arrow), and a third graphical representation for the slight left maneuver (e.g., a diagonal arrow to the left). Some embodiments, however, do not generate graphical representations for junctures at which the route continues through in a straight path. In fact, some embodiments do not transmit juncture data for these junctures from the mapping service server. On the other hand, some embodiments do transmit juncture data for each juncture along the route, and in some such embodiments the mapping application generates graphical indicators for each such juncture. In some embodiments, the directional indicators are generated by the device using a process such as the process 4600 described below by reference to FIG. 46.

After generating the set of graphical directional indicators for the junctures of the route, the process 4500 returns to 4510 to again determine whether the user is navigating the new route. When the user device is still following the route, the process 4500 determines (at 4550) whether to display a new navigation sign. When navigating a route, in some embodiments, each maneuver associated with a juncture is illustrated to the user as a sign (e.g., a green sign with an arrow and textual information indicating the type of maneuver) as the juncture approaches. When a new navigation sign is not required (e.g., because the maneuver indicated by a currently displayed sign has not yet been performed), the process 4500 transitions to 4580 to determine whether the navigation has ended. When navigation has ended, the process 4500 ends. These two operations effectively function as a 'wait' state, in which the mapping application waits for an event requiring the display of a new navigation sign or for the navigation to end (e.g., because the route's ending location has been reached).

When an event occurs requiring the display of a new sign, the process 4500 identifies (at 4560) the context for displaying the sign. In some embodiments, the context depends on several factors associated with clearly displaying the route maneuvers required for navigating the user-selected path. For example, the context may be based on the amount of space available to display the sign (e.g., due to the size of the device on which the navigation instructions are displayed), the conditions under which the indicator will be displayed (e.g., whether the maneuver is a current or future route maneuver, in which particular modality of the mapping application the sign will be displayed, etc.).

After identifying the context for the navigation sign, the process 4500 displays (at 4570) the directional indicator for the maneuver based on the context. In some embodiments, the context for displaying the sign determines how the directional indicator appears when it is displayed on the sign. The directional indicators, in some embodiments, come in different illustrative styles for different contexts. A static (or simple) illustrative style for directional indicators merely describes the maneuver by general appearance (e.g., an arrow turning right to direct the user to turn right, or an arrow turning slightly left to direct the user to turn slightly left, etc.). A dynamic illustrative style, in contrast, adapts and stylizes directional indicators to clearly illustrate important aspects of each maneuver. Such stylized directional indicators can also include additional lines to illustrate other roads at the juncture, and other information associated with the maneuver.

After displaying the directional indicator, the process 4500 transitions to 4580 to determine whether the navigation has ended. In some embodiments, the navigation ends when the user stops the mapping application or when the destination is reached. If the navigation has ended, the process 4500 ends. Otherwise, the process 4500 transitions back to 4510 to determine whether the route navigation is still on route, as described above.

Figure 46:
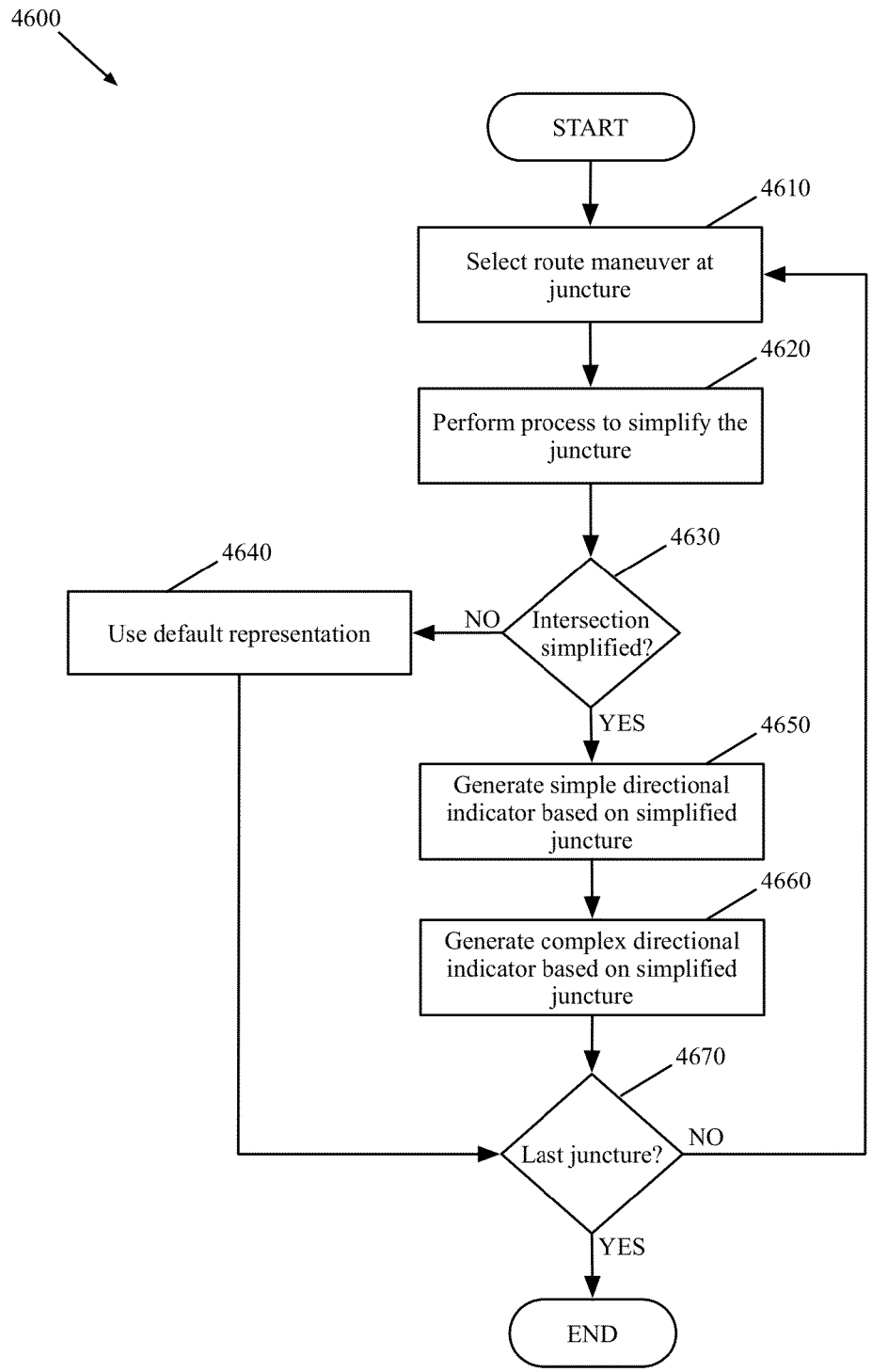
FIG. 46 conceptually illustrates a process that generates such graphical directional indicators for the maneuvers of a route.

In some embodiments, the mapping application simplifies the route navigation instructions by generating graphical directional indicators (e.g., arrows) for maneuvers (e.g., directions to turn, continue traveling straight, etc.) along a route. FIG. 46 conceptually illustrates a process 4600 that generates such graphical directional indicators for the maneuvers of a route. In some embodiments, the process 4600 is performed by a mapping application that operates on a device (e.g., a mobile device such as a smart phone or touchpad). The mapping application performs this process 4600, in some embodiments, at stage 4520 of the process 4500, after receiving juncture data for all junctures along a route. In some embodiments, this juncture data is generated and provided by a set of servers at a mapping service.

As shown, the process 4600 of some embodiments begins by selecting (at 4610) a route maneuver at a juncture. In some embodiments, the route maneuver is selected from a set of route maneuvers associated with a list of junctures along a specified route. The junctures for the route are sequentially ordered, in some embodiments, according to the specified route. The data for each juncture includes a set of branches at specific angles, with an entrance and exit branch specified for the maneuver (in some embodiments, the entrance branch is specified by a rotation of the juncture angles such that the entrance branch is at a specific angle).

After selecting the route maneuver, the process 4600 performs (at 4620) a process to simplify the juncture, if such simplification is needed and possible. In some embodiments, the simplification process uses a set of snapping rules to fit juncture branches to specific angles (e.g., snapping a branch with an angle of 101.3° to 100° or 90°). In some embodiments, the simplification process is performed according to the process 4700 of FIG. 47. Some embodiments simplify the juncture data by attempting to snap each of the branches to a multiple of a particular angle, while other embodiments only attempt to snap the exit branch to a multiple of the particular angle.

Next, the process 4600 determines (at 4630) whether the mapping application was able to simplify the juncture. If the juncture could not be simplified, the process 4600 uses (at 4640) a default representation of the route maneuver (e.g., a graphical icon of the route maneuver based on the maneuver type). On the other hand, if the application was able to simply the juncture, then the process generates (at 4650) a simple directional indicator for the maneuver based on the simplified juncture. In some embodiments, the simple directional indicator is a geometry without any styling or other features (e.g., a simple arrow indicating the direction of the maneuver). For example, the simple directional indicator may be an arrow pointing up and then directly right for a right turn maneuver at a standard juncture between two roads or may be an arrow pointing up and then diagonally up and to the right for a slight right turn. The process 4600 also generates (at 4660) a complex directional indicator based on the simplified juncture data. In some embodiments, the complex directional indicator is a stylized graphical directional indicator that includes reference features associated with the route maneuver. For example, the complex directional indicator may include an emphasized directional arrow representing the maneuver to make at the juncture, and one or more de-emphasized lines indicating other roads at the juncture. For the complex indicators, the application displays de-emphasized lines for the branches of the juncture through which the user will neither enter nor exit, and displays the emphasized arrow starting at the entrance branch and finishing along the exit branch.

After generating the simple and complex directional indicators, the process 4600 determines (at 4670) whether the juncture at which the route maneuver is made is the last juncture on the route. If the juncture is the last, the process 4600 ends. Otherwise, when additional route maneuvers at additional junctures remain, the process transitions back to 4610 to select the route maneuver at the next juncture.

Figure 47:
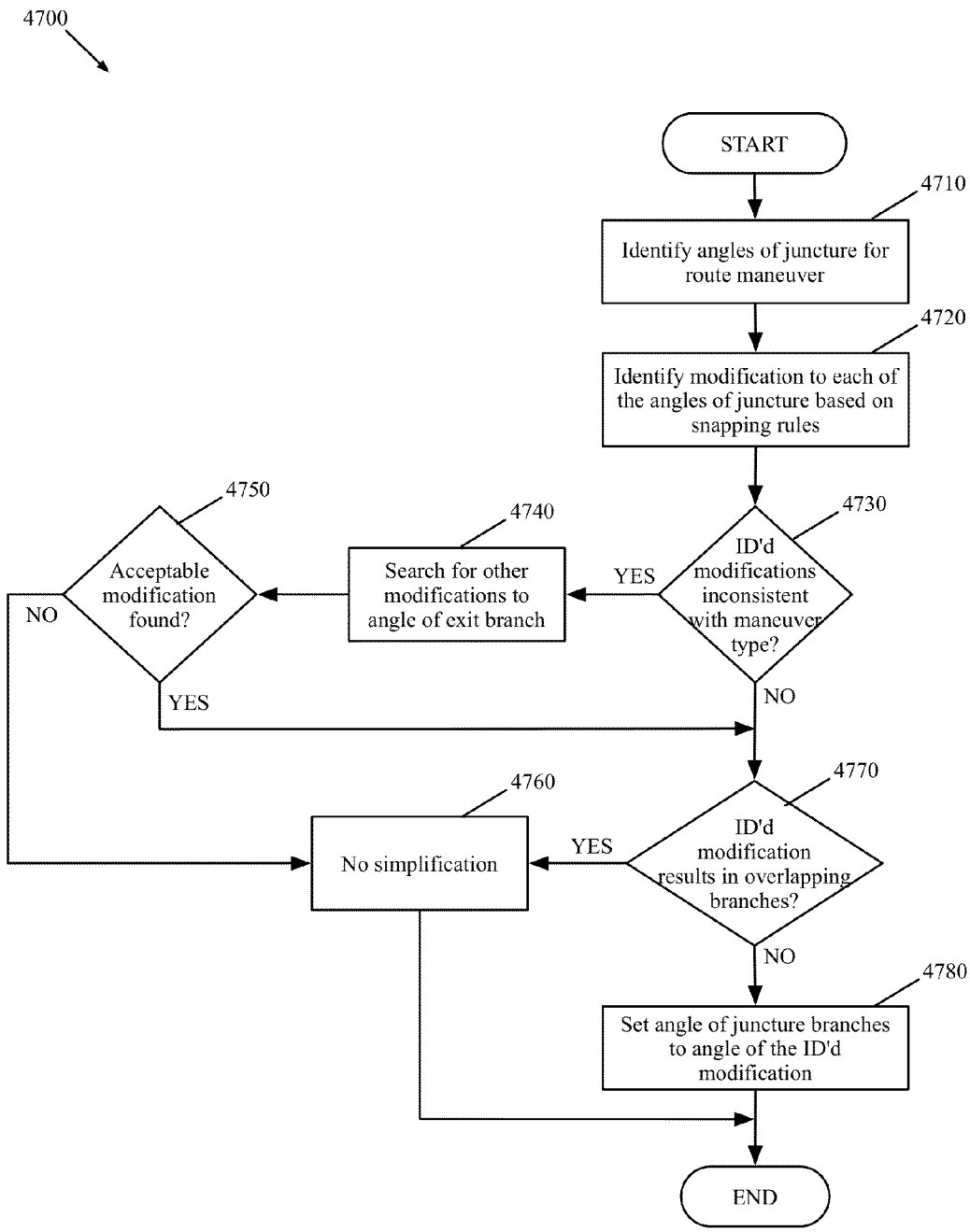
FIG. 47 conceptually illustrates a process that attempts to set the angles of branches of a juncture along a route to multiples of a pre-specified angle in some embodiments.

As mentioned above by reference to FIG. 46, the mapping application of some embodiments receives juncture data (which may have complex geometry) and simplifies the juncture geometry for use in the graphical user interface (GUI). In some embodiments, the mapping application simplifies the route navigation by fitting route juncture angles to multiples of a pre-specified simplified angle. FIG. 47 conceptually illustrates a process 4700 that attempts to set the angles of branches of a juncture along a route to multiples of a pre-specified angle (e.g., 45°). This process 4700 is performed, in some embodiments, at stage 4620 of FIG. 46. The process 4700 will be described by reference to FIGS. 48 and 49, which illustrate particular juncture situations.

Figure 48:
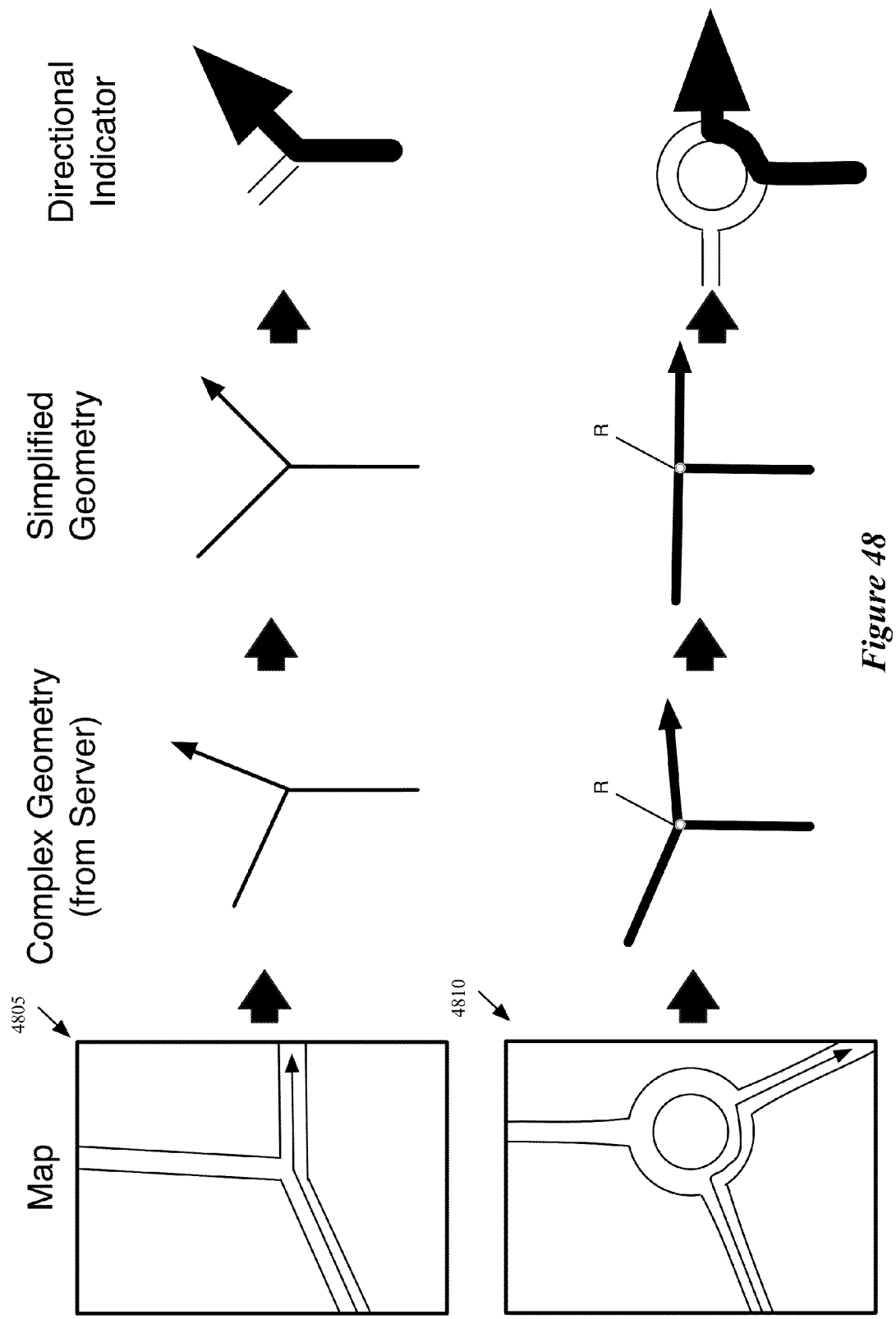
FIG. 48 illustrates a particular juncture situation in some embodiments.

As shown, the process 4700 begins by identifying (at 4710) the angles of the juncture through which a route maneuver is made. These angles, in some embodiments, are those specified by the mapping service server for the juncture, and also indicate one of the branches as the exit branch. The top portion of FIG. 48 illustrates a first point juncture 4805 on a map, with angles at approximately 5°, 90°, and −115° (with North as 0°). In addition, the map shows a maneuver through the juncture, resulting in a slight right turn from the −115° branch to the 90° branch. The second stage in this top portion shows the juncture and maneuver reduced to geometry by the mapping service server, with the juncture data rotated so that the maneuver entrance branch is at 180°. This shows the exit branch at 25° and the third branch at around −60°.

In addition, the bottom portion of the figure illustrates a roundabout juncture 4810 on a map, in which the user enters on a first branch at around −110° and exits on a second branch at around 150°, with a third branch at 0°. Again, the second stage illustrates the juncture and maneuver reduced to geometry by the mapping service server, including rotation of the juncture so that the entrance branch is set to 180°. In addition, the juncture is marked as a roundabout.

After the angles for the juncture are identified, the process 4700 identifies (at 4720) a possible modification to each of the angles of the juncture based on a set of snapping rules. In some embodiments, the snapping rules indicate how to adapt a received angle for display during navigation. In some embodiments, the snapping rules indicate that received angles should be modified to a multiple of a pre-specified angle. For example, the snapping rules may indicate that each directional indicator should conform to one of several axes at multiples of 45 degrees (e.g., 45°, 90°, 135°, 180°). In some embodiments, the snapping rules specify that the received angle should be adapted to the 45° axis closest to the received angle. For example, the received angle is snapped to 90° for a right-turn maneuver onto a road that is at a 110° angle with respect to a reference angle (i.e., the direction of travel into the juncture) because the closest axis among the 45° multiples is the axis at 90°. On the other hand, the angle direction is snapped to 135° for the right-turn maneuver if the road is at a 115° angle with respect to the reference point because the 115° angle of the juncture branch is closer to the 135° axis than to the 90° axis.

After identifying the possible modifications to the angles of the selected juncture, the process 4700 determines (at 4730) whether the identified modification is inconsistent with the type of maneuver associated with the received angle. For instance, if a maneuver involves a slight right turn at an angle of 10°, and the snapping rules modify the 10° branch angle to a 0° angle (moving straight through the juncture), then a simplified directional indicator for the maneuver would merely illustrate a graphical representation for traveling straight. Lost in such an indicator would be any indication of turning, veering, or moving to the right. In this example, moving straight is inconsistent with turning right (even slightly turning right).

When the identified modification is inconsistent with the maneuver type, then the process searches (at 4740) for other modifications to the angle of the exit branch of the juncture. In some embodiments, the snapping rules specify alternative angles to use when a first angle is inconsistent. For example, the snapping rules may indicate that a 45° angle should be used after the 0° angle was determined to be inconsistent with the right turn maneuver.

Next, the process determines (at 4750) whether an acceptable modification was found. In some embodiments, an alternative angle is acceptable if the difference between the received angle for the exit branch (e.g., 10° angle) and the identified alternative angle (e.g., 45° angle) is within a threshold. For example, the snapping rules may specify a maximum difference of 30° as the threshold for an acceptable alternative angle. In this example, the identified 45° alternative angle is 35° greater than the 10° received angle, and therefore, would be considered unacceptable. In some embodiments, the determination is made based on one or more heuristic rules that consider the context for modifying the angle. For example, a heuristic rule may specify that a right turn should always be shown when there is a fork in the road. In this example, even a slight turn to the right (e.g., at an angle of 10°) could be illustrated by an alternative directional indicator (e.g., at a 45° angle).

When no acceptable modification is found, the process determines and specifies (at 4760) that no simplification can be made to the geometry of the juncture, for at least one of the branches. As indicated above by reference to the process 4600, some embodiments use default representations for the maneuver when no simplification can be made to the juncture geometry. The process then ends.

When an acceptable modification is found for the exit branch (either in the initial determination at 4730 or the secondary determination at 4750), the process transitions to 4770 to determine whether the modification results in the overlap of two branches of the juncture (i.e., two branches assigned to the same angle). When two (or more) of the branches of the juncture overlap after the modifications, the process determines and specifies (at 4760) that the modifications should not be made. On the other hand, when there is no overlap between branches and the resulting exit branch is not inconsistent with the maneuver, then the process sets (at 4780) the angles of the juncture branches to the angles determined for the modified juncture. The process then ends.

The third stage in each of the portions of FIG. 48 illustrates the simplified geometry for the two example intersections. In the case of the point juncture 4805, the application simplifies the geometry to align the 25° branch to 45° and the −60° branch to −45°. As these alignments do not create any issues (e.g., confusing instructions or overlapping branches), the mapping application uses the simplified geometry to generate a directional indicator for the juncture and maneuver. In the case of the roundabout juncture 4810, the application simplifies the geometry to align the 80° branch to 90° and the −70° branch to −90°. As these alignments also do not create any issues, the mapping application uses the simplified geometry to generate a roundabout directional indicator for the juncture and maneuver. In some embodiments, however, the simplification process is not applied to roundabout junctures. In many cases, the user's (i.e., the driver's) perspective changes over the course of a roundabout maneuver, and sometimes the roundabout is large enough that the user cannot initially see the exit road. Instead, the directional indicator uses angles that more closely resemble the actual exits of the roundabout.

Figure 49:
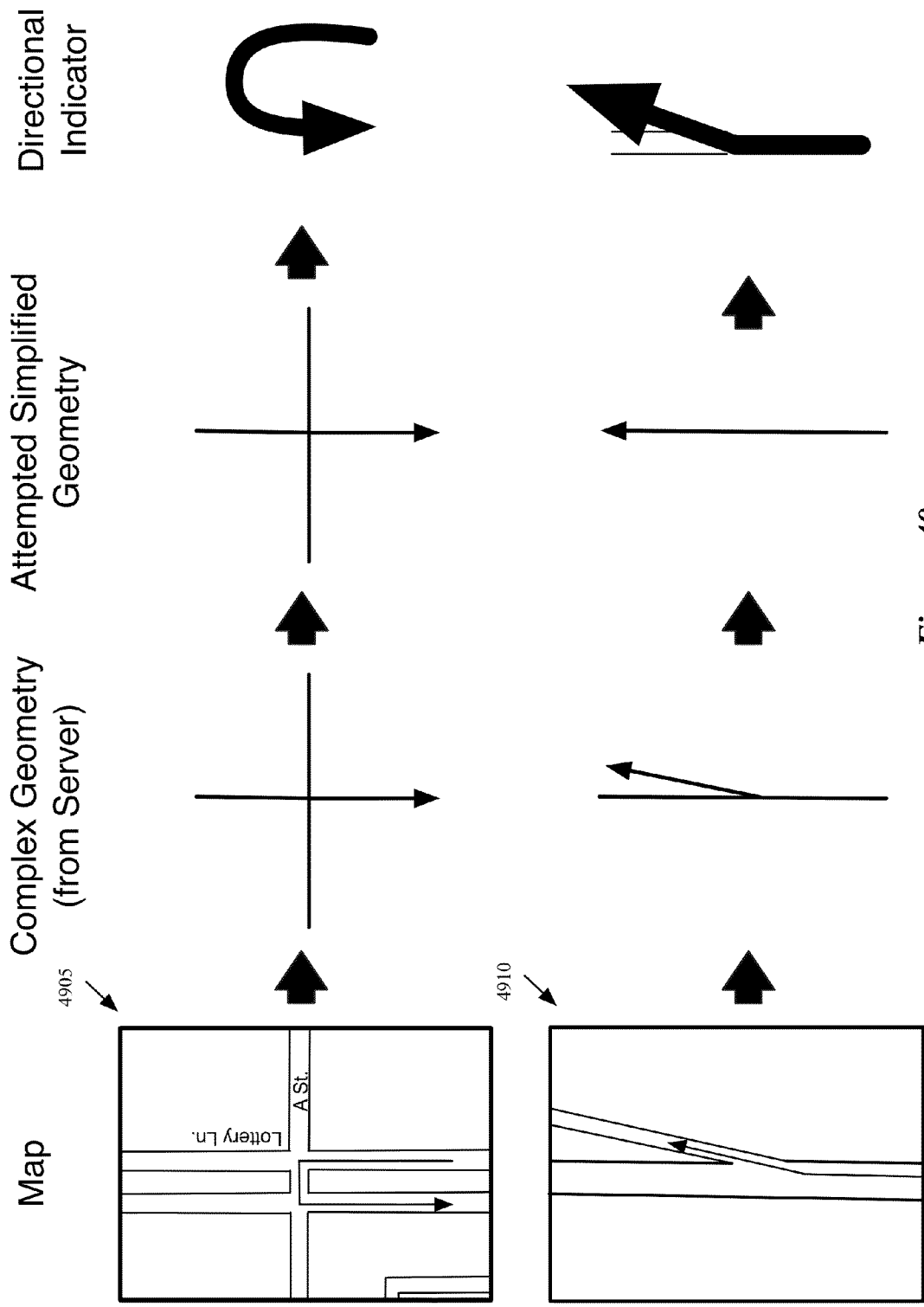
FIG. 49 illustrates two examples where default juncture/maneuver indicators are used instead of the geometry-based indicators in some embodiments.

FIG. 49 illustrates two examples where default juncture/maneuver indicators are used instead of the geometry-based indicators. The first situation is a U-turn maneuver at a juncture 4905. In this case, the juncture data stored for the juncture is a standard juncture with four branches in the cardinal directions. However, the data for the maneuver includes the exit branch at 180°, which is also the entrance branch. Thus, while no simplification is necessary of the geometry, the directional indicator that would be generated according to the standard rules would just be an arrow pointing downward, overlapping the entrance portion of the arrow. As this would not be a very useful graphical indication of the maneuver, the mapping application instead uses a stored U-turn indicator, as shown in the fourth stage of the top portion of this figure.

The second example in FIG. 49 is a freeway exit 4910. In this case, the geometry for the juncture and maneuver includes the entrance branch, a branch at 0° (for continuing straight along the freeway) and a branch at a low angle (around 10°). The attempt at simplifying the geometry, however, reduces the exit branch to 0°. This violates multiple simplification rules, in that it results in overlapping juncture branches and creates a non-intuitive description of the maneuver, because the exit branch now indicates that the route should continue in a straight line. While some embodiments will instead shift the exit branch to 45°, this example instead uses a default freeway exit graphical indicator. In some embodiments, as mentioned above, each juncture also includes routing directions, such as "Freeway_Off_Ramp". In this case, the directions stating that the maneuver involves taking a freeway off ramp, combined with the knowledge that the route is in a right-sided driving area and that the exit branch is at a low angle to the right of straight through, indicates that the right-side freeway off ramp graphical indicator should be used. Other examples of maneuver types that may use default representations include, in some embodiments, "keep left" or "keep right" maneuvers.

Figure 50:
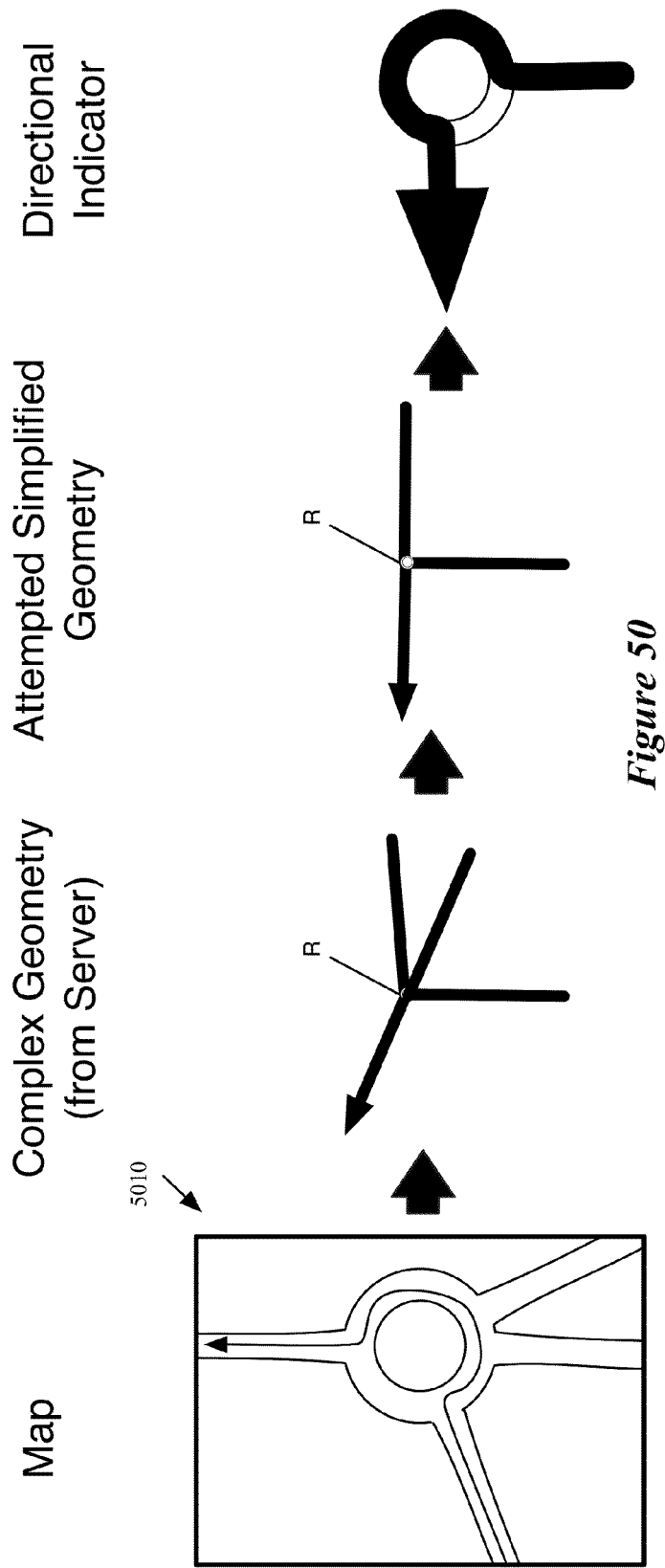
FIG. 50 illustrates an example of a roundabout in which the simplified geometry is not used by some embodiments.

FIG. 50 illustrates an example of a roundabout 5010 at which the simplified geometry is not used by some embodiments. In this case, the geometry received for the roundabout includes the entrance branch, a branch at approximately 110°, a branch at 85°, and the exit branch at approximately −70°. The attempted simplification places both of the unused (neither entrance nor exit) branches on the 90° axis. For a point intersection, some embodiments might allow this for the maneuver, as the instructions to make a left turn would be clear. However, when a driver goes around a roundabout, they will often count the number of exits, as the angles become unclear as perspective changes. Thus, reducing the number of branches could be potentially confusing for the driver. As such, the directional indicator used eliminates the exits altogether and only shows a circular roundabout with an arrow showing the maneuver. In addition, some embodiments include accompanying instructions that state "Take the third exit of the roundabout", or other instructions to that effect.

In addition, certain situations will result in the application eliminating the directional indicator from a navigation sign altogether due to the possibility of confusing the user. For instance, an intersection involving an interchange from a first freeway to a second freeway might have three lanes that go in two or three different directions. In certain cases, the information generated on the server does not specify which lane the user should take in order to get to the desired second freeway (i.e., whether to use the left lane or the right lane). While the application of some embodiments could show a generic arrow for such a maneuver, this might confuse the user. Accordingly, the navigation application of some embodiments suppresses the graphical directional indicator and centers the instruction text in the navigation sign. When a highway shield is available for the second (destination) freeway, some embodiments move the instructions to the left side of the sign and display the highway shield on the right side of the sign.

3. Direction Indicator Software Architecture

Figure 51:
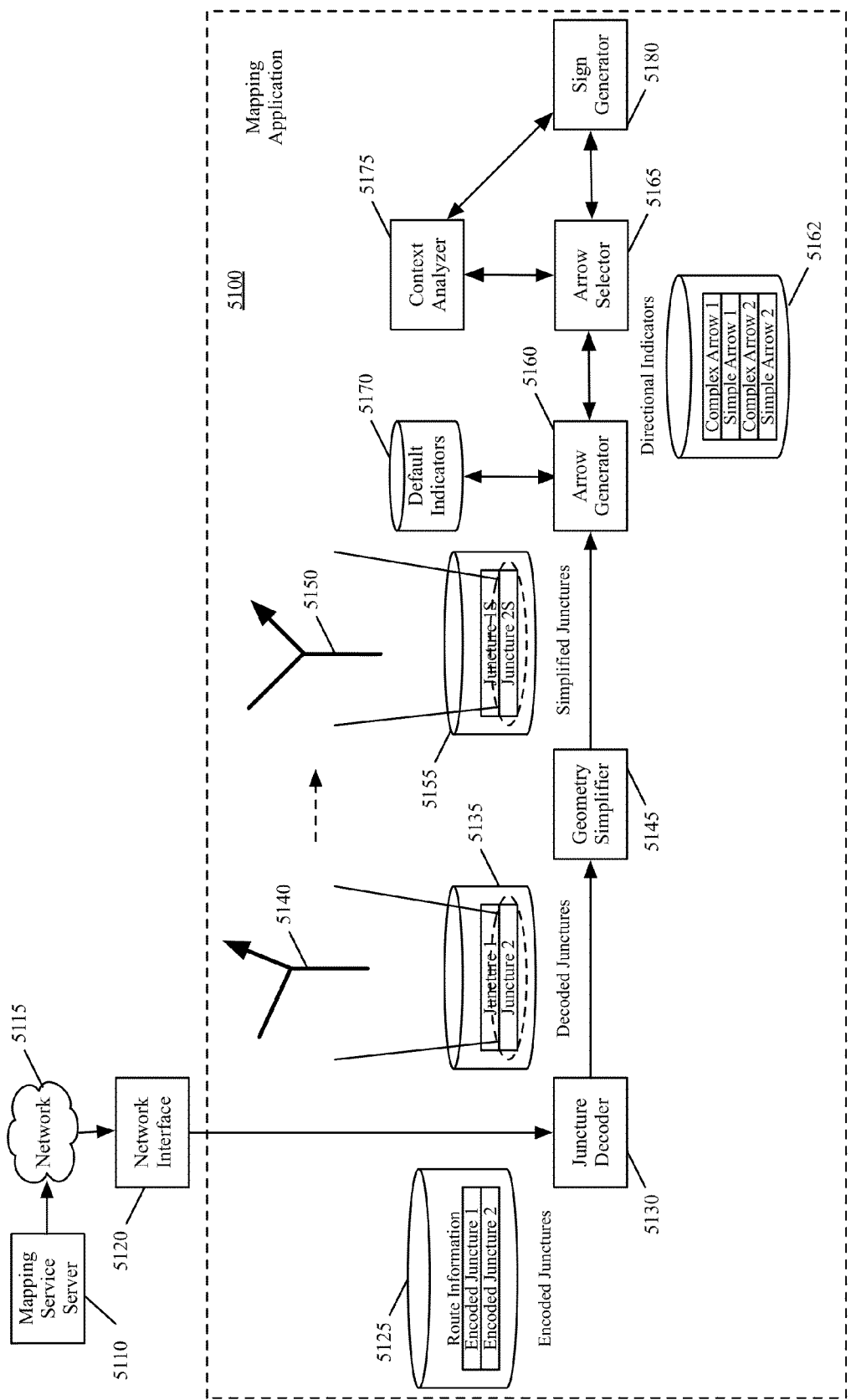
FIG. 51 conceptually illustrates a mapping application of some embodiments that generates directional indicators for different contexts.

As stated above, in some embodiments the maps, routes, and turn-by-turn navigation are presented to a user by a mapping application that operates on a device (e.g., a handheld device such as a smart phone or tablet). The mapping application may be a stand-alone application in some embodiments, or integrated with the operating system of the device. FIG. 51 conceptually illustrates a mapping application 5100 of some embodiments that generates directional indicators for different contexts. One of ordinary skill in the art will recognize that the modules shown for the application 5100 are specific to the arrow generation processes, and that the mapping application of some embodiments includes numerous additional modules (e.g., for map display, route display, additional aspects of navigation, etc.).

As shown, a mapping service server 5110 transmits route and juncture data through a network 5115 to a network interface 5120 of the device on which the mapping application 5100 operates. The mapping service server 5110 may be a server similar to that shown in FIG. 24 above, which receives a route request from devices on which the mapping application operates and generates route and juncture data for the requests.

The mapping application 5100 includes a juncture decoder 5130, a geometry simplifier 5145, an arrow generator 5160, an arrow selector 5165, a context analyzer 5175, and a sign generator 5180. The juncture decoder 5130 receives encoded juncture information 5125 for a route and decodes this information to arrive at a series of maneuvers through junctures. The juncture decoder 5130 stores the decoded juncture data 5135. This may be in random access memory or other volatile storage, for use only during the navigation of the route, or in a more permanent storage such as a hard disk or solid-state memory. As stated above, some embodiments do not encode the juncture information, in which case the application does not require a juncture decoder, and simply stores the received juncture data.

The juncture data 5135, in some embodiments, includes a geometric description of the intersection that indicates the type of the intersection (e.g., point, roundabout) as well as the different branches of the intersection at their angles, according to an analysis of the map by the mapping service. As the junctures correspond to maneuvers to make along a particular route, the juncture data also indicates an exit branch for each juncture. This figure illustrates an example geometric juncture description 5140, with three branches and the exit marked with an arrow. The branch at 180° (the bottom branch) is always assumed to be the entrance branch, in some embodiments.

The geometry simplifier 5145 reduces the juncture data to a simplified form and stores simplified juncture data 5155. As with the decoded juncture data 5135, this data may be stored in volatile or non-volatile memory in different embodiments. In some embodiments, the geometry simplifier attempts to snap each of the branches of a juncture to a multiple of 45°, according to various heuristic rules. The geometric juncture description 5150 is a simplified version of the geometric description 5140.

The arrow generator 5160 generates one or more graphical indicators for each juncture/maneuver, using the simplified juncture data. When the indicator generated according to the juncture data is not ideal (e.g., for a U-turn, a freeway exit maneuver, etc.), the arrow generator of some embodiments uses the stored default indicators 5170. For at least some of the junctures, the arrow generator creates a complex directional indicator (that also includes a de-emphasized representation of the juncture) and a simple directional indicator. The arrow generator 5160 stores these directional indicators 5162 for use in displaying route and navigation instructions, in either volatile or non-volatile memory.

The arrow selector 5165 uses a context analyzer 5175 to determine which of the directional indicators to use for a particular maneuver, depending on the context in which the indicator will be displayed. These contexts may include different situations for routing directions or different situations for turn-by-turn navigation instructions (e.g., standard mode, lock-screen mode, when a different application is open, etc.). The context analyzer 5175 identifies the context and provides this information to the arrow selector 5165.

The arrow selector chooses one of the graphical indicators 5162 and provides this selection to the sign generator 5180. The sign generator 5180 generates a navigation instruction sign for display that includes the selected graphical indicator. The sign generator 5180 also uses the context analyzer results to generate other aspects of the sign, such as the level of detail of the instructions shown within the navigation sign.

IV. Dynamic Generation of Adaptive Instructions

As shown in many of the figures in the above sections, in addition to displaying a graphical indication of a maneuver during a route, the mapping application of some embodiments displays maneuver instructions (e.g., "Turn left in 0.5 miles onto Bahrami Ct."). Much like the graphical indicators, the mapping application dynamically generates these instructions using the received route/junction data.

A. Examples of Different Instructions for Same Maneuver in Different Contexts

The mapping application of some embodiments displays textual route instructions in a large variety of cases, some of which are more space constrained than others, and some in which other guidance elements provide information about a maneuver that can take the place of the text instructions. Rather than selecting a single instruction string and then shrinking the font or truncating as dictated by the constraints, the application uses a sophisticated method to synthesize strings that are best adapted to each context from a number of details about the maneuver itself.

For a given context, the application chooses instruction text by considering factors such as the available space, the amount of information conveyed by means other than text (e.g., the graphical indicators, road signs, etc.), the localized length of each of the instruction variants, among other factors. By synthesizing and evaluating several alternatives locally on the client device (as opposed to simply receiving instruction text from the mapping service), the mapping application can pick an optimal instruction string in every scenario. In addition, this approach allows for the application to use different instruction text on a differently-sized device (e.g., using more text on a tablet computer as compared to a smaller smart phone). A similar approach can also be used for spoken instructions that need to fit within a particular amount of time, and when voice instructions are used, the application of some embodiments will reduce the length of the displayed instructions.

Figure 52:
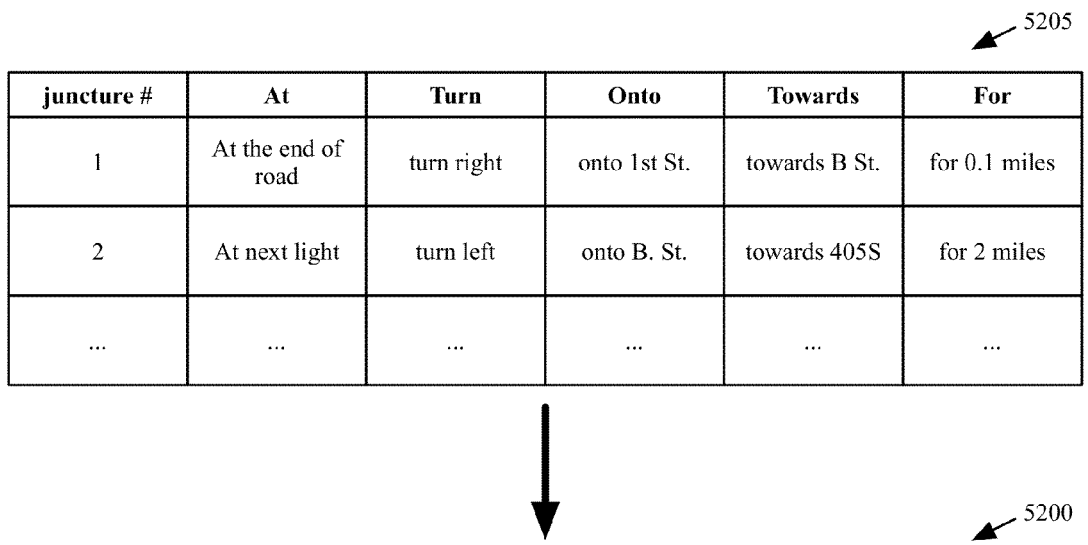
FIG. 52 illustrates an example of the synthesis of different instructions for a particular maneuver at a juncture according to some embodiments.
Figure 53:
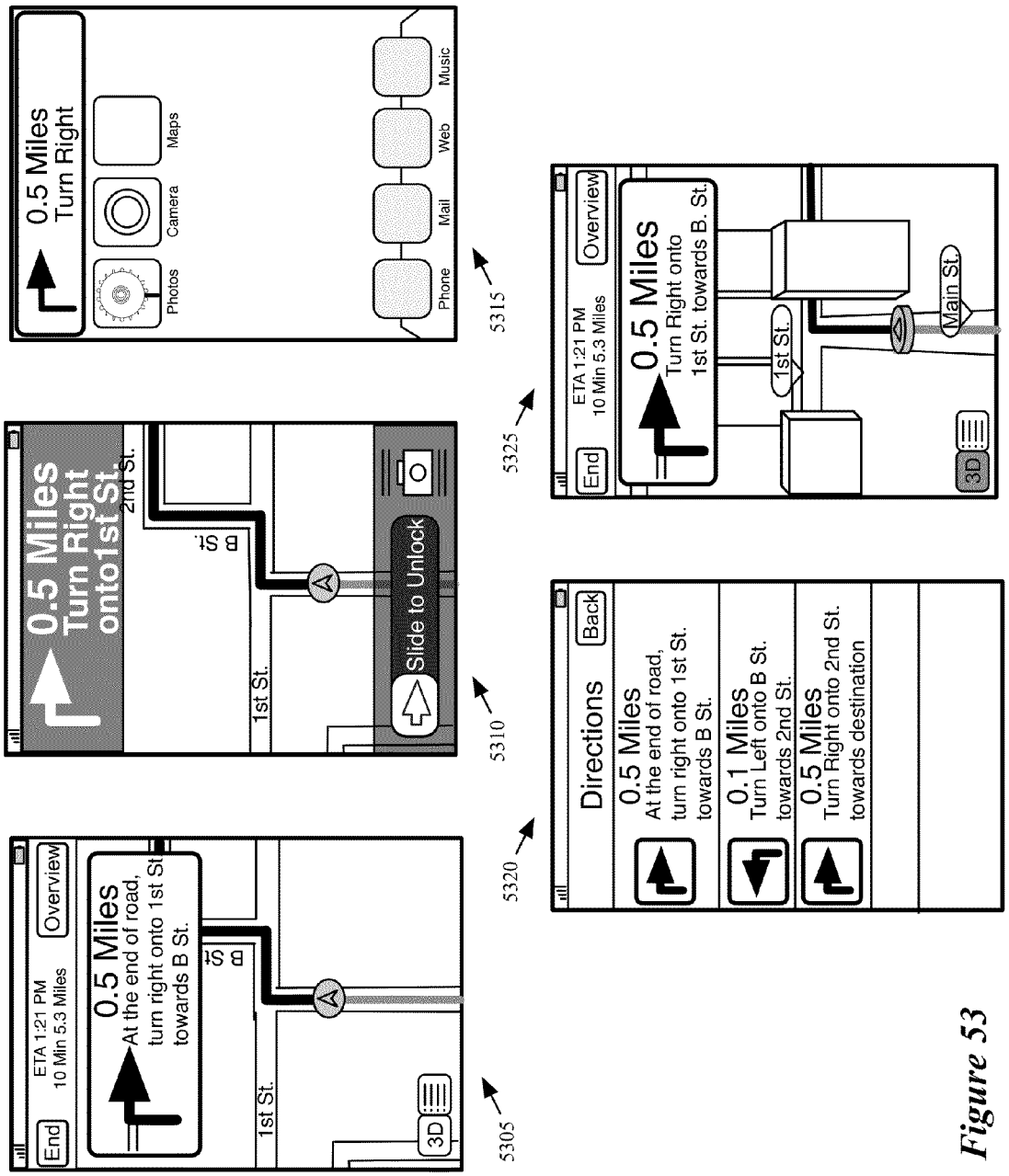
FIG. 53 illustrates several different scenarios in which the mapping application displays different examples of the adaptive instructions for the particular maneuver of the first juncture in a variety of different situations.
Figure 54:
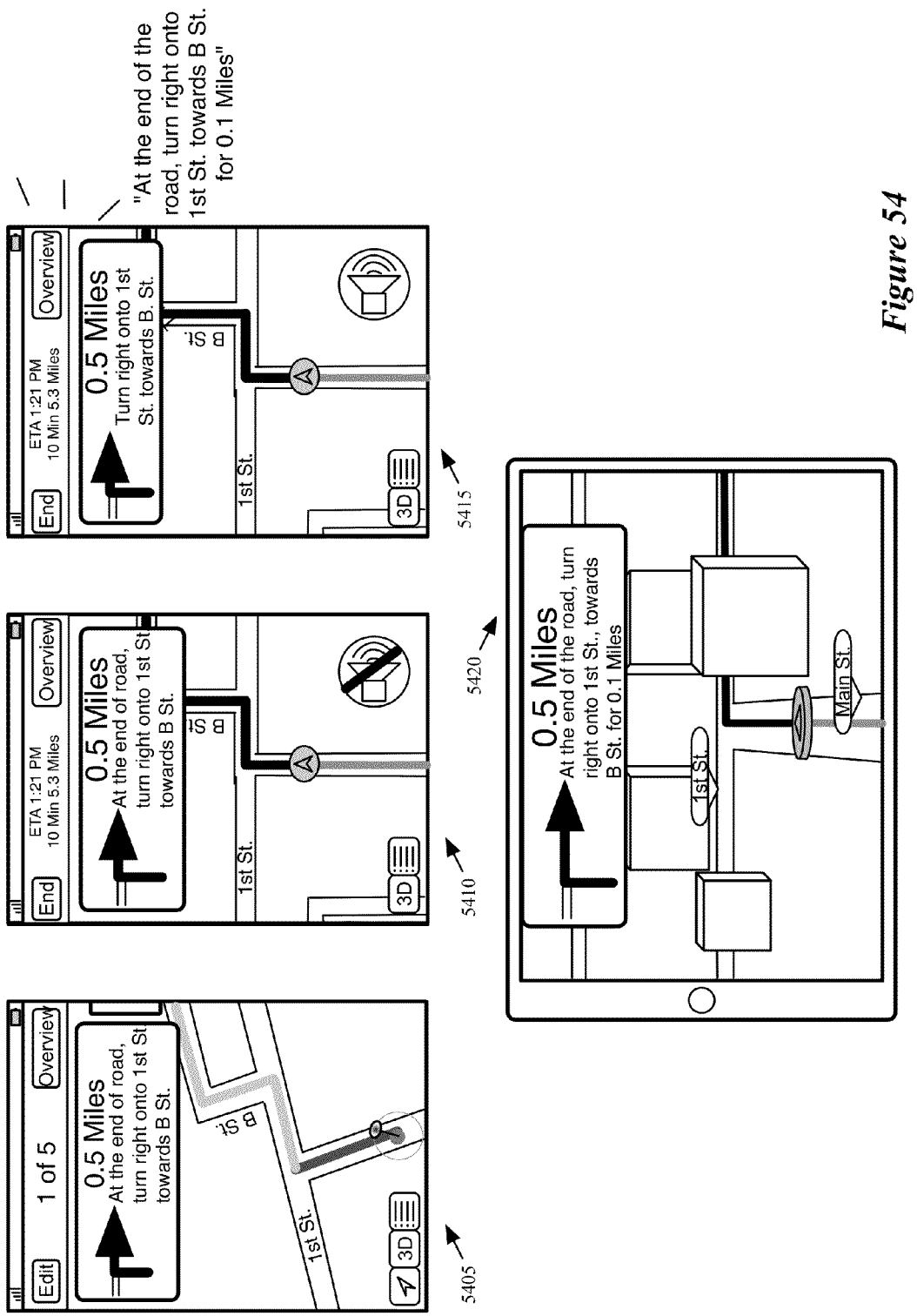
FIG. 54 illustrates additional scenarios in which the mapping application uses the synthesized instruction sets in some embodiments.

FIG. 52 illustrates an example of the synthesis of different instructions for a particular maneuver at a juncture according to some embodiments. FIGS. 53 and 54 then illustrate different scenarios in which these different instructions for the maneuver are used. As shown, the mapping application uses received route instructions and juncture data to identify specific aspects of maneuver instructions. The table 5205 conceptually illustrates how various strings might be generated for a juncture. Specifically, the maneuver instructions include an "At" field, a "Turn" field, an "Onto" field, a "Towards" field, and a "For" field. For each juncture, the application initially populates these string fields, in order to synthesize the instructions from the fields.

In some embodiments, the "At" field is based on map information that includes traffic light and stop sign information, etc. For the examples shown in FIG. 52, the first juncture takes place "at the end of the road", while the second juncture takes place "at the next light". The "Turn" field describes the maneuver to be made; examples of this field include "turn right" (the maneuver performed at the first juncture), "exit freeway", "keep left", "slight left turn", "U-turn", or other maneuvers. The route directions that include a maneuver description may be mapped to different possible strings for the "Turn" field.

The "Onto" field indicates the pathway (i.e., street, freeway, etc.) onto which the maneuver exits the juncture. In the case of the first juncture in FIG. 52, the maneuver exits the juncture "onto 1$^{st}$ St.". The "Towards" field indicates a marker (taken from the map data or juncture data) towards which the exit branch points. In some embodiments, the mapping application analyzes the exit branch of the subsequent juncture, and uses the name of this road as the "towards" field. In the example, the second juncture is a left turn onto B St., so the "Towards" field for the first juncture indicates that the maneuver exits "towards B St." Other embodiments use either the next road with which the exit street of the present junction intersects, a major road (e.g., a freeway), or other easily recognizable descriptor (e.g., a city, etc.). The "For" field indicates the distance along which the route will follow the road in the "Onto" field (that is, the road onto which the juncture exits). Thus, in the example instructions, the next juncture will be in 0.1 miles, so the "For" field is "for 0.1 miles".

Next, after generating each of the component strings for a set of instructions, the mapping application of some embodiments generates different levels of instructions. The table 5200 illustrates a set of synthesized instructions for the first juncture. Specifically, the table 5200 illustrates five sets of instructions, of varying lengths, for a particular juncture. However, one of ordinary skill in the art will recognize that different embodiments might include fewer, additional, or different synthesized strings based on the set of string fields.

The first instruction set uses all five of the fields. This is the longest instruction set, reading "At the end of the road, turn right onto 1$^{st}$ St., towards B. St. for 0.1 miles". As it is the longest instruction set, the application assigns the instruction set a rank of 1. The second instruction set removes the "For" field, using only the "At", "Turn", "Onto", and "Towards" fields. The third instruction set removes the "At" field. These fields add context, and are therefore nice to have when additional room is available. However, they are less integral to the maneuver itself, and therefore are the first fields to remove when shortening the instruction text. Next, for the fourth instruction set, the application removes the "Towards" field, as the "Turn" and "Onto" fields are considered more important. Lastly, the fifth instruction set contains only the "Turn" field, simply stating "Turn right".

Again, some embodiments will include additional instruction sets, when different length instructions (that still make sense) are available. For instance, some embodiments will include an instruction set that removes the "At" field but keeps the "For" field, in the case that the "For" field is shorter than the "At" field. This enables the application to have another option in case the second instruction set (with the "For" field removed) is just slightly too long for the allocated space. Furthermore, some embodiments may include additional, fewer, or different fields. For instance, some embodiments might include a "In" field, that gives the distance to the upcoming juncture (i.e., "In 0.5 miles, . . . ").

FIGS. 53 and 54 illustrate several different scenarios in which the mapping application displays different examples of the adaptive instructions for the particular maneuver of the first juncture in table 5205 in a variety of different situations. In this case, the full instructions are "In 0.5 miles, at the end of the road, turn right onto 1$^{st}$ St. towards B. St. for 0.1 miles." However, as the example does not include an "In" field, the highest ranked instructions are slightly shorter than this. In order to determine which instruction set to use for a particular display, the mapping application of some embodiments determines a maximum length for the instruction set, then chooses the highest ranked set that fits into the allotted space.

The first scenario 5305 illustrates instructions for the particular maneuver displayed during turn-by-turn navigation. In this case, the application allots three text lines for the instruction. The distance (0.5 miles) is already displayed in large font at the top of the navigation sign, but this is not counted as one of the text lines. With three lines available, the highest ranked instruction set can be used in the navigation sign.

The second scenario 5310 illustrates turn-by-turn navigation instructions for the particular maneuver while in lock screen mode. In this mode, only two lines of large text are allotted in some embodiments, so the highest ranked instructions that fit use only the "Turn" and "Onto" fields. This simplifies into the direction of the turn and the street onto which the user turns. The third scenario 5315 illustrates navigation instructions for the maneuver while the mapping application is not open on the device, in which case the instructions show up as an alert banner. In this case, the application only allots one line to the instructions, so the lowest ranked instructions ("Turn right") are used.

The fourth scenario 5320 illustrates the display of information in the list view for route directions. This view, as described above, lists subsequent instructions for each of the maneuvers along a route. In some embodiments, the banners in the list view for each direction are of a variable height, and therefore the full instruction set is always used. Thus, the highest ranked set of instructions, "At the end of the road, turn right onto 1$^{st}$ St. towards B. St." is used for the first maneuver in the list. As shown, this maneuver takes an extra line of text as compared to the next two maneuvers.

The fifth scenario 5325 illustrates turn-by-turn navigation in 3D mode. As compared to the first scenario 5305, some embodiments allot less room in the navigation sign for the instruction set when in 3D mode, in order for more of the 3D display to be viewable. As such, the application uses the third ranked instruction set, because this is the largest instruction that fits in the two lines using the given text size.

FIG. 54 illustrates additional scenarios in which the mapping application uses the synthesized instruction sets. The sixth scenario 5405 illustrates the display of route overview instructions that the user can step through (e.g., with sweep gestures). In some embodiments, the application allots the same amount of space for step-through instructions as for turn-by-turn navigation, and therefore the application again uses the highest ranked instruction set that includes all of the fields.

The seventh scenario 5410 is the same as the first scenario 5305, but explicitly indicates that the spoken navigation is turned off. This is provided here to contrast with the eighth scenario 5415, in which voice instructions are enabled during turn-by-turn navigation. For voice navigation, the application determines a maximum amount of time allowed for speaking the instructions, then determines the highest ranked set of instructions that can be spoken within this allotted time. In this case, the time allows the entirety of the highest ranked instruction set to be selected. In addition, when voice navigation is activated, the application reduces the size of the displayed navigation sign. As such, the application displays the third ranked instruction set within the display.

Finally, the mapping application of some embodiments may operate on different types of devices with different size display screens. For example, the application might operate on both smart phones and larger tablet computers. When operating on a larger device, some embodiments allow more room for the navigation sign. The ninth scenario 5420 illustrates turn-by-turn 3D navigation on a larger device (a tablet computer). Unlike in the fifth scenario 5325, the navigation sign provides enough room for the highest ranked instruction set to be used.

The above description describes some embodiments that generate several different instruction sets for a maneuver, rank the instruction sets, and then adaptively determine which of these instruction sets best fits into a particular space. In some embodiments, the application identifies a maximum number of characters available to use for the instruction display. The application then starts with the highest ranked instruction set and determines whether the instruction set fits into the identified number of characters. When the instruction set fits, the application selects and displays the instruction set. When the instruction set does not fit, the application moves to the next ranked instruction set and performs the same test. If none of the instruction sets fit, then the application uses the one that comes closest to fitting. Some embodiments then truncate the instruction set with an ellipsis to indicate that the instruction set does not completely fit within the space. This may result in elements being removed from the string.

In addition to text, some embodiments use text substitutes within the instruction sets. Specifically, for roads represented by shield signs (e.g., interstate freeways, state routes), the application uses the shield representation of the road rather than the road name (e.g., a blue and red shield with "I-5" inside of it instead of "Golden State Freeway" or "Interstate 5". Some embodiments treat these signs as a fixed number of characters when assessing the different instruction sets.

The above description describes some embodiments of the mapping application in which the decision regarding which elements to use is performed primarily based on trying to use the maximum length instruction set. Some other embodiments factor in whether certain elements of an instruction set are presented to the user in a different visual manner, and may potentially remove these elements.

For instance, when displaying a detailed instructional arrow that makes clear a turn is a slight right turn, some embodiments shorten the instruction to remove the "slight" or even remove the entire reference to the turn, instead using instructions along the line of "CA-17 S towards Santa Cruz". Similarly, if displaying a large road shield sign, then the "CA-17 S" portion of the instruction might be omitted.

B. Client Side Generation of Instructions that are Adapted to the Context

The above section illustrated several examples of the mapping application synthesizing navigation instructions based on route and juncture data, and then displaying different variants of these instructions according to different contexts. A user might request the mapping application to search for a route from a first location to a second location (e.g., from the user's house to a particular restaurant). In some embodiments, the application sends the request to a centralized mapping service (e.g., a set of servers running back-end map and route generation processes, such as those described above in Section III.A) and receives a set of one or more possible routes from the first location to the second location. The user then selects one of the routes to follow.

Figure 55:
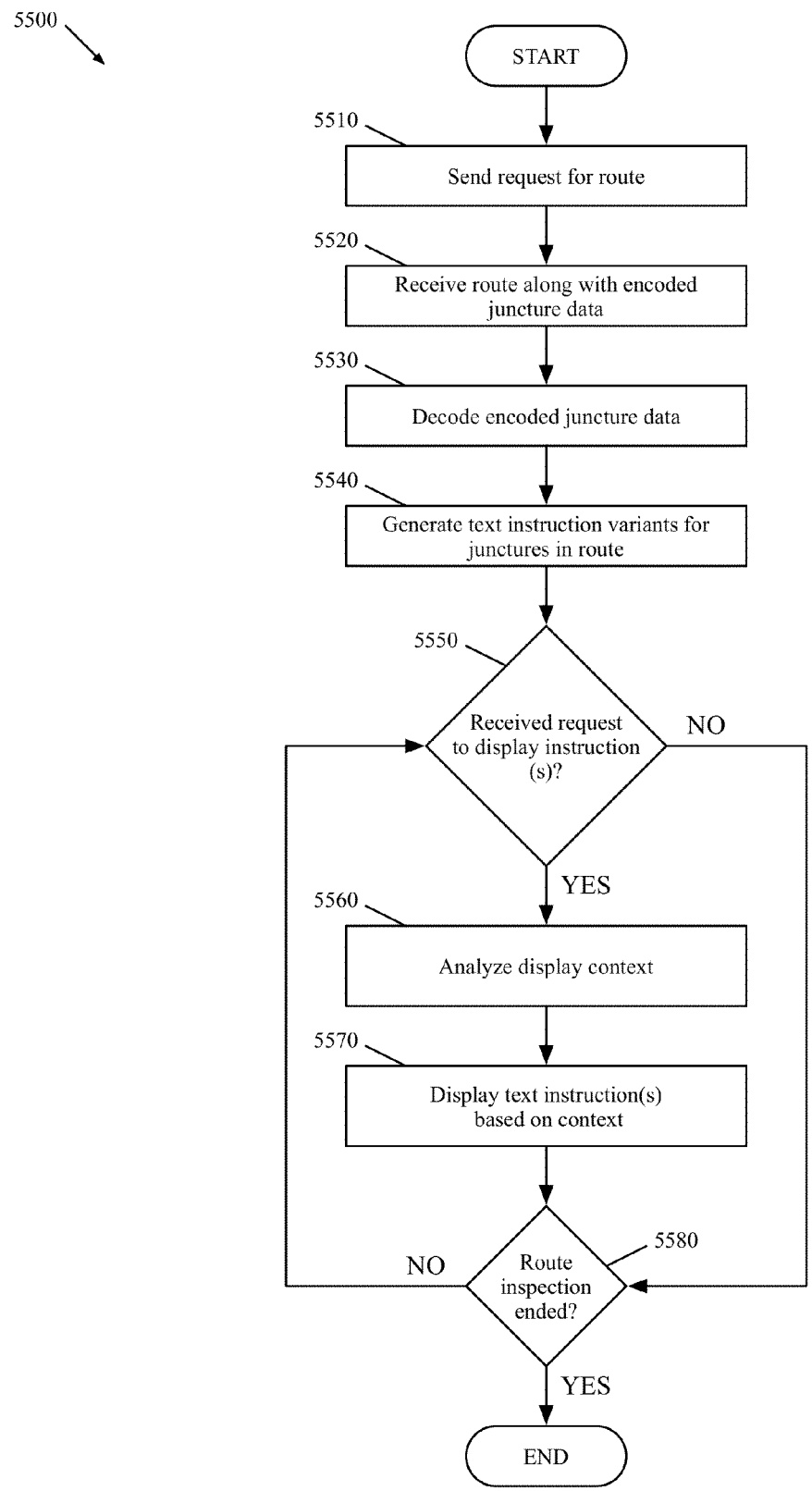
FIG. 55 conceptually illustrates a process of some embodiments for displaying text instructions during route inspection.

FIG. 55 conceptually illustrates a process 5500 of some embodiments for displaying text instructions during route inspection. In some embodiments, a user can view a list of directions for a route (e.g., by selecting a list view GUI button) or can step through the directions one at a time (e.g., via swipe gestures) while also viewing the route on the map. In some embodiments, the process 5500 is performed by a mapping application that operates on a device (e.g., a mobile device such as a smart phone or touchpad).

As shown, the process 5500 of some embodiments begins by sending (at 5510) a request for a route to a mapping service server. In some embodiments, the request comprises a starting location and an ending location, potentially with one or more intermediate locations. The user enters these locations into the mapping application GUI of some embodiments, and the application transmits a route request through a device interface to the mapping service server. The operations of the server to generate a route and navigation (juncture) instructions are described above in Section III.A.

The process 5500 then receives (at 5520) the route along with encoded juncture data. In some embodiments, the mapping service transmits the juncture data in an encoded format. This encoding may simply involve identifying similar junctures and referencing these rather than repeating the same juncture information twice, or may involve additional encoding. Other embodiments do not provide any encoding. Assuming the data is encoded, the process decodes (at 5530) the encoded juncture data to arrive at juncture information for each maneuver along a route. This juncture data, in some embodiments, consists of geometry information that identifies the branches of the juncture and the angles at which those branches enter/exit the juncture. Along with the juncture information, some embodiments also include maneuver information that describes the maneuver being made (e.g., as a right turn, U-turn, freeway off ramp, etc.).

Next, the process generates (at 5540) text instruction variants for all the junctures along the route. Text instruction variants are combinations of text strings derived from the decoded juncture and maneuver information. As discussed above in conjunction with FIGS. 52-54, examples of such text strings include "at the second intersection", "turn left", "onto $1^{st}$ St.", "towards Wolfe Rd.", and "for 0.3 miles". In some embodiments, the process 5500 combines the text strings into text instruction variants. As a first example of such a combination, process 5500 may combine "at the second intersection" and "turn left" to produce a short text instruction variant that reads, "At the second intersection, turn left." As a second example of such a combination, process 5500 may combine all of the previous text strings to produce a long text instruction variant that reads "At the second intersection, turn left onto $1^{st}$ St., towards Wolfe Rd. for 0.3 Miles." In some embodiments, process 5500 ranks the text instruction variants for each juncture based on the amount of information conveyed in each variant. In some embodiments, the text instruction variants are generated by the device using a process such as the process 5800 described below by reference to FIG. 58.

The process then determines (at 5550) whether a request to display route instruction(s) has been received. As shown in the previous subsection, a user might step through the instructions one at a time, or request to view a list of such route instructions. When no request is received, the process transitions to 5580, to determine whether the route inspection has ended (e.g., because the user has cancelled a route, begun navigation of the route, closed the mapping application, etc.). These two operations effectively function as a 'wait' state, where the process waits until an event causing the display of route instructions is received.

When the application has received such a request, the process 5500 analyzes (at 5560) the context for displaying the one or more text instruction(s). In some embodiments, the context depends on several factors associated with clearly displaying the instructions required for navigating the route. For example, the context may be based on the amount of space available to display the text instruction (e.g., due to the size of the device on which the route directions are displayed) or the conditions under which the indicator will be displayed (e.g., whether the maneuver is a current or future route maneuver, in which particular modality of the mapping application the sign will be displayed, etc.).

After identifying the context for the route instructions, the process 5500 displays (at 5570) the text instruction(s) for the maneuver(s) based on the context. In some embodiments, the context for displaying a particular text instruction determines which text instruction variant is displayed. The text instruction variants, in some embodiments, come in different lengths for different contexts. In some embodiments, longer text instruction variants convey more information than shorter instruction variants. However, longer instruction variants may not fit into small banners or may cause wrapping effects across text lines. Some embodiments, for example, use longer text instruction variants for displaying the route instructions one maneuver at a time in the standard turn-by-turn navigation view, but use shorter text instruction variants for displaying the same maneuver when less space is allocated, such as when navigation is on but the device is in a different application. The process then determines (at 5580) whether route inspection has ended, as described above. Once route inspection has ended, the process ends.

Figure 56:
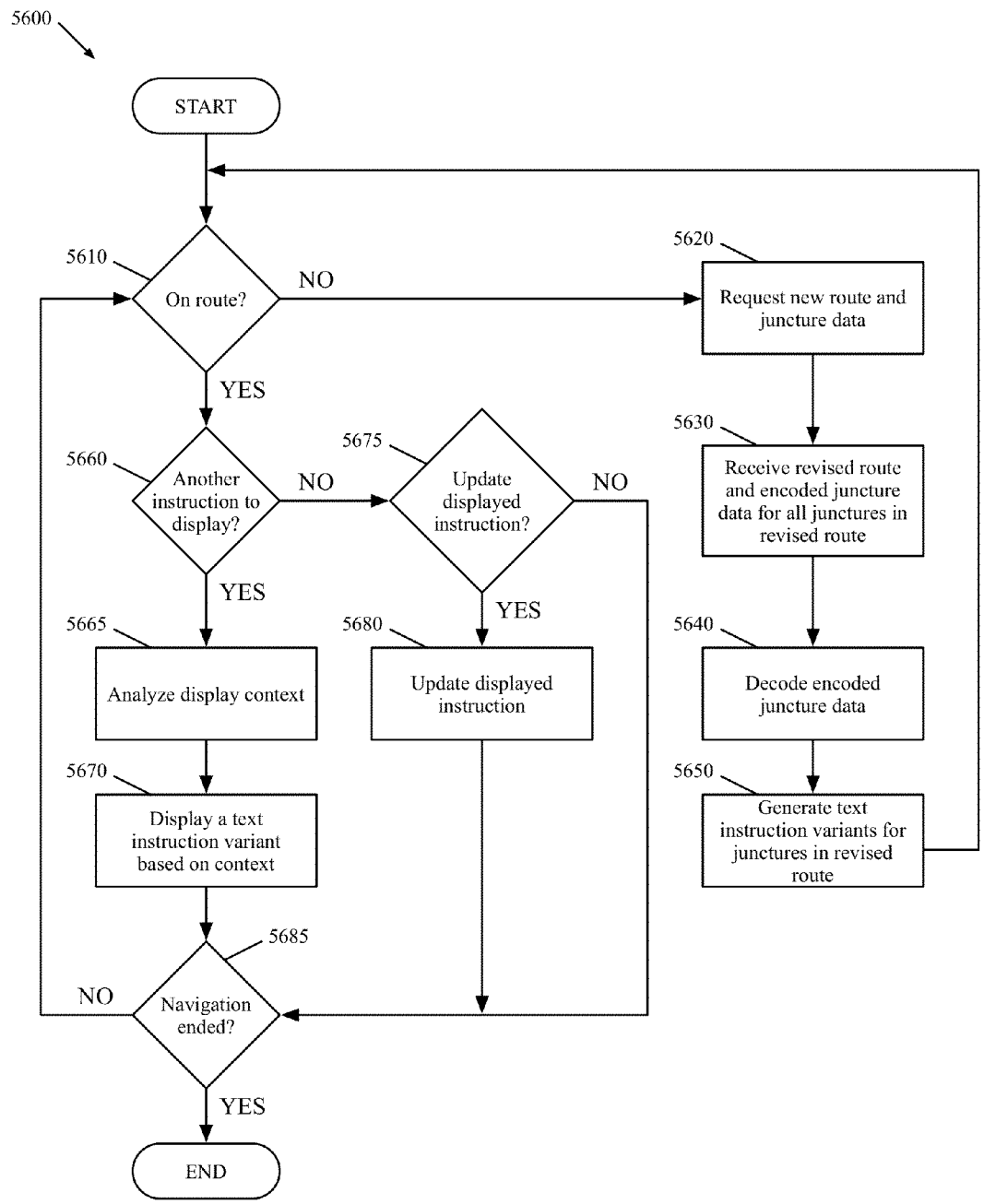
FIG. 56 conceptually illustrates a process of some embodiments that performs navigation over such a route.

In addition to the display of route instructions before actually following along a route, the text instructions are used in various contexts during turn-by-turn navigation. FIG. 56 conceptually illustrates a process 5600 of some embodiments that performs navigation over such a route. In some embodiments, the process 5600 is performed by a mapping application that operates on a device (e.g., a mobile device such as a smart phone or touchpad).

As shown, the process 5600 begins by determining (at 5610) whether the user is navigating the route. That is, the application determines whether the location of the user device (e.g., provided by the device's GPS capability or other location tracking mechanism) is along the path of the route, or has moved off of the route. When the user moves off of the route (e.g., because the user makes a different maneuver than those specified by the route, taking the location of the device off the route), the mapping application requires an update to the route and juncture data. Accordingly, if the device running the mapping application is no longer on route, the process requests (at 5620) new route and junction data from the mapping service server. The process then receives (at 5630) revised route and juncture data for all junctures along the route. In some embodiments, the juncture data is determined by the mapping service server for each juncture along the route. As described above, the juncture data may include the angles of the different branches of the juncture, normalized to the entry direction, along with an indication of the exit branch of the juncture. In some embodiments, the juncture data is retrieved by the server from a storage having a set of known junctures and angles (e.g., all the public roads in the United States). In some cases, the server generates juncture data from other sources (e.g., transportation agencies of states and municipalities, recent satellite photos illustrating new roads not previously stored, etc.). For route updates, some embodiments of the mapping service only generate and transmit new juncture information for the changes to the route, and reference the already-received data for junctures shared by the old and new routes.

Next, process 5600 decodes (at 5640) the encoded juncture data to arrive at juncture information for each maneuver along the revised route. This juncture data, in some embodiments, consists of geometry information that identifies the branches of the juncture and the angles at which those branches enter/exit the juncture. Along with the juncture information, some embodiments also include maneuver information that describes the maneuver being made (e.g., as a right turn, U-turn, freeway off ramp, etc.).

The process then generates (at 5650) text instruction variants for the junctures in the revised route. Text instruction variants are combinations of text strings derived from the decoded juncture and maneuver information. As discussed above in conjunction with FIGS. 52-54, examples of such text strings include "at the second intersection", "turn left", "onto $1^{st}$ St.", "towards Wolfe Rd.", and "for 0.3 miles". In some embodiments, the process 5500 combines the text strings into text instruction variants. As a first example of such a combination, process 5500 may combine "at the second intersection" and "turn left" to produce a short text instruction variant that reads, "At the second intersection, turn left." As a second example of such a combination, process 5500 may combine all of the previous text strings to produce a long text instruction variant that reads "At the second intersection, turn left onto $1^{st}$ St., towards Wolfe Rd. for 0.3 Miles." In some embodiments, process 5500 ranks the text instruction variants for each juncture based on the amount of information conveyed in each variant. In some embodiments, the text instruction variants are generated by the device using a process such as the process 5800 described below by reference to FIG. 58.

After generating the set of text instruction variants for the junctures in the revised route, the process returns to 5610 to again determine whether the user is navigating the new route. When the user device is still following the route, the process 5600 determines (at 5660) whether to display a new navigation instruction. When navigating a route, in some embodiments, each maneuver associated with a juncture is illustrated to the user as a sign (e.g., a green sign with an arrow and a textual instruction describing the maneuver at some level of detail) as the juncture approaches.

When a new navigation instruction is not required (e.g., because the maneuver indicated by the currently displayed instruction has not yet been performed), the process determines (at 5675) whether to update the currently displayed instruction. As shown in the previous subsection, in some embodiments the navigation sign includes an indicator of the distance remaining until the maneuver. In some embodiments, the mapping application regularly updates this distance indicator as the maneuver approaches (e.g., every mile, then every tenth of a mile, then every fifty feet, etc.). When a distance threshold has been reached such that the displayed instruction must be updated, the process 5600 updates (at 5680) the displayed instruction. In some embodiments, this entails updating the number and/or distance unit (e.g., switching from miles to feet for the last tenth of a mile). Some embodiments also provide an update to the distance remaining via the voice output feature of the device on which the process operates.

The process then proceeds to 5685 to determine whether navigation has ended. When navigation has ended, the process 5600 ends. The operations 5660, 5675, and 5685 effectively function together as a 'wait' state, in which the mapping application waits for an event requiring either the display of a new navigation instruction or an update to the displayed navigation instruction, or for the navigation to end (e.g., because the route's ending location is reached).

When an event occurs requiring the display of a new navigation instruction, the process analyzes (at 5665) the context for displaying the text instruction. In some embodiments, the context depends on several factors associated with clearly displaying the route maneuvers required for navigating the route. For example, the context may be based on the amount of space available to display the text instruction (e.g., due to the size of the device on which the route directions are displayed) or the conditions under which the indicator will be displayed (e.g., whether the maneuver is a current or future route maneuver, in which particular modality of the mapping application the sign will be displayed, etc.). Additional contextual factors may include whether the instruction is also being provided to the user via the voice guidance feature, the orientation of the device, and other factors in some embodiments.

After identifying the context for displaying the text instructions, the process 5600 displays (at 5670) a text instruction variant for the upcoming juncture based on the context. In some embodiments, the context for displaying a particular text instruction determines which text instruction variant is displayed. The text instruction variants, in some embodiments, come in different lengths for different contexts. In some embodiments, longer text instruction variants convey more information than shorter instruction variants. However, longer instruction variants may not fit into small banners or may cause wrapping effects across text lines. Some embodiments, for example, use longer text instruction variants for displaying the route instructions one maneuver at a time, and use shorter text instruction variants for displaying a list view of all of the instructions at once. Some embodiments set a character or size limit based on context, and select the text instruction variant that conveys the most information while still fitting into the display area allotted for the navigation instruction and maintaining the appropriate text size.

After displaying the new instructions, the process 5600 transitions to 5685 to determine whether the navigation has ended. In some embodiments, the navigation ends when the user stops the mapping application or when the destination is reached. If the navigation has ended, the process 5600 ends. Otherwise, the process 5600 transitions back to 5610 to determine whether the route navigation is still on the path, as described above.

Figure 57:
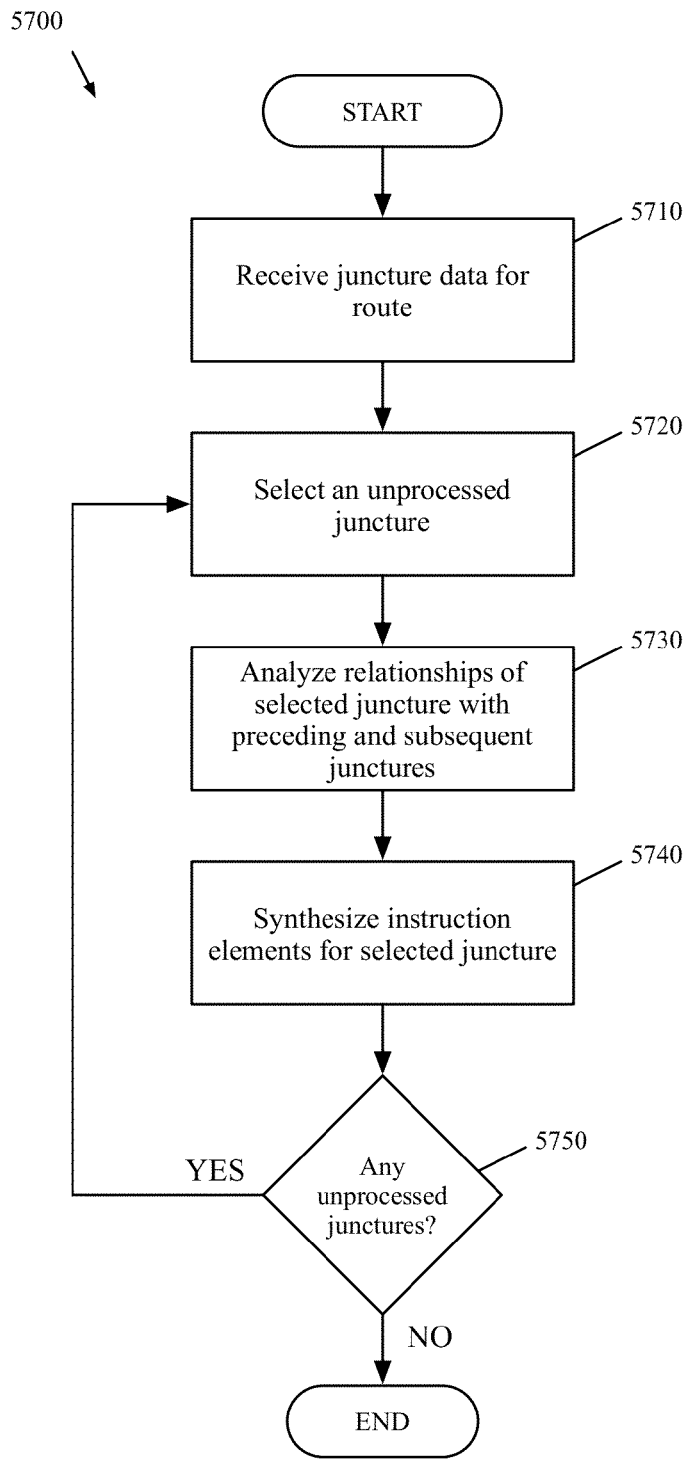
FIG. 57 conceptually illustrates a process of some embodiments for decoding encoded juncture data and synthesizing instruction elements from the route and juncture data received from a mapping service.

As discussed above, the mapping application of some embodiments decodes and synthesizes the received juncture data in order to arrive at the string data with which to generate the navigation instructions. FIG. 57 conceptually illustrates a process 5700 of some embodiments for decoding encoded juncture data and synthesizing instruction elements from the route and juncture data received from a mapping service. In some embodiments, the process 5700 is performed by a mapping application. The mapping application performs this process 5700, in some embodiments, at stage 5530 of the process 5500, after receiving juncture data for all junctures along a route.

As shown, the process 5700 begins by receiving (at 5710) encoded juncture data for all junctures in the route. In some embodiments, the process downloads the encoded juncture data from a mapping service server. In some embodiments, this encoding may simply involve identifying similar junctures and referencing these within the set of junctures rather than repeating the same juncture information twice, or may involve additional encoding. In addition, some embodiments receive route instruction information that indicates a type of maneuver to perform (e.g., "turn right", "keep left", etc.).

Next the process selects (at 5720) an unprocessed juncture. In some embodiments, the process selects the junctures in order from the start of the route to the end of the route, at each maneuver indicated by the route instructions. Once a juncture is selected, the process analyzes (at 5730) any relationships the selected juncture has with preceding or subsequent junctures, as well as specific aspects of the selected juncture. In some embodiments, such analysis can include determining distances between the preceding and subsequent junctures in the route, determining turn degree, identifying the primary maneuver to perform at the selected juncture, identifying the names of the roads at each branch of the juncture, identifying roads or other identifiers on the map that the route travels towards after the maneuver is performed at the selected juncture.

After analyzing the juncture relationships, the process synthesizes (at 5740) instruction elements for the selected juncture using the analyzed juncture data. The synthesized instruction elements are associated with the selected juncture. In some embodiments, synthesized instruction elements include a set of text strings. As discussed above by reference to FIG. 52, examples of such text strings include "at the end of the road", "turn right", "onto $1^{st}$ St.", "towards B St.", and "for 0.1 miles".

In some embodiments, each text string is associated with an element category. Examples of element categories include: "at" elements that define the location at which the main maneuver will occur, "turn" elements that summarize the primary maneuver to make at the selected juncture, "onto" elements that identify the object (i.e., road) onto which the main maneuver will turn, "towards" elements that identify the next object towards which the main maneuver will lead, and "for" elements that identify the distance between the selected juncture and the next juncture. However, other embodiments might use additional, fewer, or different element categories than those listed here.

Next, the process determines (at 5750) whether any junctures remain to be processed. When additional junctures remain for processing (i.e., for which elements have not yet been synthesized), the process 5700 returns to operation 5720 to select the next juncture. Once all of the junctures have been processed, the process 5700 ends.

The output of the process 5700 is a set of instruction elements for each juncture of a route received from the mapping service server. In some embodiments, the mapping application on the client device then uses these synthesized instruction elements to generate several text navigation instruction variants for each juncture.

Figure 58:
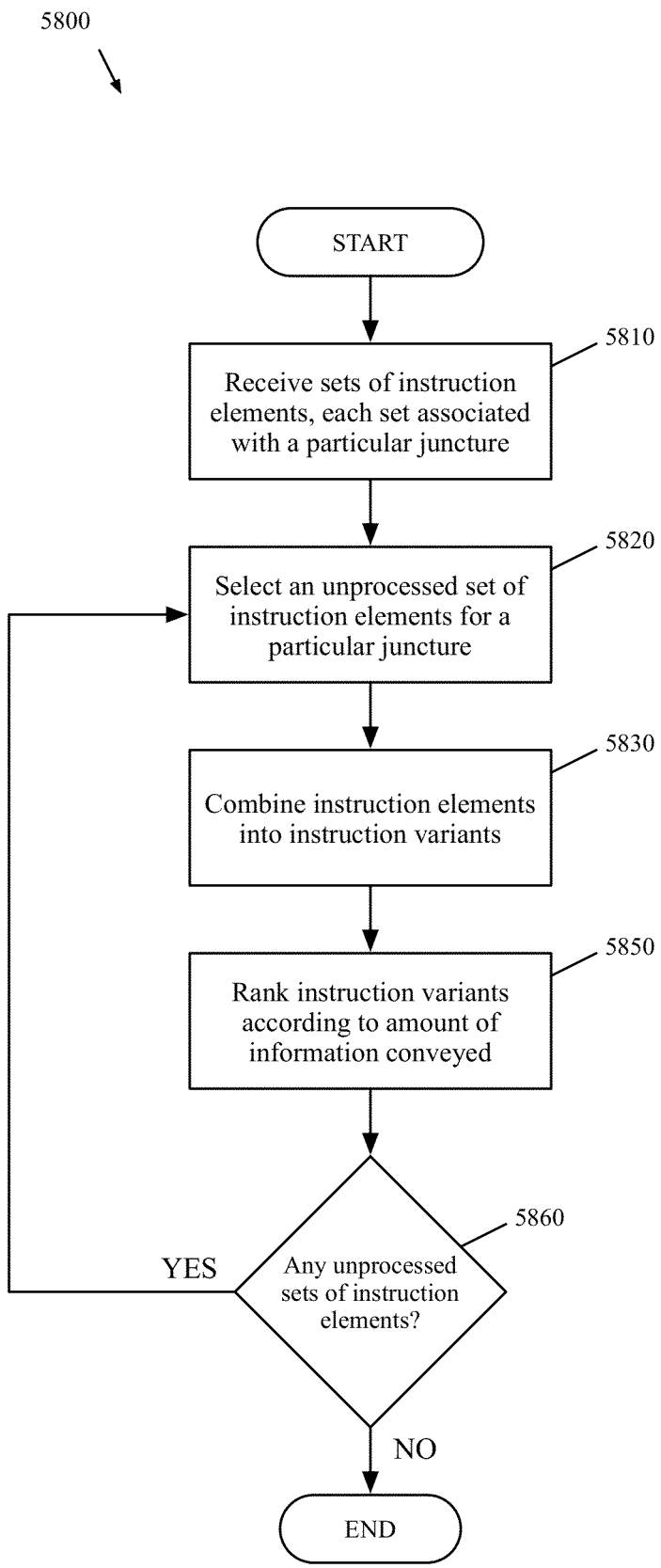
FIG. 58 conceptually illustrates a process of some embodiments for generating navigation instruction variants for display in different contexts.

FIG. 58 conceptually illustrates a process 5800 of some embodiments for generating navigation instruction variants for display in different contexts. In some embodiments, the process 5800 is performed by a mapping application that operates on a device (e.g., a mobile device such as a smart phone or touchpad). In some embodiments, the mapping application performs the processes 5700 and 5800 in succession (i.e., synthesizing the elements for each juncture and then using the elements to generate instruction text).

As shown, the process 5800 begins by receiving (at 5810) sets of instruction elements that are each associated with a particular juncture. As discussed above by reference to FIG. 57, in some embodiments the sets of instruction elements include text strings associated with element categories (i.e., "at", "turn", "onto", "towards", and "for" categories).

Next, the process 5800 selects (at 5820) an unprocessed set of instruction elements for a particular juncture of the route. While the processes 5700 and 5800 illustrate the mapping application first synthesizing the elements for each juncture and then subsequently generating the instruction text, in some embodiments the mapping application performs all of the operations in a single loop over each juncture. That is, the mapping application of some embodiments selects a juncture, synthesizes its elements, then generates the instruction text variants before moving on to the next juncture.

For the selected set of instruction elements, the process 5800 combines (at 5830) the instruction elements of the set into instruction variants. As a first example of such a combination, the process 5800 may combine "at the end of the road" and "turn right" to produce a shorter text instruction variant that reads, "At the end of the road, turn right." As a second example of such a combination, process 5800 may combine all of the previous text strings to produce a longer text instruction variant that reads "At the end of the road, turn right onto 1$^{st}$ St., towards B St. for 0.1 Miles." Some embodiments generate the same combinations of elements for each juncture. For example, in some embodiments the application generates a first instruction text variant for each juncture from all of the elements, a second instruction text variant from only the "turn" and "onto" elements, a third instruction text variant from the "turn", "onto", and "towards" elements, etc. Other embodiments take into account other factors to generate different instruction text variants from the synthesized elements.

After generating the instruction text variants for a selected juncture, the process 5800 ranks (at 5850) the instruction variants according to the amount of information conveyed in each variant. In some embodiments, the application uses length (e.g., number of characters) as a proxy for information conveyed. Other embodiments prefer specific combinations of elements over other combinations of elements, even if this methodology results in ranking a slightly shorter variant ahead of a longer variant. Some embodiments, for example, use specific combinations of elements for each juncture, with each specific combination having the same ranking for each juncture.

The process 5800 then determines (5860) whether any unprocessed sets of instruction elements remain (i.e., whether instructions have been generated for all of the junctures of the route). When additional unprocessed sets of instruction elements remain, the process 5800 returns to operation 5820 to select the next set of instruction elements. Otherwise, once all of the junctures have had their instructions generated, the process 5800 ends.

C. Navigation Instruction Software Architecture

Figure 59:
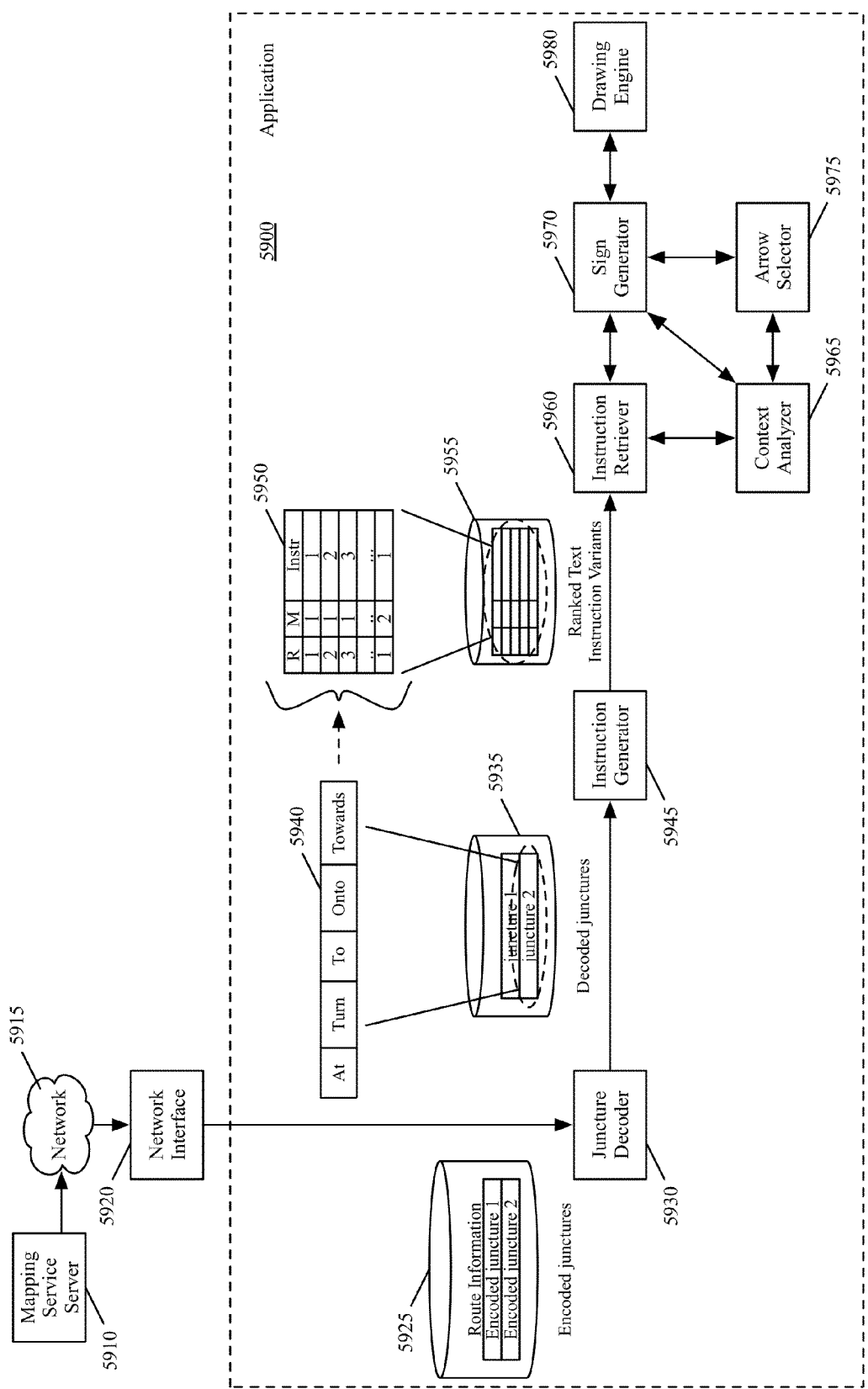
FIG. 59 conceptually illustrates a system architecture that includes mapping and navigation application of some embodiments that generates text instructions for different contexts.

As stated above, in some embodiments the maps, routes, and turn-by-turn navigation are presented to a user by a navigation application that operates on a device (e.g., a handheld device such as a smart phone or tablet). The navigation application may be a stand-alone application in some embodiments, or integrated with the operating system of the device. FIG. 59 conceptually illustrates a system architecture that includes a mapping and navigation application 5900 of some embodiments that generates text instructions for different contexts. One of ordinary skill in the art will recognize that the modules shown for the application 5900 are specific to the text instruction generation processes, and that the mapping and navigation application of some embodiments will include numerous additional modules (e.g., for map display, route display, additional aspects of navigation, etc.).

As shown, a mapping service server 5910 transmits route and juncture data through a network 5915 to a network interface 5920 of the device on which the mapping and navigation application 5900 operates. In some embodiments, the mapping service server 5910 receives a route request from devices on which the navigation application 5900 operates and generates route and juncture data for the requests.

The navigation application 5900 includes a juncture decoder 5930, an instruction generator 5945, an instruction retriever 5960, a context analyzer 5965, a sign generator 5970, an arrow selector 5975, and a drawing engine 5980. The juncture decoder 5930 receives encoded juncture information 5925 for a route, decodes this information to arrive at information describing each juncture and the maneuvers performed at the junctures, and synthesizes a set of instruction elements for each juncture in the route. In some embodiments, the juncture decoder 5930 executes the process 5700 of FIG. 57, described above. The juncture decoder 5930 decodes encoded junctures 5925 to generate decoded juncture data 5935.

In some embodiments, encoded junctures 5925 and decoded junctures 5935 may be stored on the device in random access memory or other volatile storage, for use only during the navigation of the route, or in a more permanent storage such as a hard disk or solid-state memory. As shown by example table 5940, some embodiments store a set of text string elements for each juncture, e.g., in a table, array, or similar data structure. FIG. 52, described above, illustrates an example of such a table stored for a particular set of junctures.

The instruction generator 5945 generates ranked text instruction variants 5955 for display on a device based on the synthesized instruction elements 5935 received from the juncture decoder 5930. In some embodiments, the instruction generator 5945 executes the process 5800 of FIG. 58, described above. In some embodiments, the ranked text instruction variants 5955 may be stored on the device in random access memory or other volatile storage, for use only during the navigation of the route, or in a more permanent storage such as a hard disk or solid-state memory. FIG. 52, described above, also illustrates an example of ranked instruction variants 5955 generated by the instruction generator 5945. The example table 5950 illustrates the results of synthesizing the elements 5940 into several text instruction variants for use in different contexts of the navigation displays.

The instruction retriever 5960 uses a context analyzer 5965 to determine which of the instruction variants to select for a particular display of a maneuver, depending on the context in which the text instruction will be displayed. These contexts may include different situations for routing directions or different situations for turn-by-turn navigation instructions (e.g., standard mode, lock-screen mode, when a different application is open, when voice navigation is activated, etc.). In some embodiments, the context depends on several factors associated with clearly displaying the route maneuvers required for navigating the route. For example, the context may be based on the amount of space available to display the text instruction (e.g., due to the size of the device on which the route directions are displayed), the conditions under which the indicator will be displayed (e.g., whether the maneuver is a current or future route maneuver, in which particular modality of the navigation application the sign will be displayed, etc.), or other factors. Many such contexts are shown above in subsection A of this Section. The instruction retriever 5960 selects an instruction variant to use for a particular maneuver display and provides this information to the sign generator 5970.

The arrow selector 5975 also uses the context analyzer 5965 to determine which of the directional indicators to use for a particular maneuver, depending on the context in which the indicator will be displayed. The arrow selector chooses one of the graphical indicators described in the previous section (e.g., either a complex or simple representation of a maneuver) and provides this selection to the sign generator 5970. The sign generator 5970 generates a navigation instruction sign for display that includes the selected graphical indicator and instruction text variant. The sign generator 5970 also uses the context analyzer results to generate other aspects of the sign, such as how often to update the distance information and whether to use road sign shields in place of road names.

The drawing engine 5980 receives the generated signs from the sign generator 5970 and incorporates the sign into a display to output to a display device (or to a frame buffer that feeds into the display device). In some embodiments, the drawing engine 5980 incorporates the sign along with a 2D map, 3D map, or other GUI elements shown by the mapping and navigation application.

V. Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

A. Mobile Device

Figure 60:
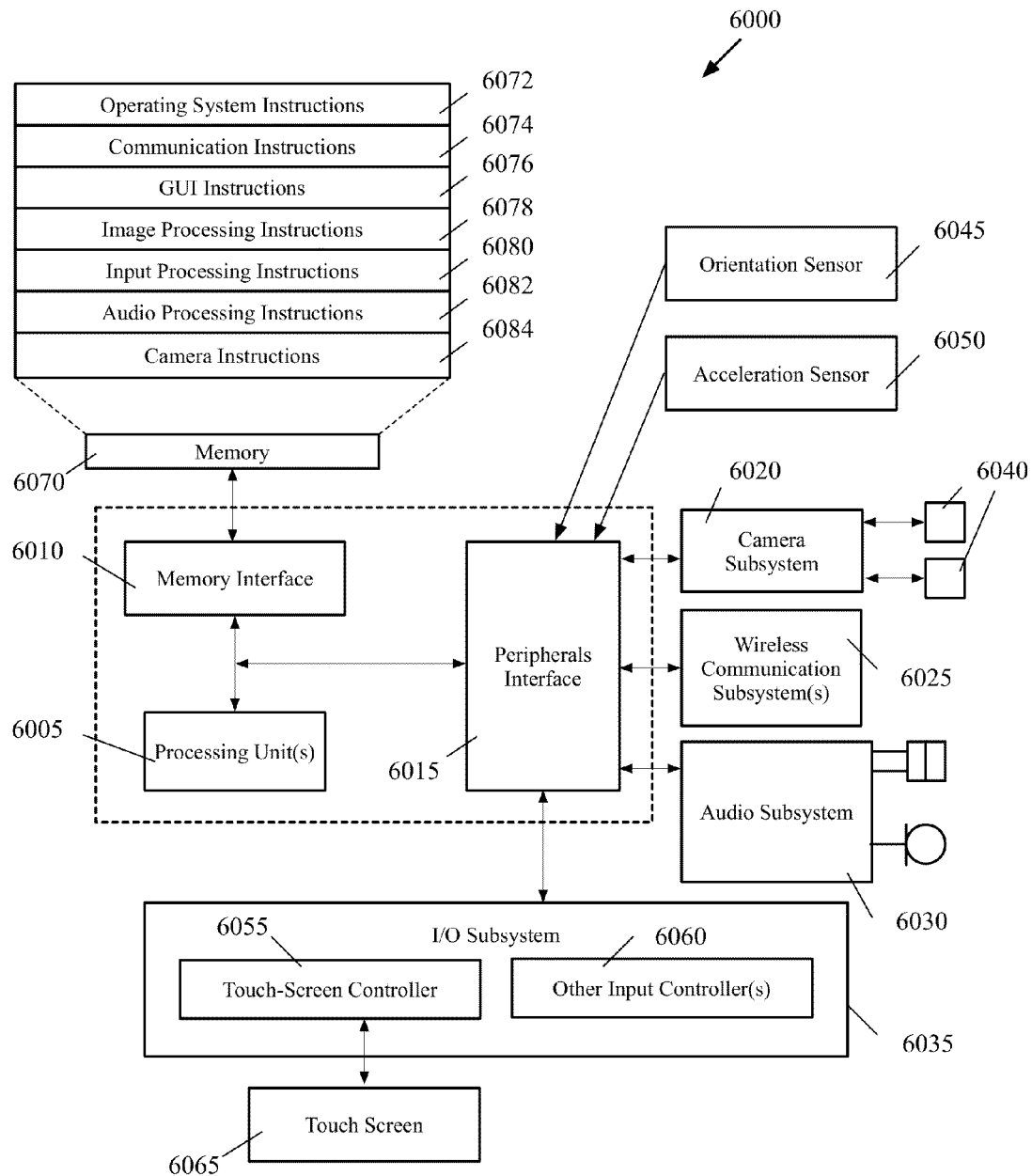
FIG. 60 is an example of an architecture of a mobile computing device of some embodiments.

The mapping and navigation applications of some embodiments operate on mobile devices, such as smart phones (e.g., iPhones®) and tablets (e.g., iPads®). FIG. 60 is an example of an architecture 6000 of such a mobile computing device. Examples of mobile computing devices include smartphones, tablets, laptops, etc. As shown, the mobile computing device 6000 includes one or more processing units 6005, a memory interface 6010 and a peripherals interface 6015.

The peripherals interface 6015 is coupled to various sensors and subsystems, including a camera subsystem 6020, a wireless communication subsystem(s) 6025, an audio subsystem 6030, an I/O subsystem 6035, etc. The peripherals interface 6015 enables communication between the processing units 6005 and various peripherals. For example, an orientation sensor 6045 (e.g., a gyroscope) and an acceleration sensor 6050 (e.g., an accelerometer) is coupled to the peripherals interface 6015 to facilitate orientation and acceleration functions.

The camera subsystem 6020 is coupled to one or more optical sensors 6040 (e.g., a charged coupled device (CCD) optical sensor, a complementary metal-oxide-semiconductor (CMOS) optical sensor, etc.). The camera subsystem 6020 coupled with the optical sensors 6040 facilitates camera functions, such as image and/or video data capturing. The wireless communication subsystem 6025 serves to facilitate communication functions. In some embodiments, the wireless communication subsystem 6025 includes radio frequency receivers and transmitters, and optical receivers and transmitters (not shown in FIG. 60). These receivers and transmitters of some embodiments are implemented to operate over one or more communication networks such as a GSM network, a Wi-Fi network, a Bluetooth network, etc. The audio subsystem 6030 is coupled to a speaker to output audio (e.g., to output voice navigation instructions). Additionally, the audio subsystem 6030 is coupled to a microphone to facilitate voice-enabled functions, such as voice recognition (e.g., for searching), digital recording, etc.

The I/O subsystem 6035 involves the transfer between input/output peripheral devices, such as a display, a touch screen, etc., and the data bus of the processing units 6005 through the peripherals interface 6015. The I/O subsystem 6035 includes a touch-screen controller 6055 and other input controllers 6060 to facilitate the transfer between input/output peripheral devices and the data bus of the processing units 6005. As shown, the touch-screen controller 6055 is coupled to a touch screen 6065. The touch-screen controller 6055 detects contact and movement on the touch screen 6065 using any of multiple touch sensitivity technologies. The other input controllers 6060 are coupled to other input/control devices, such as one or more buttons. Some embodiments include a near-touch sensitive screen and a corresponding controller that can detect near-touch interactions instead of or in addition to touch interactions.

The memory interface 6010 is coupled to memory 6070. In some embodiments, the memory 6070 includes volatile memory (e.g., high-speed random access memory), non-volatile memory (e.g., flash memory), a combination of volatile and non-volatile memory, and/or any other type of memory. As illustrated in FIG. 60, the memory 6070 stores an operating system (OS) 6072. The OS 6072 includes instructions for handling basic system services and for performing hardware dependent tasks.

The memory 6070 also includes communication instructions 6074 to facilitate communicating with one or more additional devices; graphical user interface instructions 6076 to facilitate graphic user interface processing; image processing instructions 6078 to facilitate image-related processing and functions; input processing instructions 6080 to facilitate input-related (e.g., touch input) processes and functions; audio processing instructions 6082 to facilitate audio-related processes and functions; and camera instructions 6084 to facilitate camera-related processes and functions. The instructions described above are merely exemplary and the memory 6070 includes additional and/or other instructions in some embodiments. For instance, the memory for a smartphone may include phone instructions to facilitate phone-related processes and functions. Additionally, the memory may include instructions for a mapping and navigation application as well as other applications. The above-identified instructions need not be implemented as separate software programs or modules. Various functions of the mobile computing device can be implemented in hardware and/or in software, including in one or more signal processing and/or application specific integrated circuits.

While the components illustrated in FIG. 60 are shown as separate components, one of ordinary skill in the art will recognize that two or more components may be integrated into one or more integrated circuits. In addition, two or more components may be coupled together by one or more communication buses or signal lines. Also, while many of the functions have been described as being performed by one component, one of ordinary skill in the art will realize that the functions described with respect to FIG. 60 may be split into two or more integrated circuits.

B. Computer System

Figure 61:
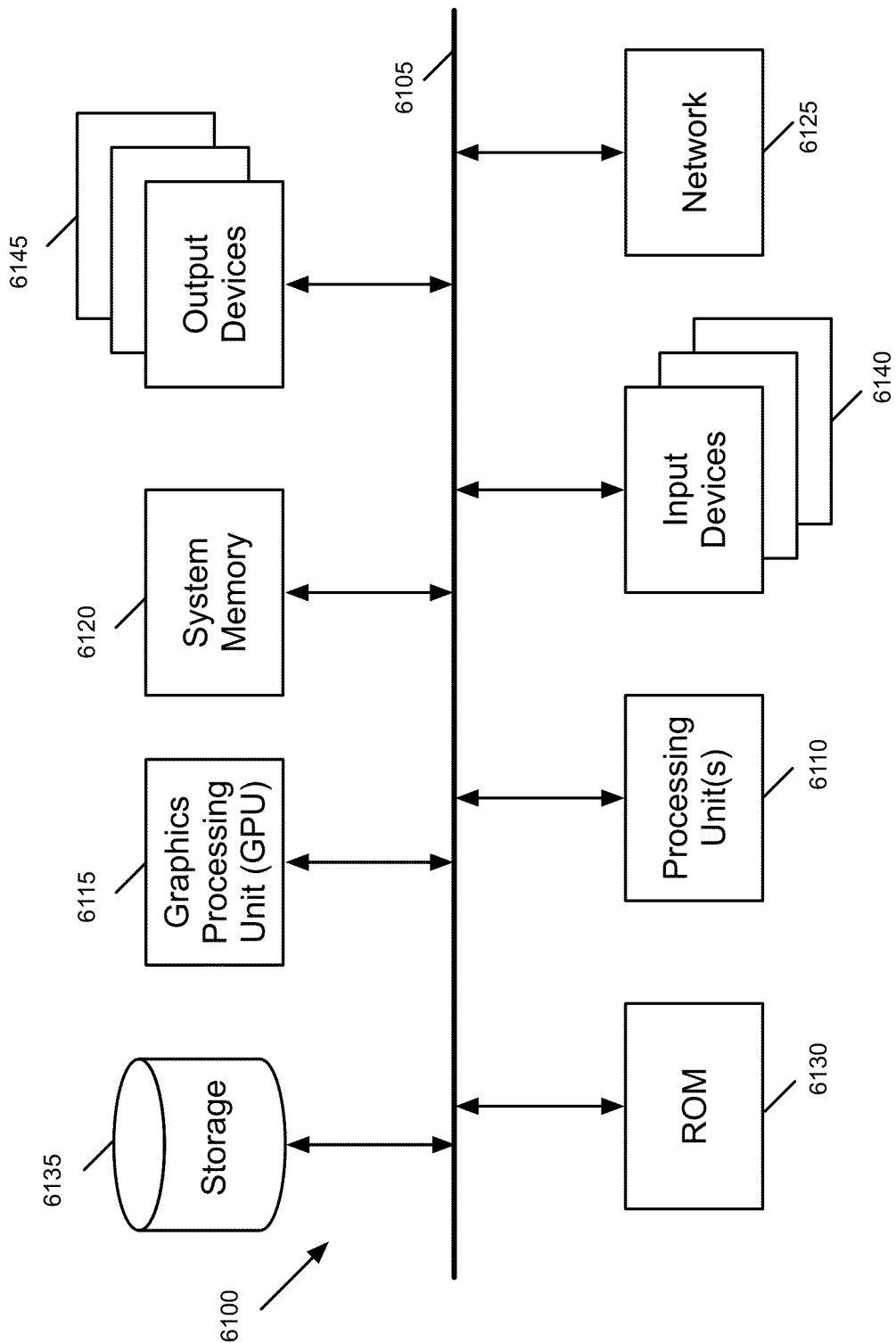
FIG. 61 conceptually illustrates an example of an electronic system with which some embodiments of the invention are implemented.

FIG. 61 conceptually illustrates another example of an electronic system 6100 with which some embodiments of the invention are implemented. The electronic system 6100 may be a computer (e.g., a desktop computer, personal computer, tablet computer, etc.), phone, PDA, or any other sort of electronic or computing device. Such an electronic system includes various types of computer readable media and interfaces for various other types of computer readable media. Electronic system 6100 includes a bus 6105, processing unit(s) 6110, a graphics processing unit (GPU) 6115, a system memory 6120, a network 6125, a read-only memory 6130, a permanent storage device 6135, input devices 6140, and output devices 6145.

The bus 6105 collectively represents all system, peripheral, and chipset buses that communicatively connect the numerous internal devices of the electronic system 6100. For instance, the bus 6105 communicatively connects the processing unit(s) 6110 with the read-only memory 6130, the GPU 6115, the system memory 6120, and the permanent storage device 6135.

From these various memory units, the processing unit(s) 6110 retrieves instructions to execute and data to process in order to execute the processes of the invention. The processing unit(s) may be a single processor or a multi-core processor in different embodiments. Some instructions are passed to and executed by the GPU 6115. The GPU 6115 can offload various computations or complement the image processing provided by the processing unit(s) 6110. In some embodiments, such functionality can be provided using CoreImage's kernel shading language.

The read-only-memory (ROM) 6130 stores static data and instructions that are needed by the processing unit(s) 6110 and other modules of the electronic system. The permanent storage device 6135, on the other hand, is a read-and-write memory device. This device is a non-volatile memory unit that stores instructions and data even when the electronic system 6100 is off. Some embodiments of the invention use a mass-storage device (such as a magnetic or optical disk and its corresponding disk drive, integrated flash memory) as the permanent storage device 6135.

Other embodiments use a removable storage device (such as a floppy disk, flash memory device, etc., and its corresponding drive) as the permanent storage device Like the permanent storage device 6135, the system memory 6120 is a read-and-write memory device. However, unlike storage device 6135, the system memory 6120 is a volatile read-and-write memory, such a random access memory. The system memory 6120 stores some of the instructions and data that the processor needs at runtime. In some embodiments, the invention's processes are stored in the system memory 6120, the permanent storage device 6135, and/or the read-only memory 6130. For example, the various memory units include instructions for processing multimedia clips in accordance with some embodiments. From these various memory units, the processing unit(s) 6110 retrieves instructions to execute and data to process in order to execute the processes of some embodiments.

The bus 6105 also connects to the input and output devices 6140 and 6145. The input devices 6140 enable the user to communicate information and select commands to the electronic system. The input devices 6140 include alphanumeric keyboards and pointing devices (also called "cursor control devices"), cameras (e.g., webcams), microphones or similar devices for receiving voice commands, etc. The output devices 6145 display images generated by the electronic system or otherwise output data. The output devices 6145 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 61, bus 6105 also couples electronic system 6100 to a network 6125 through a network adapter (not shown). In this manner, the computer can be a part of a network of computers (such as a local area network ("LAN"), a wide area network ("WAN"), or an Intranet), or a network of networks, such as the Internet. Any or all components of electronic system 6100 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

VI. Map Service Environment

Figure 62:
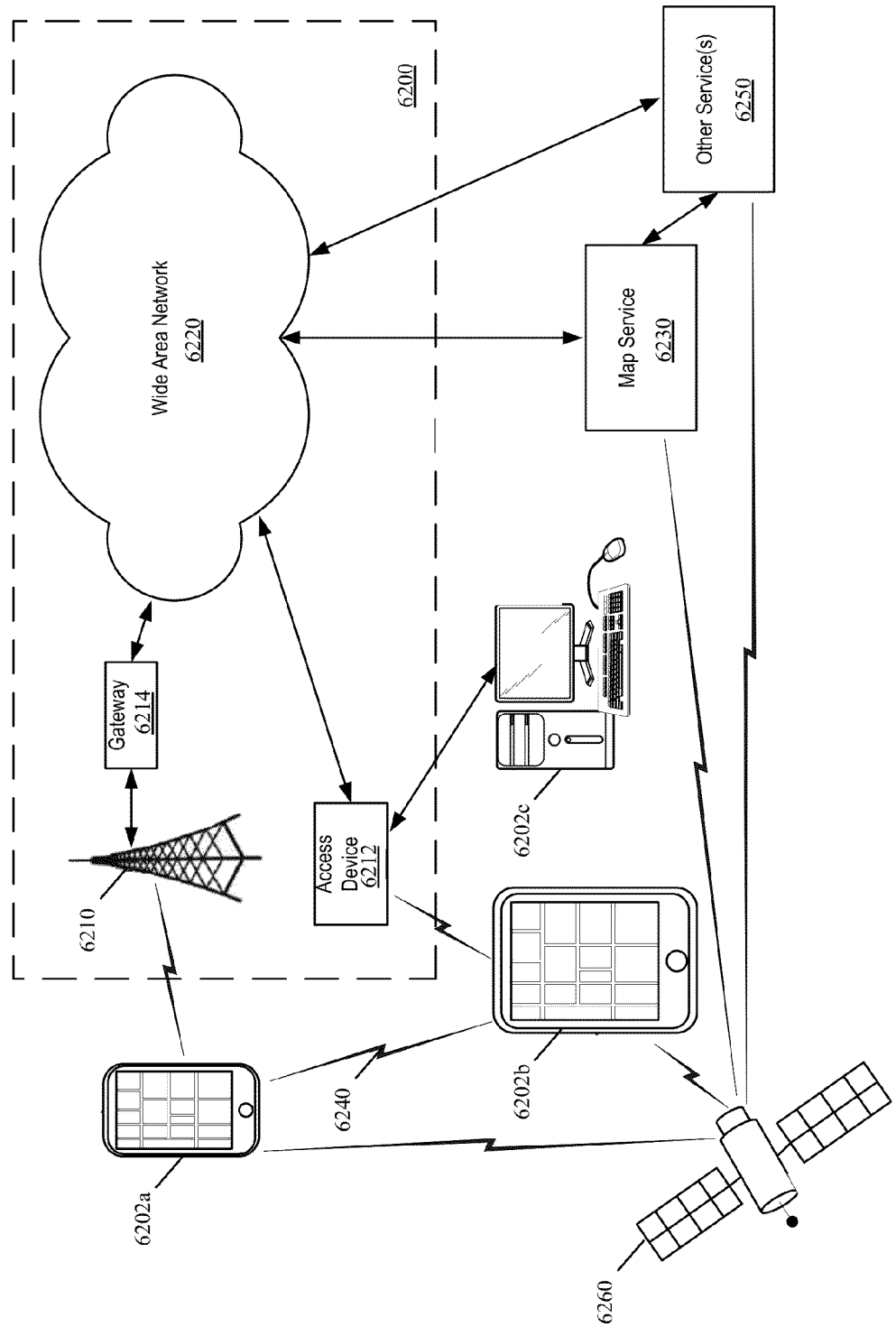
FIG. 62 illustrates a map service operating environment, according to some embodiments.

Various embodiments may operate within a map service operating environment. FIG. 62 illustrates a map service operating environment, according to some embodiments. A map service 6230 (also referred to as mapping service) may provide map services for one or more client devices 6202a-6202c in communication with the map service 6230 through various communication methods and protocols. A map service 6230 in some embodiments provides map information and other map-related data, such as two-dimensional map image data (e.g., aerial view of roads utilizing satellite imagery), three-dimensional map image data (e.g., traversable map with three-dimensional features, such as buildings), route and direction calculations (e.g., ferry route calculations or directions between two points for a pedestrian), real-time navigation data (e.g., turn-by-turn visual navigation data in two or three dimensions), location data (e.g., where the client device is currently located), and other geographic data (e.g., wireless network coverage, weather, traffic information, or nearby points-of-interest). In various embodiments, the map service data may include localized labels for different countries or regions. Localized labels may be utilized to present map labels (e.g., street names, city names, points of interest) in different languages on client devices. Client devices 6202a-6202c may utilize these map services by obtaining map service data. Client devices 6202a-6202c may implement various techniques to process map service data. Client devices 6202a-6202c may then provide map services to various entities, including, but not limited to, users, internal software or hardware modules, and/or other systems or devices external to the client devices 6202a-6202c.

In some embodiments, a map service is implemented by one or more nodes in a distributed computing system. Each node may be assigned one or more services or components of a map service. Some nodes may be assigned the same map service or component of a map service. A load balancing node in some embodiments distributes access or requests to other nodes within a map service. In some embodiments a map service is implemented as a single system, such as a single server. Different modules or hardware devices within a server may implement one or more of the various services provided by a map service.

A map service in some embodiments provides map services by generating map service data in various formats. In some embodiments, one format of map service data is map image data. Map image data provides image data to a client device so that the client device may process the image data (e.g., rendering and/or displaying the image data as a two-dimensional or three-dimensional map). Map image data, whether in two or three dimensions, may specify one or more map tiles. A map tile may be a portion of a larger map image. Assembling together the map tiles of a map produces the original map. Tiles may be generated from map image data, routing or navigation data, or any other map service data. In some embodiments map tiles are raster-based map tiles, with tile sizes ranging from any size both larger and smaller than a commonly-used 256 pixel by 256 pixel tile. Raster-based map tiles may be encoded in any number of standard digital image representations including, but not limited to, Bitmap (.bmp), Graphics Interchange Format (.gif), Joint Photographic Experts Group (.jpg, .jpeg, etc.), Portable Networks Graphic (.png), or Tagged Image File Format (.tiff). In some embodiments, map tiles are vector-based map tiles, encoded using vector graphics, including, but not limited to, Scalable Vector Graphics (.svg) or a Drawing File (.drw). Some embodiments also include tiles with a combination of vector and raster data. Metadata or other information pertaining to the map tile may also be included within or along with a map tile, providing further map service data to a client device. In various embodiments, a map tile is encoded for transport utilizing various standards and/or protocols, some of which are described in examples below.

In various embodiments, map tiles may be constructed from image data of different resolutions depending on zoom level. For instance, for low zoom level (e.g., world or globe view), the resolution of map or image data need not be as high relative to the resolution at a high zoom level (e.g., city or street level). For example, when in a globe view, there may be no need to render street level artifacts as such objects would be so small as to be negligible in many cases.

A map service in some embodiments performs various techniques to analyze a map tile before encoding the tile for transport. This analysis may optimize map service performance for both client devices and a map service. In some embodiments map tiles are analyzed for complexity, according to vector-based graphic techniques, and constructed utilizing complex and non-complex layers. Map tiles may also be analyzed for common image data or patterns that may be rendered as image textures and constructed by relying on image masks. In some embodiments, raster-based image data in a map tile contains certain mask values, which are associated with one or more textures. Some embodiments also analyze map tiles for specified features that may be associated with certain map styles that contain style identifiers.

Other map services generate map service data relying upon various data formats separate from a map tile in some embodiments. For instance, map services that provide location data may utilize data formats conforming to location service protocols, such as, but not limited to, Radio Resource Location services Protocol (RRLP), TIA 801 for Code Division Multiple Access (CDMA), Radio Resource Control (RRC) position protocol, or LTE Positioning Protocol (LPP). Embodiments may also receive or request data from client devices identifying device capabilities or attributes (e.g., hardware specifications or operating system version) or communication capabilities (e.g., device communication bandwidth as determined by wireless signal strength or wire or wireless network type).

A map service may obtain map service data from internal or external sources. For example, satellite imagery used in map image data may be obtained from external services, or internal systems, storage devices, or nodes. Other examples may include, but are not limited to, GPS assistance servers, wireless network coverage databases, business or personal directories, weather data, government information (e.g., construction updates or road name changes), or traffic reports. Some embodiments of a map service may update map service data (e.g., wireless network coverage) for analyzing future requests from client devices.

Various embodiments of a map service may respond to client device requests for map services. These requests may be for a specific maps or portions of a map. Some embodiments format requests for a map as requests for certain map tiles. In some embodiments, requests also supply the map service with starting locations (or current locations) and destination locations for a route calculation. A client device may also request map service rendering information, such as map textures or style sheets. In at least some embodiments, requests are also one of a series of requests implementing turn-by-turn navigation. Requests for other geographic data may include, but are not limited to, requests for current location, wireless network coverage, weather, traffic information, or nearby points-of-interest.

A map service, in some embodiments, analyzes client device requests to optimize a device or map service operation. For instance, a map service may recognize that the location of a client device is in an area of poor communications (e.g., weak wireless signal) and send more map service data to supply a client device in the event of loss in communication or send instructions to utilize different client hardware (e.g., orientation sensors) or software (e.g., utilize wireless location services or Wi-Fi positioning instead of GPS-based services). In another example, a map service may analyze a client device request for vector-based map image data and determine that raster-based map data better optimizes the map image data according to the image's complexity. Embodiments of other map services may perform similar analysis on client device requests and, as such, the above examples are not intended to be limiting.

Various embodiments of client devices (e.g., client devices 6202a-6202c) are implemented on different portable-multifunction device types. Client devices 6202a-6202c utilize map service 6230 through various communication methods and protocols. In some embodiments, client devices 6202a-6202c obtain map service data from map service 6230. Client devices 6202a-6202c request or receive map service data. Client devices 6202a-6202c then process map service data (e.g., render and/or display the data) and may send the data to another software or hardware module on the device or to an external device or system.

A client device, according to some embodiments, implements techniques to render and/or display maps. These maps may be requested or received in various formats, such as map tiles described above. A client device may render a map in two-dimensional or three-dimensional views. Some embodiments of a client device display a rendered map and allow a user, system, or device providing input to manipulate a virtual camera in the map, changing the map display according to the virtual camera's position, orientation, and field-of-view. Various forms and input devices are implemented to manipulate a virtual camera. In some embodiments, touch input, through certain single or combination gestures (e.g., touch-and-hold or a swipe) manipulate the virtual camera. Other embodiments allow manipulation of the device's physical location to manipulate a virtual camera. For instance, a client device may be tilted up from its current position to manipulate the virtual camera to rotate up. In another example, a client device may be tilted forward from its current position to move the virtual camera forward. Other input devices to the client device may be implemented including, but not limited to, auditory input (e.g., spoken words), a physical keyboard, mouse, and/or a joystick.

Some embodiments provide various visual feedback to virtual camera manipulations, such as displaying an animation of possible virtual camera manipulations when transitioning from two-dimensional map views to three-dimensional map views. Some embodiments also allow input to select a map feature or object (e.g., a building) and highlight the object, producing a blur effect that maintains the virtual camera's perception of three-dimensional space.

In some embodiments, a client device implements a navigation system (e.g., turn-by-turn navigation). A navigation system provides directions or route information, which may be displayed to a user. Some embodiments of a client device request directions or a route calculation from a map service. A client device may receive map image data and route data from a map service. In some embodiments, a client device implements a turn-by-turn navigation system, which provides real-time route and direction information based upon location information and route information received from a map service and/or other location system, such as a Global Positioning Satellite (GPS). A client device may display map image data that reflects the current location of the client device and update the map image data in real-time. A navigation system may provide auditory or visual directions to follow a certain route.

A virtual camera is implemented to manipulate navigation map data according to some embodiments. In some embodiments, the client devices allow the device to adjust the virtual camera display orientation to bias toward the route destination. Some embodiments also allow the virtual camera to navigate turns by simulating the inertial motion of the virtual camera.

Client devices implement various techniques to utilize map service data from map service. Some embodiments implement some techniques to optimize rendering of two-dimensional and three-dimensional map image data. In some embodiments, a client device locally stores rendering information. For instance, a client stores a style sheet, which provides rendering directions for image data containing style identifiers. In another example, common image textures may be stored to decrease the amount of map image data transferred from a map service. Client devices in different embodiments implement various modeling techniques to render two-dimensional and three-dimensional map image data, examples of which include, but are not limited to: generating three-dimensional buildings out of two-dimensional building footprint data; modeling two-dimensional and three-dimensional map objects to determine the client device communication environment; generating models to determine whether map labels are seen from a certain virtual camera position; and generating models to smooth transitions between map image data. In some embodiments, the client devices also order or prioritize map service data in certain techniques. For instance, a client device detects the motion or velocity of a virtual camera, which if exceeding certain threshold values, lower-detail image data is loaded and rendered for certain areas. Other examples include: rendering vector-based curves as a series of points, preloading map image data for areas of poor communication with a map service, adapting textures based on display zoom level, or rendering map image data according to complexity.

In some embodiments, client devices communicate utilizing various data formats separate from a map tile. For instance, some client devices implement Assisted Global Positioning Satellites (A-GPS) and communicate with location services that utilize data formats conforming to location service protocols, such as, but not limited to, Radio Resource Location services Protocol (RRLP), TIA 801 for Code Division Multiple Access (CDMA), Radio Resource Control (RRC) position protocol, or LTE Positioning Protocol (LPP). Client devices may also receive GPS signals directly. Embodiments may also send data, with or without solicitation from a map service, identifying the client device's capabilities or attributes (e.g., hardware specifications or operating system version) or communication capabilities (e.g., device communication bandwidth as determined by wireless signal strength or wire or wireless network type).

FIG. 62 illustrates one possible embodiment of an operating environment 6200 for a map service 6230 and client devices 6202a-6202c. In some embodiments, devices 6202a, 6202b, and 6202c communicate over one or more wire or wireless networks 6210. For example, wireless network 6210, such as a cellular network, can communicate with a wide area network (WAN) 6220, such as the Internet, by use of gateway 6214. A gateway 6214 in some embodiments provides a packet oriented mobile data service, such as General Packet Radio Service (GPRS), or other mobile data service allowing wireless networks to transmit data to other networks, such as wide area network 6220. Likewise, access device 6212 (e.g., IEEE 802.11g wireless access device) provides communication access to WAN 6220. Devices 6202a and 6202b can be any portable electronic or computing device capable of communicating with a map service. Device 6202c can be any non-portable electronic or computing device capable of communicating with a map service.

In some embodiments, both voice and data communications are established over wireless network 6210 and access device 6212. For instance, device 6202a can place and receive phone calls (e.g., using voice over Internet Protocol (VoIP) protocols), send and receive e-mail messages (e.g., using Simple Mail Transfer Protocol (SMTP) or Post Office Protocol 3 (POP3)), and retrieve electronic documents and/or streams, such as web pages, photographs, and videos, over wireless network 6210, gateway 6214, and WAN 6220 (e.g., using Transmission Control Protocol/Internet Protocol (TCP/IP) or User Datagram Protocol (UDP)). Likewise, in some implementations, devices 6202b and 6202c can place and receive phone calls, send and receive e-mail messages, and retrieve electronic documents over access device 6212 and WAN 6220. In various embodiments, any of the illustrated client devices may communicate with map service 6230 and/or other service(s) 6250 using a persistent connection established in accordance with one or more security protocols, such as the Secure Sockets Layer (SSL) protocol or the Transport Layer Security (TLS) protocol.

Devices 6202a and 6202b can also establish communications by other means. For example, wireless device 6202a can communicate with other wireless devices (e.g., other devices 6202b, cell phones, etc.) over the wireless network 6210. Likewise devices 6202a and 6202b can establish peer-to-peer communications 6240 (e.g., a personal area network) by use of one or more communication subsystems, such as Bluetooth® communication from Bluetooth Special Interest Group, Inc. of Kirkland, Wash. Device 6202c can also establish peer to peer communications with devices 6202a or 6202b (not shown). Other communication protocols and topologies can also be implemented. Devices 6202a and 6202b may also receive Global Positioning Satellite (GPS) signals from GPS satellites 6260.

Devices 6202a, 6202b, and 6202c can communicate with map service 6230 over one or more wired and/or wireless networks, 6212 or 6210. For instance, map service 6230 can provide map service data to rendering devices 6202a, 6202b, and 6202c. Map service 6230 may also communicate with other services 6250 to obtain data to implement map services. Map service 6230 and other services 6250 may also receive GPS signals from GPS satellites 6260.

In various embodiments, map service 6230 and/or other service(s) 6250 are configured to process search requests from any of the client devices. Search requests may include but are not limited to queries for businesses, addresses, residential locations, points of interest, or some combination thereof. Map service 6230 and/or other service(s) 6250 may be configured to return results related to a variety of parameters including but not limited to a location entered into an address bar or other text entry field (including abbreviations and/or other shorthand notation), a current map view (e.g., user may be viewing one location on the multifunction device while residing in another location), current location of the user (e.g., in cases where the current map view did not include search results), and the current route (if any). In various embodiments, these parameters may affect the composition of the search results (and/or the ordering of the search results) based on different priority weightings. In various embodiments, the search results that are returned may be a subset of results selected based on specific criteria including but not limited to a quantity of times the search result (e.g., a particular point of interest) has been requested, a measure of quality associated with the search result (e.g., highest user or editorial review rating), and/or the volume of reviews for the search results (e.g., the number of times the search result has been review or rated).

In various embodiments, map service 6230 and/or other service(s) 6250 are configured to provide auto-complete search results that are displayed on the client device, such as within the mapping application. For instance, auto-complete search results may populate a portion of the screen as the user enters one or more search keywords on the multifunction device. In some cases, this feature may save the user time as the desired search result may be displayed before the user enters the full search query. In various embodiments, the auto complete search results may be search results found by the client on the client device (e.g., bookmarks or contacts), search results found elsewhere (e.g., from the Internet) by map service 6230 and/or other service(s) 6250, and/or some combination thereof. As is the case with commands, any of the search queries may be entered by the user via voice or through typing. The multifunction device may be configured to display search results graphically within any of the map display described herein. For instance, a pin or other graphical indicator may specify locations of search results as points of interest. In various embodiments, responsive to a user selection of one of these points of interest (e.g., a touch selection, such as a tap), the multifunction device is configured to display additional information about the selected point of interest including but not limited to ratings, reviews or review snippets, hours of operation, store status (e.g., open for business, permanently closed, etc.), and/or images of a storefront for the point of interest. In various embodiments, any of this information may be displayed on a graphical information card that is displayed in response to the user's selection of the point of interest.

In various embodiments, map service 6230 and/or other service(s) 6250 provide one or more feedback mechanisms to receive feedback from client devices 6202a-6202c. For instance, client devices may provide feedback on search results to map service 6230 and/or other service(s) 6250 (e.g., feedback specifying ratings, reviews, temporary or permanent business closures, errors etc.); this feedback may be used to update information about points of interest in order to provide more accurate or more up-to-date search results in the future. In some embodiments, map service 6230 and/or other service(s) 6250 may provide testing information to the client device (e.g., an A/B test) to determine which search results are best. For instance, at random intervals, the client device may receive and present two search results to a user and allow the user to indicate the best result. The client device may report the test results to map service 6230 and/or other service(s)

6250 to improve future search results based on the chosen testing technique, such as an A/B test technique in which a baseline control sample is compared to a variety of single-variable test samples in order to improve results.

While the invention has been described with reference to numerous specific details, one of ordinary skill in the art will recognize that the invention can be embodied in other specific forms without departing from the spirit of the invention. For instance, many of the figures illustrate various touch gestures (e.g., taps, double taps, swipe gestures, press and hold gestures, etc.). However, many of the illustrated operations could be performed via different touch gestures (e.g., a swipe instead of a tap, etc.) or by non-touch input (e.g., using a cursor controller, a keyboard, a touchpad/trackpad, a near-touch sensitive screen, etc.). In addition, a number of the figures conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process.

We claim:

1. A non-transitory machine readable medium storing a navigation application for execution by at least one processing unit of a device, the navigation application comprising:
    an interface for receiving data describing junctures along a route from a first location to a second location, wherein the data for each juncture comprises a set of angles at which roads leave the juncture;
    a juncture simplifier for simplifying the set of angles of each juncture based on the received data describing the juncture;
    an arrow generator for generating at least two different representations of a same maneuver at each simplified juncture while navigating the route; and
    an arrow selector for selecting, by the at least one processing unit, one of the two different representations to display the maneuver based on a context in which the maneuver will be displayed.

2. The non-transitory machine readable medium of claim 1, wherein the navigation application further comprises a context analyzer for determining the context in which the maneuver will be displayed.

3. The non-transitory machine readable medium of claim 1, wherein the navigation application further comprises a sign generator for incorporating the selected representation into a sign for display.

4. The non-transitory machine readable medium of claim 3, wherein the sign comprises text instructions for the maneuver in addition to the selected representation, wherein the text instructions are based on the context in which the maneuver will be displayed.

5. The non-transitory machine readable medium of claim 3, wherein the sign is designed to appear similar to a road sign.

6. The non-transitory machine readable medium of claim 3, wherein the sign is overlaid on a region of a map associated with the juncture.

7. The non-transitory machine readable medium of claim 1, wherein the data that describes each juncture further comprises a tag marking one of the roads leaving the juncture as an exit road of the maneuver at the simplified juncture.

8. The non-transitory machine readable medium of claim 1, wherein the navigation application is part of a mapping and navigation application operating on a handheld device.

9. The non-transitory machine readable medium of claim 1, wherein one of the representations displays a prominent arrow that represents the maneuver at the simplified juncture, the prominent arrow overlaid on a representation of all the roads that leave the juncture, wherein the other representation displays only an arrow for performing the maneuver.

10. A non-transitory machine readable medium storing a navigation application for execution by at least one processing unit, the navigation application comprising sets of instructions for:
    receiving, for a route from a first location on a map to a second location on the map, juncture data describing junctures along the route at which maneuvers are required, wherein the juncture data for a particular juncture comprises a set of angles at which roads leave the particular juncture with one of the angles marked as an exit road for a maneuver to perform at the particular juncture;
    automatically simplifying the set of angles for the particular juncture by snapping the set of angles to a set of axes, wherein multiple angles are prevented from snapping to a same axis;
    generating a navigation arrow for the maneuver to perform at the particular juncture using the simplified set of angles; and
    displaying the generated navigation arrow in a navigation sign for the particular juncture.

11. The non-transitory machine readable medium of claim 10, wherein the axes comprise eight possible snap points at multiples of 45°.

12. The non-transitory machine readable medium of claim 11, wherein an axis at 0° represents a maneuver continuing straight through the juncture.

13. The non-transitory machine readable medium of claim 10, wherein the navigation sign that incorporates the generated arrow is overlaid on a region of the map that is associated with the particular juncture.

14. A non-transitory machine readable medium storing a navigation application for execution by at least one processing unit, the navigation application comprising sets of instructions for:
    receiving, for a route from a first location on a map to a second location on the map, juncture data describing junctures along the route at which maneuvers are required, wherein the juncture data for a particular juncture comprises a set of angles at which roads leave the particular juncture with one of the angles marked as an exit road for a maneuver to perform at the particular juncture;
    automatically simplifying the set of angles for the particular juncture by snapping the set of angles to a set of axes, wherein the angle marked as the exit road for the maneuver is prevented from snapping to an axis incompatible with the maneuver; and
    generating a navigation arrow to display for the maneuver to perform at the particular juncture using the simplified set of angles.

15. The non-transitory machine readable medium of claim 14, wherein the set of instructions for generating a navigation arrow comprises a set of instructions for using a default navigation arrow for the maneuver when the exit road would otherwise snap to an axis incompatible with the maneuver.

16. A non-transitory machine readable medium storing a navigation application for execution by at least one processing unit, the navigation application comprising sets of instructions for:

receiving juncture data describing junctures along a route at which maneuvers are required, wherein the juncture data for a particular juncture comprises a set of angles at which roads leave the juncture with one of the angles marked as an exit road for a maneuver at the particular juncture while navigating the route;

generating at least two different representations for a same particular maneuver at a particular juncture;

displaying a first representation of the particular maneuver in a first context of the navigation application; and displaying a second representation of the particular maneuver in a second context of the navigation application.

17. The non-transitory machine readable medium of claim 16, wherein the first representation comprises only a graphical description of the particular maneuver and the second representation comprises the graphical description of the particular maneuver overlaid on contextual information graphically describing the juncture.

18. The non-transitory machine readable medium of claim 16, wherein the first representation comprises an arrow showing a maneuver through the juncture overlaid on a graphical representation of all roads that leave the juncture.

19. The non-transitory machine readable medium of claim 18, wherein the graphical representation of the roads that leave the juncture has a first thickness and the arrow showing the maneuver through the juncture has a second thickness greater than the first thickness.

20. The non-transitory machine readable medium of claim 18, wherein the second representation comprises only the arrow showing the maneuver through the juncture.

21. The non-transitory machine readable medium of claim 20, wherein the arrow for the second representation is simpler than the arrow for the first representation.

22. The non-transitory machine readable medium of claim 16, wherein the first context comprises a display of a road sign for describing a maneuver during turn-by-turn navigation and the second context comprises a list of all maneuvers to perform while navigating the route.

23. A non-transitory machine readable medium storing a navigation application for execution by at least one processing unit, the navigation application comprising sets of instructions for:

receiving juncture data describing junctures along a route at which maneuvers are required, wherein the juncture data for a particular juncture comprises a set of angles at which roads leave the juncture with one of the angles marked as an exit road for a maneuver to perform at the particular juncture;

determining whether the set of angles for the particular juncture satisfies a set of criteria for simplification of the angles;

when the set of angles satisfies the set of criteria:
snapping the set of angles to a set of evenly spaced axes to simplify the set of angles; and
using a simplified set of angles to generate a directional indicator for the maneuver at the particular juncture;

when the set of angles does not satisfy the set of criteria, using a default directional indicator as the directional indicator for the maneuver at the particular juncture; and displaying the directional indicator for the maneuver at the particular juncture.

24. The non-transitory machine readable medium of claim 23, wherein the set of instructions for determining whether the set of angles satisfies a set of criteria for simplification comprises a set of instructions for determining whether simplifying the set of angles will result in the angle marked as the exit road being inconsistent with the maneuver to perform at the particular juncture.

25. The non-transitory machine readable medium of claim 23, wherein the set of instructions for determining whether the set of angles satisfies a set of criteria for simplification comprises a set of instructions for determining whether simplifying the set of angles will result in two of the angles being simplified to a same angle.

* * * * *